(12) United States Patent
Fujisaki

(10) Patent No.: US 7,466,992 B1
(45) Date of Patent: Dec. 16, 2008

(54) COMMUNICATION DEVICE

(76) Inventor: Iwao Fujisaki, 3-5-8-313 Musashinoshi, Kichijouji Kitamachi Tokyo (JP) 180-0001

( * ) Notice: Subject to any disclaimer, the term of this patent is extended or adjusted under 35 U.S.C. 154(b) by 775 days.

(21) Appl. No.: 10/904,291

(22) Filed: Nov. 3, 2004

Related U.S. Application Data

(63) Continuation of application No. 10/202,374, filed on Jul. 24, 2002, now abandoned.

(60) Provisional application No. 60/329,964, filed on Oct. 18, 2001.

(51) Int. Cl.
*H04M 1/00* (2006.01)
*H04M 1/725* (2006.01)
*H04Q 7/20* (2006.01)

(52) U.S. Cl. .............. 455/556.1; 455/566; 455/466; 455/412.1

(58) Field of Classification Search .......... 455/575.1, 455/522.1, 556.1, 557, 90.1, 550.1, 552.1, 455/566, 553.1; 379/433.01, 433.04; 348/14.05
See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,353,376 A | 10/1994 | Oh et al. | |
| 5,414,444 A | 5/1995 | Britz | |
| 5,414,461 A | 5/1995 | Kishi et al. | |
| 5,491,507 A | 2/1996 | Umezawa et al. | |
| 5,550,754 A | 8/1996 | McNelley et al. | |
| 5,687,331 A | 11/1997 | Volk et al. | |
| 5,732,383 A | 3/1998 | Foladare et al. | |
| 5,844,824 A | 12/1998 | Newman et al. | |
| 5,879,289 A | 3/1999 | Yarush et al. | |
| 5,902,349 A | 5/1999 | Endo et al. | |
| 5,915,020 A | 6/1999 | Tilford et al. | |
| 5,917,542 A | 6/1999 | Moghadam et al. | |
| 5,918,183 A | 6/1999 | Janky et al. | |
| 5,959,661 A * | 9/1999 | Isono | 348/14.05 |
| 5,966,643 A | 10/1999 | Radley | |
| 6,009,336 A * | 12/1999 | Harris et al. | 455/566 |
| 6,023,278 A | 2/2000 | Margolin | |
| 6,038,295 A | 3/2000 | Mattes | |
| 6,055,513 A | 4/2000 | Katz et al. | |
| 6,073,034 A | 6/2000 | Jacobsen et al. | |
| 6,081,265 A | 6/2000 | Nakayama et al. | |
| 6,133,853 A | 10/2000 | Obradovich et al. | |
| 6,144,848 A | 11/2000 | Walsh et al. | |
| 6,148,261 A | 11/2000 | Obradovich et al. | |
| 6,175,717 B1 | 1/2001 | Rebec et al. | |
| 6,177,950 B1 | 1/2001 | Robb | |
| 6,192,257 B1 * | 2/2001 | Ray | 455/566 |
| 6,202,060 B1 | 3/2001 | Tran | |
| 6,222,482 B1 * | 4/2001 | Gueziec | 342/357.08 |
| 6,236,832 B1 | 5/2001 | Ito | |
| 6,243,030 B1 | 6/2001 | Levine | |
| 6,243,039 B1 | 6/2001 | Elliot | |
| 6,246,960 B1 | 6/2001 | Lin | |
| 6,259,405 B1 | 7/2001 | Stewart et al. | |
| 6,261,247 B1 | 7/2001 | Ishikawa et al. | |

(Continued)

*Primary Examiner*—Tilahun B Gesesse

(57) ABSTRACT

The communication device which implements the target device location indicating function, the motion visual image producing function, the non-motion visual image producing function, and the auto backing up function. The target device location indicating function indicates the current location of the target device, the motion visual image producing function retrieves the motion visual image data from the camera, the non-motion visual image producing function retrieves the non-motion visual image data from the camera, and the auto backing up function transfers the data stored in the communication device to another computer for purposes of storing backup data therein.

20 Claims, 109 Drawing Sheets

U.S. PATENT DOCUMENTS

| | | | |
|---|---|---|---|
| 6,275,190 B1 | 8/2001 | Sugiura et al. | |
| 6,278,383 B1 * | 8/2001 | Endo et al. | 340/995.14 |
| 6,278,884 B1 * | 8/2001 | Kim, II | 455/556.1 |
| 6,285,317 B1 * | 9/2001 | Ong | 342/357.13 |
| 6,292,747 B1 | 9/2001 | Amro et al. | |
| 6,300,976 B1 | 10/2001 | Fukuoka | |
| 6,304,218 B1 | 10/2001 | Sugiura et al. | |
| 6,304,729 B2 | 10/2001 | Honda et al. | |
| 6,317,039 B1 | 11/2001 | Thomason | |
| 6,317,049 B1 | 11/2001 | Toubia et al. | |
| 6,317,684 B1 | 11/2001 | Roeseler et al. | |
| 6,320,535 B1 | 11/2001 | Hillman et al. | |
| 6,321,161 B1 | 11/2001 | Herbst et al. | |
| 6,323,803 B1 | 11/2001 | Jolley et al. | |
| 6,323,892 B1 | 11/2001 | Mihara | |
| 6,323,893 B1 | 11/2001 | Tosaya | |
| 6,327,471 B1 | 12/2001 | Song | |
| 6,327,534 B1 | 12/2001 | Levanon et al. | |
| 6,342,915 B1 | 1/2002 | Ozaki et al. | |
| 6,362,778 B2 | 3/2002 | Neher | |
| 6,366,782 B1 | 4/2002 | Fumarolo et al. | |
| 6,401,035 B2 | 6/2002 | Jin | |
| 6,405,033 B1 | 6/2002 | Kennedy, III et al. | |
| 6,415,138 B2 * | 7/2002 | Sirola et al. | 455/90.1 |
| 6,415,222 B1 | 7/2002 | Sato et al. | |
| 6,424,369 B1 | 7/2002 | Adair | |
| 6,424,843 B1 | 7/2002 | Reitmaa et al. | |
| 6,430,498 B1 | 8/2002 | Maruyama et al. | |
| 6,445,802 B1 | 9/2002 | Dan | |
| 6,452,626 B1 * | 9/2002 | Adair et al. | 348/158 |
| 6,456,854 B1 | 9/2002 | Chern et al. | |
| 6,477,387 B1 | 11/2002 | Jackson et al. | |
| 6,487,422 B1 | 11/2002 | Lee | |
| 6,512,919 B2 | 1/2003 | Ogasawara | |
| 6,515,595 B1 | 2/2003 | Obradovich et al. | |
| 6,525,768 B2 | 2/2003 | Obradovich | |
| 6,529,742 B1 | 3/2003 | Yang | |
| 6,532,374 B1 | 3/2003 | Chennakeshu et al. | |
| 6,611,753 B1 | 8/2003 | Millington | |
| 6,647,251 B1 | 11/2003 | Siegle et al. | |
| 6,658,272 B1 * | 12/2003 | Lenchik et al. | 455/575.1 |
| 6,690,932 B1 | 2/2004 | Barnier et al. | |
| 6,701,148 B1 | 3/2004 | Wilson et al. | |
| 6,707,942 B1 | 3/2004 | Cortopassi et al. | |
| 6,711,399 B1 | 3/2004 | Granier | |
| 6,725,022 B1 | 4/2004 | Clayton et al. | |
| 6,738,643 B1 | 5/2004 | Harris | |
| 6,763,226 B1 | 7/2004 | McZeal, Jr. | |
| 6,779,030 B1 | 8/2004 | Dugan et al. | |
| 6,795,715 B1 * | 9/2004 | Kubo et al. | 455/556.1 |
| 6,819,939 B2 | 11/2004 | Masamura | |
| 6,836,654 B2 | 12/2004 | Decotignie | |
| 6,891,525 B2 | 5/2005 | Ogoro | |
| 6,898,321 B1 | 5/2005 | Knee et al. | |
| 6,898,765 B2 | 5/2005 | Matthews, III et al. | |
| 6,901,383 B1 | 5/2005 | Ricketts et al. | |
| 6,922,630 B2 | 7/2005 | Maruyama et al. | |
| 6,947,728 B2 | 9/2005 | Tagawa et al. | |
| 6,968,206 B1 * | 11/2005 | Whitsey-Anderson | 455/556.1 |
| 6,999,802 B2 * | 2/2006 | Kim | 455/575.1 |
| 7,007,239 B1 | 2/2006 | Hawkins et al. | |
| 7,012,999 B2 | 3/2006 | Ruckart | |
| 7,035,666 B2 | 4/2006 | Silberfenig | |
| 7,058,356 B2 * | 6/2006 | Slotznick | 455/3.05 |
| 7,081,832 B2 | 7/2006 | Nelson et al. | |
| 7,085,739 B1 | 8/2006 | Winter et al. | |
| 7,089,298 B2 | 8/2006 | Nyman et al. | |
| 7,107,081 B1 * | 9/2006 | Fujisaki | 455/575.1 |
| 7,127,238 B2 | 10/2006 | Vandermeijden et al. | |
| 7,127,271 B1 * | 10/2006 | Fujisaki | 455/556.1 |
| 7,130,630 B1 | 10/2006 | Enzmann et al. | |
| 7,218,916 B2 | 5/2007 | Nonami | |
| 7,233,795 B1 | 6/2007 | Ryden | |
| 7,274,952 B2 * | 9/2007 | Hayashi | 455/575.1 |
| 2001/0045978 A1 | 11/2001 | McConnell et al. | |
| 2002/0028690 A1 | 3/2002 | McKenna et al. | |
| 2002/0034292 A1 | 3/2002 | Tuoriniemi | |
| 2002/0065037 A1 | 5/2002 | Messina et al. | |
| 2002/0066115 A1 | 5/2002 | Wendelrup | |
| 2002/0068585 A1 | 6/2002 | Chan et al. | |
| 2002/0068599 A1 | 6/2002 | Rodriguez et al. | |
| 2002/0094806 A1 | 7/2002 | Kamimura | |
| 2002/0102960 A1 | 8/2002 | Lechner | |
| 2002/0111139 A1 | 8/2002 | Nishiyama et al. | |
| 2002/0120718 A1 | 8/2002 | Lee | |
| 2002/0133342 A1 | 9/2002 | McKenna | |
| 2002/0137526 A1 | 9/2002 | Shinohara | |
| 2002/0151326 A1 | 10/2002 | Awada et al. | |
| 2002/0151327 A1 | 10/2002 | Levitt | |
| 2002/0173344 A1 | 11/2002 | Cupps et al. | |
| 2002/0178225 A1 | 11/2002 | Madenberg et al. | |
| 2002/0191951 A1 | 12/2002 | Sodeyama et al. | |
| 2002/0196378 A1 | 12/2002 | Slobodin et al. | |
| 2002/0198813 A1 | 12/2002 | Patterson, Jr. et al. | |
| 2002/0198936 A1 | 12/2002 | McIntyre et al. | |
| 2003/0007556 A1 | 1/2003 | Oura et al. | |
| 2003/0013483 A1 | 1/2003 | Ausems et al. | |
| 2003/0014286 A1 | 1/2003 | Cappellini | |
| 2003/0032406 A1 | 2/2003 | Minear et al. | |
| 2003/0045301 A1 | 3/2003 | Wollrab | |
| 2003/0045311 A1 | 3/2003 | Larikka et al. | |
| 2003/0052964 A1 | 3/2003 | Priestman et al. | |
| 2003/0055994 A1 | 3/2003 | Herrmann et al. | |
| 2003/0065805 A1 | 4/2003 | Barnes, Jr. | |
| 2003/0083055 A1 | 5/2003 | Riordan et al. | |
| 2003/0093790 A1 | 5/2003 | Logan et al. | |
| 2003/0100326 A1 | 5/2003 | Grube et al. | |
| 2003/0114191 A1 | 6/2003 | Nishimura | |
| 2003/0117316 A1 | 6/2003 | Tischer | |
| 2003/0135563 A1 | 7/2003 | Bodin et al. | |
| 2003/0181201 A1 * | 9/2003 | Bomze et al. | 455/414.3 |
| 2003/0220835 A1 | 11/2003 | Barnes, Jr. | |
| 2003/0224760 A1 | 12/2003 | Day | |
| 2003/0227570 A1 | 12/2003 | Kim et al. | |
| 2003/0229900 A1 | 12/2003 | Reisman | |
| 2003/0236866 A1 | 12/2003 | Light | |
| 2004/0003307 A1 | 1/2004 | Tsuji | |
| 2004/0029640 A1 | 2/2004 | Masuyama et al. | |
| 2004/0034692 A1 | 2/2004 | Eguchi et al. | |
| 2004/0082321 A1 | 4/2004 | Kontianinen | |
| 2004/0107072 A1 | 6/2004 | Dietrich et al. | |
| 2004/0137893 A1 | 7/2004 | Muthuswamy et al. | |
| 2004/0157664 A1 | 8/2004 | Link | |
| 2004/0166832 A1 | 8/2004 | Portman et al. | |
| 2004/0174863 A1 | 9/2004 | Caspi et al. | |
| 2004/0183937 A1 | 9/2004 | Viinikanoja et al. | |
| 2004/0252197 A1 | 12/2004 | Fraley et al. | |
| 2005/0070257 A1 | 3/2005 | Saarinen et al. | |
| 2005/0136949 A1 | 6/2005 | Barnes et al. | |
| 2005/0153745 A1 | 7/2005 | Smethers | |
| 2005/0164684 A1 | 7/2005 | Chen et al. | |
| 2005/0165871 A1 | 7/2005 | Barrs, II et al. | |
| 2005/0235312 A1 | 10/2005 | Karaoguz et al. | |
| 2005/0261945 A1 | 11/2005 | Mougin et al. | |
| 2006/0041923 A1 | 2/2006 | McQuaide, Jr. | |
| 2006/0143655 A1 | 6/2006 | Ellis et al. | |
| 2006/0166650 A1 | 7/2006 | Berger et al. | |
| 2006/0206913 A1 | 9/2006 | Jerding et al. | |
| 2007/0109262 A1 | 5/2007 | Oshima et al. | |
| 2008/0014917 A1 | 1/2008 | Rhoades et al. | |
| 2008/0058005 A1 | 3/2008 | Zicker et al. | |

* cited by examiner

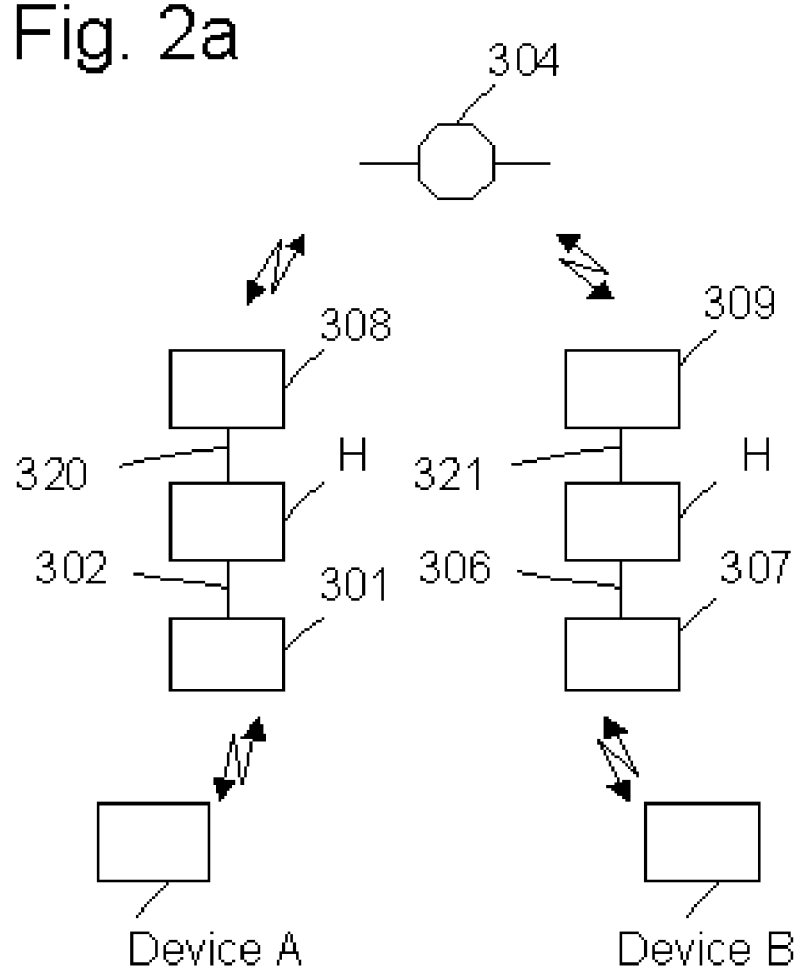

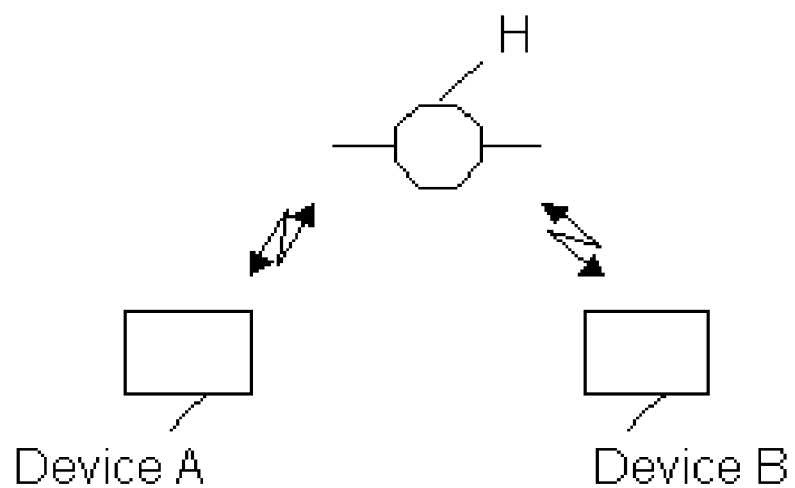

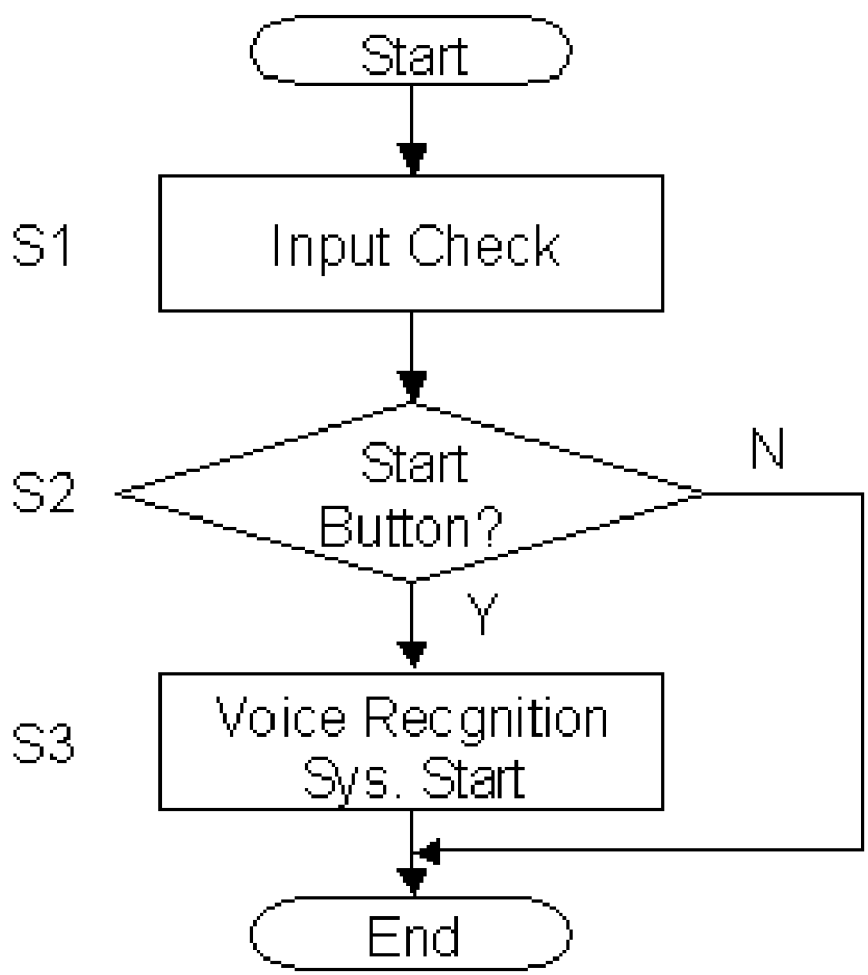

Fig. 8

Table #1

| Audio Info #1 | Scott |
|---|---|
| Audio Info #2 | Carol |
| Audio Info #3 | Peter |
| Audio Info #4 | Amy |
| Audio Info #5 | Brian |

Fig. 9

Table #2

| | |
|---|---|
| Scott | (916) 411-2526 |
| Carol | (418) 675-6566 |
| Peter | (220) 890-1567 |
| Amy | (615) 125-3411 |
| Brian | (042) 645-2097 |

Fig. 10

Table #A

| Audio Info #1 | (916) 411-2526 |
| --- | --- |
| Audio Info #2 | (418) 675-6566 |
| Audio Info #3 | (220) 890-1567 |
| Audio Info #4 | (615) 125-3411 |
| Audio Info #5 | (042) 645-2097 |

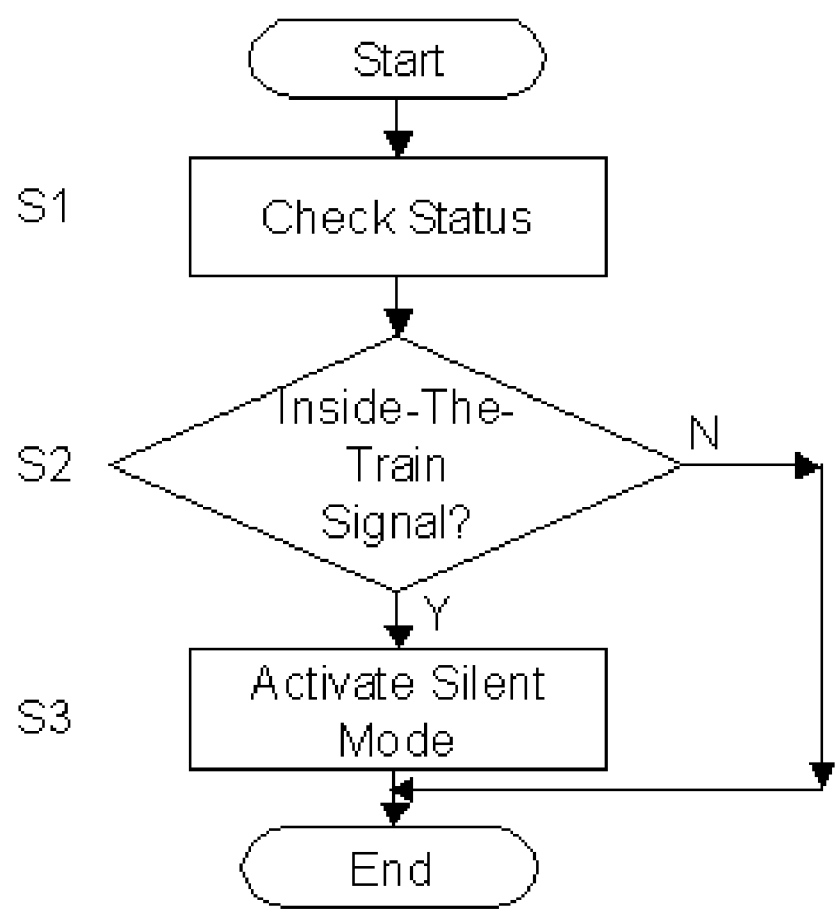

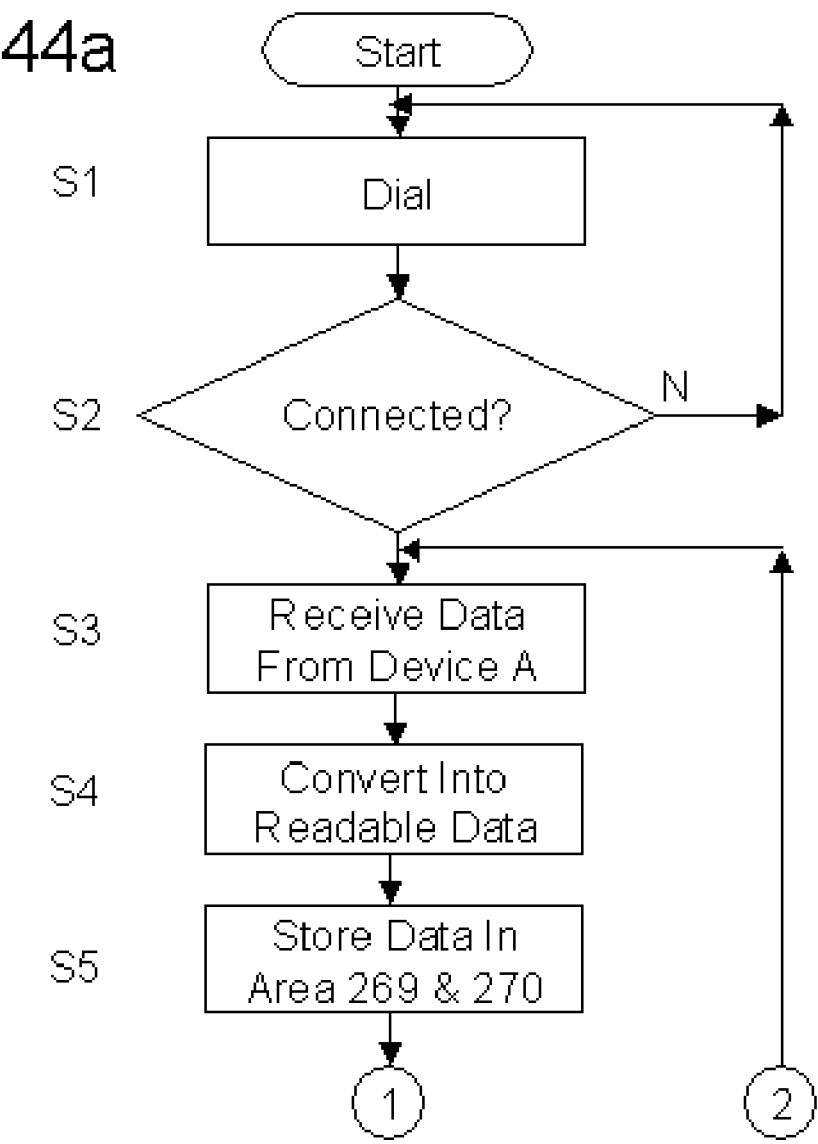

Area 267

Area 267

Fig. 45

RAM 206

Table C

| Phone #1 | Color A | Sound E |
| Phone #2 | Color B | Sound F |
| Phone #3 | Color C | Sound G |
| Phone #4 | Color D | Sound H |

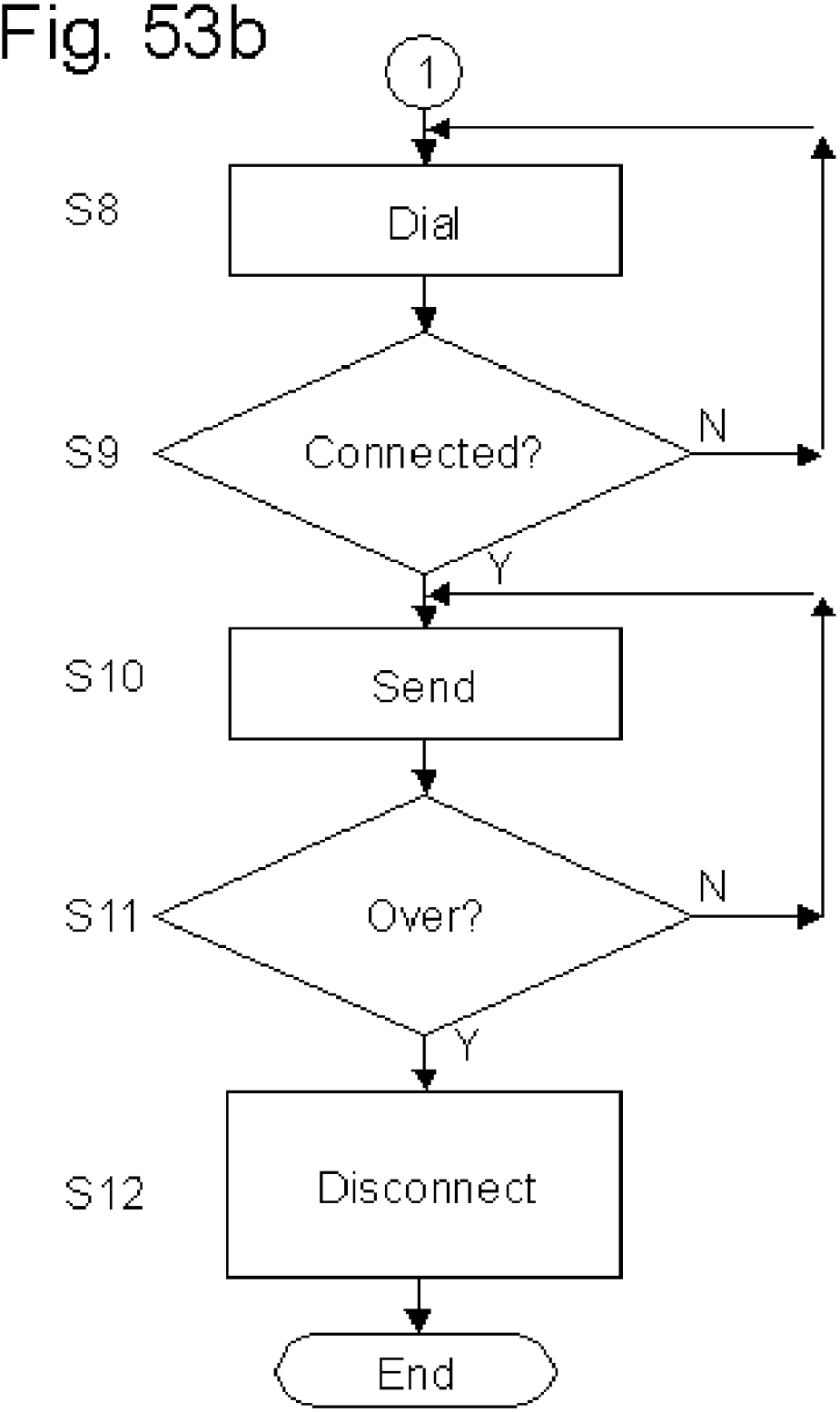

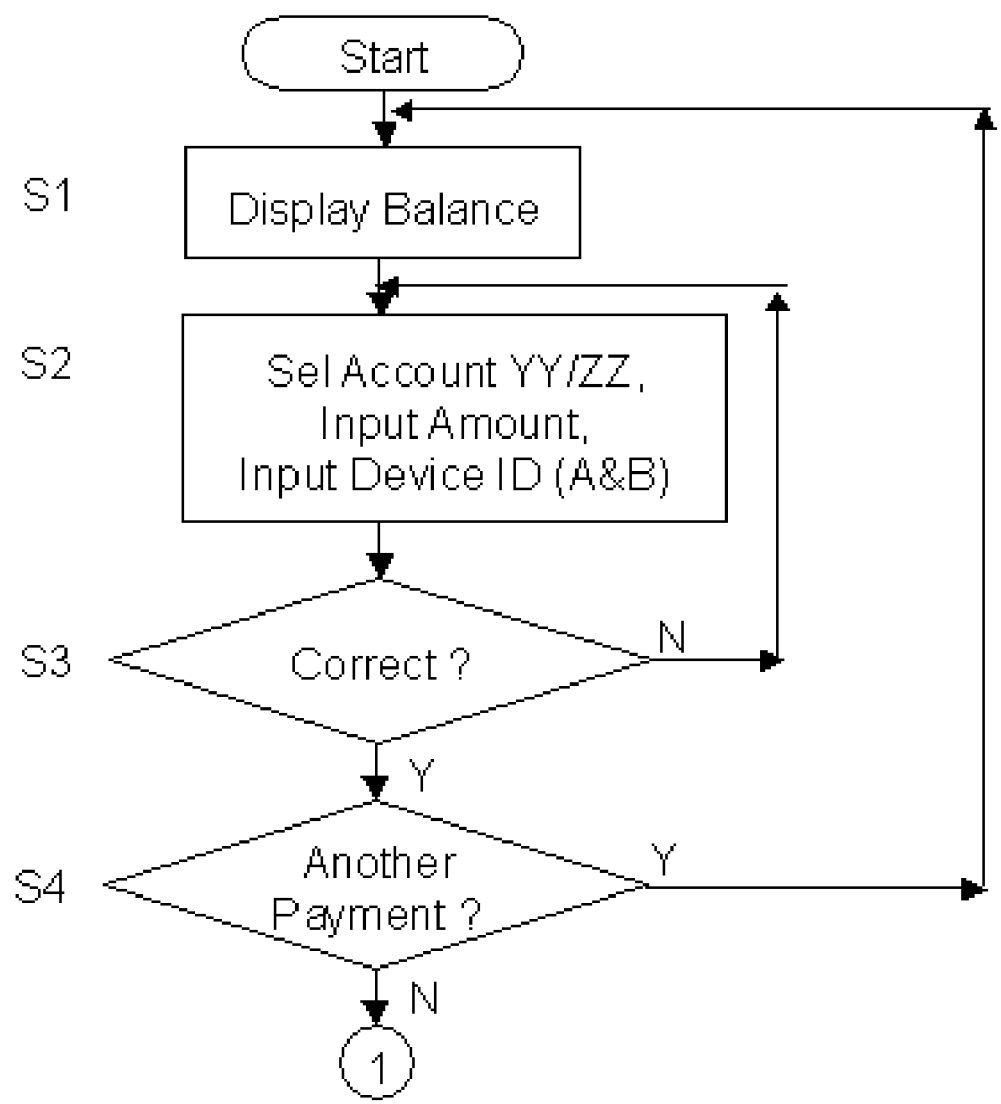

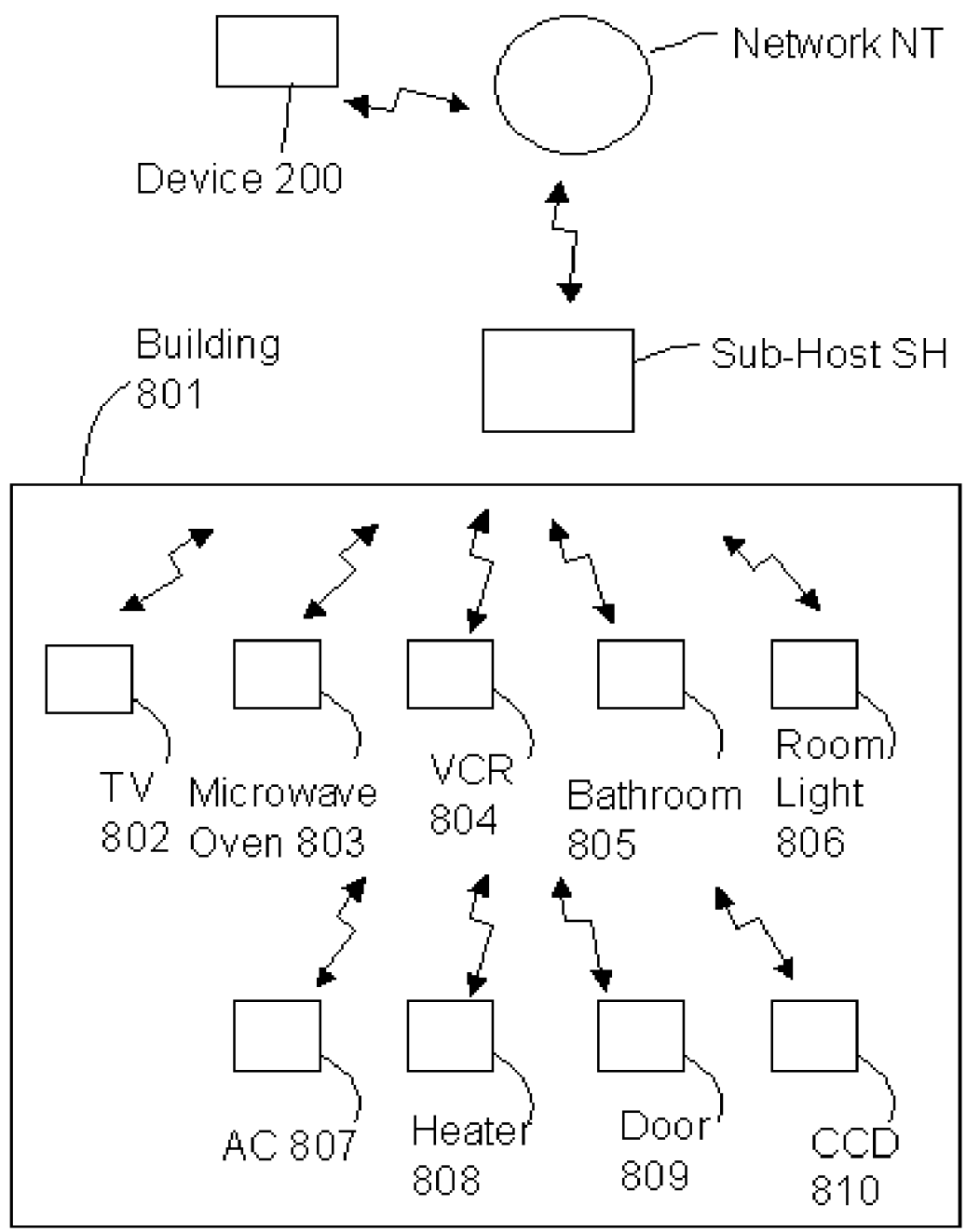

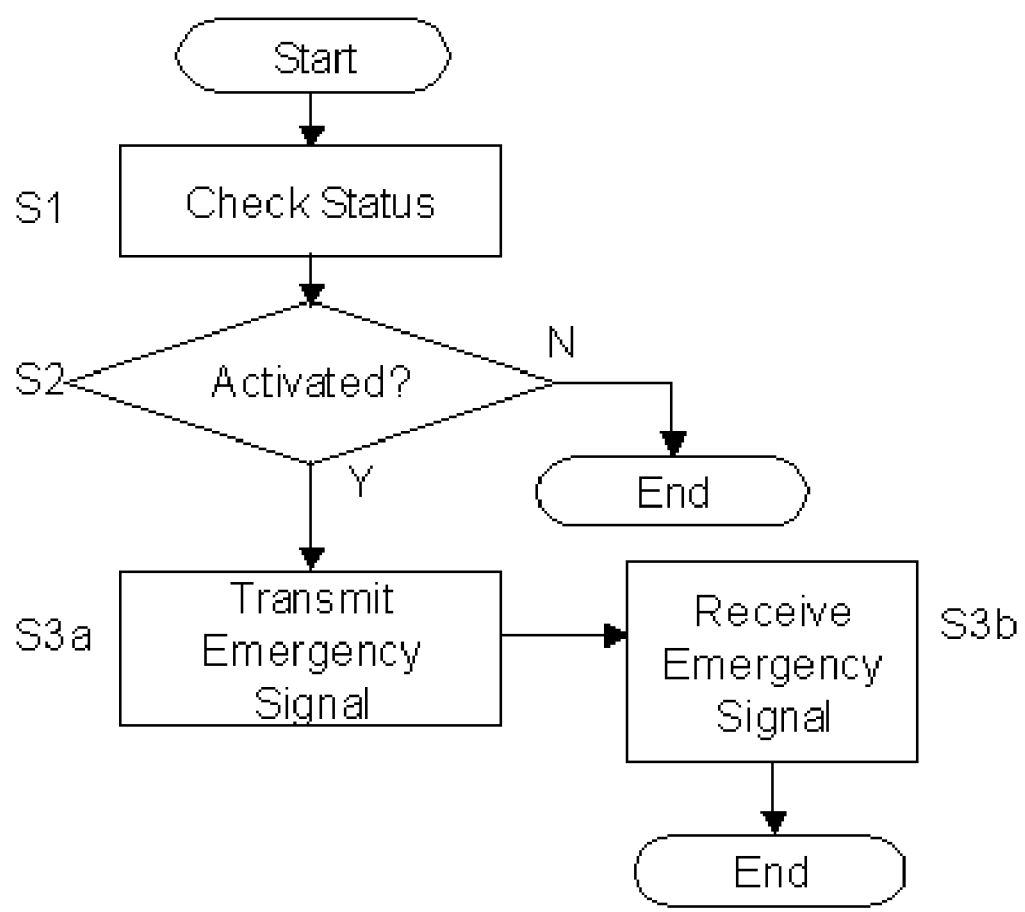

COMMUNICATION DEVICE

CROSS REFERENCE TO RELATED APPLICATIONS

This application is a continuation of U.S. Ser. No. 10/202,374, filed 2002 Jul. 24 now abandoned, which claims the benefit of U.S. Provisional Application No. 60/329,964, filed 2001 Oct. 18, both of which are hereby incorporated herein by reference.

BACKGROUND OF INVENTION

The invention relates to a communication device and more particularly to the communication device which is capabile to communicate with another communication device in a wireless fashion.

U.S. Pat. No. 6,532,374 is introduced as a prior art of the present invention of which the summary is the following: 'A radiotelephone includes a base unit mounted within the vehicle having a wide area transceiver for communicating with a station outside the vehicle, a control unit disposed in the vehicle remotely from the base unit, and a local area network for establishing a communication link between the base unit and the control unit. The local area network is adapted to transmit control and data signals between the base unit and the control unit. The control unit includes a keypad for entering commands and data that are transmitted to the base unit via the local area network, and a display for displaying information to the user. The control unit may also include a speaker and microphone. Alternatively, the speaker and microphone may be contained in a remote audio unit that is linked to the base unit via the local area network. The control unit may, for example, be incorporated into the steering wheel of a vehicle while the base unit is concealed in the trunk or under the seat of the vehicle.'

U.S. Pat. No. 6,525,768 is introduced as a prior art of the present invention of which the summary is the following: 'A location tagged data provision and display system. A personal communication device (PCD) with electromagnetic communication capability has a GPS receiver and a display. The PCD requests maps and location tagged data from data providers and other for display on the PCD. The data providers respond to requests by using searching and sorting schemes to interrogate data bases and then automatically transmitting data responsive to the requests to the requesting PCD.'

U.S. Pat. No. 6,515,595 is introduced as a prior art of the present invention of which the summary is the following: 'A location tagged data provision and display system. A personal communication device (PCD) with electromagnetic communication capability has a GPS receiver and a display. The PCD requests maps and location tagged data from data providers and other for display on the PCD. The data providers respond to requests by using searching and sorting schemes to interrogate data bases and then automatically transmitting data responsive to the requests to the requesting PCD.'

U.S. Pat. No. 6,456,854 is introduced as a prior art of the present invention of which the summary is the following: 'A system and method for locating mobile telephone devices via the Web. The mobile telephone device obtains and provides its location to a Web server in GPS latitude and longitude format. The communication between the Web server and the mobile telephone device may be through a browser or through mobile originated short message service. The Web server records the location information along with the time of receipt. Over time, the Web server may record several locations for a single mobile telephone device so that the progress of the mobile unit may be mapped. The information contained in the Web server is accessible to devices with Web browsing capabilities. A Web browsing device queries the Web server for location information pertaining to a particular mobile telephone device. The Web server may require authorization for such information before sending the location to the requesting device. The location information may be sent in a text only format or as text with graphics, depending on the display capabilities of the requesting Web browsing device.'

U.S. Pat. No. 6,415,222 is introduced as a prior art of the present invention of which the summary is the following: 'A navigation system includes an information storage unit that stores map data including fork pattern data. A retrieval device obtains fork information from the map data and retrieves the connection between an entrance lane and an exit lane and the number of lanes at an approaching fork. A fork schematic drawing generation device generates a schematic drawing of a approaching fork by a selecting a fork pattern based on the connection between the entrance and exit lanes and the number of lanes that have been retrieved.'

U.S. Pat. No. 6,401,035 is introduced as a prior art of the present invention of which the summary is the following: 'An Interactive Real-Time Distributed Navigation system is disclosed. In the present invention a user's location is determined by generating a position signal at the user's location. Through wireless communication between the user and distributed navigation servers, the user is presented with a list of candidate locations. The user's choice from the candidate list are then used by the navigation servers to obtain an accurate measurement of the user's location. Having established a user's location, the system proceeds to provide navigational prompts to the user to reach a final destination.'

U.S. Pat. No. 6,362,778 is introduced as a prior art of the present invention of which the summary is the following: 'A personal locator system for determining the location of a locator unit. The system includes a locator device in communication with both a central station and a GPS satellite. The locator unit includes a portable housing able to be worn about the wrist of a user. A communication system is positioned within the housing for contacting the central station and includes a transmitter and receiver. A GPS unit is also positioned within the housing for contacting the GPS system for determining a location of said locator device. Upon receipt of a location request signal by the receiver from the central station, the locator unit activates the GPS unit to contact the GPS system and receive location data therefrom. Upon receipt of the location data, the transmitter transmits the location data to the central station for analysis. A panic button is provided for transmitting an emergency signal to the central station and initiating detecting the location of the locator unit. A non-emergency call button is provided for transmitting a location request signal to the central station and in response thereto, informing a person on the contact list as to the location of the locator device. The communication system utilizes one of a POTS, cellular, PCS or internet communications network. A tamper detection sensor detects when said device is tampered with. A beacon generator generates an ultrasonic or radio frequency beacon signal for aiding a person in pinpointing a location of the device.'

U.S. Pat. No. 6,327,534 is introduced as a prior art of the present invention of which the summary is the following: 'A system and method for unambiguously determining the position of a user terminal (for example, a mobile wireless telephone) in a low-Earth orbit satellite communications system. The system includes a user terminal, at least two satellites with known positions and known velocities, and a gateway (that is, a terrestrial base station) for communicating with the user terminal through the satellites. The method includes the steps of determining a range parameter, a range difference parameter, and either or both of a range-rate parameter and a range-rate difference parameter. A range parameter represents a distance between one of the satellites and the user terminal. A range difference parameter represents the difference between (1) the distance between a first one of the satellites and the user terminal and (2) the distance between a second one of the satellites and the user terminal. A range-rate parameter represents a relative radial velocity between one of the satellites and the user terminal. A range-rate difference parameter represents the difference between (a) a relative radial velocity between a first one of the satellites and the user terminal and (b) a relative radial velocity between a second one of the satellites and the user terminal. The position of the user terminal on the Earth's surface is then determined based on the known positions and known velocities of the satellites, the range parameter, the range difference parameter, and either or both of the range-rate parameter and the range-rate difference parameter.'

U.S. Pat. No. 6,327,471 is introduced as a prior art of the present invention of which the summary is the following: 'A method and an apparatus is provided for acquiring satellite signals to establish the exact spatial position of a cellular radiotelephone, in order to perform a timely dropoff or smooth handoff to another base station or frequency. The cellular radiotelephone is equipped with its own positioning system which uses satellite data to determine its spatial position. The communication system is preferably a Code Division Multiple Access (CDMA) system, and the positioning system is preferably a Global Positioning System (GPS). The method of the present invention may be used to determine the base station closest to the cellular radiotelephone. In the alternative, it may be used to compute a distance between the cellular radiotelephone and a location where the quality level of the cellular radiotelephone communication signal is predicted to be less than the predetermined value, and to determine from the computed distance whether the cellular radiotelephone should be handed off.'

U.S. Pat. No. 6,323,803 is introduced as a prior art of the present invention of which the summary is the following: 'A system for broadcasting GPS assistance data in a wireless communication network to mobile stations is disclosed herein. Each mobile station includes a transceiver operating in the wireless communication network and an integrated GPS receiver to make GPS positioning measurements. The system includes a GPS receiver for obtaining orbital modeling information for visible GPS satellites and DGPS correction data. A transceiver communicates with mobile stations in the wireless communication network. A broadcast controller is operatively associated with the GPS receiver and the transceiver for selectively establishing a direct point-to-point channel with select mobile stations for transferring the orbital modeling information and for periodically broadcasting the DGPS correction data on the wireless communication network to all mobile stations communicating in the wireless communication network.'

U.S. Pat. No. 6,321,161 is introduced as a prior art of the present invention of which the summary is the following: 'A feature for a navigation system provides an evaluation of alternative routes. According to this feature, the navigation system provides information to the vehicle driver about departing from a route being followed. This allows the driver to make an assessment whether to depart from the route being followed or stay on the route. This feature enables driver-observable traffic conditions to be taken into account by the vehicle driver.'

U.S. Pat. No. 6,320,535 is introduced as a prior art of the present invention of which the summary is the following: 'A system that tracks and monitors a vehicle by utilizing cellular communication componentry and global positioning system componentry is disclosed. The system provides for simultaneous and continuous transmission of a voice signal and location data to a monitoring center. The monitoring center comprises componentry to communicate with the vehicle and determine the vehicle's location on a digitized map using a computer. In one embodiment, the location data is modulated onto a carrier and the modulated carrier is inserted into a relatively narrow band of frequencies that have been removed from an audio data channel such as, for example, a cellular telephone voice channel.'

U.S. Pat. No. 6,317,684 is introduced as a prior art of the present invention of which the summary is the following: 'The invention provides an apparatus and method for route planning and navigation using a portable communication device. A route planning and navigation unit receives a route request from a caller. The route planning and navigation unit checks the latest traffic/road condition data, long term map database, knowledge database, Internet resources, if necessary, and then determines the best route for the driver to reach the destination. The caller may also enter general destination information and be prompted to may a selection from the possible choices. The route planning and navigation unit may also provide exact location information to police officers and emergency personnel, if necessary. During the navigation phase, the caller may receive turn-by-turn navigation and reminders to change lanes in preparation for turns, etc. The route planning and navigation unit may monitor the caller's location, speed, and direction, and provide the caller with updates based on new traffic or road condition changes affecting the caller's route.'

U.S. Pat. No. 6,317,049 is introduced as a prior art of the present invention of which the summary is the following: 'A micropower transponder operates in conjunction with a constellation of low-to-medium Earth-orbiting communication satellites. The transponder is attached to a person, animal, or object. The location of a missing person, animal, or lost object is ascertained by locating the transponder associated with that person, animal, or object. The transponder may be hidden in the individual's hair, timepiece, jewelry, or article of clothing; may be swallowed by the individual; may be implanted under the individual's skin; or incorporated into an inconspicuous hand-held device such as a cellular telephone, pager, or calculator. The transponder includes a receiver for receiving an interrogation radio signal and a transmitter for transmitting a response radio signal. The transponder transmits the response radio signal in response to the interrogation radio signal if the interrogation radio signal includes a code matching the access code stored in the transponder. The Doppler shift in frequency of the response radio signal is measured and the Doppler shift is used to determine the location of the transponder.'

U.S. Pat. No. 6,304,218 is introduced as a prior art of the present invention of which the summary is the following: 'A method of detecting a position of a radio mobile station in radiocommunications, which is capable of accurately and simply finding the position of the mobile station. At a measuring point the mobile station measures the reception radio strength levels from a plurality of base stations and conveys the measurement results through the base station to a control station. The control station learns, through a neural network, the correlation between the reception radio strength levels and the position of the mobile station on the basis of the measurement results at a plurality of measuring points and the positions of the measuring points. Subsequently, when the mobile station communicates to the control station the reception radio strength levels measured at an arbitrary point, the control station estimates the position of the mobile station, causing those measurement results, on the basis of the correlation obtained through the learning.'

U.S. Pat. No. 6,285,317 is introduced as a prior art of the present invention of which the summary is the following: 'A navigation system for a mobile vehicle includes a vehicle position data generator for generating signals indicating location of the mobile vehicle, and scene information provider which generates information representative of the layouts of local environs at various locations and a display. A real environment scene generator, using position data acquired from the vehicle position data generator, acquires information from the local scene information provider representative of the local scene at the vehicle position indicated by the position data. The real environment scene generator generates location pertinent information which is used by the display to display a scene depicting the locality setting in a three dimensional format. The real environment scene generator also generates direction information which is used to display directions overlaid on the displayed local scene. The displayed scene and overlaid directions are constantly updated to reflect the changing locality as the position of the vehicle changes.'

U.S. Pat. No. 6,278,383 is introduced as a prior art of the present invention of which the summary is the following: 'A navigation apparatus for displaying most appropriately information such as character strings, routes, etc., when a map is displayed by bird's-eye view display. The navigation apparatus includes a portion for calculating the present position on the basis of information from sensors, a portion for executing perspective conversion operation for displaying a map by bird's-eye view display, a portion for disposing the present position or the present position and a position representing a destination at the most suitable positions, a portion for controlling so that overlap of character strings can be eliminated, a portion for controlling the same character strings, a portion for displaying most appropriately a background such as lines and planes, a portion for controlling marks to be displayed, and a portion for executing graphic plotting by using the resulting map data.'

U.S. Pat. No. 6,275,190 is introduced as a prior art of the present invention of which the summary is the following: 'A method of detecting a position of a radio mobile station in radiocommunications, which is capable of accurately and simply finding the position of the mobile station. At a measuring point the mobile station measures the reception radio strength levels from a plurality of base stations and conveys the measurement results through the base station to a control station. The control station learns, through a neural network, the correlation between the reception radio strength levels and the position of the mobile station on the basis of the measurement results at a plurality of measuring points and the positions of the measuring points. Subsequently, when the mobile station communicates to the control station the reception radio strength levels measured at an arbitrary point, the control station estimates the position of the mobile station, causing those measurement results, on the basis of the correlation obtained through the learning.'

U.S. Pat. No. 6,261,247 is introduced as a prior art of the present invention of which the summary is the following: 'An anatomical position sensing system (100) using one or more substantially spherical transponders for measuring relative positions and distances. Transponders (P) and (S) are capable of receiving and transmitting RF signals, and communicating between themselves and with a separate CPU (112). The CPU (112) is controlled by an operator at an operator control panel (114), interacts with an alarm (120) for providing audible alerts to the operator, and a display for displaying information to the operator. The CPU (112) controls a broadband antenna (118) to transmit, at a frequency $f.sub.1$, a low-frequency RF power signal (122) across a wide field to energize the transponders (P) and (S). Directional components (122a) and (122b) intercept and energize the transponders (P) and (S). Once energized, transponder (P) transmits a range signal in all directions including component (124) at a very high RF frequency $f.sub.2$, extending from transponder (P) to transponder (S). Upon receipt of the range signal (124), transponder (S) emits a data signal at a very high RF frequency $f.sub.3$ in all directions, including component (126), which is directed at the antenna (118). The distance (D) is determined by measuring the attenuation of the range signal (124) as it is received by transponder (S). Transponder (S) then modulates the value of the strength of the incoming range signal (124) onto the data signal. The CPU (112) computes the distance (D) from the incoming data signal (126) from a lookup table derived from a sequence of calibration steps prior to beginning normal operation.'

U.S. Pat. No. 6,259,405 is introduced as a prior art of the present invention of which the summary is the following: 'A geographic based communications service system that includes a network and a plurality of access points connected to the network and arranged at known locations in a geographic region. One or more service providers or information providers may be connected to the network to provide services or information on the network. A mobile user (MU) may use a portable computing device (PCD) to connect to the network and access information or services from the network. The PCD may be configured to transmit a signal indicating a presence of the PCD as well as identification information indicating the mobile user. Upon detection of the wireless signal by a first access point in proximity to the PCD, and upon receipt of the identification information indicating the user of the PCD, the first access point may transmit the identification information, as well as the known geographic location of the first access point, to one or more providers on the network. The known geographic location of the first access point indicates the approximate location of the PCD of the mobile user. A first information provider may receive this information and provide content information or services to the mobile user. For example, the first information provider may select content information dependent upon the known geographic location of the first access point and demographic information or past activities of the mobile user of the PCD. The first information provider may then provide the selected content information through the network and through the first access point to the PCD of the mobile user.'

U.S. Pat. No. 6,246,960 is introduced as a prior art of the present invention of which the summary is the following: 'An enhanced positioning method and system with altitude measurement includes the steps of receiving the inertial measurements from an inertial sensor, the global positioning system raw measurements from a global positioning system processor, and the altitude measurement from an altitude measurement device and performing integrated filtering, feeding the velocity and acceleration back to the global positioning system satellite signal tracking loops, and using integration solution to aid the global positioning system satellite signal carrier phase ambiguity resolution. The present invention provides a positioning method and system with high accuracy and robustness. The global positioning system measurements assure the long term positioning accuracy and the inertial measurements assure the short term positioning accuracy.

The altitude measurement improves the vertical positioning accuracy. The velocity and acceleration from the inertial device aid the global positioning system signal tracking. The integrated positioning solution is employed to derive the global positioning system carrier phase ambiguity number. The present patent supports high precision navigation in general aviation and space applications. It also supports high precision approach and landing for aircraft, reusable launch vehicles, and other air transportation vehicles.'

U.S. Pat. No. 6,243,030 is introduced as a prior art of the present invention of which the summary is the following: 'An electronic navigation system using wirelessly transmitted video map images from one or more ground based transmitters together with wireless receivers having visual display available to travelers, for receiving and displaying the video map images. In one embodiment a cellular system is provided using video map images covering different zones or cells of a city or other community. GPS reception is combined to additionally provide location, direction, and speed parameters on the received video maps. Transmitted video image information may also include names of streets, roads, as well as places of interest and to obtain service and assistance in emergencies. Interactive controls are provided as supplements to assist travelers in obtaining specific information as well as additional information.'

U.S. Pat. No. 6,222,482 is introduced as a prior art of the present invention of which the summary is the following: 'A hand-held device has access to a three-dimensional geometry database and a GPS receiver, and provides information on the one or more closest features to the device location in the three-dimensional geometry database. The system has data input devices, optionally digital cameras, and a data processor executing a location process. A multiresolution process creates one or more models of the three-dimensional geometry database. The models have a hierarchy of resolutions. The models have vertices, edges and polygons. The multiresolution process preferably associates data to the vertices, edges and polygons. A data processor executes a location process that determines a distance between the position of the handheld device and corresponding one or more closest features on the hierarchy of resolutions of the database. The data processor produces display commands for displaying data and geometry relative to the one or more closest features. Data input devices are used to collect data that is appended to or replaces data pertaining to the one or more closest features.'

U.S. Pat. No. 6,148,261 is introduced as a prior art of the present invention of which the summary is the following: 'A location tagged data provision and display system. A personal communication device (PCD) with electromagnetic communication capability has a GPS receiver and a display. The PCD requests maps and location tagged data from data providers and other for display on the PCD. The data providers respond to requests by using searching and sorting schemes to interrogate data bases and then automatically transmitting data responsive to the requests to the requesting PCD.'

U.S. Pat. No. 6,133,853 is introduced as a prior art of the present invention of which the summary is the following: 'A location tagged data provision and display system. A personal communication device (PCD) with electromagnetic communication capability has a GPS receiver and a display. The PCD requests maps and location tagged data from data providers and other for display on the PCD. The data providers respond to requests by using searching and sorting schemes to interrogate data bases and then automatically transmitting data responsive to the requests to the requesting PCD.'

U.S. Pat. No. 6,023,278 is introduced as a prior art of the present invention of which the summary is the following: 'A digital map system for displaying three dimensional terrain data uses terrain data in the form of polygons. The polygon database is produced from a database of elevation points which are divided into, for example, n.times.n (where n is a positive integer) squares which have an elevation point in the center of the square. The center point forms four polygons with the corners of the square. The elevation of the center point may be chosen to be the highest elevation point in the n.times.n square, the average elevation of the elevation points in the n.times.n square, the elevation of the actual center point, or other methods. The method chosen depends on how the data base is to be used. The size of the n.times.n square chosen also depends on how the data base is to be used since there is a tradeoff between the resolution of the displayed scene and the amount of data reduction from the original database of elevation points. The polygon database may be used in a pilot aid using a synthetic environment, a flight simulator, as part of the control system for a remotely piloted vehicle, or in a video game.'

U.S. Pat. No. 5,918,183 is introduced as a prior art of the present invention of which the summary is the following: 'A mobile communications system for transmitting or receiving a broadcast signal and designed for mounting on in a vehicle has a transmitter or receiver and one or more antennas electrically connected to the transmitter/receiver. The system is mounted on or in a vehicle so that the transmitter/receiver and the antenna(s) are concealed. The system includes a GPS unit for receiving and processing a GPS and signal a cellular telephone unit for transmitting a fix of the vehicle location (to the police, for example). The system is particularly useful in recovering stolen vehicles and deterring theft.'

U.S. Pat. No. 6,611,753 is introduced as a prior art of the present invention of which the summary is the following: 'A navigation system includes a display which provides a 3-D perspective view. The angle of viewing in the perspective view is increased based upon the complexity of the intersection being displayed. Intersections of increased complexity are displayed at an increased viewing angle to facilitate understanding. A sky above a horizon on the display changes color based upon the time of day.'

U.S. Pat. No. 6,477,387 is introduced as a prior art of the present invention of which the summary is the following: 'A display-based terminal (101) employs a method and apparatus for dynamically grouping (719, 723, 819, 823) communication units in a communication system. The terminal displays a map (703, 803) to the terminal user that indicates locations of communication units in at least a portion of the communication system. The terminal receives (705, 805) an indication of a geographic area on the map. After the area has been indicated and the talkgroup identified, the terminal automatically groups (719, 723, 819, 823) communication units that are in or have entered the selected area into the identified talkgroup. If a regrouped unit exits the selected area, the terminal automatically removes the exiting unit from the talkgroup. The terminal user may further input criteria to limit which units entering and leaving the indicated area are actually grouped or ungrouped.'

U.S. Pat. No. 6,366,782 is introduced as a prior art of the present invention of which the summary is the following: 'A display-based terminal (101) employs a method and apparatus for allowing a user of the terminal to communicate with communication units (105-113) in a communication system (100). The terminal displays a map (300, 400) to the user indicating locations of communication units in at least a portion of the communication system. The terminal then receives a selection from the map of at least one communication unit (105, 108, 109, 113) and an indication (309, 311) of the user's desire to communicate with the selected communication unit. The indication of the user's desire to communicate may be contemporaneous with the user's selection of the communication unit, for example, when the user has, prior to such selection, indicated a desired type (302-305, 401-404) of communication and/or a desired transmission mode (406) for subsequent communications with the communication units. Responsive to receipt of the user's selection of the communication unit and indication of a desire to communicate, the terminal automatically initiates a communication with the selected communication unit.'

U.S. Pat. No. 6,292,747 is introduced as a prior art of the present invention of which the summary is the following: 'A wireless network and an associated communication device are disclosed. The communication device is typically mounted in a first vehicle and includes a location device, such as a global positioning system receiver, suitable for determining the first vehicle's geographic position, a wireless transceiver enabled to communicate with a wireless transceiver of a second vehicle within a wireless range of the first vehicle, and a processor connected to the wireless transceiver and the location device. The processor is able to use the wireless transceiver and the location device to broadcast travel information of the first vehicle and to identify the presence of the second vehicle. The processor may also be enabled to display the position of the second vehicle on a display screen of the communication device or to enable the first vehicle to communicate with the second vehicle. The communication device may be configure to permit a user of the first vehicle, by clicking on an image of the second vehicle on the display screen, to obtain identification information of the second vehicle or to initiate a communication with the second vehicle. The communication with the traveler in the second vehicle may comprise a voice communication or an electronic message such as an email message. The first vehicle may include one or more environmental sensors connected to the processor that permit the communication device to broadcast weather information to other vehicle in the vicinity. The travel information exchanged among the vehicle may be organized into categories enabling the traveler to restrict information exchange based on one or more of the categories. The restriction criteria may include route criteria, transportation class criteria, and identity criteria.'

U.S. Pat. No. 5,732,383 is introduced as a prior art of the present invention of which the summary is the following: 'An estimation of traffic conditions on roads located in the radio coverage areas of a wireless communications network is provided based on an analysis of real-time and past wireless traffic data carried on the wireless communications network. Data analyzed may include, for example, actual (current) and expected (past average) number of a) active-busy wireless end-user devices in one or more cells at a particular period of time, b) active-idle wireless end-user devices registered in a location area of the wireless communications network, c) amount of time spent by mobile end-user devices in one or more cells at a particular period of time.'

U.S. Pat. No. 4,937,570 is introduced as a prior art of the present invention of which the summary is the following: 'A route guidance display device for an automotive vehicle capable of displaying route patterns with a three-dimensional effect to enhance the viewer's comprehension of the road route situation being encountered. The display device includes a plurality of intersecting display segments indicative of corresponding possible route configurations. A depth-enhancing segment is included in a portion indicating the straight-ahead route. An intersection name display section may be separately included to display the name and related information regarding an intersection laying ahead.'

U.S. Patent Publication No. 20030117316 is introduced as a prior art of the present invention of which the summary is the following: 'Systems and methods for locating and tracking a wireless device including a database remotely located from the wireless device, the database operable for receiving and storing position information from the wireless device at a predetermined interval. The systems and methods also including a wireless network operable for communicating the position information from the wireless device to the database and a first algorithm operable for providing the position information upon request. The systems and methods further including a second algorithm allowing modification of the predetermined interval, a third algorithm operable for associating a landmark with the position information, a fourth algorithm operable for causing the position of the wireless device to be determined locally at the predetermined interval, a fifth algorithm operable for causing the position information to be stored locally within the wireless device, and a sixth algorithm operable for causing the position information to be communicated to the database via the wireless network when the battery power of the wireless device reaches a predetermined level. The position information is provided to a user via a land-line phone and a public switched telephone network (PSTN), a finding wireless device and the wireless network, or a personal computer (PC) and a globally-distributed computer network. The position information is provided to the user in the form of a voice synthetic message, a text message, or a graphical display.'

U.S. Patent Publication No. 20030100326 is introduced as a prior art of the present invention of which the summary is the following: 'Methods are disclosed for sharing location and route information between communication units (e.g., talkgroup members) that are subscribed to a group location sharing service. The group location sharing service is event-based, such that the communication units may form a subset of a talkgroup desiring to actively participate or monitor an event. Communication units de-subscribe from the group location sharing service or talkgroup when they no longer desire to participate or monitor the event. Service levels may be determined for various subscribers to the group location sharing service. The service levels may include, for example, an information transmission service level and information reception service level that determine an amount, type, and/or timing of information to be sent or received by particular subscribers.'

U.S. Patent Publication No. 20030045301 is introduced as a prior art of the present invention of which the summary is the following: 'The present invention is directed to an electronic system and method for managing location, calendar, and event information. The system comprises at least two hand portable electronic devices, each having a display device to display personal profile, location, and event information, and means for processing, storing, and wirelessly communicating data. A software program running in the electronic device can receive local and remote input data; store, process, and update personal profile, event, time, and location information; and convert location information into coordinates of a graphic map display. The system additionally includes at least one earth orbiting satellite device using remote sensing technology to determine the location coordinates of the electronic device. The electronic devices receive synchronization messages broadcast by the satellite device, causing the software program to update the personal profile, event, time, and location information stored in each hand portable electronic device.'

U.S. Patent Publication No. 20020111139 is introduced as a prior art of the present invention of which the summary is the following: 'The object of the present invention is to provide a data distribution system that is capable of distributing to a mobile communication terminal at a specific location information suited for the location, e.g., guide information, and that is capable of allowing anyone to easily and freely access information. In order to achieve this object, the present invention provides a data distribution system communicating with a mobile data communication device capable of obtaining current position information indicating a current position. The present invention is equipped with data communication means sending and receiving data to and from the mobile data communication device and means for storing information storing area position information indicating a position of a specific area and information associated with the specific area. Control is provided so that, if the mobile data communication device is located in the specific area, information associated with the specific area is sent to the mobile data communication device via data communication means.'

U.S. Pat. No. 6,452,626 is introduced as a prior art of the present invention of which the summary is the following: 'A reduced area imaging device is provided for use with a communication device, such as a wireless/cellular phone. In one configuration of the imaging device, the image sensor is placed remote from the remaining image processing circuitry. In a second configuration, all of the image processing circuitry to include the image sensor is placed in a stacked fashion near the same location. In the first configuration, the entire imaging device can be placed at the distal end of a camera module. In a second configuration, the image sensor is remote from the remaining image processing circuitry wherein available space within the phone is used to house the remaining circuitry. In any of the embodiments, the image sensor may be placed alone on a first circuit board, or timing and control circuits may be included on the first circuit board containing the image sensor. One or more video processing boards can be stacked in a longitudinal fashion with respect to the first board, or the video processing boards may be placed within the housing of the communication device. The communication device includes a miniature LCD-type monitor which is capable of viewing not only the images taken by the camera module, but also can show incoming video images. The camera module is of such small size that it can be easily stored within the housing of the communication device, and may be attached thereto as by a small retractable cable. Having a tethered camera module allows it to be pointed at any desired object within sight of the user, and without having to actually point or move the phone housing in order to take an image.'

U.S. Pat. No. 6,424,843 is introduced as a prior art of the present invention of which the summary is the following: 'The telecommunication device comprises a speaker (32) and a microphone (33) in order to use the telecommunication device as a telephone. Further it comprises a camera (91, 1101) having a certain photographing direction, and a display (38, 1102) having a certain displaying direction, in order to use the telecommunication device as an image generating means. The photographing direction is substantially different from the displaying direction.'

U.S. Pat. No. 6,424,369 is introduced as a prior art of the present invention of which the summary is the following: 'A reduced area imaging device is provided for use with a miniature hand-held computer referred to in the industry as a PDA. In one configuration of the imaging device, the image sensor is placed remote from the remaining image processing circuitry. In a second configuration, all of the image processing circuitry to include the image sensor is placed in a stacked fashion near the same location. In the first configuration, the entire imaging device can be placed at the distal end of a camera module. In a second configuration, the image sensor is remote from the remaining image processing circuitry wherein available space within the PDA is used to house the remaining circuitry. In any of the embodiments, the image sensor may be placed alone on a first circuit board, or timing and control circuits may be included on the first circuit board containing the image sensor. One or more video processing boards can be stacked in a longitudinal fashion with respect to the first board, or the video processing boards may be placed within the housing of the communication device. The PDA includes a miniature LCD-type video view screen which is capable of viewing not only the images taken by the camera module, but also can show incoming video images received from a personal computer connected to a global communications network. The camera module is of such small size that it can be easily stored within the housing of the PDA, and may be attached thereto as by a small retractable cable.'

U.S. Pat. No. 6,342,915 is introduced as a prior art of the present invention of which the summary is the following: 'An image telecommunication system comprises a worker's device and a manager's device. The worker's device collects an image of an object and transmits it to the manager's device placed in a remote place, so that the image is displayed on a display screen of the manager's device. The manager's device transmits a designated position of the image, designated in a state where the image is displayed, to the worker's device. The worker's device indicates a position of the object corresponding to the designated position received from the manager's device. The worker's device detects a point of view of the worker. The manager's device suppresses fluctuation of the image displayed on the display screen, when it is determined that the worker looks at the object substantially continuously.'

U.S. Pat. No. 6,323,893 is introduced as a prior art of the present invention of which the summary is the following: 'A portable video conference module supporting a network-based video conference comprising a processor, a video camera, and audio input device and several interfaces coupled to the processor. The processor includes a local instruction processor accessing a local non-volatile memory. The interfaces include a wireless data capture interface, a video display interface, an audio output interface and a network interface.'

U.S. Pat. No. 6,323,892 is introduced as a prior art of the present invention of which the summary is the following: 'A display and camera device for a videophone comprises a liquid crystal display for displaying a picture, a camera such as a CCD sensor or a CMOS sensor, a free-form surface prism, and a prism for guiding light to the camera. The free-form surface prism has a concave reflector for optically enlarging a picture displayed on the display. A beam splitter is provided on a bonded surface between the free-form surface prism and the prism. The beam splitter is designed to reflect some of light beams from the display toward the reflector and transmit some of light beams from the reflector. A camera-system optical path extending from the camera is aligned with a display-system optical path extending from the display within the free-form surface prism and the outside space.'

U.S. Pat. No. 6,317,039 is introduced as a prior art of the present invention of which the summary is the following: 'A method and system for remote assistance and review of a technician or multiple technicians, in real time, working with equipment of various complexity. A technician or multiple technicians at a remote location are coupled by a wireless means to an advisor at a local station, so that the advisor may view and hear the same stimuli as the technician, that the advisor and technician may communicate. The technician has limited training or otherwise in need of support, and may be a field engineer, technician or maintenance personnel. The advisor has extensive training and able to provide technical support, and generally has extended and specialized knowledge with regard to the remote apparatus, and may be a technical expert on the remote apparatus. The technician may comprise an individual or group with technical training and knowledge, but lacking managerial or other authority, while the advisor comprises an individual or group with such authority. The technician communicates with the advisor by visual cues or ordinary speech, while the advisor views and listens to the remote apparatus. The advisor gives advise to the technician for manipulating or repairing the remote apparatus. Alternatively, an intermediate advisor may advise the technician and be advised by a higher-level advisor.'

U.S. Pat. No. 6,304,729 is introduced as a prior art of the present invention of which the summary is the following: 'A camera is provided with a radio receiver for receiving electromagnetic waves transmitted from a given radio base station, a GPS receiver for receiving electromagnetic waves transmitted from each of a plurality of artificial satellites, a place information generator for generating place information based on one of electromagnetic waves received by the radio receiver and electromagnetic waves received by the GPS receiver, and a selector for selecting activation of one of the radio receiver and the GPS receiver, the selector judging whether the receptive state of the radio receiver is satisfactory, and selecting activation of the GPS receiver if the receptive state of the radio receiver is judged to be unsatisfactory.'

U.S. Pat. No. 6,300,976 is introduced as a prior art of the present invention of which the summary is the following: 'A digital image capturing device which communicates through an input/output interface with an external processing device which monitors and/or controls the camera. The image capturing device communicates with the external device in order to output status information to the external device, receive commands from the external device and to transfer images and sound between the image capturing device and the external device. Various parameters describing the state of the image capturing device are transmitted to the external device including characteristics of the captured images, whether the flash is ready, the state of the device battery, whether the memory is full, or the parameters used when capturing images. The commands which can be sent from the external device to the image capturing device include commands to change any of the parameters of the image capturing device and a command to capture an image or a series of images, and whether or not sound is recorded.'

U.S. Pat. No. 6,278,884 is introduced as a prior art of the present invention of which the summary is the following: 'A conventional portable cellular phone modified such that the phone housing incorporates a digital cameras security alarm system and other functions. In another embodiment, the portable cellular phone is modified such that the phone housing incorporates a security alarm system, radio receiver and other functions.'

U.S. Pat. No. 6,192,257 is introduced as a prior art of the present invention of which the summary is the following: 'A wireless communication terminal is configured for enabling a user to receive and transmit video images as well as receive and transmit audio or speech signals associated with the user of the terminal and another user at, for example, a remote location. The received video image is obtained from a video image signal received over a radio frequency communications link established between the wireless communication terminal and a cellular base station. This received video image is displayed in a video image display conveniently associated with the wireless communication terminal. The transmitted video image signal may be that of the user of the terminal, of a scene within the field of view of the video camera or of text either coupled to the terminal through one of many well known data interfaces, or an image of text as captured by the camera. This transmitted video image signal is obtained from a video camera associated with the wireless communication terminal and then transmitted over the radio frequency communications link established between the wireless communication terminal and the cellular base station for displaying in a remotely located video image display.'

U.S. Pat. No. 6,177,950 is introduced as a prior art of the present invention of which the summary is the following: 'A personal communication device includes a display for displaying data and video signals; a loudspeaker for generating an audible signal; a microphone for receiving an audio signal; a keypad for entering data; a telecommunications interface for receiving and transmitting information; and an internal multi-position and multi-function reading head for producing an image signal when in a first position using a first lensing and for reading for image conversion using a second lensing when in a second position.'

U.S. Pat. No. 6,175,717 is introduced as a prior art of the present invention of which the summary is the following: 'A mobile can transmit and receive broadcast quality video signals while in motion. The system includes a power generator and a microwave subsystem coupled to said power generator. The microwave subsystem transmits first local microwave signals modulated with first local digital data while in motion with respect to earth and also receives first remote microwave signals modulated with first remote digital data while in motion with respect to earth. A high speed digital station receives a video signal and transforms and compresses the video signal into the first local digital data and transforms and decompresses the first remote digital data into a first decompressed remote digital data. The mobile microwave system is housed in a vehicle which has a lower portion and an upper portion, wherein the first local microwave signals can pass through the upper portion.'

U.S. Pat. No. 6,073,034 is introduced as a prior art of the present invention of which the summary is the following: 'The invention relates to a microdisplay system that utilizes a small high resolution active matrix liquid crystal display with an illumination system and a magnifying optical system to provide a hand held communication display device. The system can employ an LED illumination system and cellular communication or processor circuits within a compact housing to provide communication devices such as pagers, telephones, televisions, and hand held computer or card reader devices with a compact high resolution data and/or video display.'

U.S. Pat. No. 6,055,513 is introduced as a prior art of the present invention of which the summary is the following: 'Apparatus and methods are provided for effecting remote commerce, such as in telemarketing (either inbound or outbound) and in electronic commerce, which are particularly adapted for the intelligent selection and proffer of products, services or information to a user or customer. In one aspect of the invention, goods, service or information are provided to the user via electronic communication, such as through a telephone, videophone or other computer link, as determined by the steps of first, establishing communication via the electronic communications device between the user and the system to effect a primary transaction or primary interaction, second, obtaining data with respect to the primary transaction or primary interaction, including at least in part a determination of the identity of the user or prospective customer, third, obtaining at least a second data element relating to the user, fourth, utilizing the primary transaction or primary interaction data along with the at least second data element as factors in determining at least one good, service or item of information for prospective upsell to the user or prospective customer, and offering the item to the prospective customer. In the preferred embodiment, the selection of the proffer of goods, services or information comprises an upsell with respect to the primary transaction or primary interaction data. The offer of the upsell is preferably generated and offered in real time, that is, during the course of the communication initiated with the primary transaction or primary interaction.'

U.S. Pat. No. 6,038,295 is introduced as a prior art of the present invention of which the summary is the following: 'A communication system includes at least one telephone unit, a transmission system for communicating from the telephone unit, and a server for receiving information via the transmission system. The telephone unit includes a digital image pick up by which images are recorded, transmitted to the server, and stored in the server depending upon classification information which characterizes the digital images and which is associated with the digital image data. The classification information is determined by an analysis unit in the server.'

U.S. Pat. No. 5,966,643 is introduced as a prior art of the present invention of which the summary is the following: 'Known hand-held mobile radiotelephones and cordless telephones have the dimensions of a handset, and their antennas radiate near the user's head; such may be improved by providing a hand-held radiotelephone which is of a compact design and fully user-controllable and exposes the user to only little RF radiation. A hand-held radiotelephone (HH1) is provided whose earpiece (R) and/or microphone (M) are spatially separated from the other components of the radiotelephone. It is also possible to provide an infrared link between the earpiece and/or microphone and the housing of the radiotelephone in order to further increase the user's freedom of movement. During operation of the hand-held radiotelephone, the keyboard and display are fully accessible.'

U.S. Pat. No. 5,959,661 is introduced as a prior art of the present invention of which the summary is the following: 'A telephone terminal capable of sending and receiving images and sounds, having a movable camera for obtaining images of the surrounding area and a sound-collection microphone for collecting surround sounds, automatic answering circuitry which automatically responds to a call received from a calling terminal and which starts the transmission of surrounding area images and sounds, and a transmission switching circuit which, upon response by the automatic answering circuitry, switches connection from the fixed microphone and handset for TV telephone use to the movable camera and sound-collection microphone.'

U.S. Pat. No. 5,917,542 is introduced as a prior art of the present invention of which the summary is the following: 'A system method for digital image capture and transmission includes an image fulfillment server, having a transceiver for sending and receiving channel assessment signals and receiving a digital image file and a memory for storing the received digital image file. The system also includes a digital camera having an electronic image sensor for sensing an image and producing a digital image; a short term memory for storing digital images produced by the image sensor in digital image files; a transceiver for communicating with and transmitting the digital image files to the image fulfillment server; a signal strength detector for monitoring the registration signal from the fulfillment server and producing a transmit enable signal; a long term memory for storing the digital image files; the transmit enable signal for disabling transmission of the digital image data when the channel assessment signal indicates that successful transmission of the digital image data is not possible; and a timer for transferring the digital image file from the short term memory to the long term memory after a predetermined period of time.'

U.S. Pat. No. 5,915,020 is introduced as a prior art of the present invention of which the summary is the following: 'A portable device for receiving satellite signals and displaying the signals as video. Preferably, the device includes a portable supporting member such as a hinged enclosure case, a satellite antenna, and a display monitor. The satellite antenna is preferably of a flat configuration and is mounted to the support, and the display monitor is preferably a flat video screen mounted to the same support. The required satellite receiver electronics and video decoder may be mounted to the portable support and powered by one or more batteries to provide an integrated and easily transported system to receive and view video relayed by satellite. A PCMCIA card slot and a microcontroller can be provided with the device to provide additional features such as cellular modem use, PCS wireless access, RS-232 port emulation, or GPS position location.'

U.S. Pat. No. 5,879,289 is introduced as a prior art of the present invention of which the summary is the following: 'A portable, hand-held endoscopic camera having all of the necessary components for performing endoscopic procedures comprises power source means, lens means, light source means, and video camera means. The portable endoscopic camera is adaptable to a wide variety of systems and includes a highly efficient means for focusing the illumination of the light source. The lens means includes a fiber bundle and the light source means includes a bulb. The bulb is positioned in an abutting relationship with the fiber bundle, thereby focusing light into the fiber bundle. The camera is selectively operable in a cordless and cord-operated mode.'

U.S. Pat. No. 5,550,754 is introduced as a prior art of the present invention of which the summary is the following: 'A combination portable recording video camera and video-conferencing terminal is described, wherein a video camera and lens is adjustable so that it can either produce images of an operator's surroundings for recording on a medium such as video tape, as in normal recording video cameras, or of the operator as in video conferencing terminals. The device is preferably provided with a video display screen that functions as a viewfinder in video-graphing the surroundings. The device is equipped with communication electronics that establish a connection over a network, and then transmits video and audio signals from the device while displaying video signals and reproducing audio signals that arrive over the network. Attempts by the network to establish a connection with the device result in the device automatically establishing the connection. Then the device activates its internal recording systems to play the prerecorded video message and transmit it over the network. The operator is later able to play the recorded signals and view them on the device's built-in display.'

U.S. Pat. No. 5,491,507 is introduced as a prior art of the present invention of which the summary is the following: 'A handy type video telephone equipment which permits a user to transmit and receive pictures and speech with a casing held in one hand. A speaker is arranged at the upper end part of the front of the casing which is thin and vertically long, while a microphone is arranged at the lower end part thereof. A display panel and a control panel are interposed between the speaker and the microphone. A camera is mounted on the casing so as to be capable of altering its angle. The speaker is detachably mounted, and it is usable as an earphone when detached. The user's movements are not hampered during the transmission and reception, and the equipment can assume various communication or service attitudes conforming to the contents of information for the communications.'

U.S. Pat. No. 5,414,444 is introduced as a prior art of the present invention of which the summary is the following: 'A personal communicator for use in a wireless communication network includes a wireless communications LCD and a multimedia LCD with the communications, mounded on a hinged member, and superimposed on top of the multimedia LCD. The communications LCD is sufficiently transparent to permit viewing of the under multimedia LCD. Each provides visual information to the user relative to the present use of the communicator. The selected use of the communicator is primarily responsive to the open or closed position of the hinged keyboard supporting cover. When the hinged member is closed the communicator operates in a communication mode. When it is open the communicator operates primarily in a multimedia mode. The personal communicator includes a steerable video imager for controllably optimizing image field coverage and adjusting to the orientation of the user relative to the personal communicator. The video imager includes an optical lens set and the imager is mounted on a mounting shaft so as to allow controlled rotation about its axis. The video imager includes mechanical apparatus interactive with the hinged keyboard supporting cover to reset its orientation to a standard position when the cover is closed and allow differing orientations when the cover is open.'

U.S. Patent Publication No. 20010045978 is introduced as a prior art of the present invention of which the summary is the following: 'A portable personal wireless interactive video device including a miniature camera, a portable wireless transmitter connected to the camera, a portable wireless receiver for receiving video signals from the transmitter, and a portable video display device connected to the receiver for presenting an image to a viewer corresponding to a view from the perspective of the camera. The viewer may select an image for display on the video display device corresponding to a view from his/her own camera, from a camera worn by another person, or from one of several cameras positioned in selected locations. In one embodiment, the camera may be located within a remotely controlled model vehicle, thereby providing the viewer with a view from the perspective of inside the vehicle for viewing while remotely controlling the vehicle. Enhanced realism may be achieved by providing a true depth perception "stereo-optic" display by using two spaced apart cameras viewing the same scene and by presenting two corresponding independent channels of video information to the two eyes of the viewer. A "videotronics" capability allows the angle of view of the camera to be responsive to head movements of the viewer to further enhance the remote viewing experience.'

However, the foregoing prior arts do not disclose the communication device which implements the current location identifying mode and the camera mode.

For the avoidance of doubt, the number of the prior arts introduced herein (and/or in IDS) may be of a large one, however, the applicant has no intent to hide the more relevant prior art(s) in the less relevant ones.

SUMMARY OF INVENTION

It is an object of the present invention to provide a single device capable to implement a plurality of functions where each function had to be implemented by an individual device in the prior art.

It is another object of the present invention to provide merchandise to merchants attractive to the consumers in the U.S.

It is another object of the present invention to provide mobility to the users of communication devices.

It is another object of the present invention to overcome the shortcomings associated with the foregoing prior arts.

The present invention introduces the communication device which implements the current location identifying mode and the camera mode.

BRIEF DESCRIPTION OF DRAWINGS

The above and other aspects, features, and advantages of the invention will be better understood by reading the following more particular description of the invention, presented in conjunction with the following drawings, wherein:

FIG. 2a is a simplified illustration illustrating an exemplary embodiment of the present invention.

FIG. 2b is a simplified illustration illustrating an exemplary embodiment of the present invention.

FIG. 5 is a flowchart illustrating an exemplary embodiment of the present invention.

FIG. 8 is a simplified illustration illustrating an exemplary embodiment of the present invention.

FIG. 9 is a simplified illustration illustrating an exemplary embodiment of the present invention.

FIG. 10 is a simplified illustration illustrating an exemplary embodiment of the present invention.

FIG. 32g is a flowchart illustrating an exemplary embodiment of the present invention.

FIG. 44a is a flowchart illustrating an exemplary embodiment of the present invention.

FIG. 45 is a block diagram illustrating an exemplary embodiment of the present invention.

FIG. 53b is a flowchart illustrating an exemplary embodiment of the present invention.

FIG. 61a is a flowchart illustrating an exemplary embodiment of the present invention.

FIG. 75 is a simplified illustration illustrating an exemplary embodiment of the present invention.

FIG. 87 is a flowchart illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrates only one function or mode in order to avoid complexity in its explanation, however, such description does not mean that only one function or mode can be implemented at a time. In other words, more than one function or mode can be implemented simultaneously by way of utilizing the same random access memory. In addition, the figure numbers are cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

Figure 1:
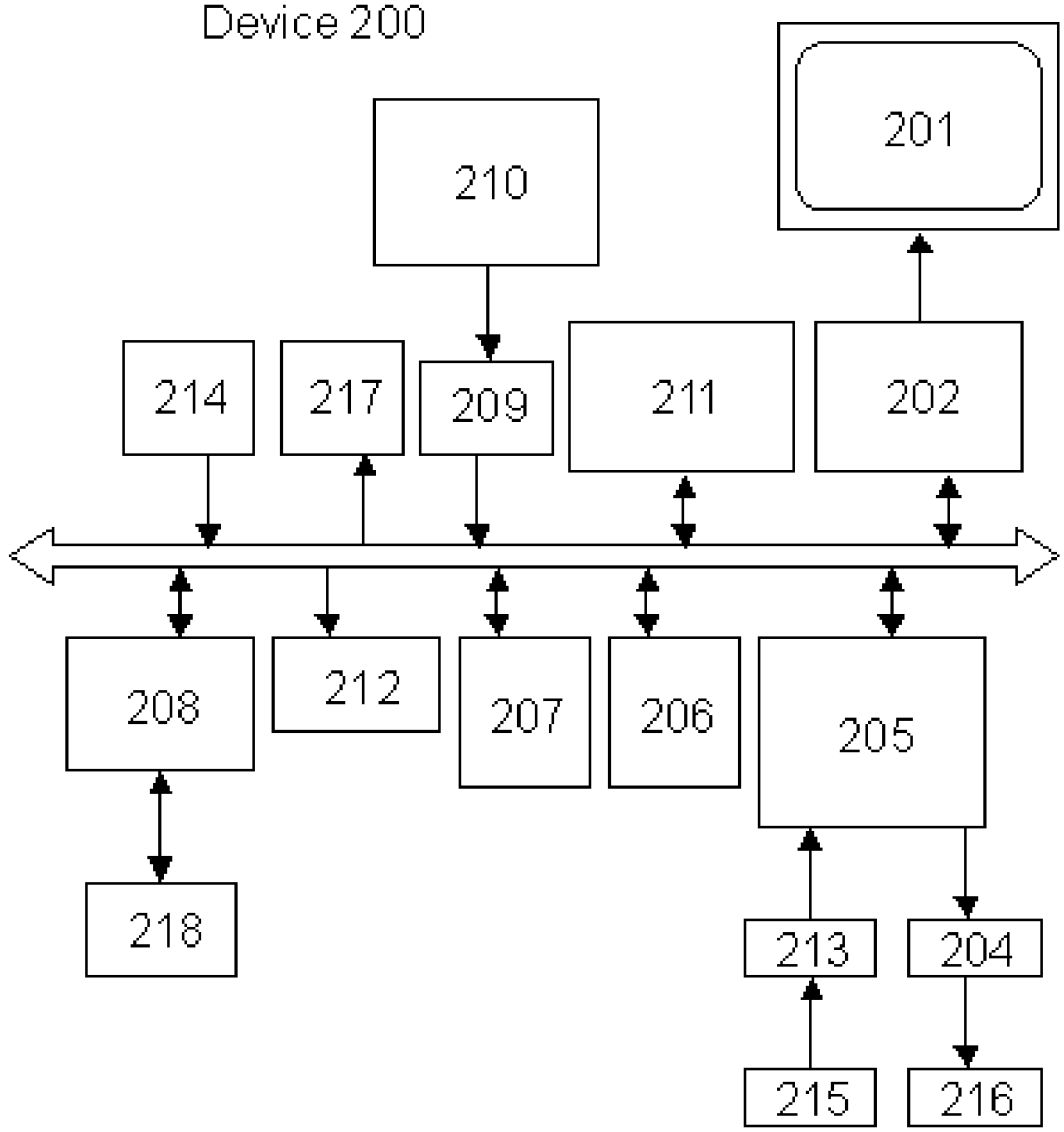
FIG. 1 is a block diagram illustrating an exemplary embodiment of the present invention.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable as described in the following patents: U.S. Pat. No. 6,496,161; U.S. Pat. No. 6,487,021; U.S. Pat. No. 6,462,882; U.S. Pat. No. 6,452,572; U.S. Pat. No. 6,448,944; U.S. Pat. No. 6,445,364; U.S. Pat. No. 6,445,363; U.S. Pat. No. 6,424,321; U.S. Pat. No. 6,421,183; U.S. Pat. No. 6,417,820; U.S. Pat. No. 6,388,814; U.S. Pat. No. 6,388,640; U.S. Pat. No. 6,369,952; U.S. Pat. No. 6,359,603; U.S. Pat. No. 6,359,602; U.S. Pat. No. 6,356,392; U.S. Pat. No. 6,353,503; U.S. Pat. No. 6,349,001; U.S. Pat. No. 6,329,965; U.S. Pat. No. 6,304,303; U.S. Pat. No. 6,271,808; U.S. Pat. No. 6,246,383; U.S. Pat. No. 6,239,771; U.S. Pat. No. 6,232,934; U.S. Pat. No. 6,222,675; U.S. Pat. No. 6,219,186; U.S. Pat. No. 6,204,974; U.S. Pat. No. 6,181,304; U.S. Pat. No. 6,160,666; U.S. Pat. No. 6,157,291; U.S. Pat. No. 6,147,807; U.S. Pat. No. 6,147,805; U.S. Pat. No. 6,140,980; U.S. Pat. No. 6,127,990; U.S. Pat. No. 6,124,837; U.S. Pat. No. 6,115,007; U.S. Pat. No. 6,097,543; U.S. Pat. No. 6,094,309; U.S. Pat. No. 6,094,242; U.S. Pat. No. 6,091,546; U.S. Pat. No. 6,084,556; U.S. Pat. No. 6,072,445; U.S. Pat. No. 6,055,110; U.S. Pat. No. 6,055,109; U.S. Pat. No. 6,050,717; U.S. Pat. No. 6,040,945; U.S. Pat. No. 6,034,653; U.S. Pat. No. 6,023,372; U.S. Pat. No. 6,011,653; U.S. Pat. No. 5,995,071; U.S. Pat. No. 5,991,085; U.S. Pat. No. 5,982,343; U.S. Pat. No. 5,971,538; U.S. Pat. No. 5,966,242; U.S. Pat. No. 5,959,780; U.S. Pat. No. 5,954,642; U.S. Pat. No. 5,949,583; U.S. Pat. No. 5,943,171; U.S. Pat. No. 5,923,476; U.S. Pat. No. 5,903,396; U.S. Pat. No. 5,903,395; U.S. Pat. No. 5,900,849; U.S. Pat. No. 5,880,773; U.S. Pat. No. 5,864,326; U.S. Pat. No. 5,844,656; U.S. Pat. No. 5,844,530; U.S. Pat. No. 5,838,490; U.S. Pat. No. 5,835,279; U.S. Pat. No. 5,822,127; U.S. Pat. No. 5,808,802; U.S. Pat. No. 5,808,801; U.S. Pat. No. 5,774,096; U.S. Pat. No. 5,767,820; U.S. Pat. No. 5,757,339; U.S. Pat. No. 5,751,493; U.S. Pat. No. 5,742,264; U.S.

Pat. No. 5,739,955; U.S. Pat. No. 5,739,797; U.S. Pat. No. 5,708,449; U.S. Pat. No. 5,673,059; U.S. Pat. No. 5,670,970; U.S. Pat. No. 5,642,221; U.S. Pat. No. 5,619,377; U.S. Pat. No. 5,619,373; U.S. Pat. No. 5,606,458; U.S. Pat. No. 5,572,229; U.S. Pat. No. 5,546,099; U.S. Pat. No. 5,543,816; U.S. Pat. No. 5,539,422; U.S. Pat. No. 5,537,253; U.S. Pat. No. 5,526,184; U.S. Pat. No. 5,486,841; U.S. Pat. No. 5,483,307; U.S. Pat. No. 5,341,242; U.S. Pat. No. 5,281,957; and U.S. Pat. No. 5,003,300.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

FIG. 2a illustrates one of the preferred methods of the communication between two Communication Device 200. In FIG. 2a, both Device A and Device B represents Communication Device 200 in FIG. 1. Device A transfers wireless data to Transmitter 301 which Relays the data to Host H via Cable 302. The data is transferred to Transmitter 308 (e.g., a satellite dish) via Cable 320 and then to Artificial Satellite 304. Artificial Satellite 304 transfers the data to Transmitter 309 which transfers the data to Host H via Cable 321. The data is then transferred to Transmitter 307 via Cable 306 and to Device B in a wireless fashion. Device B transfers wireless data to Device A in the same manner.

FIG. 2b illustrates another preferred method of the communication between two Communication Devices 200. In this example, Device A directly transfers the wireless data to Host H, an artificial satellite, which transfers the data directly to Device B. Device B transfers wireless data to Device A in the same manner.

Figure 2C:
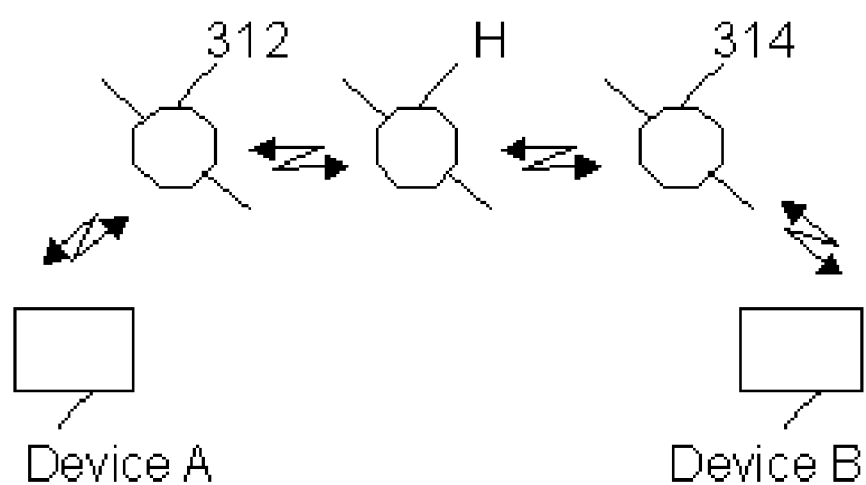
FIG. 2c is a simplified illustration illustrating an exemplary embodiment of the present invention.

FIG. 2c illustrates another preferred method of the communication between two Communication Devices 200. In this example, Device A transfers wireless data to Transmitter 312, an artificial satellite, which Relays the data to Host H, which is also an artificial satellite, in a wireless fashion. The data is transferred to Transmitter 314, an artificial satellite, which Relays the data to Device B in a wireless fashion. Device B transfers wireless data to Device A in the same manner.

<<Voice Recognition System>>

Communication Device 200 (FIG. 1) has a function to operate the device by the user's voice or convert the user's voice into a text format (i.e., the voice recognition). Such function can be enabled by the technologies primarily introduced in the following inventions and the references cited thereof: U.S. Pat. No. 6,282,268; U.S. Pat. No. 6,278,772; U.S. Pat. No. 6,269,335; U.S. Pat. No. 6,269,334; U.S. Pat. No. 6,260,015; U.S. Pat. No. 6,260,014; U.S. Pat. No. 6,253,177; U.S. Pat. No. 6,253,175; U.S. Pat. No. 6,249,763; U.S. Pat. No. 6,246,990; U.S. Pat. No. 6,233,560; U.S. Pat. No. 6,219,640; U.S. Pat. No. 6,219,407; U.S. Pat. No. 6,199,043; U.S. Pat. No. 6,199,041; U.S. Pat. No. 6,195,641; U.S. Pat. No. 6,192,343; U.S. Pat. No. 6,192,337; U.S. Pat. No. 6,188,976; U.S. Pat. No. 6,185,530; U.S. Pat. No. 6,185,529; U.S. Pat. No. 6,185,527; U.S. Pat. No. 6,182,037; U.S. Pat. No. 6,178,401; U.S. Pat. No. 6,175,820; U.S. Pat. No. 6,163,767; U.S. Pat. No. 6,157,910; U.S. Pat. No. 6,119,086; U.S. Pat. No. 6,119,085; U.S. Pat. No. 6,101,472; U.S. Pat. No. 6,100,882; U.S. Pat. No. 6,092,039; U.S. Pat. No. 6,088,669; U.S. Pat. No. 6,078,807; U.S. Pat. No. 6,075,534; U.S. Pat. No. 6,073,101; U.S. Pat. No. 6,073,096; U.S. Pat. No. 6,073,091; U.S. Pat. No. 6,067,517; U.S. Pat. No. 6,067,514; U.S. Pat. No. 6,061,646; U.S. Pat. No. 6,044,344; U.S. Pat. No. 6,041,300; U.S. Pat. No. 6,035,271; U.S. Pat. No. 6,006,183; U.S. Pat. No. 5,995,934; U.S. Pat. No. 5,974,383; U.S. Pat. No. 5,970,239; U.S. Pat. No. 5,963,905; U.S. Pat. No. 5,956,671; U.S. Pat. No. 5,953,701; U.S. Pat. No. 5,953,700; U.S. Pat. No. 5,937,385; U.S. Pat. No. 5,937,383; U.S. Pat. No. 5,933,475; U.S. Pat. No. 5,930,749; U.S. Pat. No. 5,909,667; U.S. Pat. No. 5,899,973; U.S. Pat. No. 5,895,447; U.S. Pat. No. 5,884,263; U.S. Pat. No. 5,878,117; U.S. Pat. No. 5,864,819; U.S. Pat. No. 5,848,163; U.S. Pat. No. 5,819,225; U.S. Pat. No. 5,805,832; U.S. Pat. No. 5,802,251; U.S. Pat. No. 5,799,278; U.S. Pat. No. 5,797,122; U.S. Pat. No. 5,787,394; U.S. Pat. No. 5,768,603; U.S. Pat. No. 5,751,905; U.S. Pat. No. 5,729,656; U.S. Pat. No. 5,704,009; U.S. Pat. No. 5,671,328; U.S. Pat. No. 5,649,060; U.S. Pat. No. 5,615,299; U.S. Pat. No. 5,615,296; U.S. Pat. No. 5,544,277; U.S. Pat. No. 5,524,169; U.S. Pat. No. 5,522,011; U.S. Pat. No. 5,513,298; U.S. Pat. No. 5,502,791; U.S. Pat. No. 5,497,447; U.S. Pat. No. 5,477,451; U.S. Pat. No. 5,475,792; U.S. Pat. No. 5,465,317; U.S. Pat. No. 5,455,889; U.S. Pat. No. 5,440,663; U.S. Pat. No. 5,425,129; U.S. Pat. No. 5,353,377; U.S. Pat. No. 5,333,236; U.S. Pat. No. 5,313,531; U.S. Pat. No. 5,293,584; U.S. Pat. No. 5,293,451; U.S. Pat. No. 5,280,562; U.S. Pat. No. 5,278,942; U.S. Pat. No. 5,276,766; U.S. Pat. No. 5,267,345; U.S. Pat. No. 5,233,681; U.S. Pat. No. 5,222,146; U.S. Pat. No. 5,195,167; U.S. Pat. No. 5,182,773; U.S. Pat. No. 5,165,007; U.S. Pat. No. 5,129,001; U.S. Pat. No. 5,072,452; U.S. Pat. No. 5,067,166; U.S. Pat. No. 5,054,074; U.S. Pat. No. 5,050,215; U.S. Pat. No. 5,046,099; U.S. Pat. No. 5,033,087; U.S. Pat. No. 5,031,217; U.S. Pat. No. 5,018,201; U.S. Pat. No. 4,980,918; U.S. Pat. No. 4,977,599; U.S. Pat. No. 4,926,488; U.S. Pat. No. 4,914,704; U.S. Pat. No. 4,882,759; U.S. Pat. No. 4,876,720; U.S. Pat. No. 4,852,173; U.S. Pat. No. 4,833,712; U.S. Pat. No. 4,829,577; U.S. Pat. No. 4,827,521; U.S. Pat. No. 4,759,068; U.S. Pat. No. 4,748,670; U.S. Pat. No. 4,741,036; U.S. Pat. No. 4,718,094; U.S. Pat. No. 4,618,984; U.S. Pat. No. 4,348,553; U.S. Pat. No. 6,289,140; U.S. Pat. No. 6,275,803; U.S. Pat. No. 6,275,801; U.S. Pat. No. 6,272,146; U.S. Pat. No. 6,266,637; U.S. Pat. No. 6,266,571; U.S. Pat. No. 6,223,153; U.S. Pat. No. 6,219,638; U.S. Pat. No. 6,163,535; U.S. Pat. No. 6,115,820; U.S. Pat. No. 6,107,935; U.S. Pat. No. 6,092,034; U.S. Pat. No. 6,088,361; U.S. Pat. No. 6,073,103; U.S. Pat. No. 6,073,095; U.S. Pat. No. 6,067,084; U.S. Pat. No. 6,064,961; U.S. Pat. No. 6,055,306; U.S. Pat. No. 6,047,301; U.S. Pat. No. 6,023,678; U.S. Pat. No. 6,023,673; U.S. Pat. No. 6,009,392; U.S. Pat. No. 5,995,933; U.S. Pat. No. 5,995,931; U.S. Pat. No. 5,995,590; U.S. Pat. No. 5,991,723; U.S. Pat. No. 5,987,405; U.S. Pat. No. 5,974,382; U.S. Pat. No. 5,943,649; U.S. Pat. No. 5,916,302; U.S. Pat. No. 5,897,616; U.S. Pat. No. 5,897,614; U.S. Pat.

No. 5,893,133; U.S. Pat. No. 5,873,064; U.S. Pat. No. 5,870,616; U.S. Pat. No. 5,864,805; U.S. Pat. No. 5,857,099; U.S. Pat. No. 5,809,471; U.S. Pat. No. 5,805,907; U.S. Pat. No. 5,799,273; U.S. Pat. No. 5,764,852; U.S. Pat. No. 5,715,469; U.S. Pat. No. 5,682,501; U.S. Pat. No. 5,680,509; U.S. Pat. No. 5,668,854; U.S. Pat. No. 5,664,097; U.S. Pat. No. 5,649,070; U.S. Pat. No. 5,640,487; U.S. Pat. No. 5,621,809; U.S. Pat. No. 5,577,249; U.S. Pat. No. 5,502,774; U.S. Pat. No. 5,471,521; U.S. Pat. No. 5,467,425; U.S. Pat. No. 5,444,617; U.S. Pat. No. 4,991,217; U.S. Pat. No. 4,817,158; U.S. Pat. No. 4,725,885; U.S. Pat. No. 4,528,659; U.S. Pat. No. 3,995,254; U.S. Pat. No. 3,969,700; U.S. Pat. No. 3,925,761; U.S. Pat. No. 3,770,892. The voice recognition function can be performed in terms of software by using Area 261, the voice recognition working area, of RAM 206 (FIG. 1) which is specifically allocated to perform such function as described in FIG. 3, or can also be performed in terms of hardware circuit where such space is specifically allocated in Area 282 of Sound Processor 205 (FIG. 1) for the voice recognition system as described in FIG. 4.

Figure 3:
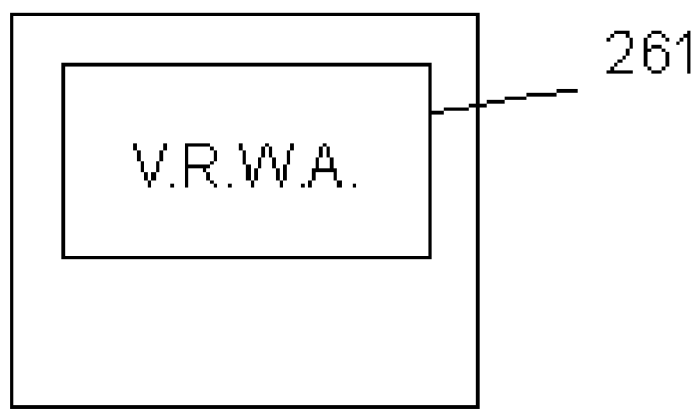
FIG. 3 is a block diagram illustrating an exemplary embodiment of the present invention.
Figure 4:
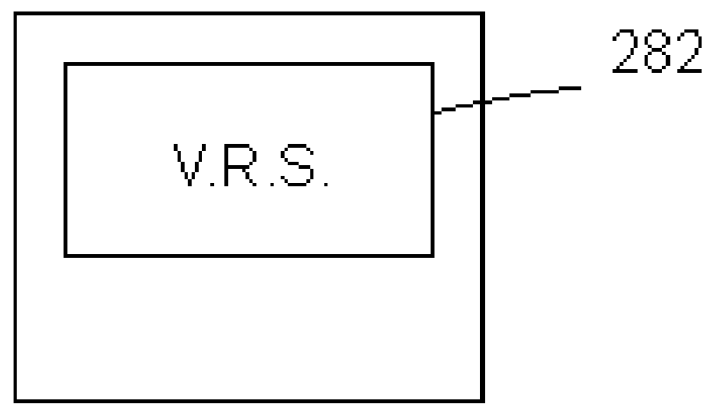
FIG. 4 is a block diagram illustrating an exemplary embodiment of the present invention.

FIG. 5 illustrates how the voice recognition function is activated. CPU 211 (FIG. 1) periodically checks the input status of Input Device 210 (FIG. 1) (S1). If the CPU 211 detects a specific signal input from Input Device 210 (S2) the voice recognition system which is described in FIG. 2 and/or FIG. 3 is activated. As another embodiment, the voice recognition system can also be activated by entering predetermined phrase, such as 'start voice recognition system' via Microphone 215 (FIG. 1).

<<Voice Recognition—Dialing/Auto-Off During Call Function>>

Figure 6A:
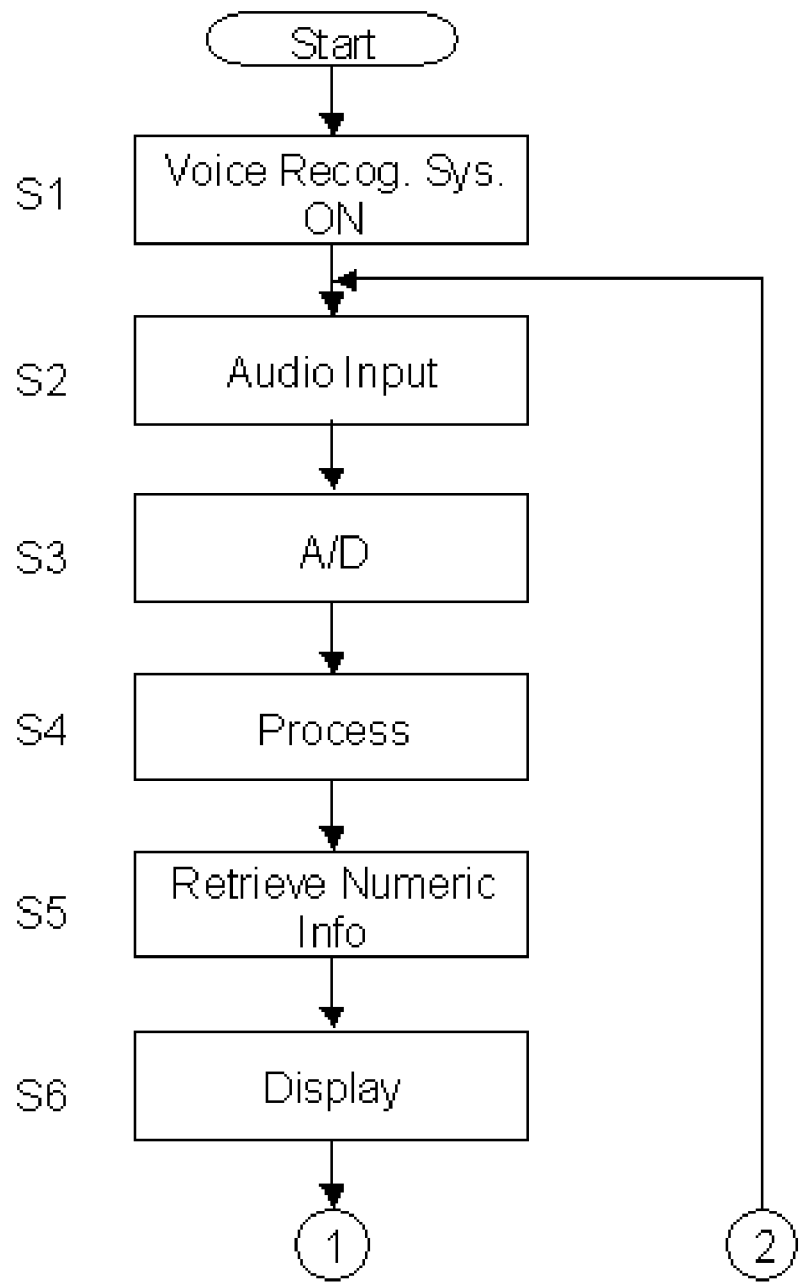
FIG. 6a is a flowchart illustrating an exemplary embodiment of the present invention.
Figure 6B:
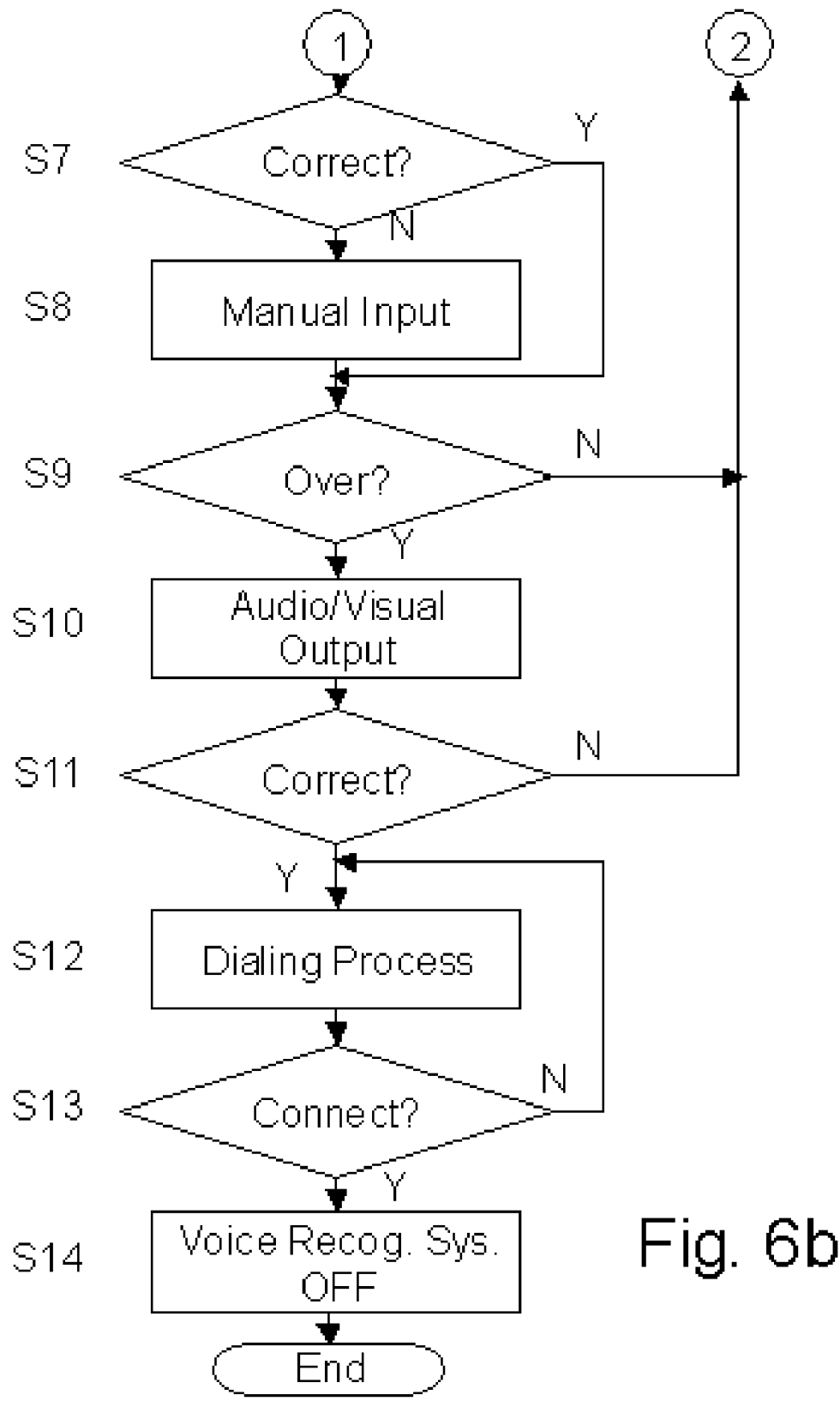
FIG. 6b is a flowchart illustrating an exemplary embodiment of the present invention.

FIG. 6a and FIG. 6b illustrate the operation of the voice recognition in the present invention. Once the voice recognition system is activated (S1) the analog audio data is input from Microphone 215 (FIG. 1) (S2). The analog audio data is converted into digital data by A/D 213 (FIG. 1) (S3). The digital audio data is processed by Sound Processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using Input Device 210 (FIG. 1) (S8). Once the sequence of inputting the numeric information is completed and after the confirmation process is over (S9), the entire numeric information is displayed on LCD 201 and the sound is output from Speaker 216 under control of CPU 211 (S10). If the numeric information is correct (S11), Communication Device 200 (FIG. 1) initiates the dialing process by utilizing the numeric information (S12). The dialing process continues until Communication Device 200 is connected to another device (S13). Once CPU 211 detects that the line is connected it automatically deactivates the voice recognition system (S14).

Figure 7:
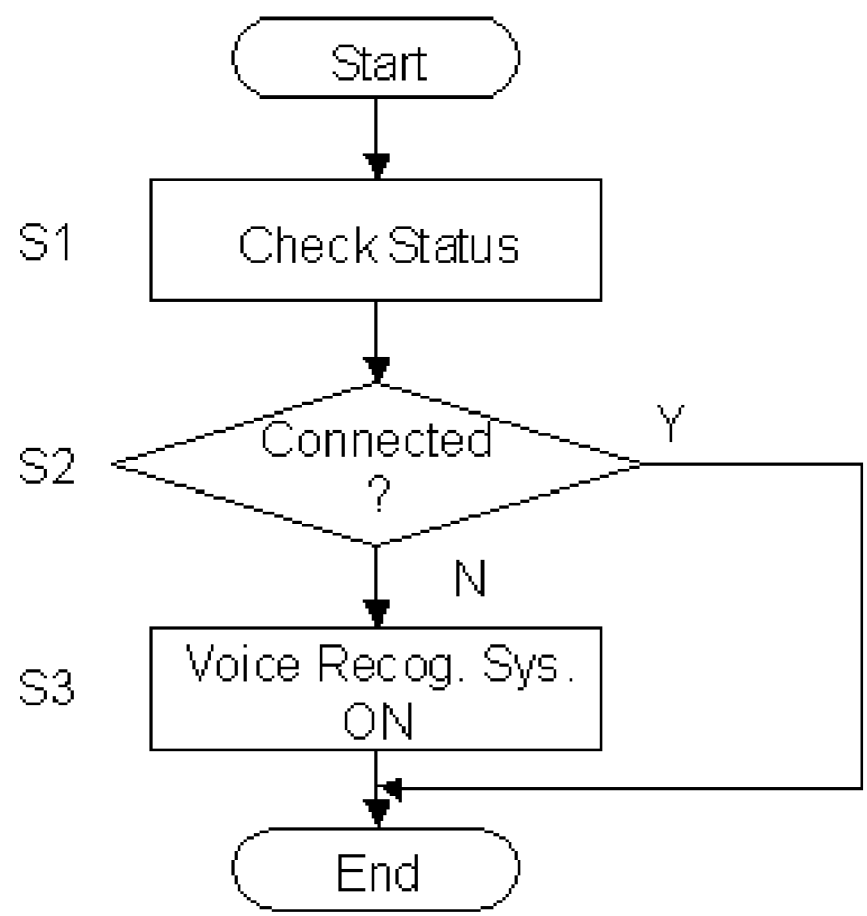
FIG. 7 is a flowchart illustrating an exemplary embodiment of the present invention.

As described in FIG. 7, CPU 211 (FIG. 1) checks the status of Communication Device 200 periodically (S1) and remains the voice recognition system offline during call (S2). If the connection is severed, i.e., user hangs up, then CPU 211 reactivates the voice recognition system (S3).

<<Voice Recognition Tag Function>>

FIGS. 8 through 12 describes the method of inputting the numeric information in a convenient manner.

Figure 11:
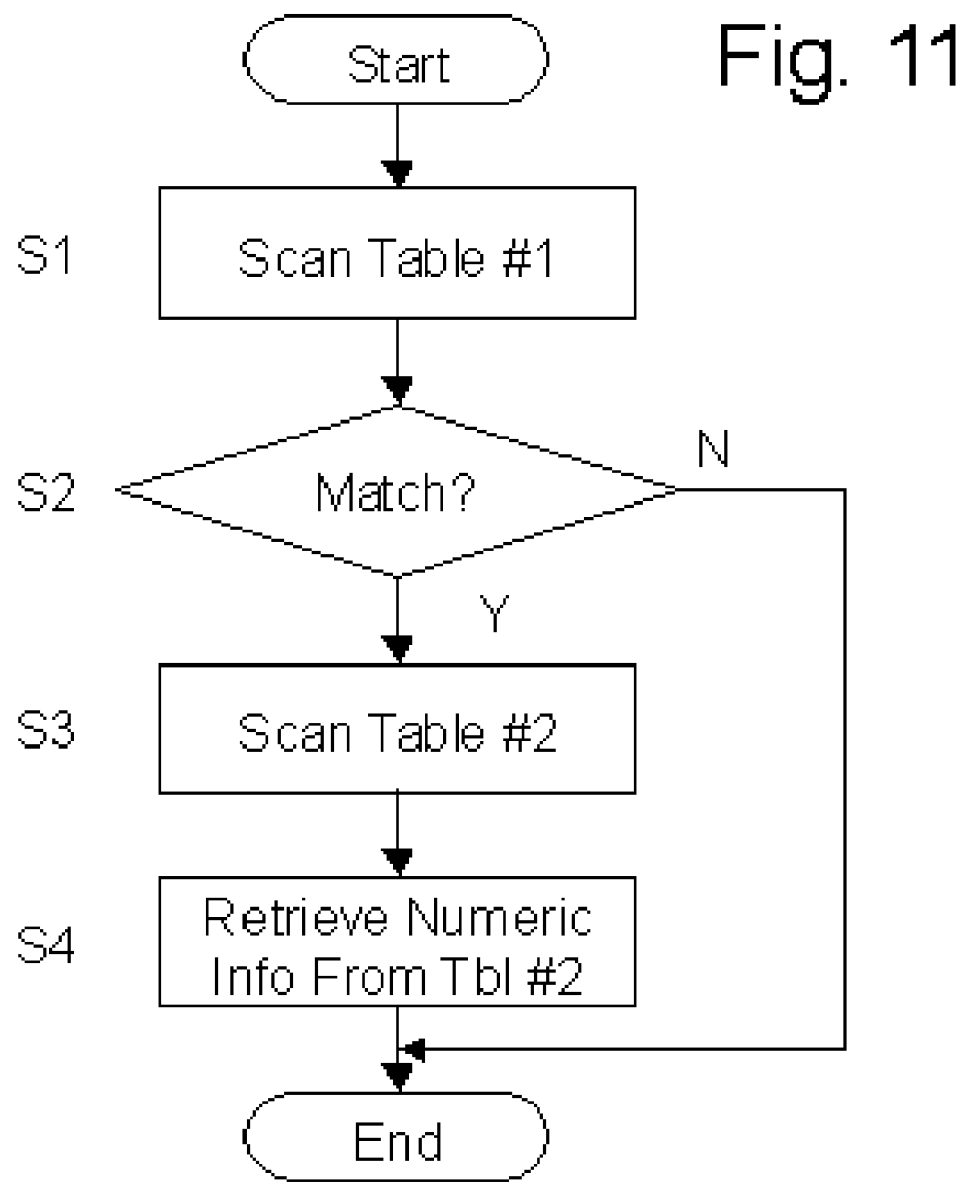
FIG. 11 is a flowchart illustrating an exemplary embodiment of the present invention.

As described in FIG. 8, RAM 206 includes Table #1 (FIG. 8) and Table #2 (FIG. 9). In FIG. 8, audio information #1 corresponds to tag 'Scott.' Namely audio information, such as wave data, which represents the sound of 'Scott' (sounds like 'S-ko-t') is registered in Table #1, which corresponds to tag 'Scott'. In the same manner audio information #2 corresponds to tag 'Carol'; audio information #3 corresponds to tag 'Peter'; audio information #4 corresponds to tag 'Amy'; and audio information #5 corresponds to tag 'Brian.' In FIG. 9, tag 'Scott' corresponds to numeric information '(916) 411-2526'; tag 'Carol' corresponds to numeric information '(418) 675-6566'; tag 'Peter' corresponds to numeric information '(220) 890-1567'; tag 'Amy' corresponds to numeric information '(615) 125-3411'; and tag 'Brian' corresponds to numeric information '(042) 645-2097.' FIG. 11 illustrates how CPU 211 (FIG. 1) operates by utilizing both Table #1 and Table #2. Once the audio data is processed as described in S4 of FIG. 6, CPU 211 scans Table #1 (S1). If the retrieved audio data matches with one of the audio information registered in Table #1 (S2), CPU 211 scans Table #2 (S3) and retrieves the corresponding numeric information from Table #2 (S4).

Figure 12:
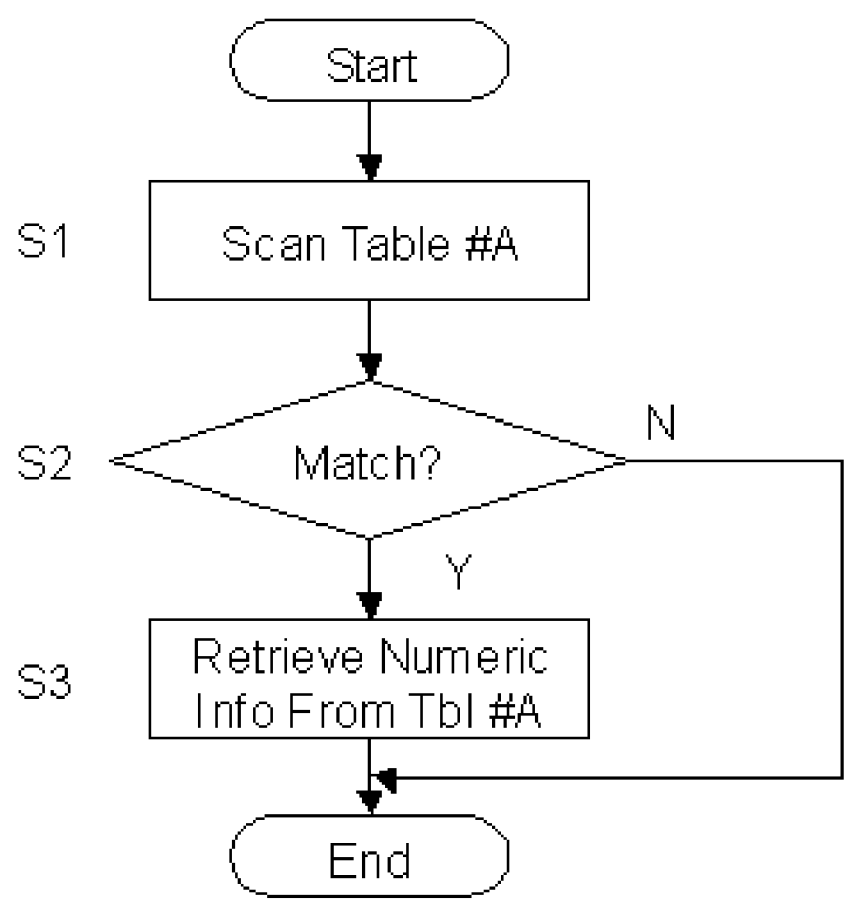
FIG. 12 is a flowchart illustrating an exemplary embodiment of the present invention.

FIG. 10 illustrates another embodiment of the present invention. Here, RAM 206 includes Table #A instead of Table #1 and Table #2 described above. In this embodiment, audio info #1 (i.e., wave data which represents the sound of 'Scot') directly corresponds to numeric information '(916) 411-2526.' In the same manner audio info #2 corresponds to numeric information '(410) 675-6566'; audio info #3 corresponds to numeric information '(220) 890-1567'; audio info #4 corresponds to numeric information '(615) 125-3411'; and audio info #5 corresponds to numeric information '(042) 645-2097.' FIG. 12 illustrates how CPU 211 (FIG. 1) operates by utilizing Table #A. Once the audio data is processed as described in S4 of FIG. 6, CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained in FIGS. 3 through 7. Namely, once the audio data is processed by CPU 211 (FIG. 1) as described in S4 of FIG. 6 and retrieves the text data therefrom and detects one of the tags registered in Table #2 (e.g., 'Scot'), CPU 211 retrieves the corresponding numeric information (e.g., '(916) 411-2526') from the same table.

<<Voice Recognition Noise Filtering Function>>

Figure 13:
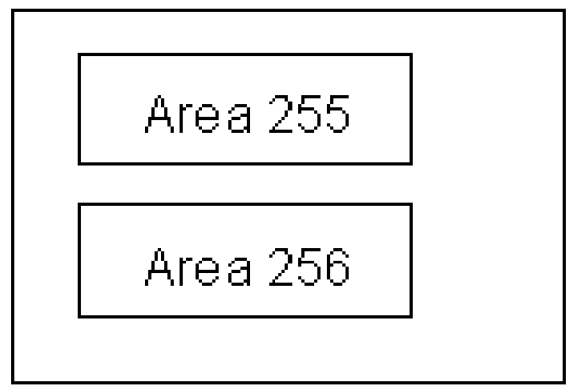
FIG. 13 is a block diagram illustrating an exemplary embodiment of the present invention.
Figure 14:
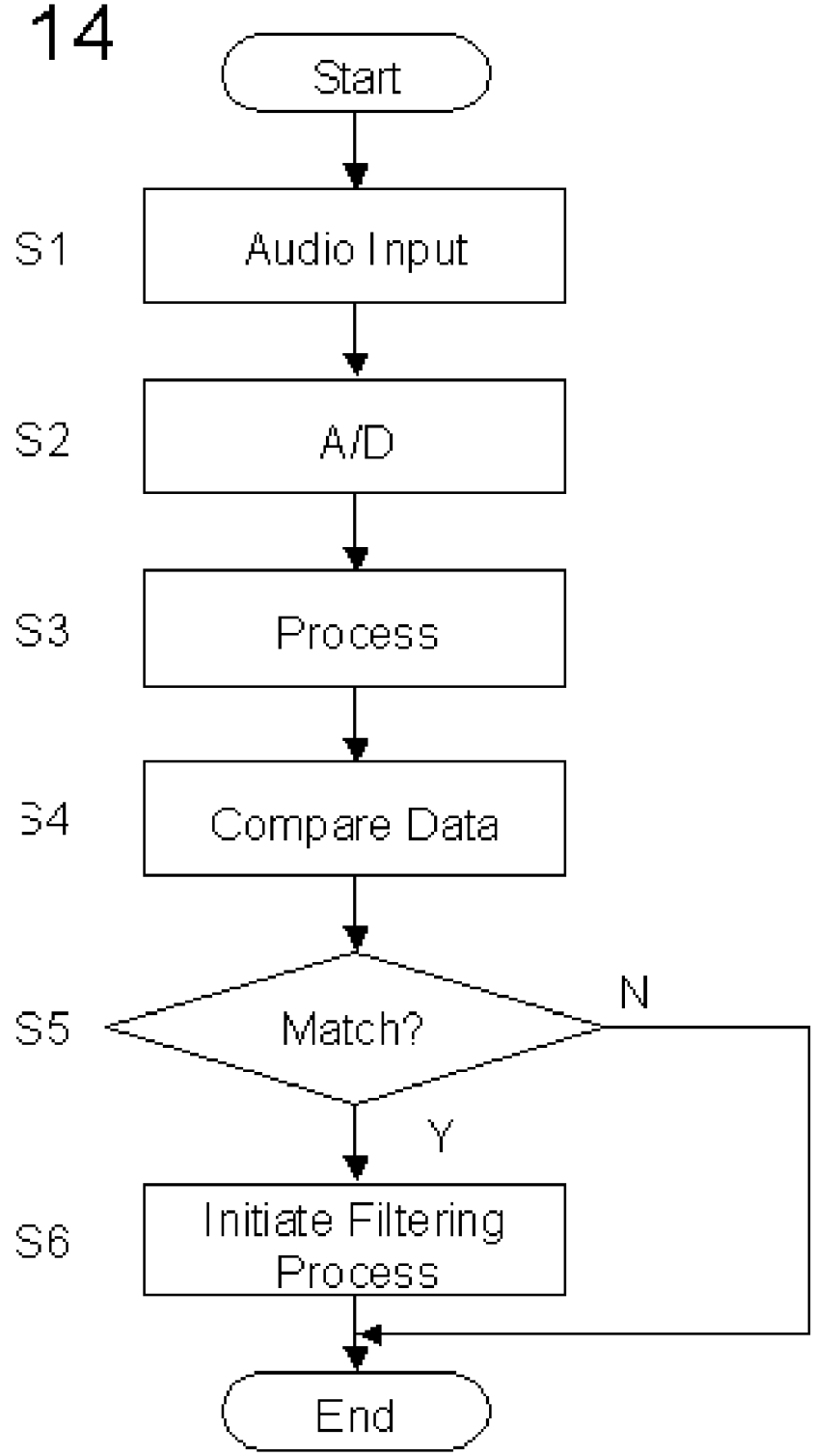
FIG. 14 is a flowchart illustrating an exemplary embodiment of the present invention.
Figure 15:
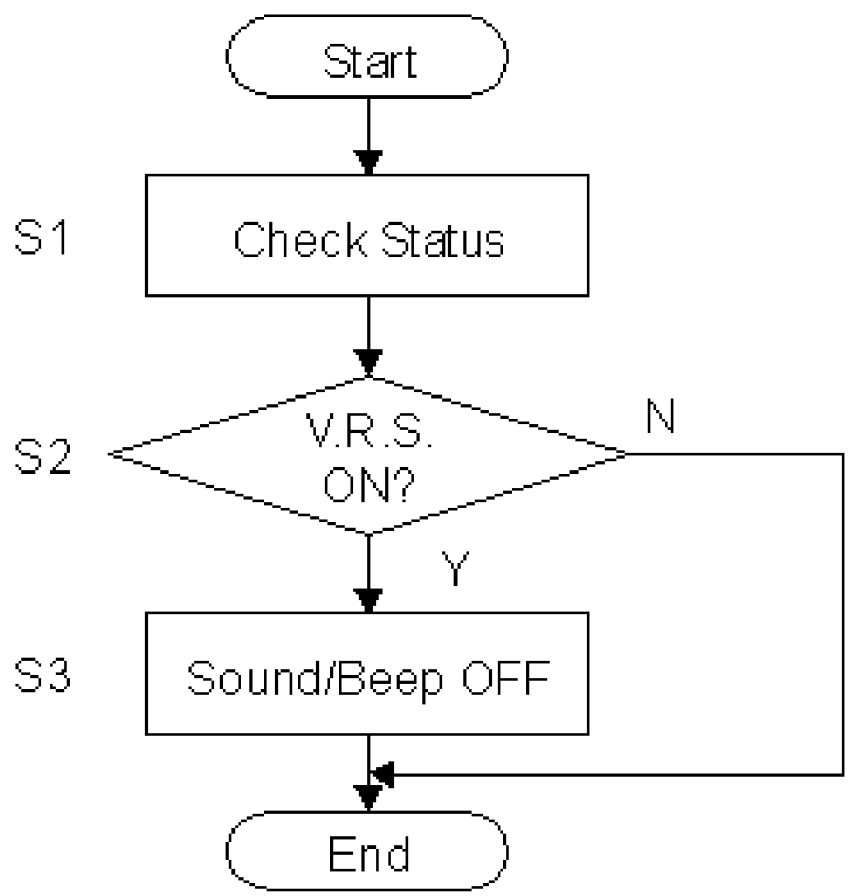
FIG. 15 is a flowchart illustrating an exemplary embodiment of the present invention.

FIGS. 13 through 15 describes the method of minimizing the undesired effect of the background noise when utilizing the voice recognition system.

As described in FIG. 13, RAM 206 (FIG. 1) includes Area 255 and Area 256. Sound audio data which represents background noise is stored in Area 255, and sound audio data which represents the beep, ringing sound and other sounds which are emitted from the Communication Device 200 are stored in Area 256.

FIG. 14 describes the method to utilize the data stored in Area 255 and Area 256 described in FIG. 13. When the voice recognition system is activated as described in FIG. 5, the analog audio data is input from Microphone 215 (FIG. 1) (S1). The analog audio data is converted into digital data by A/D 213 (FIG. 1) (S2). The digital audio data is processed by Sound Processor 205 (FIG. 1) (S3) and compared to the data stored in Area 255 and Area 256 (S4). Such comparison can be done by either Sound Processor 205 or CPU 211 (FIG. 1). If the digital audio data matches to the data stored in Area 255 and/or Area 256, the filtering process is initiated and the matched portion of the digital audio data is deleted as background noise. Such sequence of process is done before retrieving text and numeric information from the digital audio data.

Figure 14A:
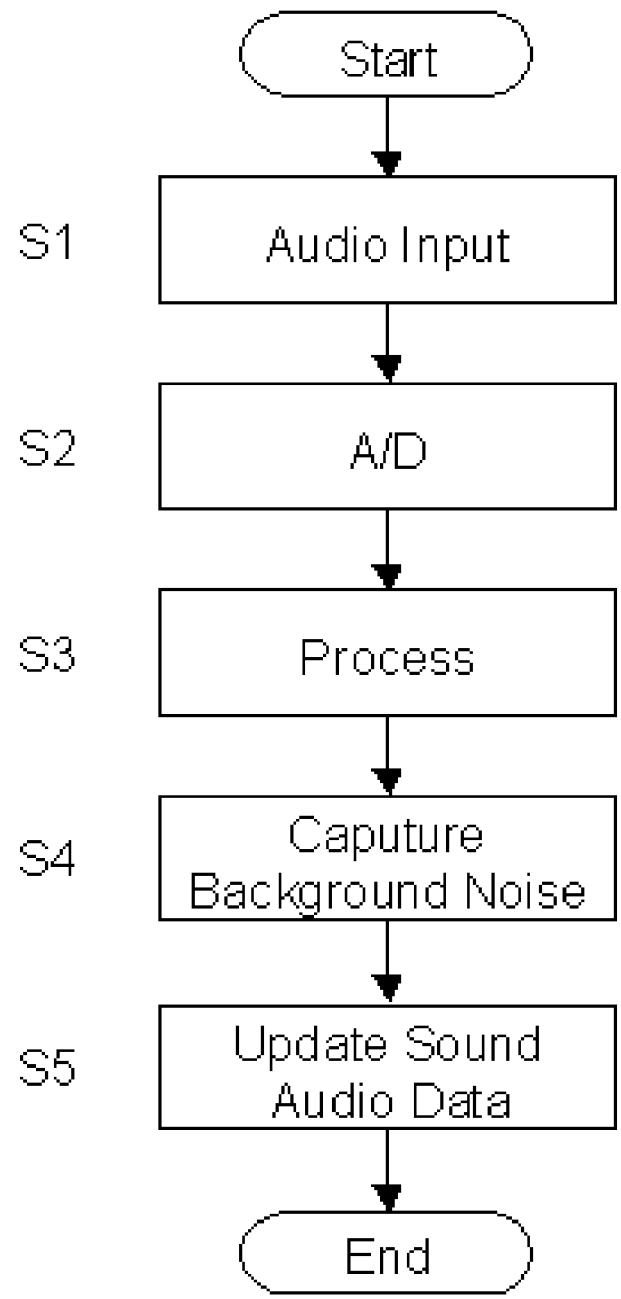
FIG. 14a is a flowchart illustrating an exemplary embodiment of the present invention.

FIG. 14a describes the method of updating Area 255. When the voice recognition system is activated as described in FIG. 5, the analog audio data is input from Microphone 215 (FIG.

1) (S1). The analog audio data is converted into digital data by A/D 213 (FIG. 1) (S2). The digital audio data is processed by Sound Processor 205 (FIG. 1) or CPU 211 (FIG. 1) (S3) and the background noise is captured (S4). CPU 211 (FIG. 1) scans Area 255 and if the captured background noise is not registered in Area 255, it updates the sound audio data stored therein (S5).

FIG. 15 describes another embodiment of the present invention. CPU 211 (FIG. 1) routinely checks whether the voice recognition system is activated (S1). If the system is activated (S2), the beep, ringing sound, and other sounds which are emitted from Communication Device 200 are automatically turned off in order to minimize the miss recognition process of the voice recognition system (S3).

<<Voice Recognition Auto-Off Function>>

Figure 16:
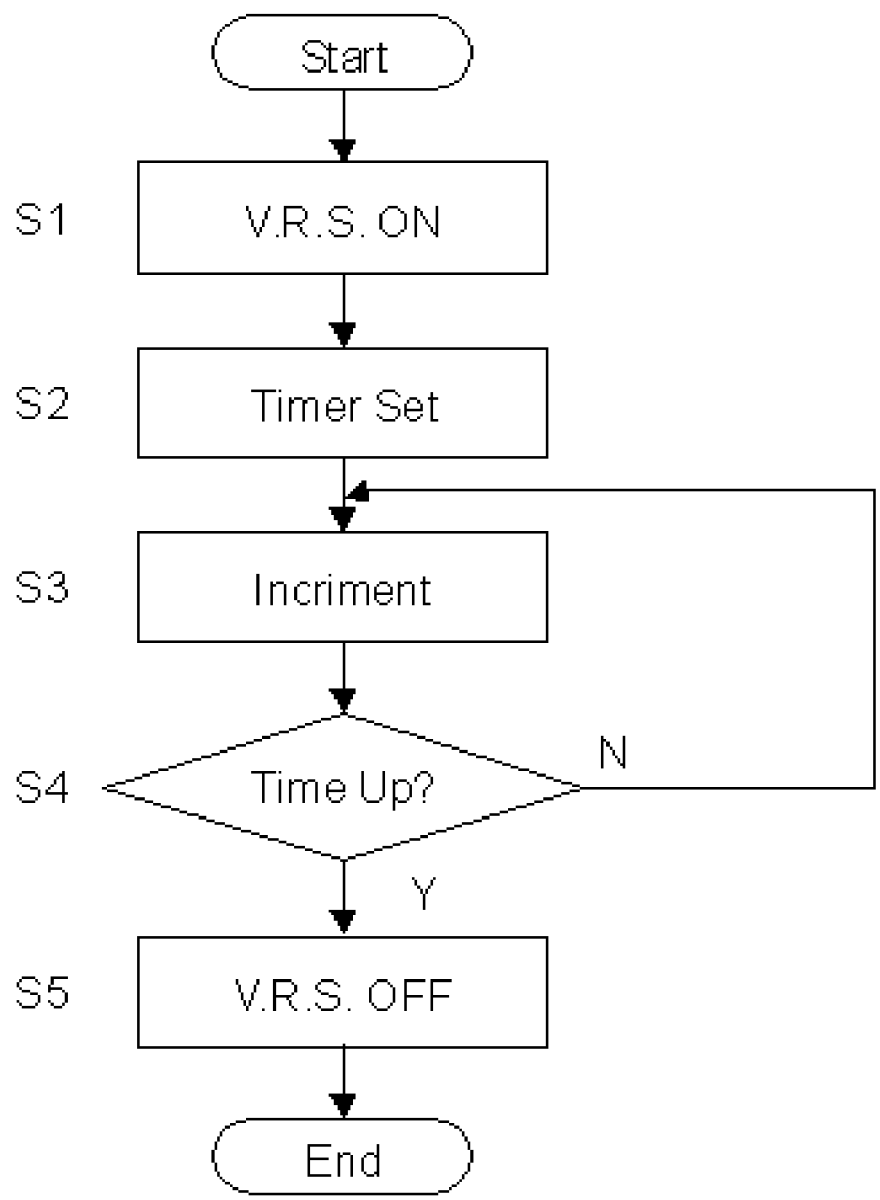
FIG. 16 is a flowchart illustrating an exemplary embodiment of the present invention.

The voice recognition system can be automatically turned off to avoid glitch as described in FIG. 16. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition Email Function (1)>>

Figure 17A:
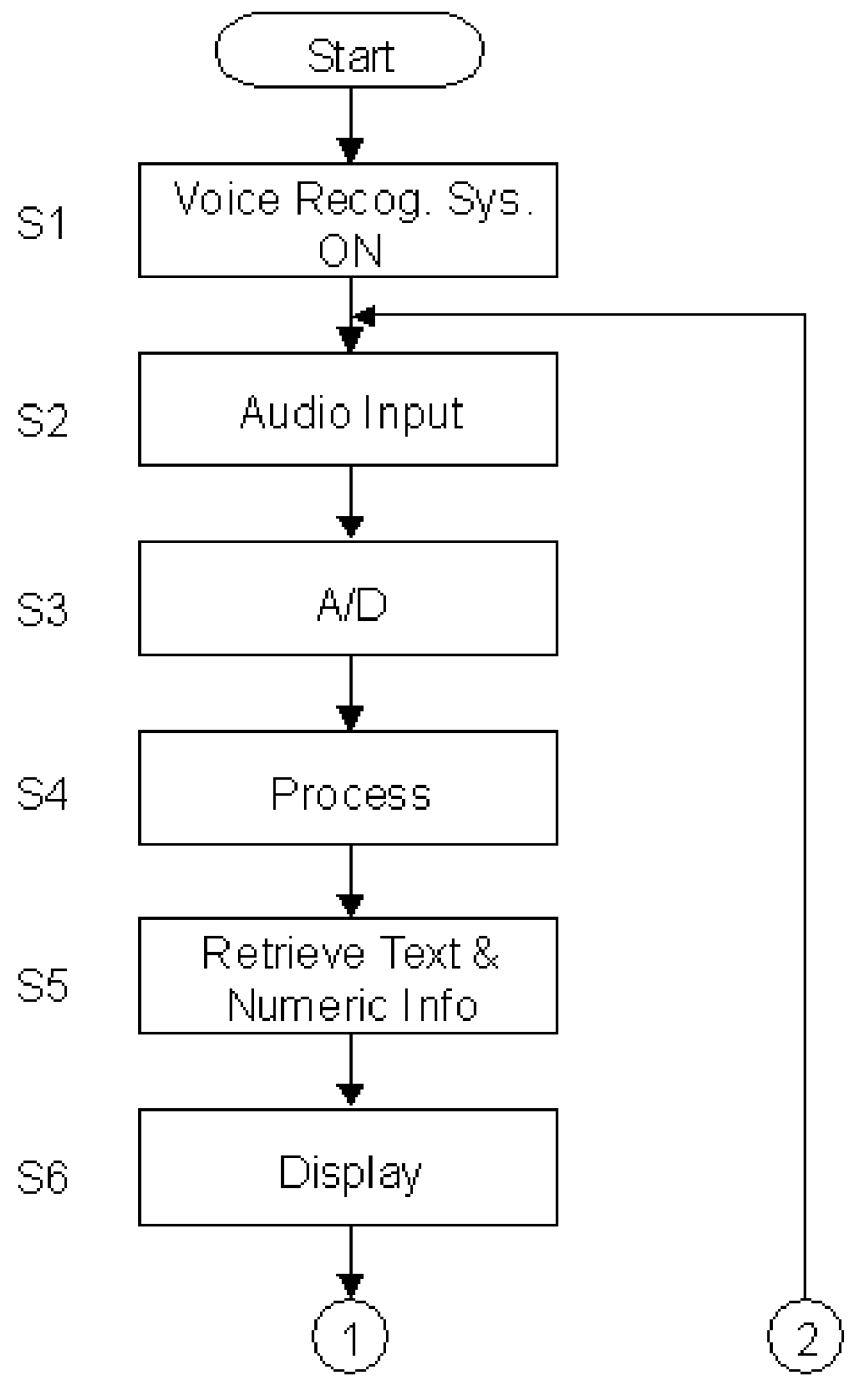
FIG. 17a is a flowchart illustrating an exemplary embodiment of the present invention.
Figure 17B:
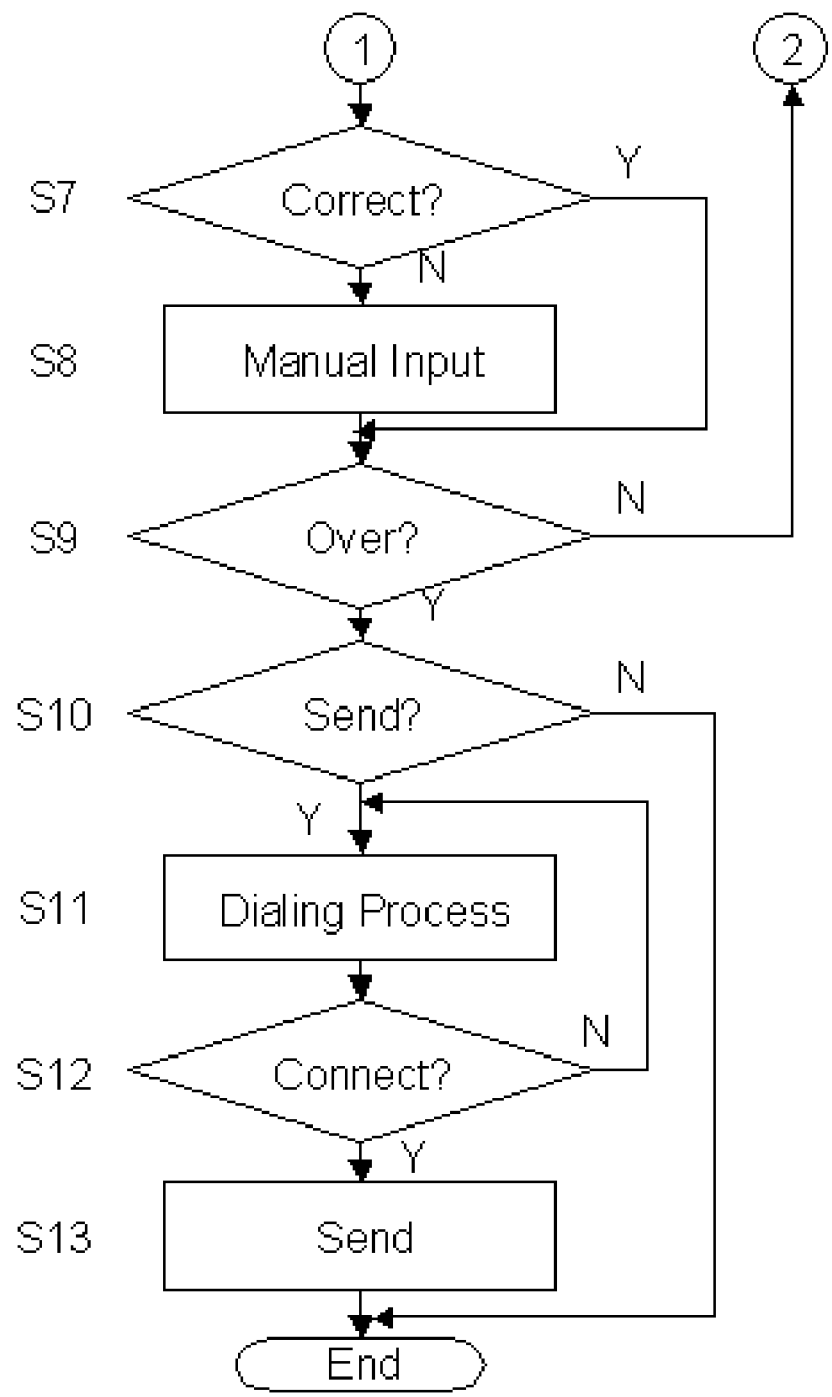
FIG. 17b is a flowchart illustrating an exemplary embodiment of the present invention.

FIGS. 17*a* and 17*b* illustrate the first embodiment of the function of typing and sending e-mails by utilizing the voice recognition system. Once the voice recognition system is activated (S1), the analog audio data is input from Microphone 215 (FIG. 1) (S2). The analog audio data is converted into digital data by A/D 213 (FIG. 1) (S3). The digital audio data is processed by Sound Processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the Input Device 210 (FIG. 1) (S8). If inputting the text and numeric information is completed (S9) and CPU 211 detects input signal from Input Device 210 to send the e-mail (S10), the dialing process is initiated (S11). The dialing process is repeated until Communication Device 200 is connected to Host H (S12), and the e-mail is sent to the designated address (S13).

<<Voice Recognition—Speech-to-Text Function>>

Figure 18:
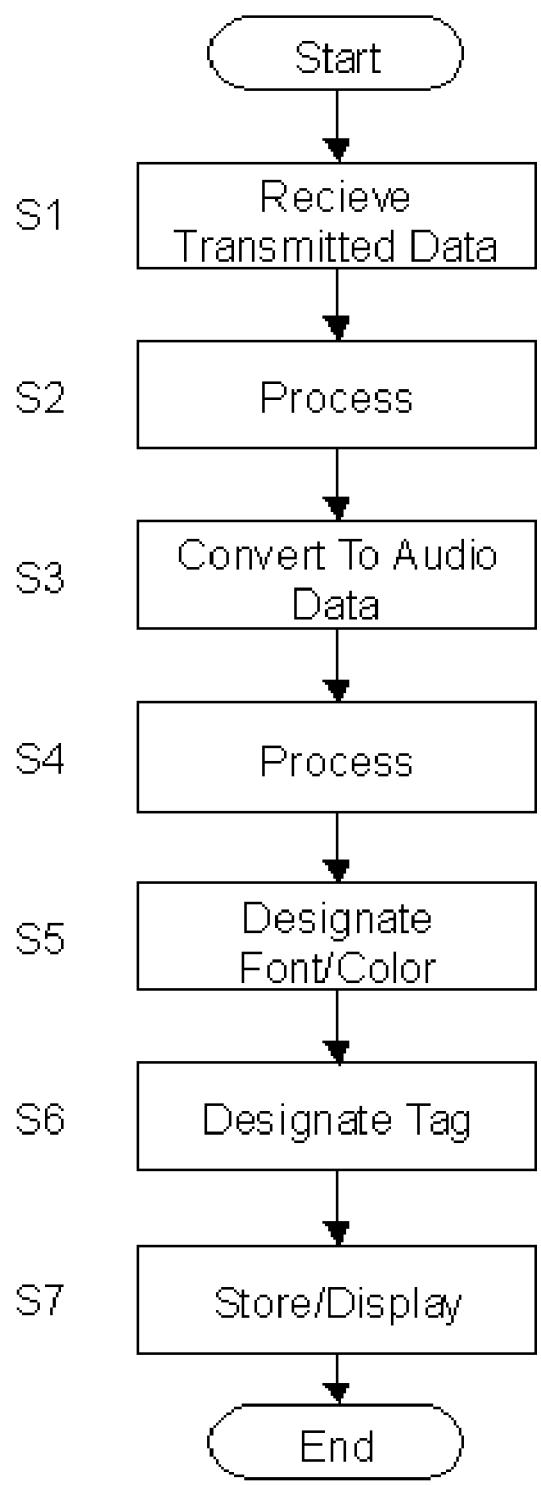
FIG. 18 is a flowchart illustrating an exemplary embodiment of the present invention.

FIG. 18 illustrates the speech-to-text function of Communication Device 200 (FIG. 1).

Once Communication Device 200 receives a transmitted data from another device via Antenna 218 (FIG. 1) (S1), Signal Processor 208 (FIG. 1) processes the data (e.g., wireless signal error check and decompression) (S2), and the transmitted data is converted into digital audio data (S3). Such conversion can be rendered by either CPU 211 (FIG. 1) or Signal Processor 208. The digital audio data is transferred to Sound Processor 205 (FIG. 1) via Data Bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

Figure 19:
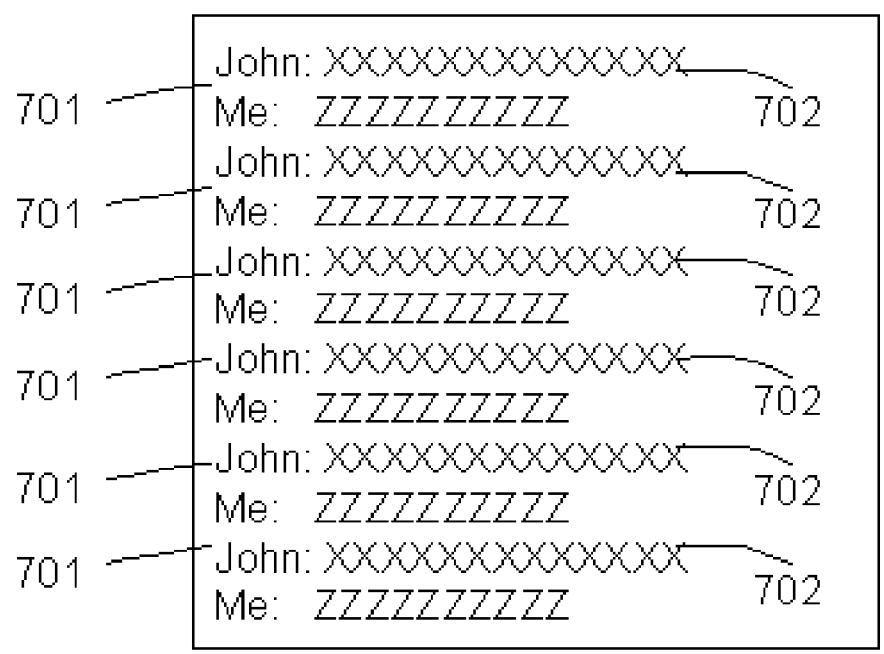
FIG. 19 is a simplified illustration illustrating an exemplary embodiment of the present invention.

FIG. 19 illustrates how the text and numeric information as well as the tag are displayed. On LCD 201 the text and numeric information 702 ('XXXXXXXXX') are displayed with the predetermined font and color as well as with the tag 701 ('John').

<<Voice Recognition—Summary>>

The foregoing inventions may be summarized as the following.

(1) A communication device which has a function to retrieve text and numeric information from a user's voice input from a microphone wherein said function is deactivated when said communication device is connected to another device in order to avoid undesired operation of said communication device.

(2) A communication device which has a function to retrieve text and numeric information from a user's voice input from a microphone wherein said communication device retrieves a numeric information from said user's voice and initiates a dialing process by utilizing said numeric information thereby enabling said user to initiate said dialing process only by his/her voice and/or by without physically contacting said communication device.

(3) A communication device which has a function to retrieve text and numeric information from a user's voice input from a microphone wherein said communication device retrieves audio information from which numeric information can not be retrieved from said user's voice and retrieves predetermined corresponding numeric information therefrom thereby enabling said user to initiate a dialing process in a convenient manner and without memorizing said numeric information or without referring to other sources for said information.

(4) A communication device which has a function to retrieve text and numeric information from a user's voice input from a microphone wherein said communication device compares audio information retrieved from said user's voice with pre-stored audio data and erases said audio data from said audio information before retrieving text and numeric information therefrom thereby enabling said function to be more accurate and minimizing error in retrieving said text and numeric information.

(5) A communication device which has a function to retrieve text and numeric information from a user's voice input from a microphone wherein said communication device retrieves text and numeric information from data transmitted from another device and displays said text and numeric information with predetermined font and color thereby enabling the user to visually confirm the content of conversation by way of observing the said text and numeric information displayed.

(6) A wireless communication device comprising a microphone, a display, an input device, an antenna, an alphanumeric data modification means and, a voice recognition system, wherein when said voice recognition system is activated and said wireless communication is in an email producing mode to produce an email, a series of audio data is input from said microphone and said voice recognition system converts said series of audio data into a first series of alphanumeric data which are displayed on said display, said first series of alphanumeric data are modified by said alphanumeric data modification means to a second series of alphanumeric data when said second series of alphanumeric data are input from said input device, said email including said second series of alphanumeric data is transmitted in a wireless manner from said antenna.

<<Positioning System>>

Figure 20A:
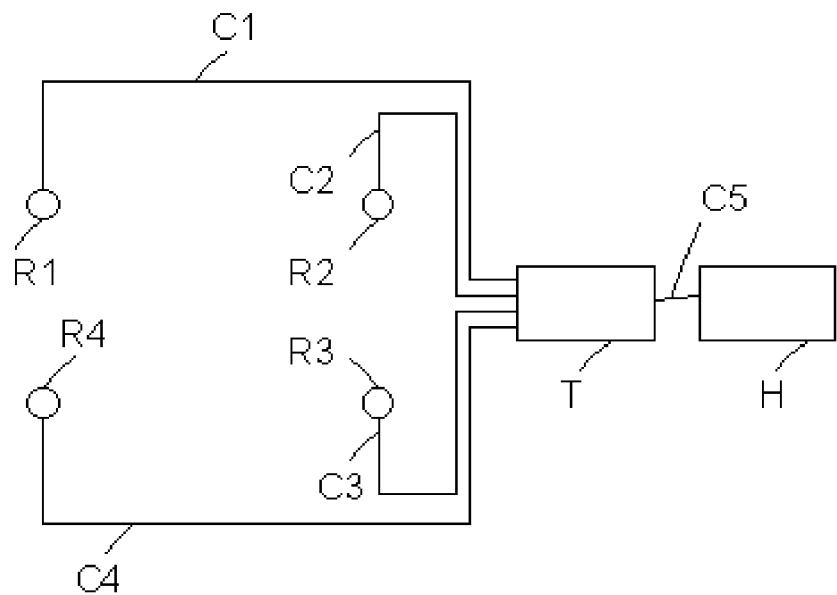
FIG. 20a is a simplified illustration illustrating an exemplary embodiment of the present invention.

FIG. 20*a* illustrates the simplified block diagram to detect the position of Communication Device 200 (FIG. 1).

Figure 20B:
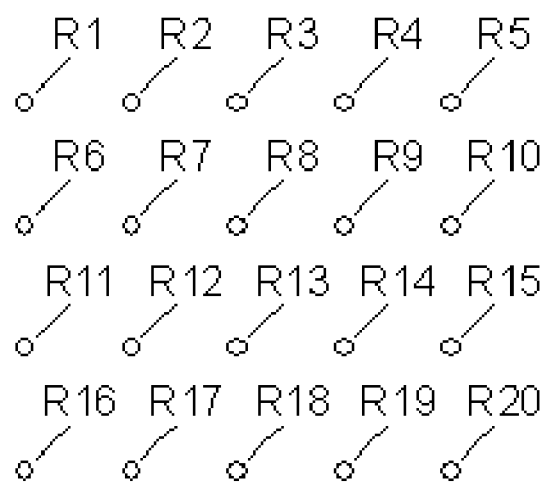
FIG. 20b is a simplified illustration illustrating an exemplary embodiment of the present invention.

In FIG. 20*a*, Relay R1 is connected to Cable C1, Relay R2 is connected to Cable C2, Relay R3 is connected to Cable C3, and Relay R4 is connected to Cable C4. Cables C1, C2, C3, and C4 are connected to Transmitter T, which is connected to Host H by Cable C5. The Relays (R1 through R 20) are located throughout the predetermined area in the pattern illustrated in FIG. 20b. The system illustrated in FIG. 20a and FIG. 20b is designed to pinpoint the position of Communication Device 200 by using the method so-called 'global positioning system' or 'GPS.' Such function can be enabled by the technologies primarily introduced in the following inventions and the references cited thereof: U.S. Pat. No. 6,429,814; U.S. Pat. No. 6,427,121; U.S. Pat. No. 6,427,120; U.S. Pat. No. 6,424,826; U.S. Pat. No. 6,415,227; U.S. Pat. No. 6,415,154; U.S. Pat. No. 6,411,811; U.S. Pat. No. 6,392,591; U.S. Pat. No. 6,389,291; U.S. Pat. No. 6,369,751; U.S. Pat. No. 6,347,113; U.S. Pat. No. 6,324,473; U.S. Pat. No. 6,301,545; U.S. Pat. No. 6,297,770; U.S. Pat. No. 6,278,404; U.S. Pat. No. 6,275,771; U.S. Pat. No. 6,272,349; U.S. Pat. No. 6,266,012; U.S. Pat. No. 6,259,401; U.S. Pat. No. 6,243,647; U.S. Pat. No. 6,236,354; U.S. Pat. No. 6,233,094; U.S. Pat. No. 6,232,922; U.S. Pat. No. 6,211,822; U.S. Pat. No. 6,188,351; U.S. Pat. No. 6,182,927; U.S. Pat. No. 6,163,567; U.S. Pat. No. 6,101,430; U.S. Pat. No. 6,084,542; U.S. Pat. No. 5,971,552; U.S. Pat. No. 5,963,167; U.S. Pat. No. 5,944,770; U.S. Pat. No. 5,890,091; U.S. Pat. No. 5,841,399; U.S. Pat. No. 5,808,582; U.S. Pat. No. 5,777,578; U.S. Pat. No. 5,774,831; U.S. Pat. No. 5,764,184; U.S. Pat. No. 5,757,786; U.S. Pat. No. 5,736,961; U.S. Pat. No. 5,736,960; U.S. Pat. No. 5,594,454; U.S. Pat. No. 5,585,800; U.S. Pat. No. 5,554,994; U.S. Pat. No. 5,535,278; U.S. Pat. No. 5,534,875; U.S. Pat. No. 5,519,620; U.S. Pat. No. 5,506,588; U.S. Pat. No. 5,446,465; U.S. Pat. No. 5,434,574; U.S. Pat. No. 5,402,441; U.S. Pat. No. 5,373,531; U.S. Pat. No. 5,349,531; U.S. Pat. No. 5,347,286; U.S. Pat. No. 5,341,301; U.S. Pat. No. 5,339,246; U.S. Pat. No. 5,293,170; U.S. Pat. No. 5,225,842; U.S. Pat. No. 5,223,843; U.S. Pat. No. 5,210,540; U.S. Pat. No. 5,193,064; U.S. Pat. No. 5,187,485; U.S. Pat. No. 5,175,557; U.S. Pat. No. 5,148,452; U.S. Pat. No. 5,134,407; U.S. Pat. No. 4,928,107; U.S. Pat. No. 4,928,106; U.S. Pat. No. 4,785,463; U.S. Pat. No. 4,754,465; U.S. Pat. No. 4,622,557; and U.S. Pat. No. 4,457,006. Relays R1 through R20 are preferably located on ground, however, are also permitted to be installed in artificial satellites as described in the foregoing patents and the references cited thereof in order to cover wider geographical range. The Relays may also be installed in houses, buildings, bridges, boats, ships, submarines, airplanes, and spaceships. In addition, Host H may be carried by houses, buildings, bridges, boats, ships, submarines, airplanes, and spaceships. In stead of utilizing Cables C1 through C5, Relays R1 through R20 (and other relays described in this specification) may be connected to Transmitter T in a wireless fashion, and Transmitter T may be connected to Host H in a wireless fashion.

FIGS. 21 through 26 illustrate how the positioning system is performed. Assuming that Device A, Communication Device 200, seeks to detect the position of Device B, another Communication Device 200, which is located somewhere in the matrix of Relays illustrated in FIG. 20b.

Figure 21:
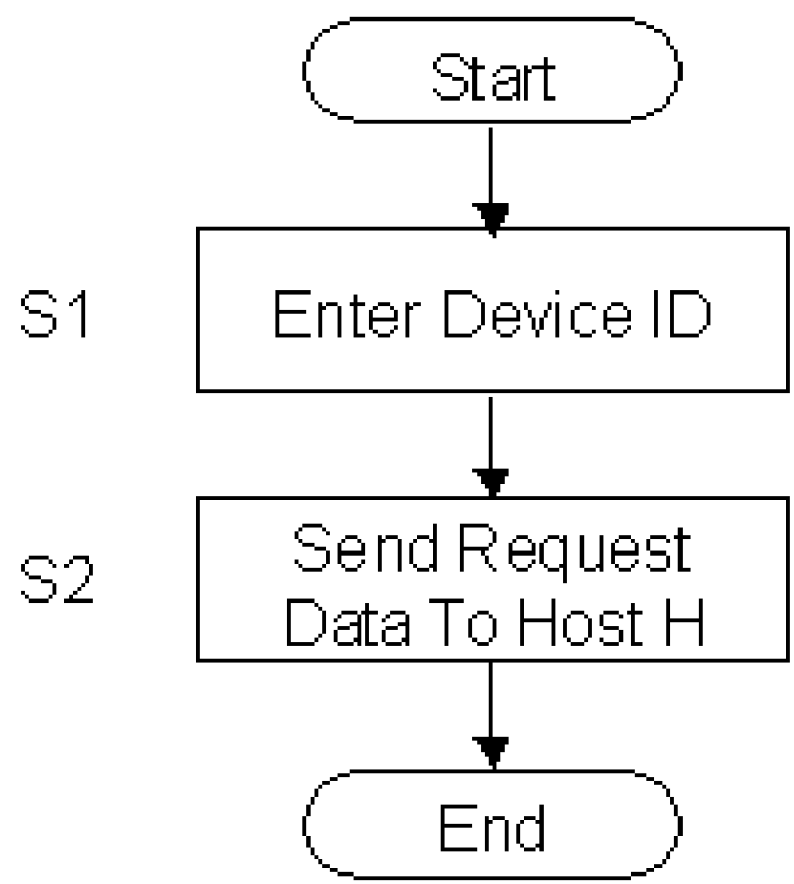
FIG. 21 is a flowchart illustrating an exemplary embodiment of the present invention.

As described in FIG. 21, first of all the device ID of Device B is entered by utilizing Input Device 210 (FIG. 1) or the voice recognition system of Device A installed therein (S1). The device ID may be its corresponding phone number. A request data including the device ID is sent to Host H (FIG. 20a) from Device A (S2).

Figure 22:
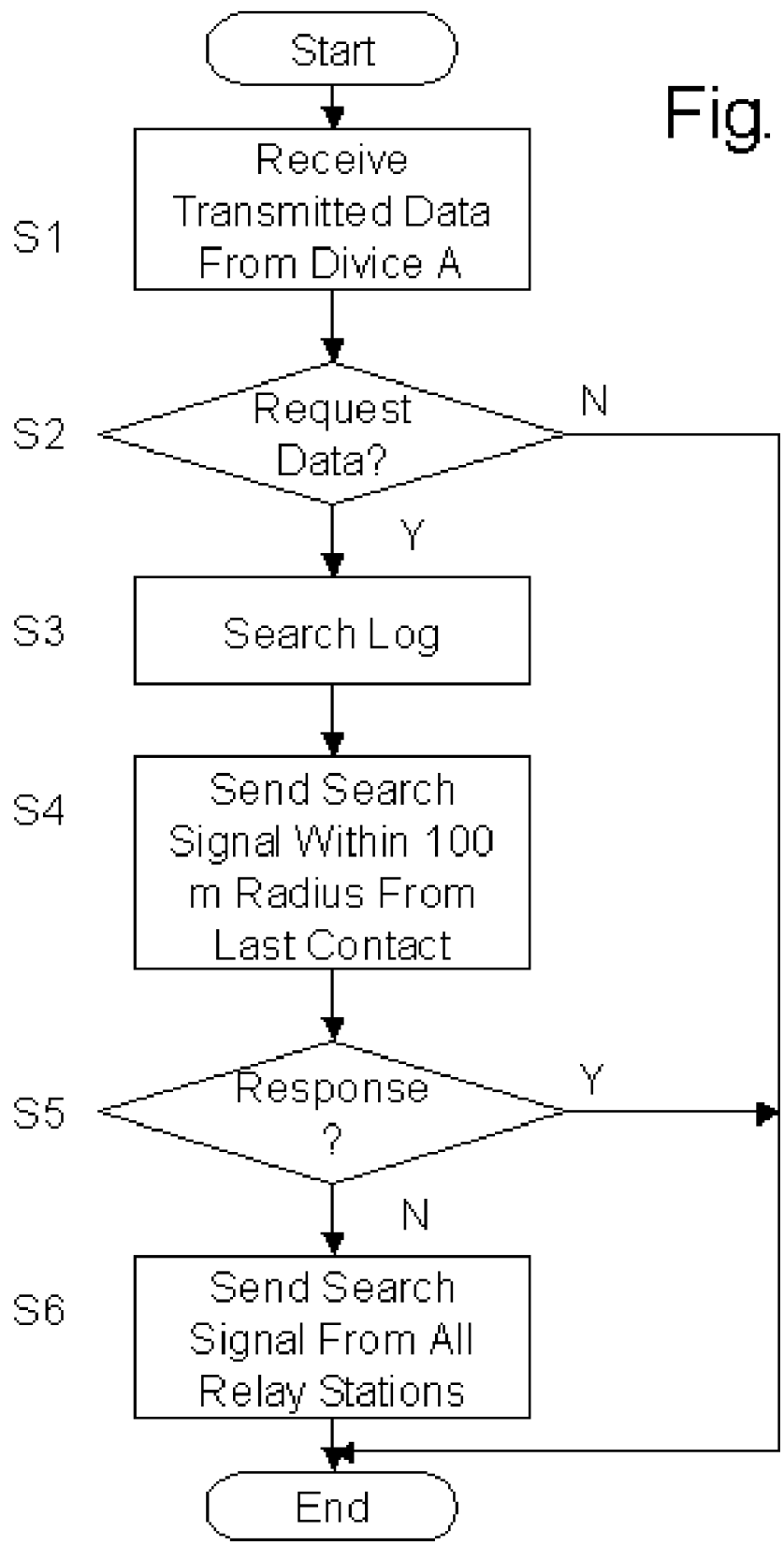
FIG. 22 is a flowchart illustrating an exemplary embodiment of the present invention.

As illustrated in FIG. 22, Host H (FIG. 20a) periodically receives data from Device A (S1). If the received data is a request data (S2), Host H, first of all, searches its communication log which records the location of Device B when it last communicated with Host H (S3). Then Host H sends search signal from the Relays described in FIG. 20b which are located within 100-meter radius from the location registered in the communication log. If there is no response from Device B (S5), Host H sends a search signal from all Relays (from R1 to R20 in FIG. 20b) (S6).

Figure 23:
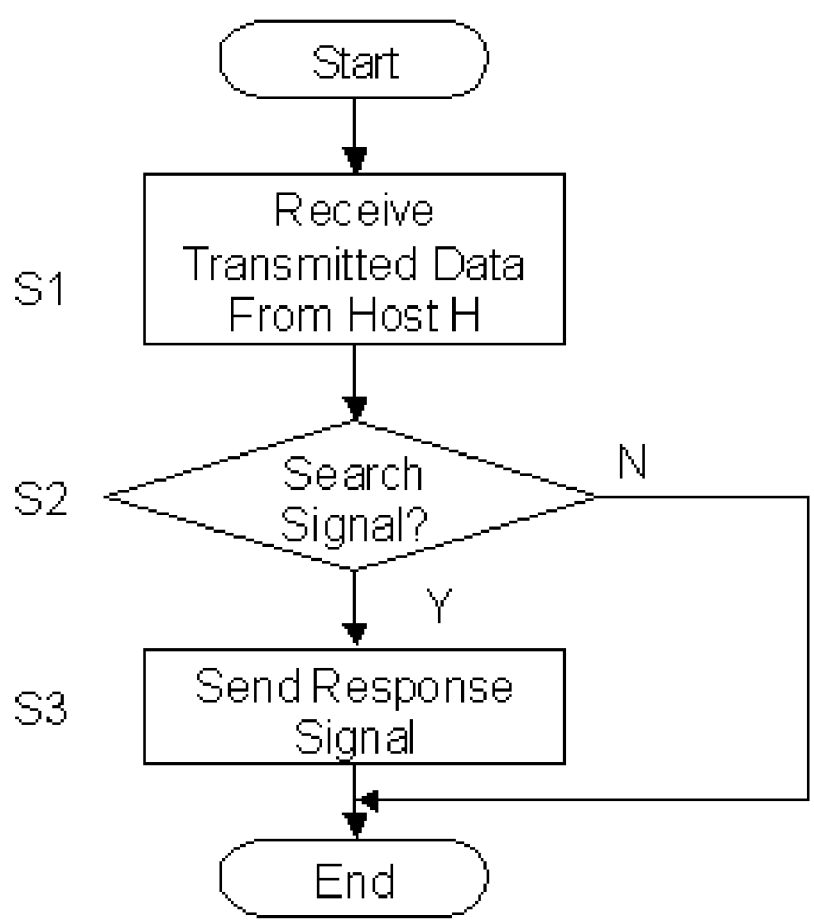
FIG. 23 is a flowchart illustrating an exemplary embodiment of the present invention.

As illustrated in FIG. 23, Device B periodically receives data from Host H (FIG. 20a) (S1). If the data received is a search signal (S2), Device B sends a response signal to Host H (S3).

Figure 24:
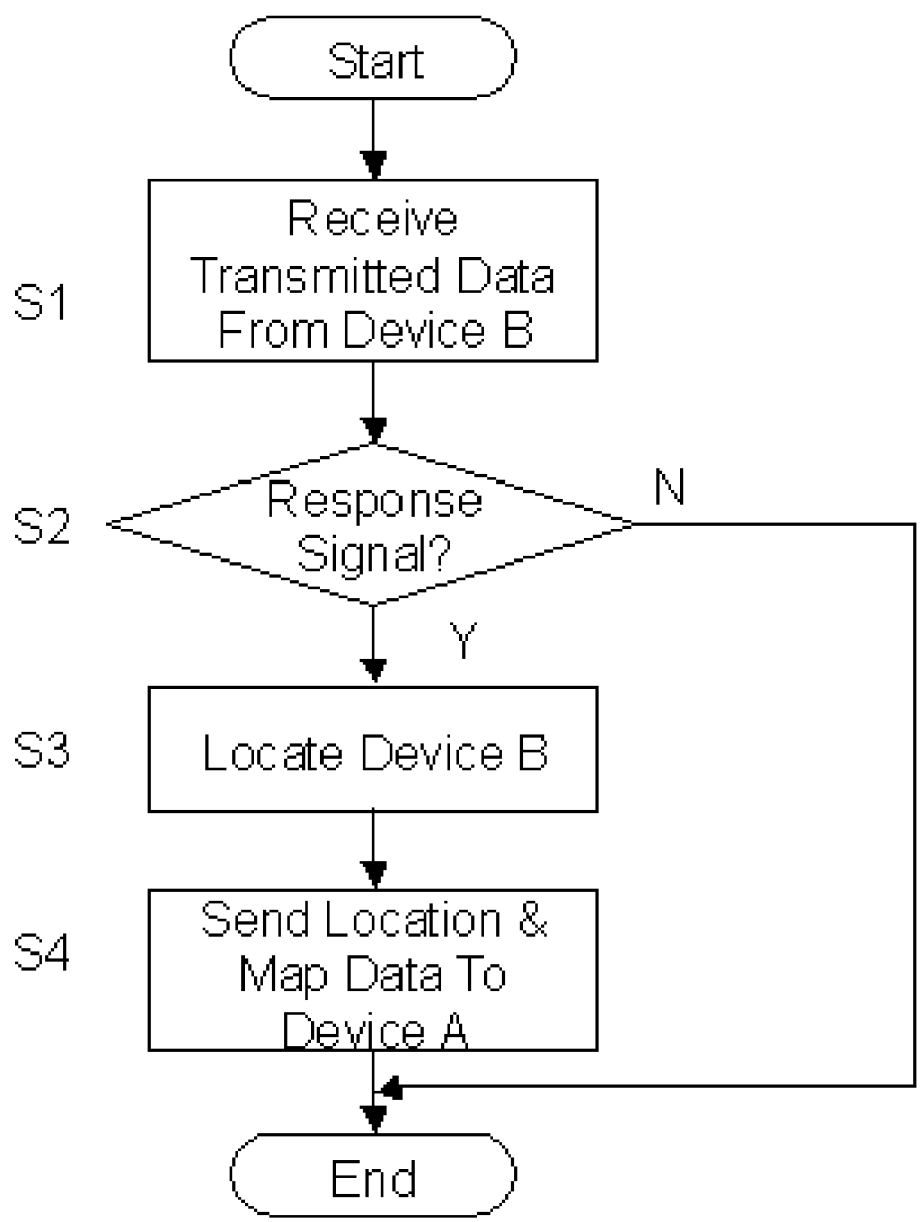
FIG. 24 is a flowchart illustrating an exemplary embodiment of the present invention.

As illustrated in FIG. 24 Host H (FIG. 20a) periodically receives data from Device B (S1). If the data received is a response signal (S2), Host H locates the geographic position of Device B by utilizing the method described in FIGS. 20a and 20b (S3), and sends the location data and the relevant map data of the area where Device B is located to Device A (S4).

Figure 25:
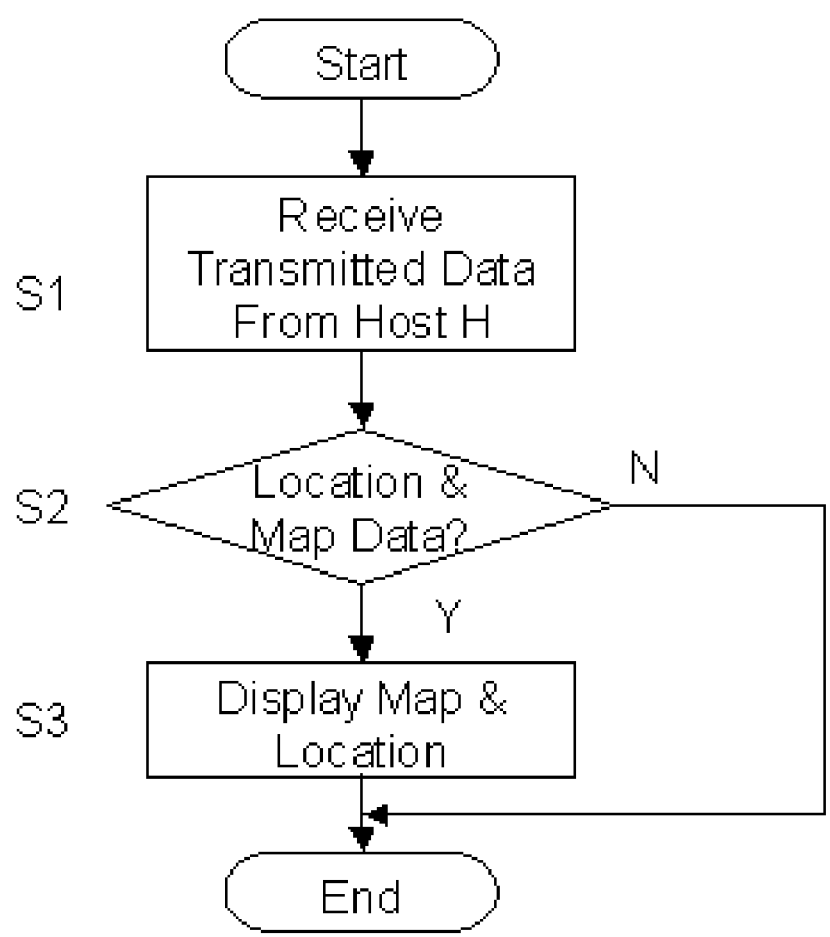
FIG. 25 is a flowchart illustrating an exemplary embodiment of the present invention.

As illustrated in FIG. 25, Device A periodically receives data from Host H (FIG. 20a) (S1). If the data received is the location data and the relevant map data mentioned above (S2), Device A displays the map based on the relevant map data and indicates the current location of Device B thereon based on the location data received (S3).

Figure 26:
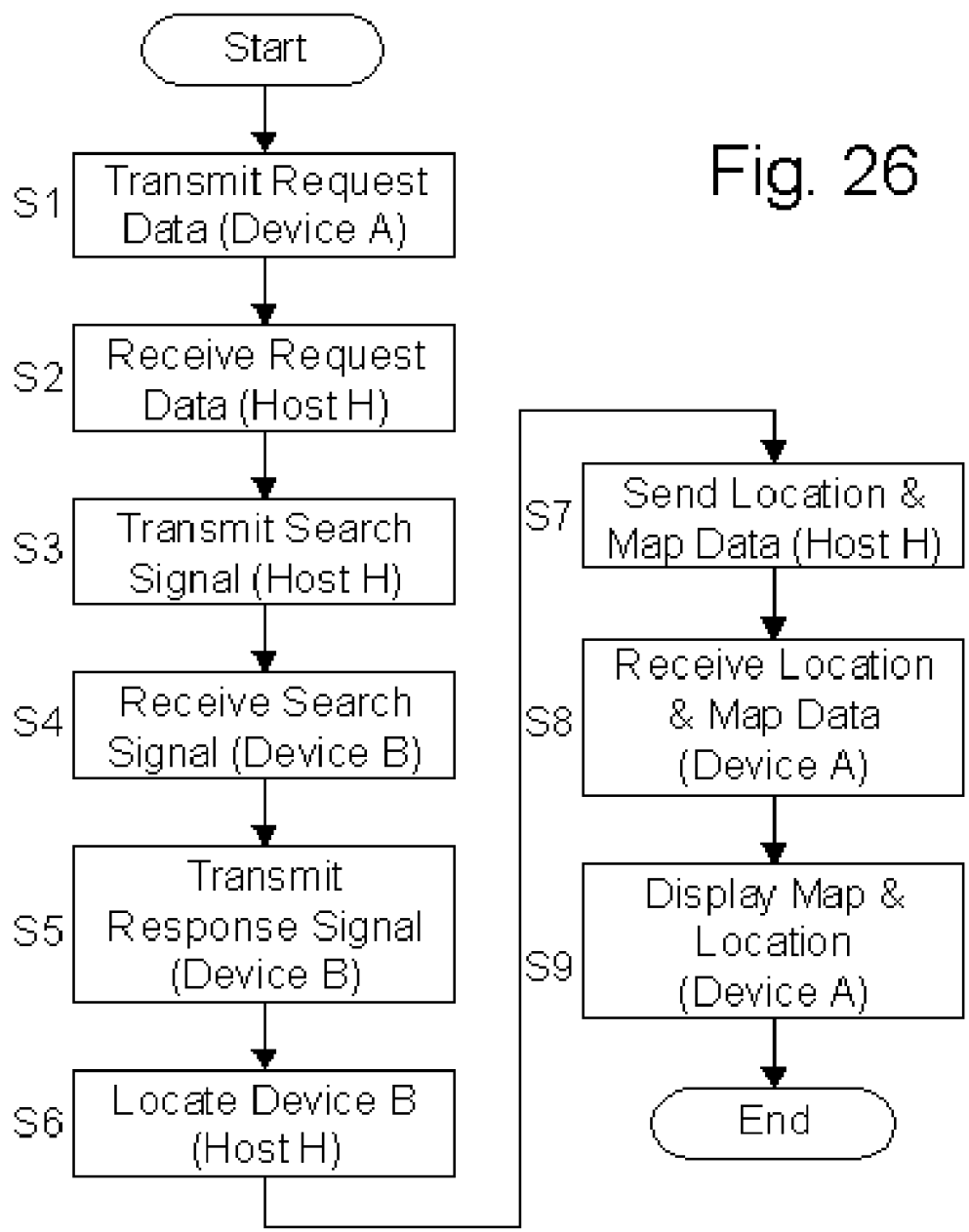
FIG. 26 is a flowchart illustrating an exemplary embodiment of the present invention.

Device A can continuously track down the current location of Device B as illustrated in FIG. 26. First, Device A sends a request data to Host H (FIG. 20a) (S1). As soon as Host H receives the request data (S2), it sends a search signal in the manner illustrated in FIG. 22 (S3). As soon as Device B receives the search signal (S4), it sends a response signal to Host H (S5). Based on the response signal, Host H locates the geographic location of Device B with the method described in FIGS. 20a and 20b (S6). Then Host H sends to Device A a renewed location data and a relevant map data of the area where Device B is currently located (S7). As soon as these data are received (S8), Device A displays the map based on the relevant map data and indicates the updated location based on the renewed location data (S9). If Device B is still within the specified area Device A may use the original relevant map data. As another embodiment of the present invention, S1 through S4 may be omitted and make Device B send a response signal continuously to Host H until Host H sends a command signal to Device B to cease sending the response signal.

<<Positioning System—Automatic Silent Mode>>

FIGS. 27a through 32g illustrate the automatic silent mode of Communication Device 200 (FIG. 1).

Figure 27A:
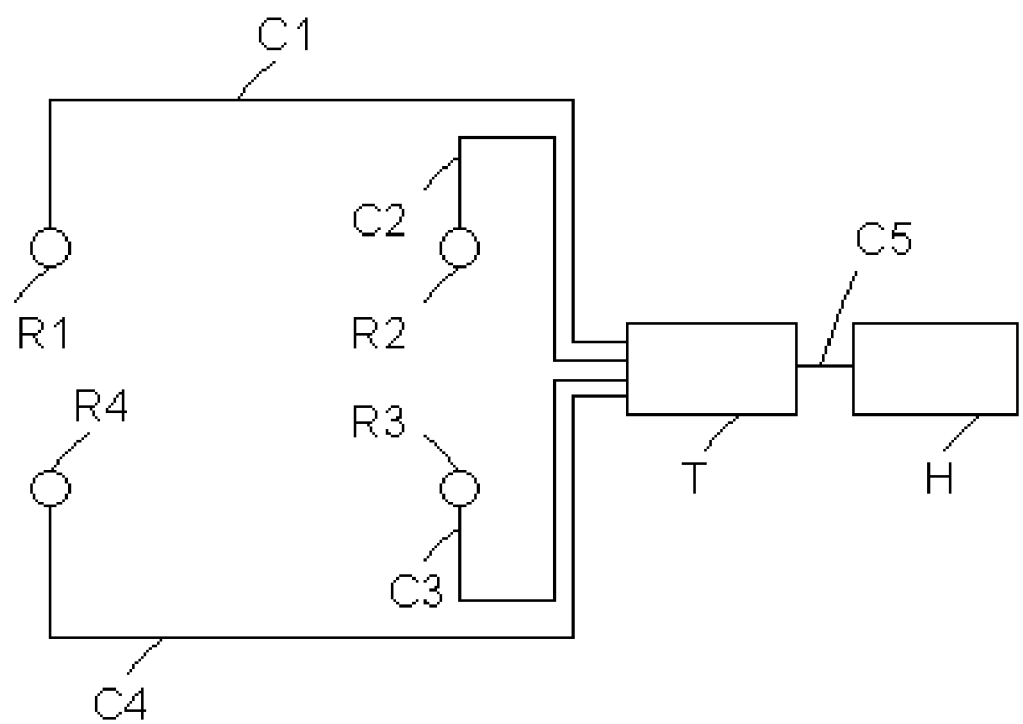
FIG. 27a is a simplified illustration illustrating an exemplary embodiment of the present invention.
Figure 27B:
FIG. 27b is a simplified illustration illustrating an exemplary embodiment of the present invention.

In FIG. 27a, Relay R1 is connected to Cable C1, Relay R2 is connected to Cable C2, Relay R3 is connected to Cable C3, and Relay R4 is connected to Cable C4. Cables C1, C2, C3, and C4 are connected to Transmitter T, which is connected to Host H by Cable C5. The Relays (R1 through R 20) are located throughout the predetermined area in the pattern illustrated in FIG. 27b. The system illustrated in FIGS. 27a and 27b is designed to pinpoint the position of Communication Device 200 by using the method so-called 'global positioning system' or 'GPS.' As stated hereinbefore, such function can be enabled by the technologies primarily introduced in the inventions in the foregoing patents and the references cited thereof. The Relays R1 through R20 are preferably located on ground, however, are also permitted to be installed in artificial satellites as described in the foregoing patents and the references cited thereof in order to cover wider geographical range. In addition, Host H may be carried by an artificial satellite and utilize the formation as described in FIGS. 2a, 2b, and 2c.

Figure 28:
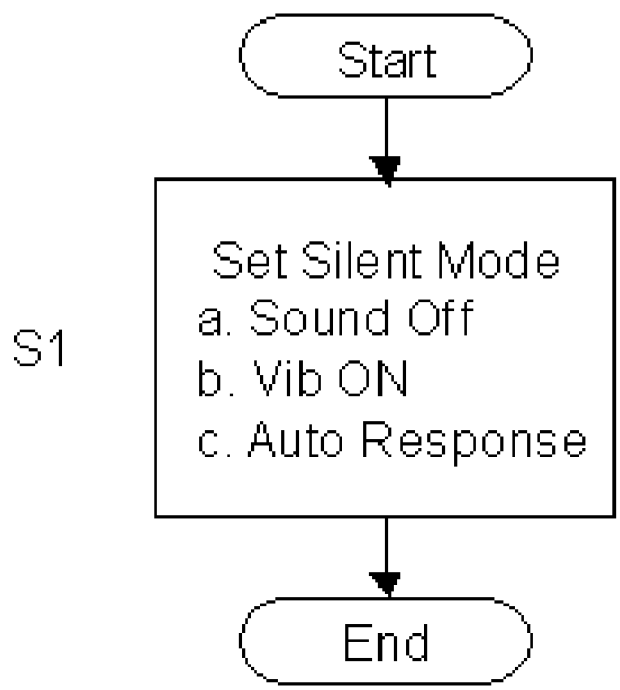
FIG. 28 is a flowchart illustrating an exemplary embodiment of the present invention.

As illustrated in FIG. 28, the user of Communication Device 200 may set the silent mode by Input Device 210 (FIG. 1) or by utilizing the voice recognition system installed therein. When Communication Device 200 is in the silent mode, (a) the ringing sound is turned off, (b) Vibrator 217 (FIG. 1) activates when Communication Device 200 receives call, and/or (c) Communication Device 200 sends an automatic response to the caller device when a call is received (S1). The user may, at his discretion, select any of these predetermined functions of the automatic silent mode.

Figure 29:
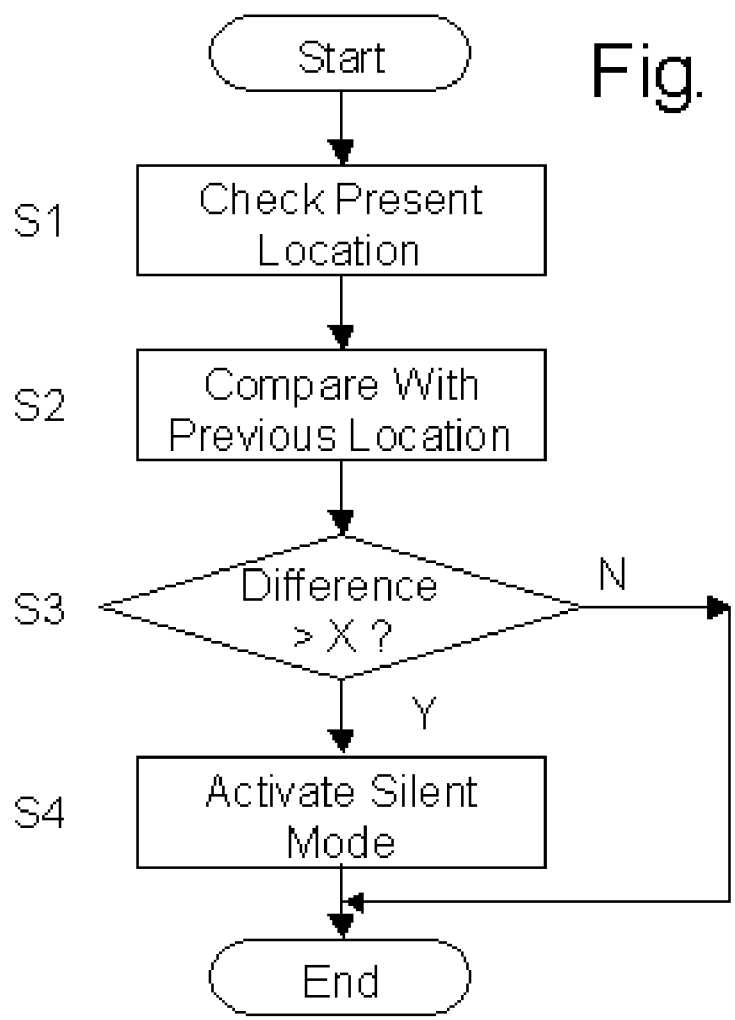
FIG. 29 is a flowchart illustrating an exemplary embodiment of the present invention.

FIG. 29 illustrates how the automatic silent mode is activated. Communication Device 200 periodically checks its present location with the method so-called 'global positioning system' or 'GPS' by using the system illustrated in FIGS. 27*a* and 27*b* (S1). Communication Device 200 then compares the present location and the previous location (S2). If the difference of the two values is more than the specified amount X, i.e., when the moving velocity of Communication Device 200 exceeds the predetermined value (S3), the silent mode is activated and (a) the ringing sound is automatically turned off, (b) Vibrator 217 (FIG. 1) activates, and/or (c) Communication Device 200 sends an automatic response to the caller device according to the user's setting (S4). Here, the silent mode is automatically activated because the user of Communication Device 200 is presumed to be on an automobile and is not in a situation to freely answer the phone, or the user is presumed to be riding a train and does not want to disturb other passengers.

Figure 30:
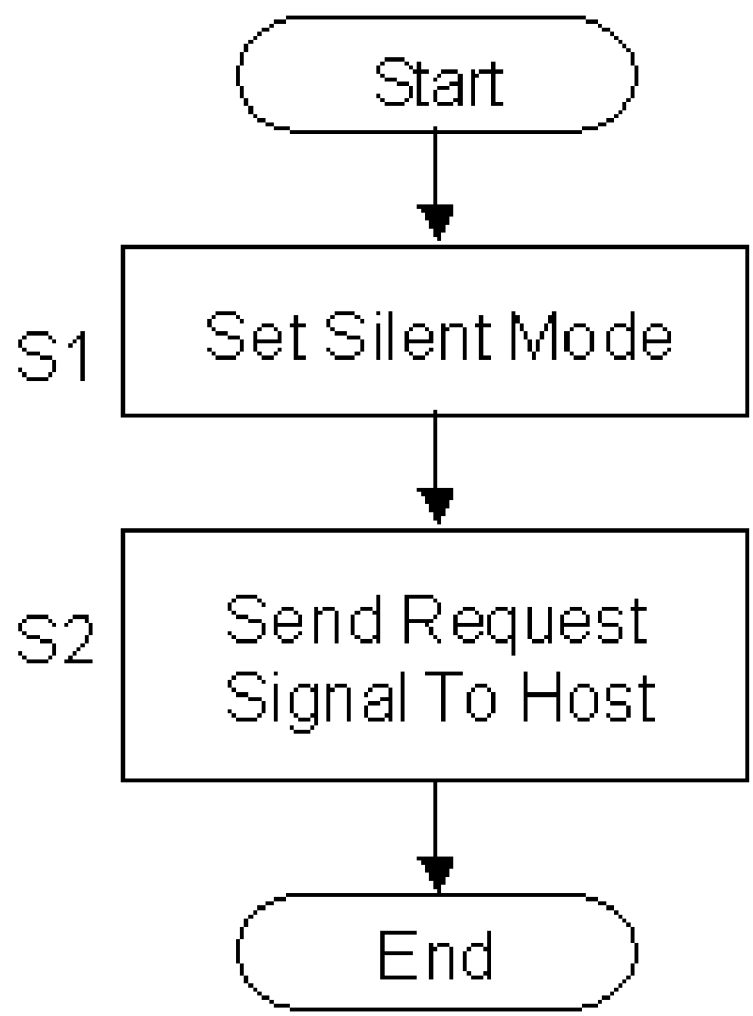
FIG. 30 is a flowchart illustrating an exemplary embodiment of the present invention.

As another embodiment of the present invention, the automatic silent mode may be administered by Host H (FIG. 27*a*). As illustrated in FIG. 30, the silent mode is set in the manner described in FIG. 28 (S1) and Communication Device 200 sends to Host H a request signal indicating that it is in the silent mode (S2).

Figure 31:
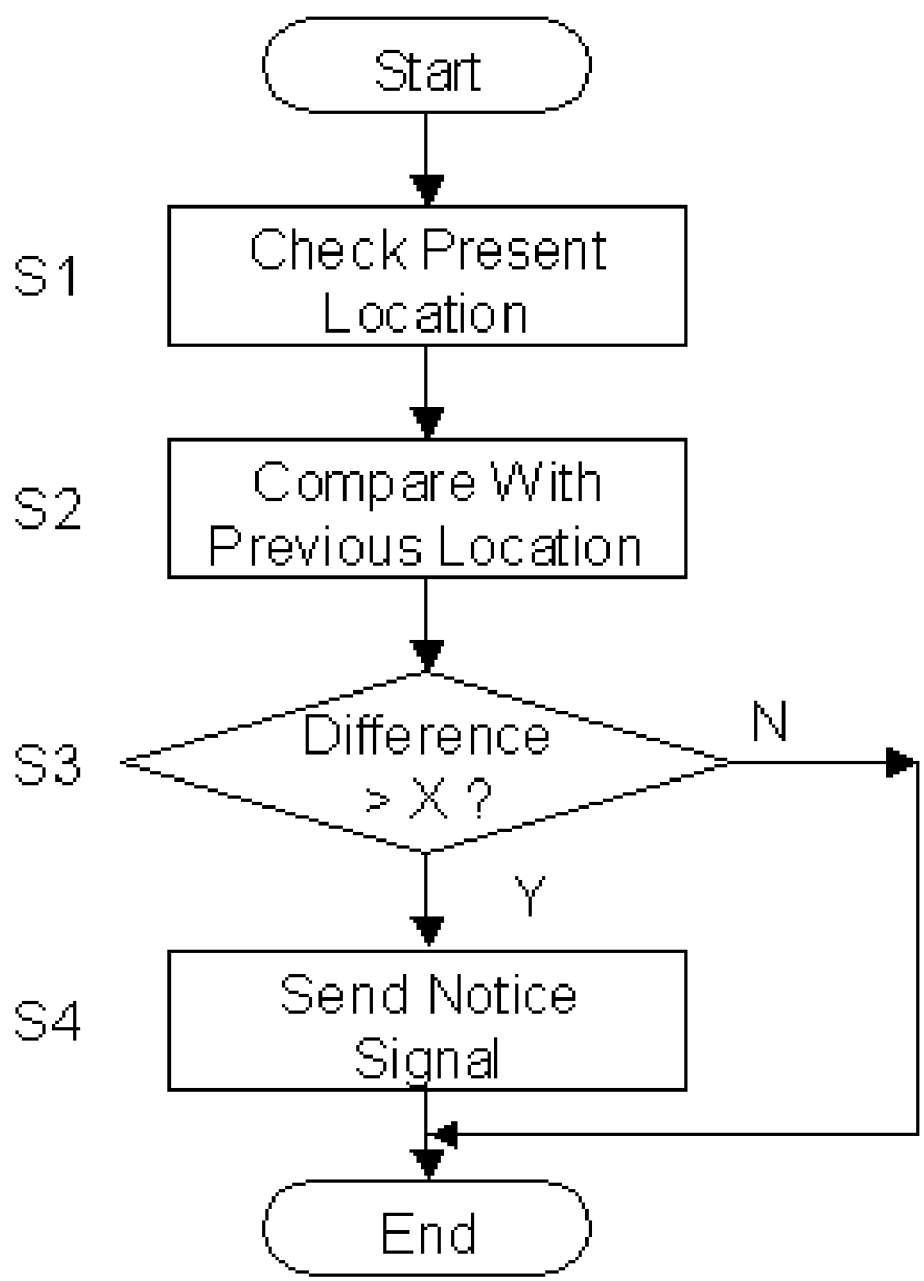
FIG. 31 is a flowchart illustrating an exemplary embodiment of the present invention.

As described in FIG. 31, when Host H (FIG. 27*a*) detects a call to Communication Device 200 after receiving the request signal, it checks the current location of Communication Device 200 (S1) and compares it with the previous location (S2). If the difference of the two values is more than the specified amount X, i.e., when the moving velocity of Communication Device 200 exceeds the predetermined value (S3), Host H sends a notice signal to Communication Device 200 indicating that it has received an incoming call (S4).

Figure 32:
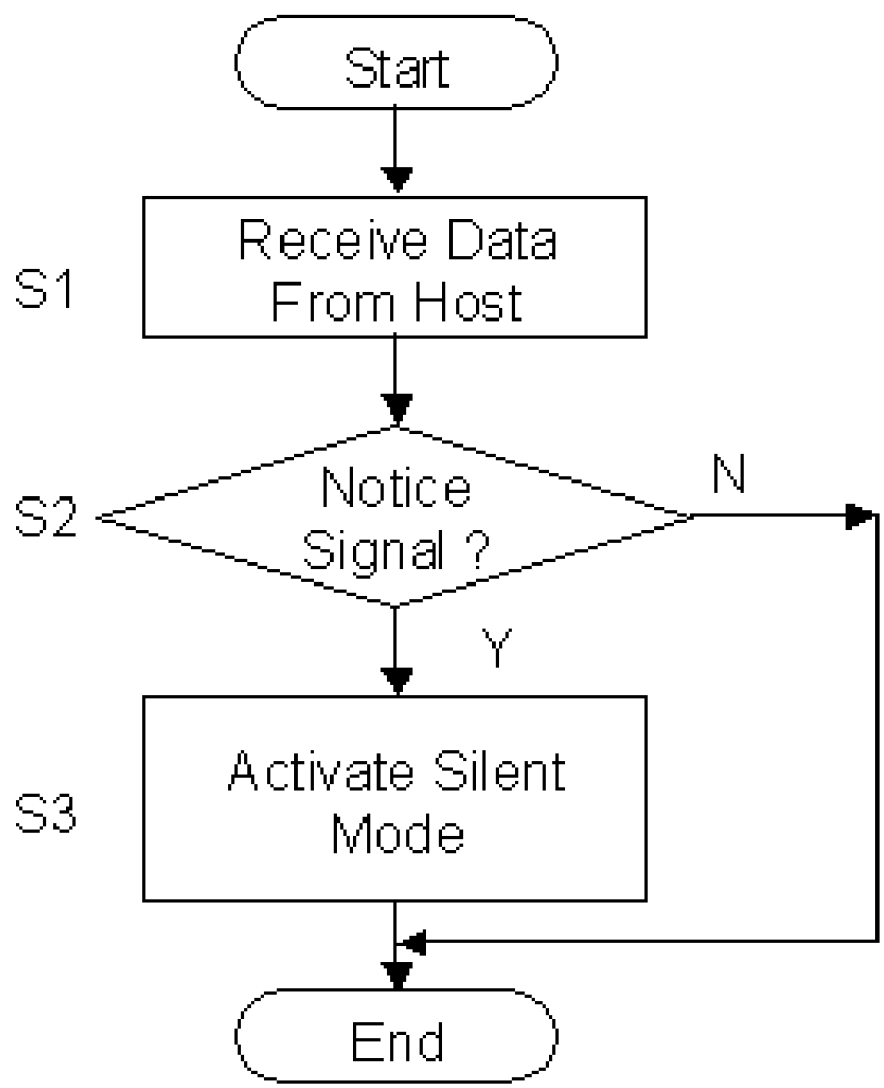
FIG. 32 is a flowchart illustrating an exemplary embodiment of the present invention.

As illustrated in FIG. 32, Communication Device 200 receives data periodically from Host H (FIG. 27*a*) (S1). If the received data is a notice signal (S2), Communication Device 200 activates the silent mode (S3) and (a) the ringing sound is automatically turned off, (b) Vibrator 217 (FIG. 1) activates, and/or (c) Communication Device 200 sends an automatic response to the caller device according to the user's setting. The automatic response may be sent from Host H instead.

Figure 32A:
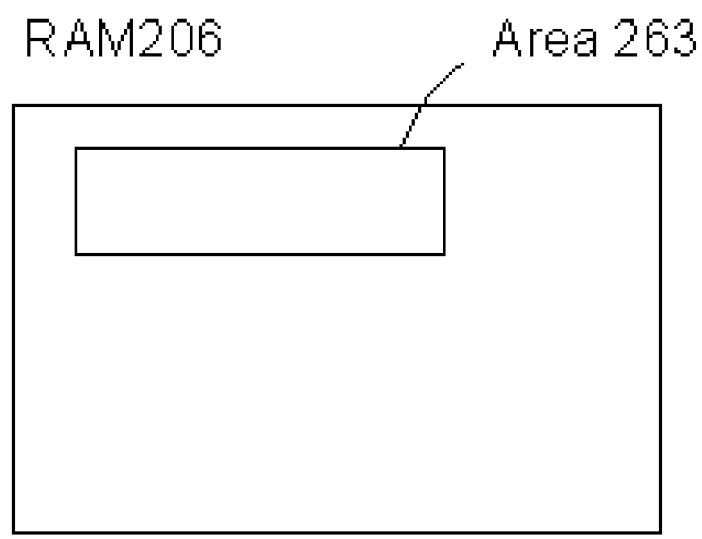
FIG. 32a is a block diagram illustrating an exemplary embodiment of the present invention.
Figure 32B:
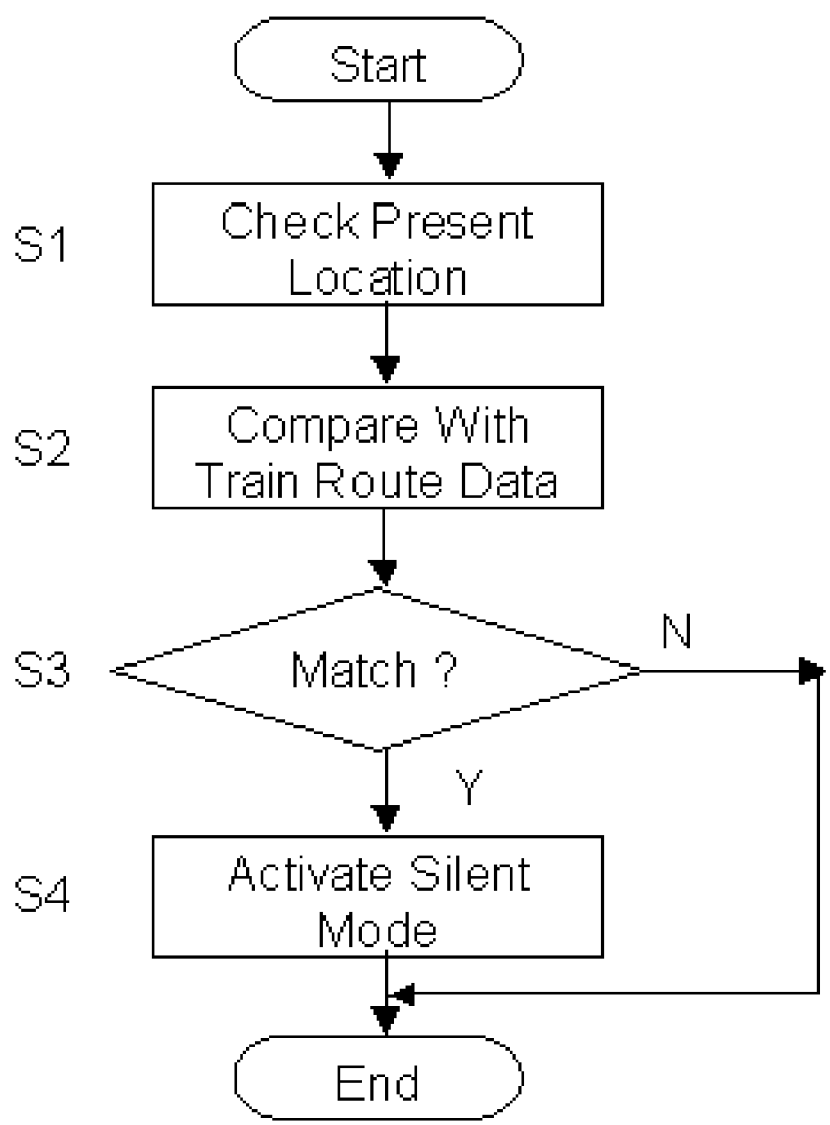
FIG. 32b is a flowchart illustrating an exemplary embodiment of the present invention.

As another embodiment of the present invention, a train route data may be utilized. As illustrated in FIG. 32*a*, a train route data is stored in Area 263 of RAM 206. The train route data contains three-dimensional train route map including the location data of the train route. FIG. 32*b* illustrates how the train route data is utilized. CPU 211 (FIG. 1) periodically checks the present location of Communication Device 200 by the method described in FIGS. 27*a* and 27*b* (S1). Then CPU 211 compares with the train route data stored in Area 263 of RAM 206 (S2). If the present location of Communication Device 200 matches the train route data (i.e., if Communication Device 200 is located on the train route) (S3), the silent mode is activated in the manner described above (S4). The silent mode is activated because the user of Communication Device 200 is presumed to be currently on a train and may not want to disturb the other passengers on the same train.

Figure 32C:
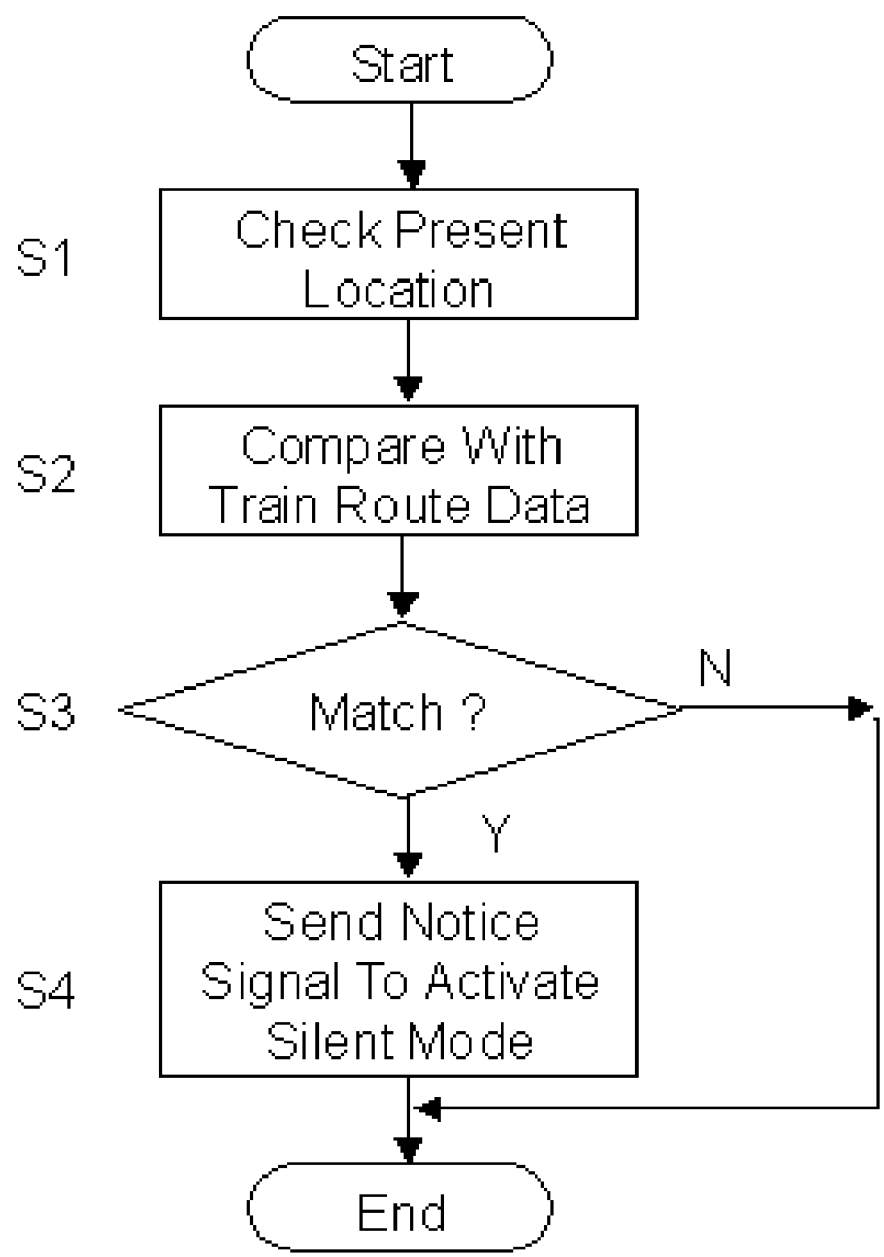
FIG. 32c is a flowchart illustrating an exemplary embodiment of the present invention.

As another embodiment of the present invention, such function can be delegated to Host H (FIG. 27*a*) as described in FIG. 32*c*. Namely, Host H (FIG. 27*a*) periodically checks the present location of Communication Device 200 by the method described in FIGS. 27*a* and 27*b* (S1). Then Host H compares the present location with the train route data stored in its own storage (not shown) (S2). If the present location of communication 200 matches the train route data (i.e., if Communication Device 200 is located on the train route) (S3) Host H sends a notice signal to Communication Device 200 thereby activating the silent mode in the manner described above (S4).

Figure 32D:
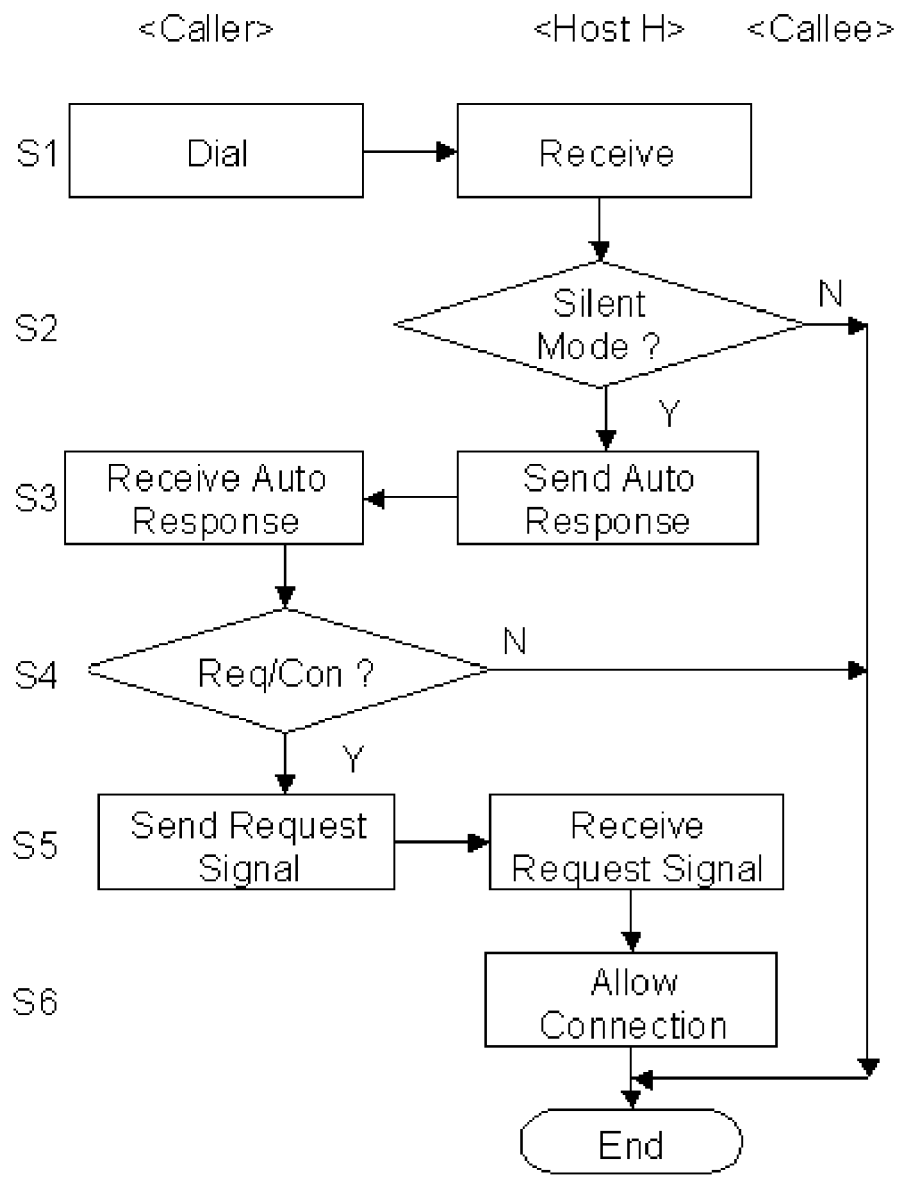
FIG. 32d is a flowchart illustrating an exemplary embodiment of the present invention.
Figure 32E:
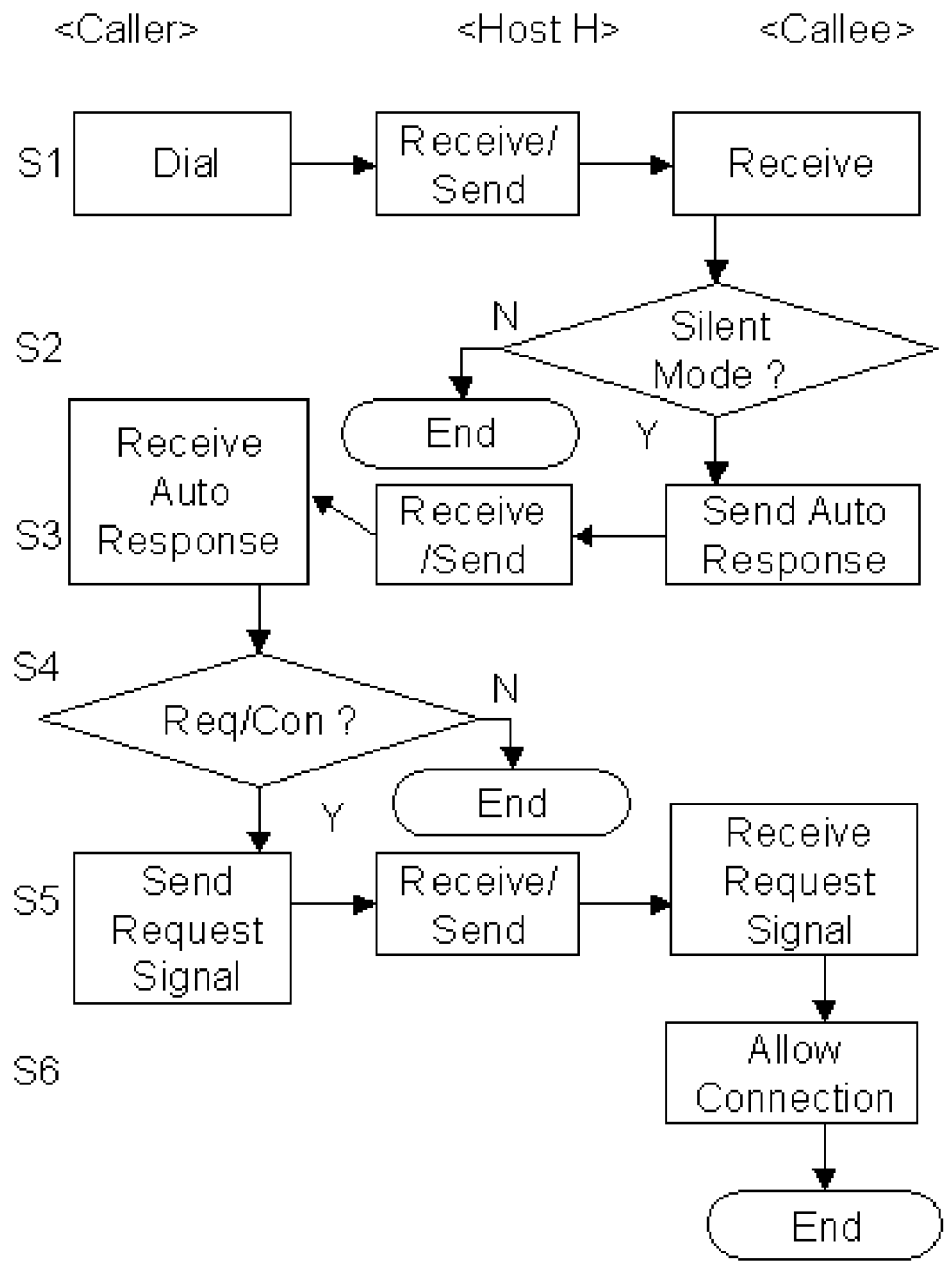
FIG. 32e is a flowchart illustrating an exemplary embodiment of the present invention.
Figure 32F:
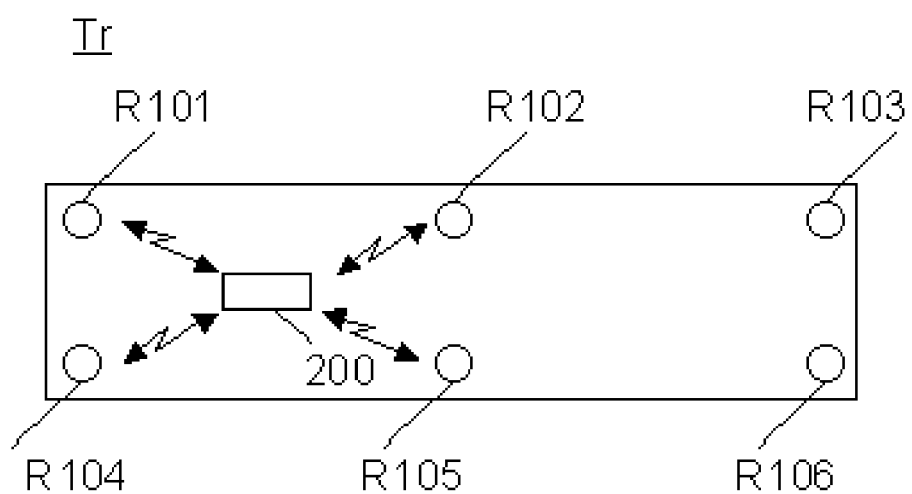
FIG. 32f is a simplified illustration illustrating an exemplary embodiment of the present invention.

Another embodiment is illustrated in FIGS. 32*f* and 32*g*. As illustrated in FIG. 32*f*, Relays R 101, R 102, R 103, R 104, R 105, R 106, which perform the same function to the Relays described in FIG. 27*a* and FIG. 27*b*, are installed in Train Tr. The signals from these Relays are sent to Host H illustrated in FIG. 27*a*. Relays R 101 through R 106 emit inside-the-train signals which are emitted only inside Train Tr. FIG. 32*g* illustrates how Communication Device 200 operates inside Train Tr. Communication Device 200 periodically checks the signal received in Train Tr (S1). If Communication Device 200 determines that the signal received is an inside-the-train signal (S2), it activates the silent mode in the manner described above (S3).

<<Positioning System—Auto Response Mode>>

FIG. 32*d* and FIG. 32*e* illustrates the method to send an automatic response to a caller device when the silent mode is activated.

Assume that the caller device, a Communication Device 200, intends to call a callee device, another Communication Device 200 via Host H (FIG. 27*a*). As illustrated in FIG. 32*d*, the caller device dials the callee device and the dialing signal is sent to Host H (S1). Host H checks whether the callee device is in the silent mode (S2). If Host H detects that the callee device is in the silent mode, it sends a predetermined auto response which indicates that the callee is probably on a train and may currently not be available, which is received by the caller device (S3). If the user of the caller device still desires to request for connection and certain code is input from Input Device 210 (FIG. 1) or by the voice recognition system (S4), a request signal for connection is sent and received by Host H (S5), and the line is connected between the caller device and the callee device via Host H (S6).

As another embodiment of the present invention, the task of Host H (FIG. 27*a*) which is described in FIG. 32*d* may be delegated to the callee device as illustrated in FIG. 32*e*. The caller device dials the callee device and the dialing signal is sent to the callee device via Host H (S1). The callee device checks whether it is in the silent mode (S2). If the callee device detects that it is in the silent mode, it sends a predetermined auto response which indicates that the callee is probably on a train and may currently not be available, which is sent to the caller device via Host H (S3). If the user of the caller device still desires to request for connection and certain code is input from Input Device 210 (FIG. 1) or by the voice recognition system (S4), a request signal for connection is sent to the callee device via Host H (S5), and the line is connected between the caller device and the callee device via Host H (S6).

<<Positioning System—Summary>>

The foregoing inventions may be summarized as the following.

(1) A positioning system comprising a first device, a host, and a second device wherein a device ID of said second device is input into said first device, said device ID is sent to said host, said host sends a search signal to which said second device responds, said host sends to the first device location data indicating the location of said second device, and said first device displays the location of said second device thereby enabling said first device to identify the location of said second device. Where said first device is a communication device, said first device includes an antenna, said antenna sends positioning signal to identify the location of said second device, and said antenna also sends communication signal thereby enabling the user of said first device to identify the location of said second device as well as utilizing said communication device for means of communication.

(2) A communication device wherein the moving velocity of said communication device is checked and when said moving velocity exceeds a predetermined value said communication device refrains from emitting sound thereby preventing other persons being present near said communication device from being disturbed.

(3) A communication device wherein the location of said communication device is compared to a route data and said communication device refrains from emitting sound if said location of said communication device is determined to match said route data thereby preventing other persons being present near said communication device from being disturbed.

(4) A communication system comprising a first communication device and a second communication device wherein said first communication device receives an automatic response if said second communication device is in a certain mode and said first communication device is enable to be connected to said second communication device upon said second device sending a request thereby preventing other persons being present near said first communication device from being disturbed.

(5) A communication system comprising a communication device and a plurality of signal emitter wherein said communication device refrains from emitting sound upon receiving a certain signal from said signal emitter thereby preventing other persons being present near said communication device from being disturbed.

<<Auto Backup System>>

FIGS. 33 through 37 illustrate the automatic backup system of Communication Device 200 (FIG. 1).

Figure 33:
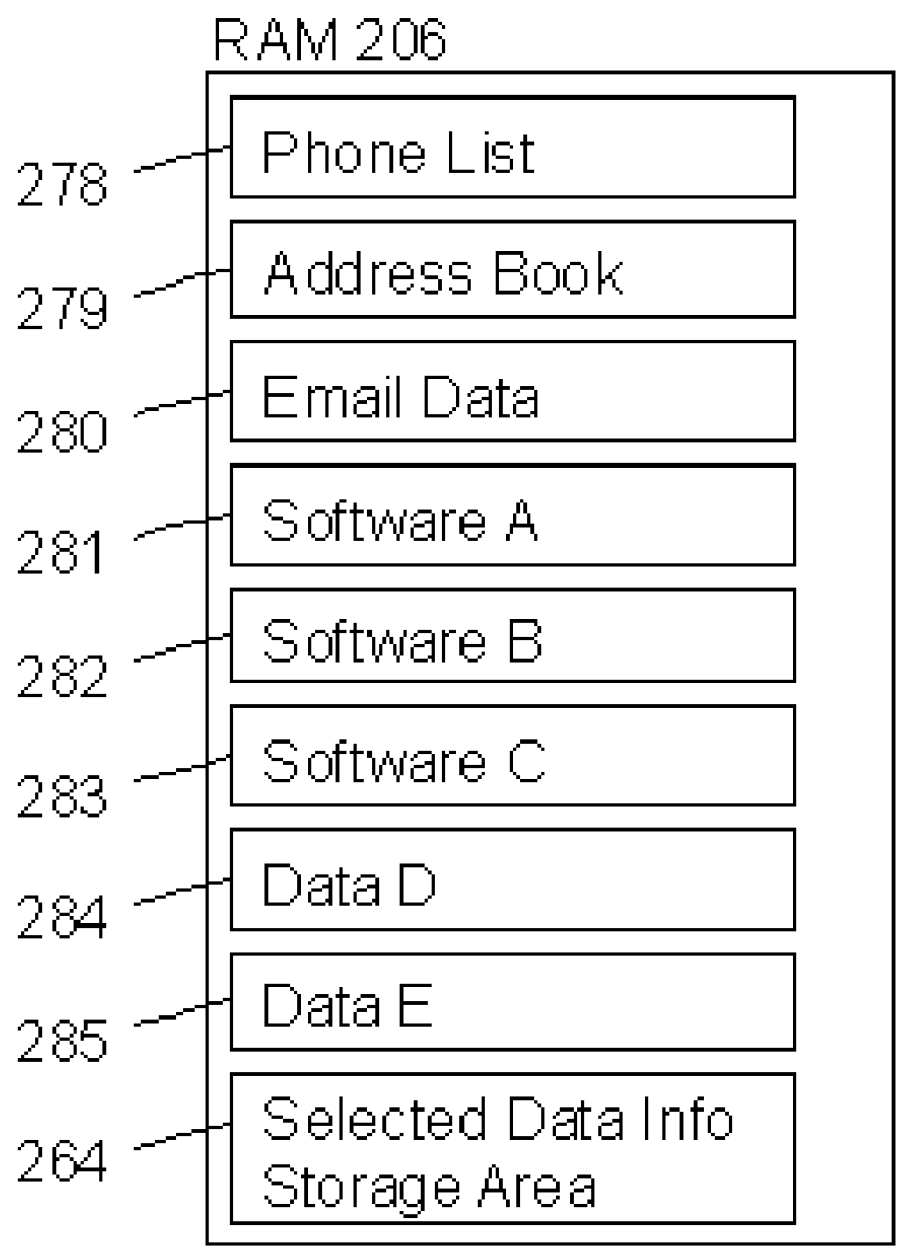
FIG. 33 is a block diagram illustrating an exemplary embodiment of the present invention.

As illustrated in FIG. 33, RAM 206 (FIG. 1) includes areas to store the data essential to the user of Communication Device 200, such as Area 278 for a phone list, Area 279 for an address book, Area 280 for email data, Area 281 for software A, Area 282 for software B, Area 283 for software C, Area 284 for Data D, Area 285 for Data E. RAM 206 also includes Area 264, i.e., the selected data info storage area, which will be explained in details hereinafter.

Figure 34:
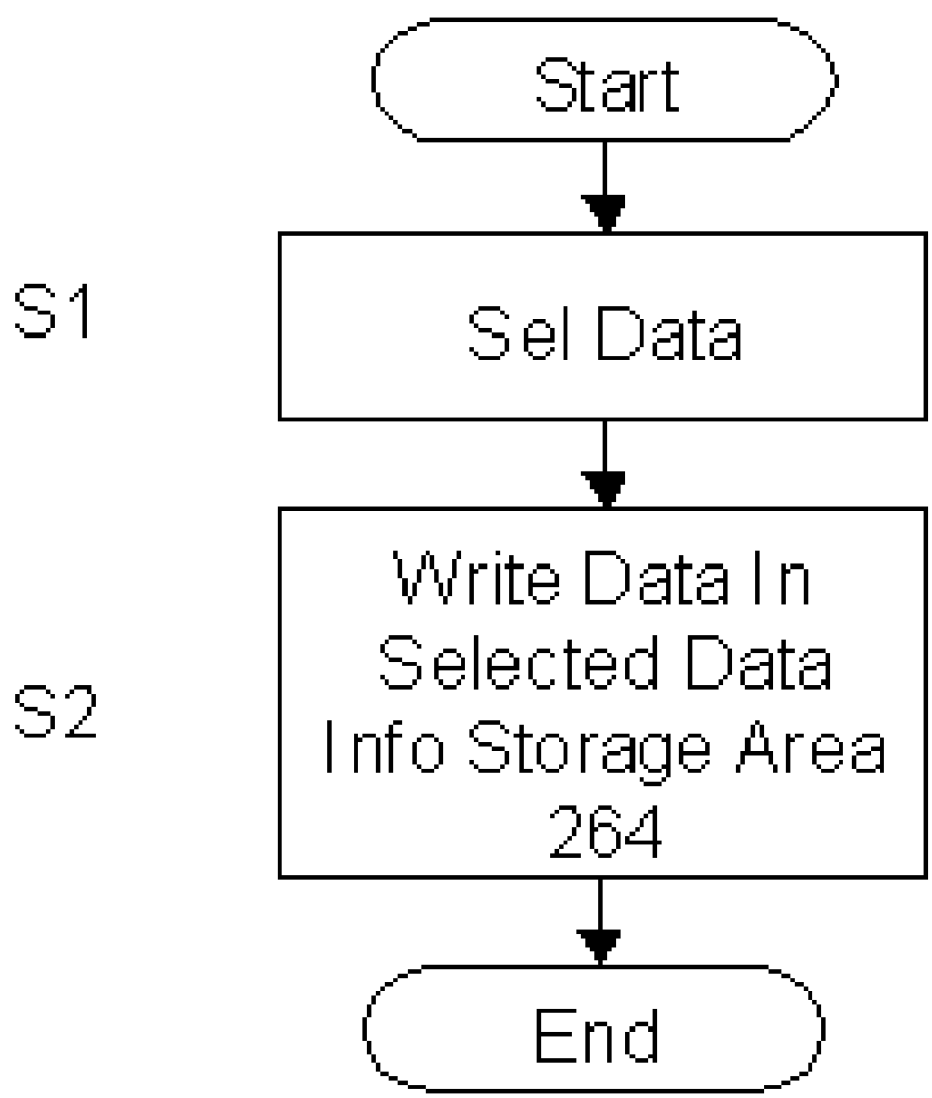
FIG. 34 is a flowchart illustrating an exemplary embodiment of the present invention.

As described in FIG. 34, the user selects data by utilizing Input Device 210 (FIG. 1) or the voice recognition system which he/she intends to be automatically backed up (S1). The selected data are written in Area 264, the selected data info storage area (S2).

Figure 35A:
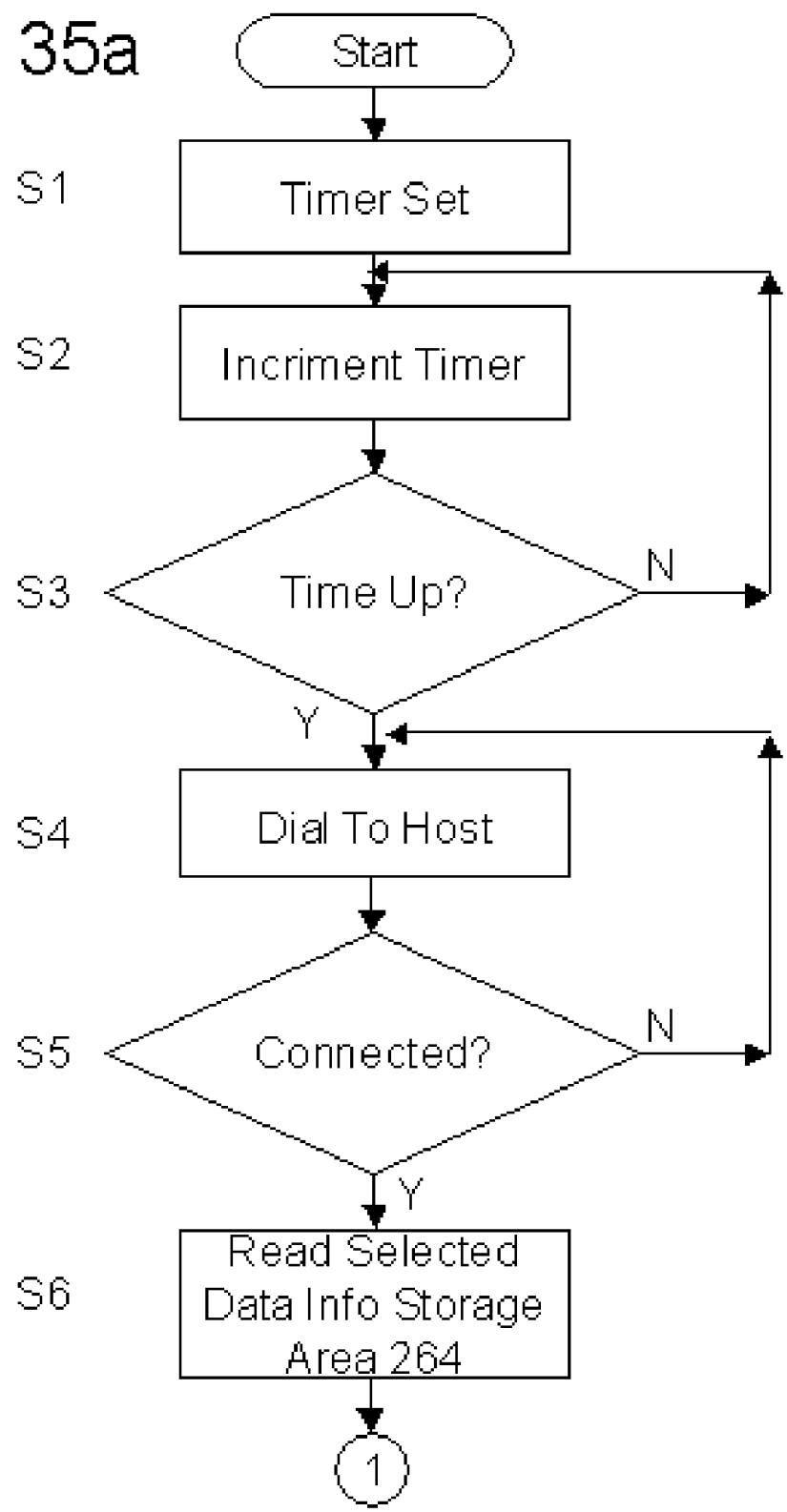
FIG. 35a is a flowchart illustrating an exemplary embodiment of the present invention.
Figure 35B:
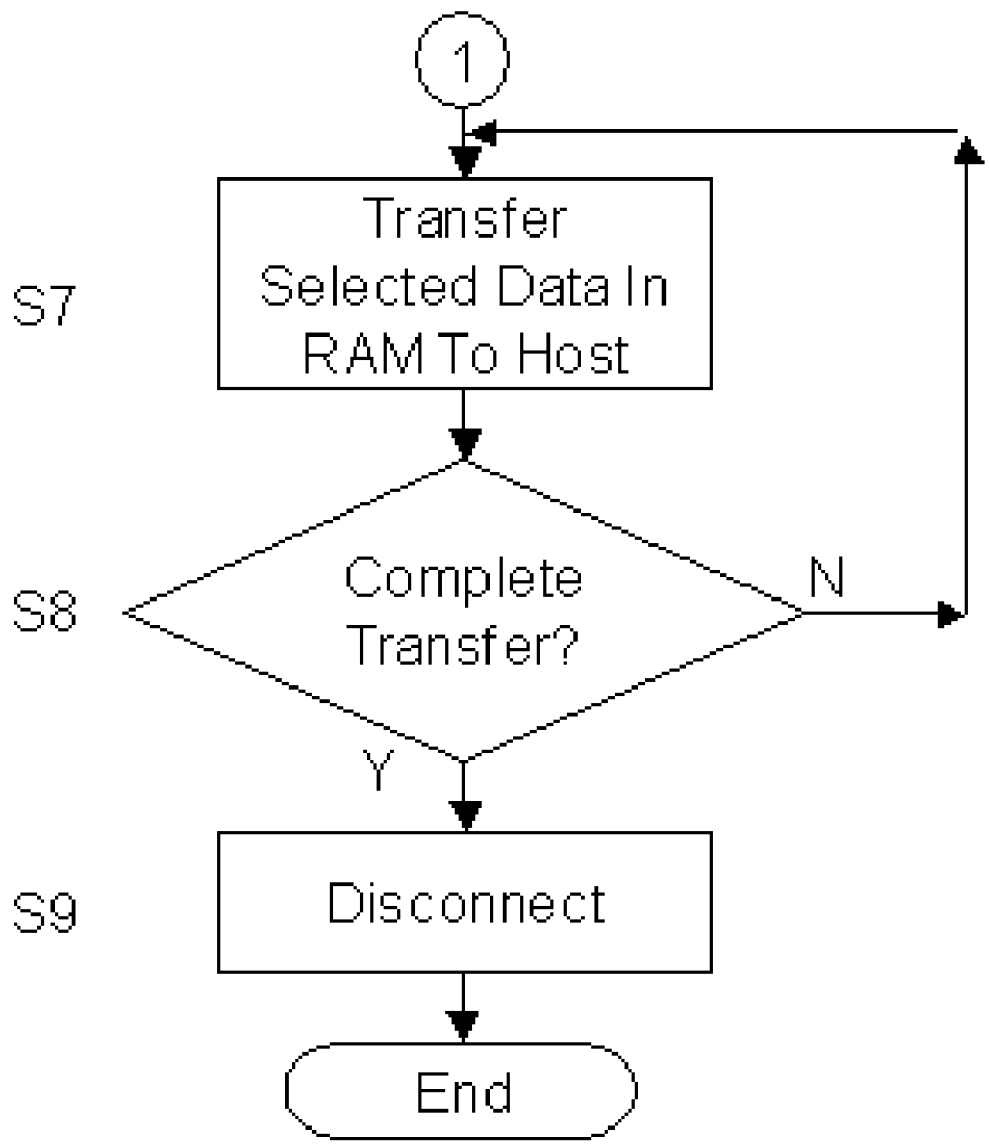
FIG. 35b is a flowchart illustrating an exemplary embodiment of the present invention.

The overall operation of this function is illustrated in FIGS. 35a and 35b. First of all, a timer (not shown) is set by a specific input signal produced by Input Device 210 (FIG. 1) or by the voice recognition system (S1). The timer is incremented periodically (S2) and when the incremented value equals the predetermined value (S3), CPU 211 (FIG. 1) initiates the dialing process (S4). The dialing process continues until Communication Device 200 is connected to Host H explained in FIG. 37 (S5). Once the line is connected, CPU 211 reads the information stored in Area 264 (S6) and based on such information it initiates to transfer the selected data from RAM 206 to Host H (S7). The transfer continues until all of the selected data are transferred to Host H (S8), and the line is disconnected thereafter (S9). This backup sequence can be initiated automatically and periodically by using a timer or manually. As another embodiment of the present invention, instead of selecting the data that are to be backed up, all data in RAM 206 (FIG. 1) can be transferred to Host H.

Figure 36:
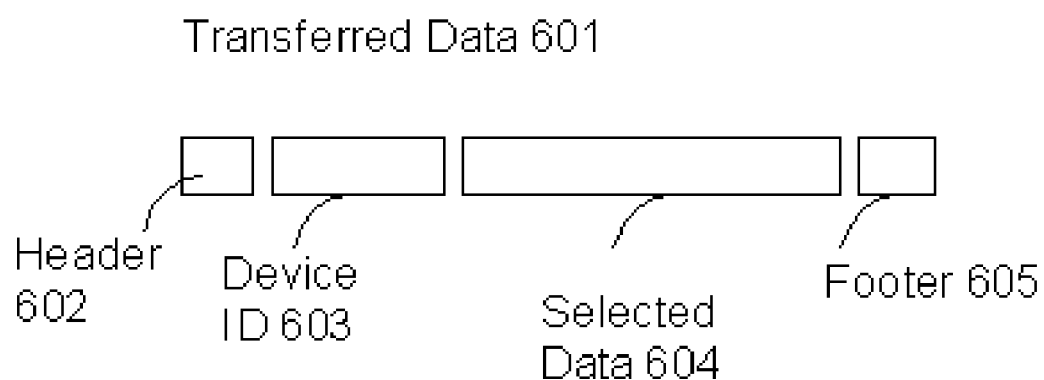
FIG. 36 is a simplified illustration illustrating an exemplary embodiment of the present invention.

FIG. 36 illustrates the basic structure of the data transferred to Host H. Transferred data 601 includes Header 602, device ID 603, selected data 604 and Footer 605. Device ID 603 is the identification number of Communication Device 200 preferably its phone number, and selected data 604 is a pack of data which is transferred from RAM 206 to Host H based on information stored in Area 264. Header 602 and Footer 605 indicates the beginning and the end of the Transferred Data 601 respectively.

Figure 37:
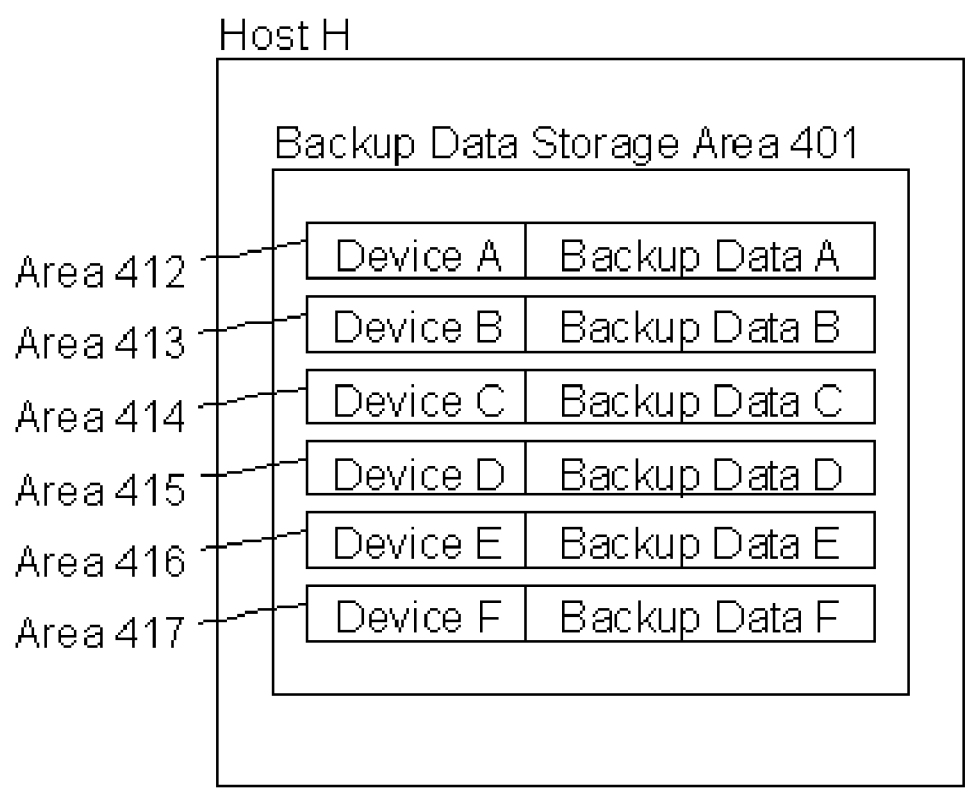
FIG. 37 is a block diagram illustrating an exemplary embodiment of the present invention.

FIG. 37 illustrates the basic structure of Host H. Host H includes backup data storage Area 401 which is used to backup all of the backup data transferred from all Communication Devices 200. Host H stores the Transferred Data 601 (FIG. 36) to the designated area based on the device ID included in Transferred Data 601. For example, Transferred Data 601 transferred from Device A is stored in Area 412 as Backup Data A. In the same manner Transferred Data 601 transferred from Device B is stored in Area 413 as Backup Data B; Transferred Data 601 transferred from Device C is stored in Area 414 as Backup Data C; Transferred Data 601 transferred from device D is stored in Area 415 as Backup Data D; Transferred Data 601 transferred from device E is stored in Area 416 as Backup Data E; and Transferred Data 601 transferred from device F is stored in Area 417 as Backup Data F.

<<Auto Backup—Summary>>

The foregoing invention may be summarized as the following.

A communication system comprising a host and a plurality of communication device wherein said host includes a plurality of storage areas and each of said plurality of communication device includes a storage area, and data stored in said storage area of said communication device are manually and/or periodically transferred to one of the designated storage areas of said host thereby enabling the users of said plurality of communication device to retrieve data when said plurality of communication device are lost or broken.

<<Signal Amplifier>>

Figure 38:
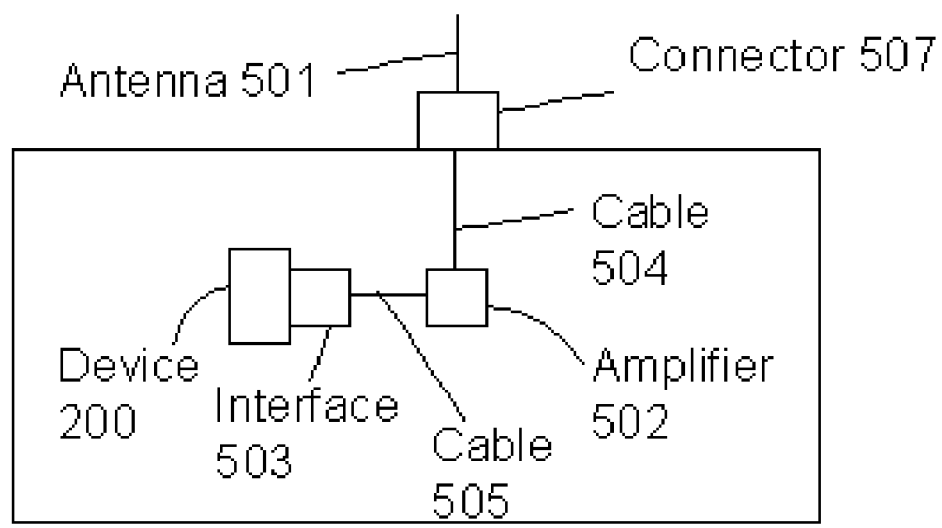
FIG. 38 is a simplified illustration illustrating an exemplary embodiment of the present invention.

FIG. 38 illustrates a signal amplifier utilized for automobiles and other transportation carriers, such as trains, airplanes, space shuttles, and motor cycles.

As described in FIG. 38, Automobile 835 includes Interface 503, an interface detachably connected to Communication Device 200, which is connected to Amplifier 502 via Cable 505. Amplifier 502 is connected to Antenna 501 via Cable 504 and Connector 507 as described in this drawing. The signal produced by Communication Device 200 is transferred to Interface 503. Then the signal is transferred to Amplifier 502 via Cable 505 where the signal is amplified. The amplified signal is transferred to Antenna 501 via Cable 504 and Connector 507, which transmits the amplified signal to Host H (not shown). The receiving signal is received by Antenna 501 and transferred to Amplifier 502 via Connector 507 and Cable 504, and then is transferred to Interface 503 via Cable 505, which transfers the amplified signal to Communication Device 200.

<<Signal Amplifier—Summary>>

The foregoing invention may be summarized as the following.

A transportation carrier which is primarily designed to carry person or persons comprising an interface which is detachably connectable to a communication device, an amplifier which is connected to said interface and which amplifies the signal produced by said communication device, and an transmitter which is connected to said amplifier and which transmits said signal amplified by said amplifier.

<<Audio/Video Data Capturing System>>

FIGS. 39 through 44 illustrate the audio/video capturing system of Communication Device 200 (FIG. 1).

Assuming that Device A, a Communication Device 200, captures audio/video data and transfers such data to Device B, another Communication Device 200, via a host (not shown). Primarily video data is input from CCD Unit 214 (FIG. 1) and audio data is input from Microphone 215 of (FIG. 1) of Device A.

Figure 39:
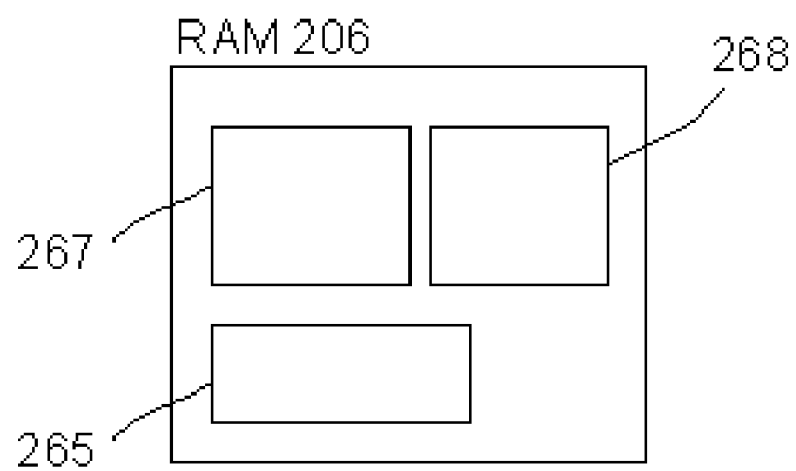
FIG. 39 is a block diagram illustrating an exemplary embodiment of the present invention.

As illustrated in FIG. 39, RAM 206 (FIG. 1) includes Area 267 which stores video data, Area 268 which stores audio data, and Area 265 which is a work area utilized for the process explained hereinafter.

Figure 40:
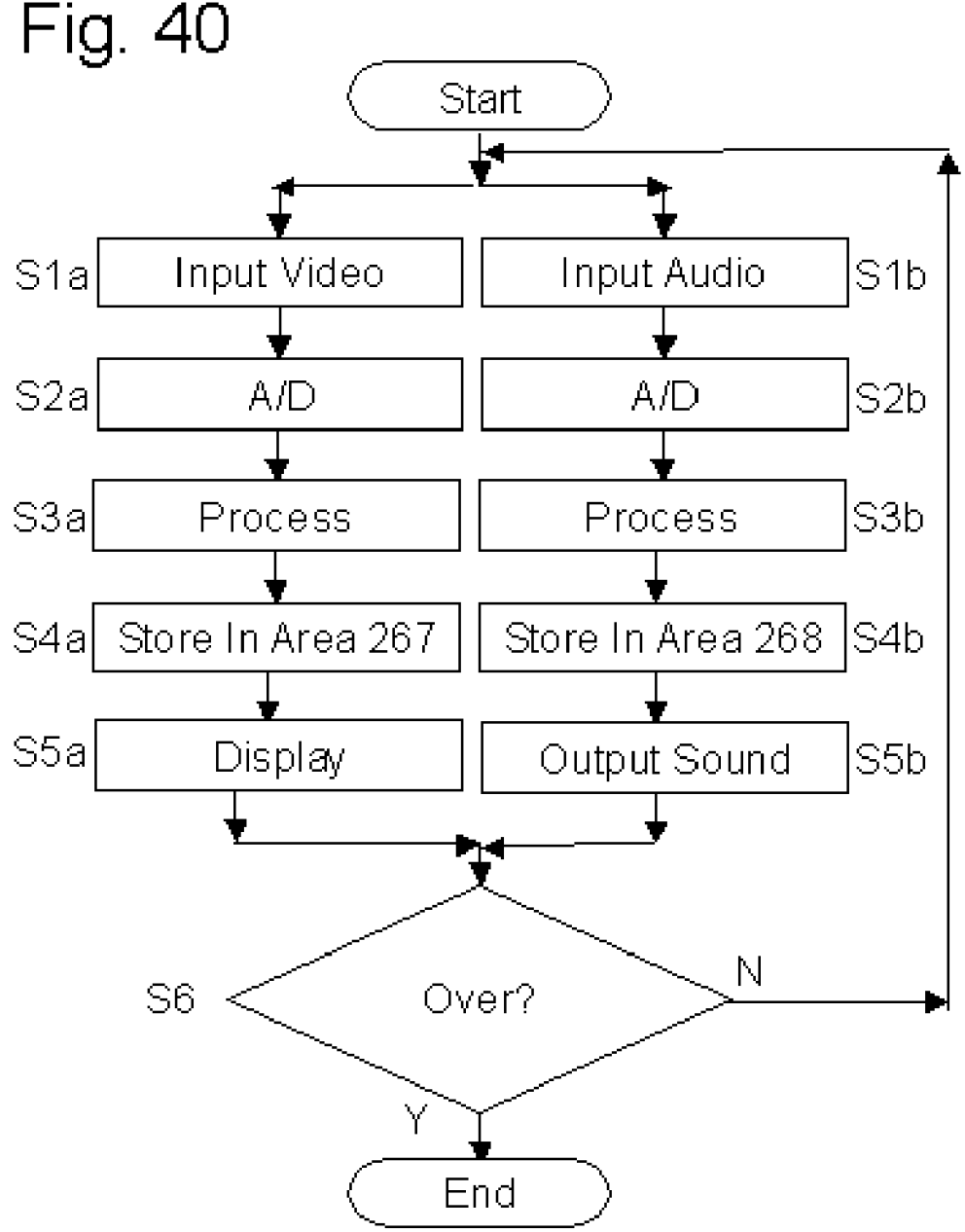
FIG. 40 is a flowchart illustrating an exemplary embodiment of the present invention.

As described in FIG. 40, the video data input from CCD Unit 214 (FIG. 1) (S1a) is converted from analog data to digital data (S2a) and is processed by Video Processor 202 (FIG. 1) (S3a). Area 265 (FIG. 39) is used as work area for such process. The processed video data is stored in Area 267 (FIG. 39) of RAM 206 (S4a) and is displayed on LCD 201 (FIG. 1) (S5a). As described in the same drawing, the audio data input from Microphone 215 (FIG. 1) (S1b) is converted from analog data to digital data by A/D 213 (FIG. 1) (S2b) and is processed by Sound Processor 205 (FIG. 1) (S3b). Area 265 is used as work area for such process. The processed audio data is stored in Area 268 (FIG. 39) of RAM 206 (S4b) and is transferred to Sound Processor 205 and is output from Speaker 216 (FIG. 1) via D/A 204 (FIG. 1) (S5b). The sequences of S1a through S5a and S1b through S5b are continued until a specific signal indicating to stop such sequence is input from Input Device 210 (FIG. 1) or by the voice recognition system (S6).

Figure 41:
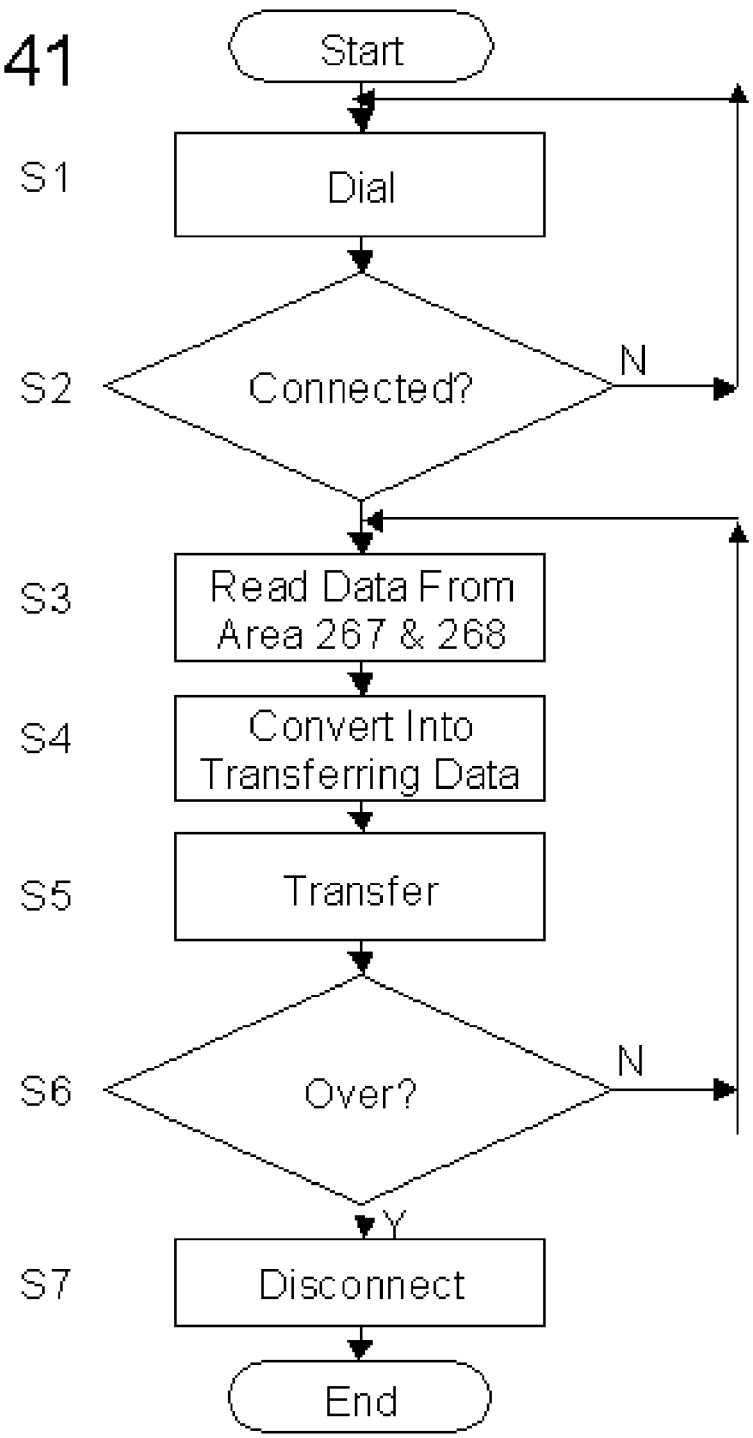
FIG. 41 is a flowchart illustrating an exemplary embodiment of the present invention.

FIG. 41 illustrates the sequence to transfer the video data and the audio data via Antenna 218 (FIG. 1) in a wireless fashion. As described in FIG. 41, CPU 211 (FIG. 1) of Device A initiates a dialing process (S1) until the line is connected to a host (not shown) (S2). As soon as the line is connected, CPU 211 reads the video data and the audio data stored in Area 267 (FIG. 39) and Area 268 (FIG. 39) (S3) and transfer them to Signal Processor 208 (FIG. 1) where the data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

Figure 42:
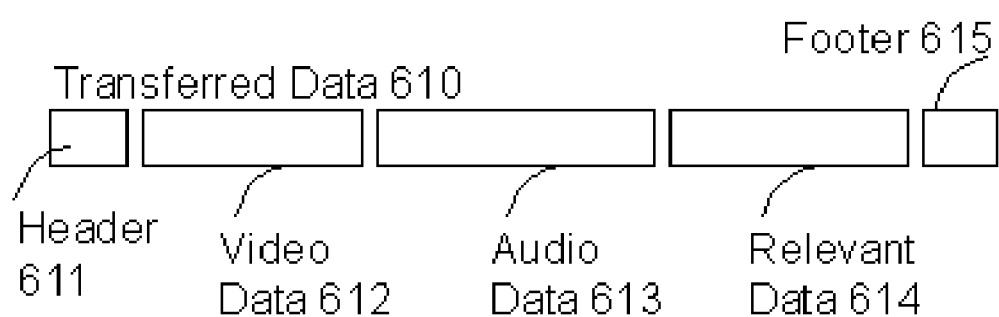
FIG. 42 is a simplified illustration illustrating an exemplary embodiment of the present invention.

FIG. 42 illustrates the basic structure of the transferred data which is transferred from Device A as described in S4 and S5 of FIG. 41. Transferred data 610 is primarily composed of Header 611, video data 612, audio data 613, relevant data 614, and Footer 615. Video data 612 corresponds to the video data stored in Area 267 (FIG. 39) of RAM 206, and audio data 613 corresponds to the audio data stored in Area 268 (FIG. 39) of RAM 206. Relevant Data 614 includes various types of data, such as the identification numbers of Device A (i.e., transferor device) and Device B (i.e., the transferee device), a location data which represents the location of Device A, email data transferred from Device A to Device B, etc. Header 611 and Footer 615 represent the beginning and the end of Transferred Data 610 respectively.

Figure 43:
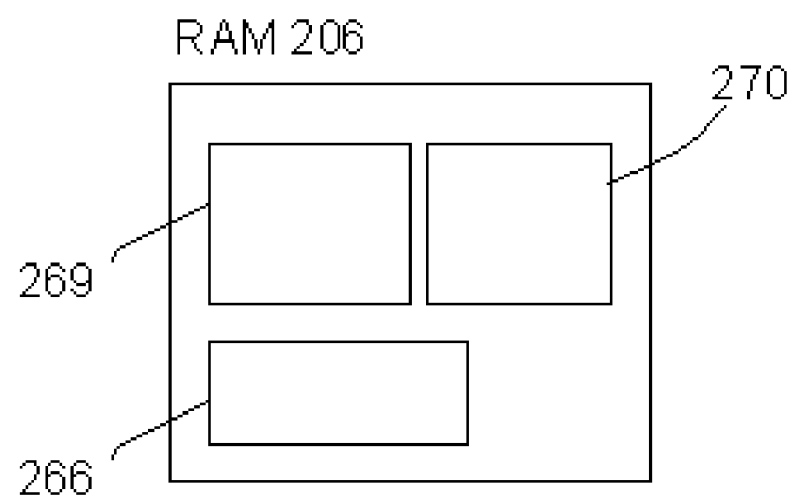
FIG. 43 is a block diagram illustrating an exemplary embodiment of the present invention.

FIG. 43 illustrates the data contained in RAM 206 (FIG. 1) of Device B. As illustrated in FIG. 43, RAM 206 includes Area 269 which stores video data, Area 270 which stores audio data, and Area 266 which is a work area utilized for the process explained hereinafter.

Figure 44B:
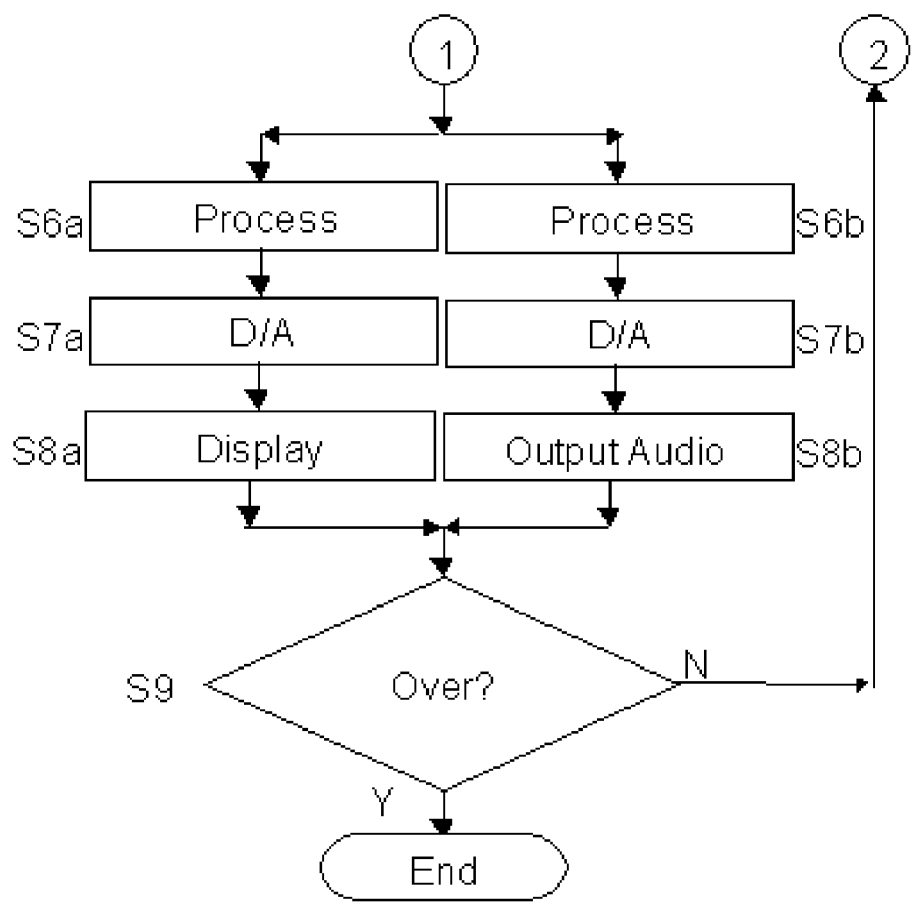
FIG. 44b is a flowchart illustrating an exemplary embodiment of the present invention.

As described in FIG. 44a and FIG. 44b, CPU 211 (FIG. 1) of Device B initiates a dialing process (S1) until Device B is connected to a host (not shown) (S2). Transferred Data 610 is received by Antenna 218 (FIG. 1) of Device B (S3) and is converted by Signal Processor 208 (FIG. 1) into data readable by CPU 211 (S4). Video data and audio data are retrieved from Transferred Data 610 and stored into Area 269 (FIG. 43) and Area 270 (FIG. 43) of RAM 206 respectively (S5). The video data stored in Area 269 is processed by Video Processor 202 (FIG. 1) (S6a). The processed video data is converted into an analog data (S7a) and displayed on LCD 201 (FIG. 1) (S8a). S7a may not be necessary depending on the type of LCD 201 used. The audio data stored in Area 270 is processed by Sound Processor 205 (FIG. 1) (S6b). The processed audio data is converted into analog data by D/A 204 (FIG. 1) (S7b) and output from Speaker 216 (FIG. 1) (S8b). The sequences of S6a through S8a and S6b through S8b are continued until a specific signal indicating to stop such sequence is input from Input Device 210 (FIG. 1) or via the voice recognition system (S9).

<<Audio/Video Data Capturing System—Summary>>

The foregoing invention may be summarized as the following.

(1) A communication system comprising a first communication device and a second communication device wherein said first communication consists of a video input means to input video information, a microphone, and a first antenna, said second communication device consists of a display means to output said video information, a speaker, and a second antenna, said first communication device inputs said video information and said audio information from said video input means and said microphone respectively, said video information and said audio information are sent to said second communication device from said first antenna in a wireless fashion, said second communication device receives said video information and said audio information in a wireless fashion from said second antenna, and said video information and said audio information are output from said display means and said speaker of said second communication device respectively thereby enabling the user of said first communication device and the user of said second communication device to communicate at any location wherever they desire.

(2) A communication device comprising a video input means to input video information, a microphone, and an antenna wherein said communication device inputs said video information and said audio information from said video input means and said microphone respectively, said video information is sent to another device in a wireless fashion from said antenna, said audio information is also sent to said other device in a wireless fashion from said antenna thereby enabling the user of said communication device to communicate with said other device by utilizing said video information and said audio information in any location wherever he/she desires.

<<Digital Mirror Function (1)>>

Figure 44C:
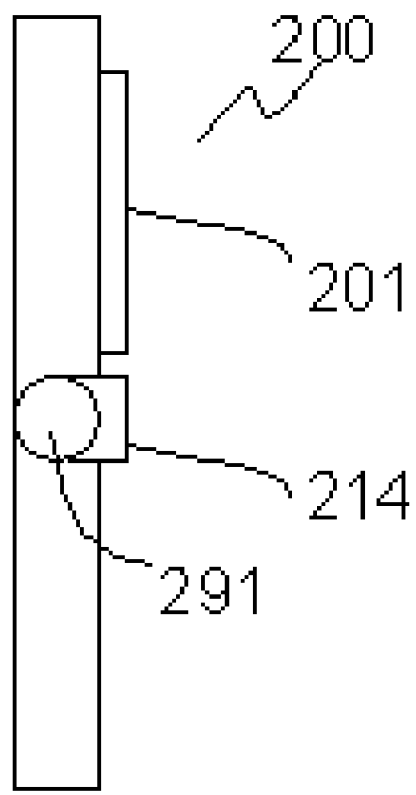
FIG. 44c is a simplified illustration illustrating an exemplary embodiment of the present invention.
Figure 44D:
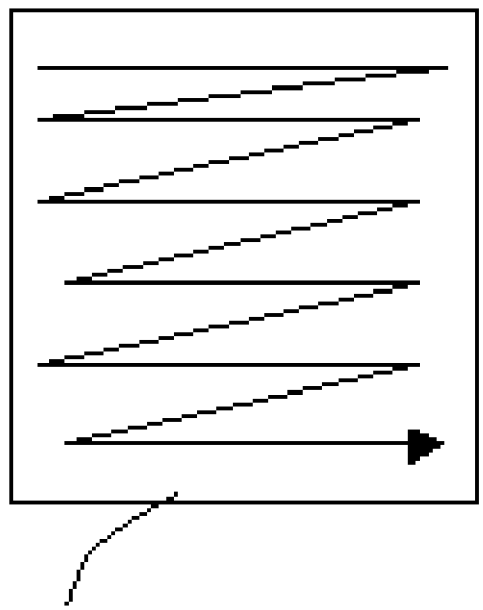
FIG. 44d is a simplified illustration illustrating an exemplary embodiment of the present invention.
Figure 44E:
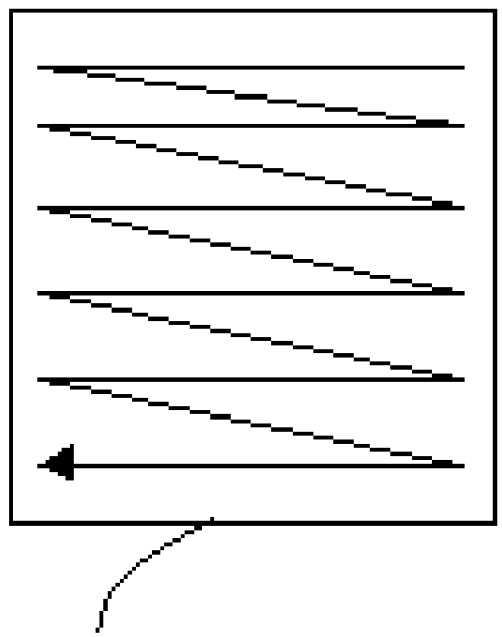
FIG. 44e is a simplified illustration illustrating an exemplary embodiment of the present invention.

FIGS. 44c through 44e illustrate the first embodiment of digital mirror function of Communication Device 200 (FIG. 1).

In this embodiment, Communication Device 200 includes Rotator 291 as described in FIG. 44c. Rotator 291 is fixed to the side of Communication Device 200 and rotates CCD Unit 214 (FIG. 1) and thereby CCD Unit 214 is enabled to face multi-direction. CPU 211 (FIG. 1) reads the video data stored in Area 267 (FIG. 39) from left to right as described in FIG. 44d when CCD Unit 214 is facing the opposite direction from LCD 201 (FIG. 1). However, when CCD Unit 214 is facing the same direction with LCD 201, CPU 211 reads the video data stored in Area 267 from right to left as described in FIG. 44e thereby producing a 'mirror image' on LCD 201. As another embodiment, more than one area in RAM 206 (FIG.

1) may be utilized instead of one area, i.e., Area 267. The following description is not explained in the drawing figures. First Area and Second Area in RAM 206 (FIG. 1) are utilized in this embodiment. First of all, CPU 211 stores the video data taken from CCD Unit 214 into both First Area and Second Area. Here, the video data stored in First Area and Second Area are identical. CPU 211 reads the video data stored in First Area from left to right as described in FIG. 44*d*. CPU 211 reads the video data stored in Second Area from right to left as described in FIG. 44*e*. CPU 211 displays the video data stored in First Area on LCD 201 when CCD Unit 214 is facing the opposite direction from LCD 201. CPU 211 displays the video data stored in Second Area on LCD 201 when CCD Unit 214 is facing the same direction with LCD 201.

As another embodiment of the present invention, more than one CCD unit which face multi-direction may be utilized instead of enabling one CCD unit to rotate in the manner described hereinbefore. The following description is not explained in the drawing figures. First CCD Unit and Second CCD Unit are utilized in this embodiment. Here, First CCD Unit faces the opposite direction from LCD 201 (FIG. 1), and Second CCD Unit faces the same direction with LCD 201. CPU 211 (FIG. 1) reads the video data stored in Area 267 (FIG. 39) from left to right as described in FIG. 44*d* when First CCD Unit is activated. CPU 211 reads the video data stored in Area 267 (FIG. 39) from right to left as described in FIG. 44*e* when Second CCD Unit is activated thereby producing a 'mirror image' on LCD 201. Such activations may be rendered automatically by CPU 211 or manually by the user of Communication Device 200 utilizing input device 210 (FIG. 1) or via voice recognition system. As another embodiment, more than one area in RAM 206 (FIG. 1) may be utilized instead of one area, i.e., Area 267. First Area and Second Area in RAM 206 are utilized in this embodiment. Here, First Area is designed to be read from left to right as described in FIG. 44*d*, and Second Area is designed to be read from right to left as described in FIG. 44*e*. CPU 211 stores the video data taken from First CCD Unit and Second CCD Unit into First Area and Second Area respectively. CPU 211 displays the video data stored in First Area on LCD 201 when First CCD Unit is activated, and also displays the video data stored in Second Area on LCD 201 when Second CCD Unit is activated.

As another embodiment of the present invention, more than one LCD unit which face multi-direction may be utilized instead of one LCD 201 (FIG. 1). The following description is not explained in the drawing figures. First LCD and Second LCD are utilized in this embodiment. Here, First LCD faces the opposite direction from CCD Unit 214 (FIG. 1), and Second LCD faces the same direction with CCD Unit 214. CPU 211 (FIG. 1) reads the video data stored in Area 267 (FIG. 39) from left to right as described in FIG. 44*d* when First LCD is activated. CPU 211 (FIG. 1) reads the video data stored in Area 267 (FIG. 39) from right to left as described in FIG. 44*e* when Second LCD is activated thereby producing a 'mirror image' thereon. Such activations may be rendered automatically by CPU 211 or manually by the user of Communication Device 200 utilizing input device 210 (FIG. 1) or via voice recognition system. As another embodiment, more than one area in RAM 206 (FIG. 1) may be utilized instead of one area, i.e., Area 267 (FIG. 39). First Area and Second Area in RAM 206 (FIG. 1) are utilized in this embodiment. CPU 211 stores the video data taken from CCD Unit 214 into both First Area and Second Area. Here, the video data stored in First Area and Second Area are identical. CPU 211 reads the video data stored in First Area from left to right as described in FIG. 44*d*, and also reads the video data stored in Second Area from right to left as described in FIG. 44*e*. The video data stored in First Area is displayed on First LCD, and the video data stored in Second Area is displayed on Second LCD.

<<Digital Mirror—Summary>>

The foregoing inventions may be summarized as the following.

(1) A wireless communication device comprising a camera, a display, an image data producing means, a wireless transmitting means, wherein said camera is capable of facing a first direction and a second direction, said image data producing means is capable of producing a non-inverted image data and an inverted image data, said image data producing means produces said non-inverted image data which is displayed on said display when said camera is facing said first direction and produces said inverted image data which is displayed on said display when said camera is facing said second direction, while said non-inverted image data is transferred in a wireless fashion from said wireless transmitting means.

(2) A communication device comprising a display and a video input means wherein said display outputs video image which is input from said video input means and said video image is output in a symmetric fashion when said video input means is facing the same direction with said display thereby enabling the user of said communication device to utilize said communication device as a digital mirror.

<<Caller ID System>>

Figure 46:
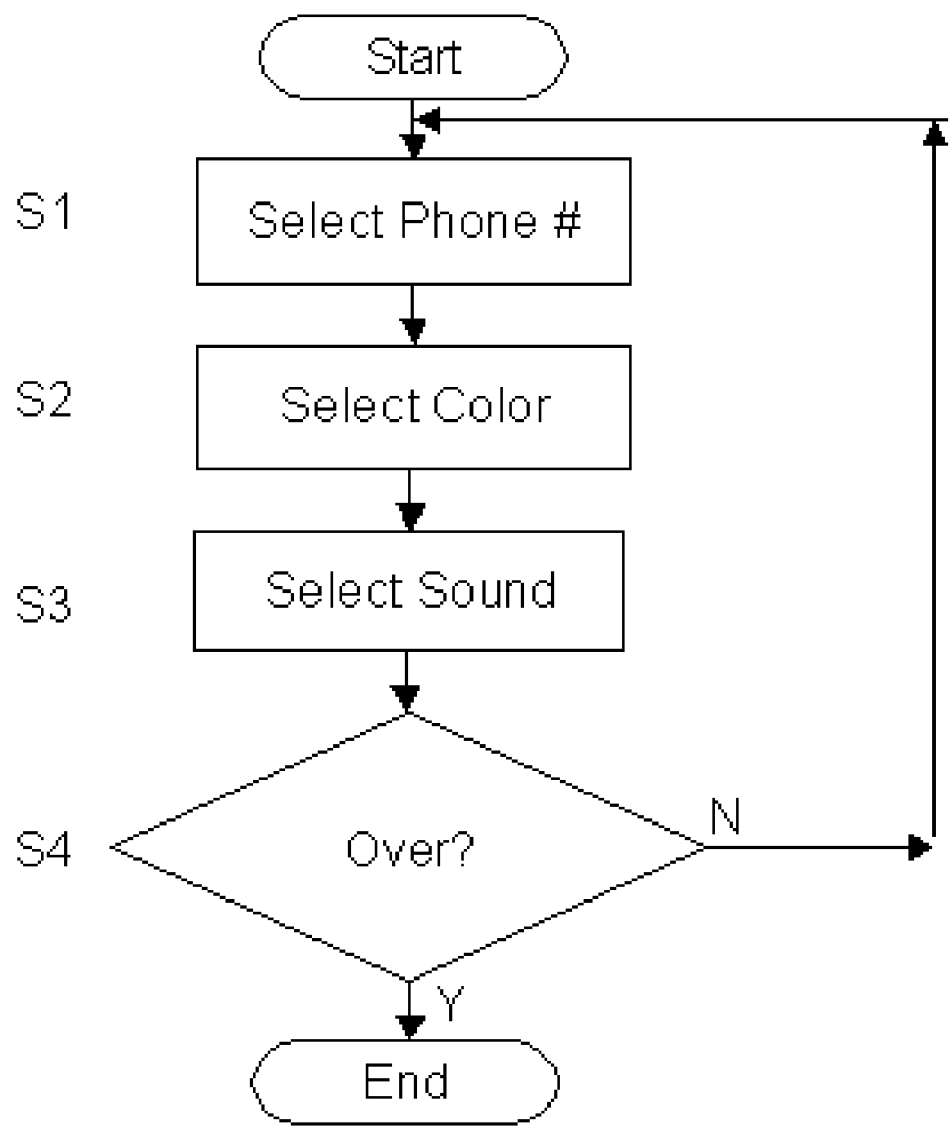
FIG. 46 is a flowchart illustrating an exemplary embodiment of the present invention.
Figure 47:
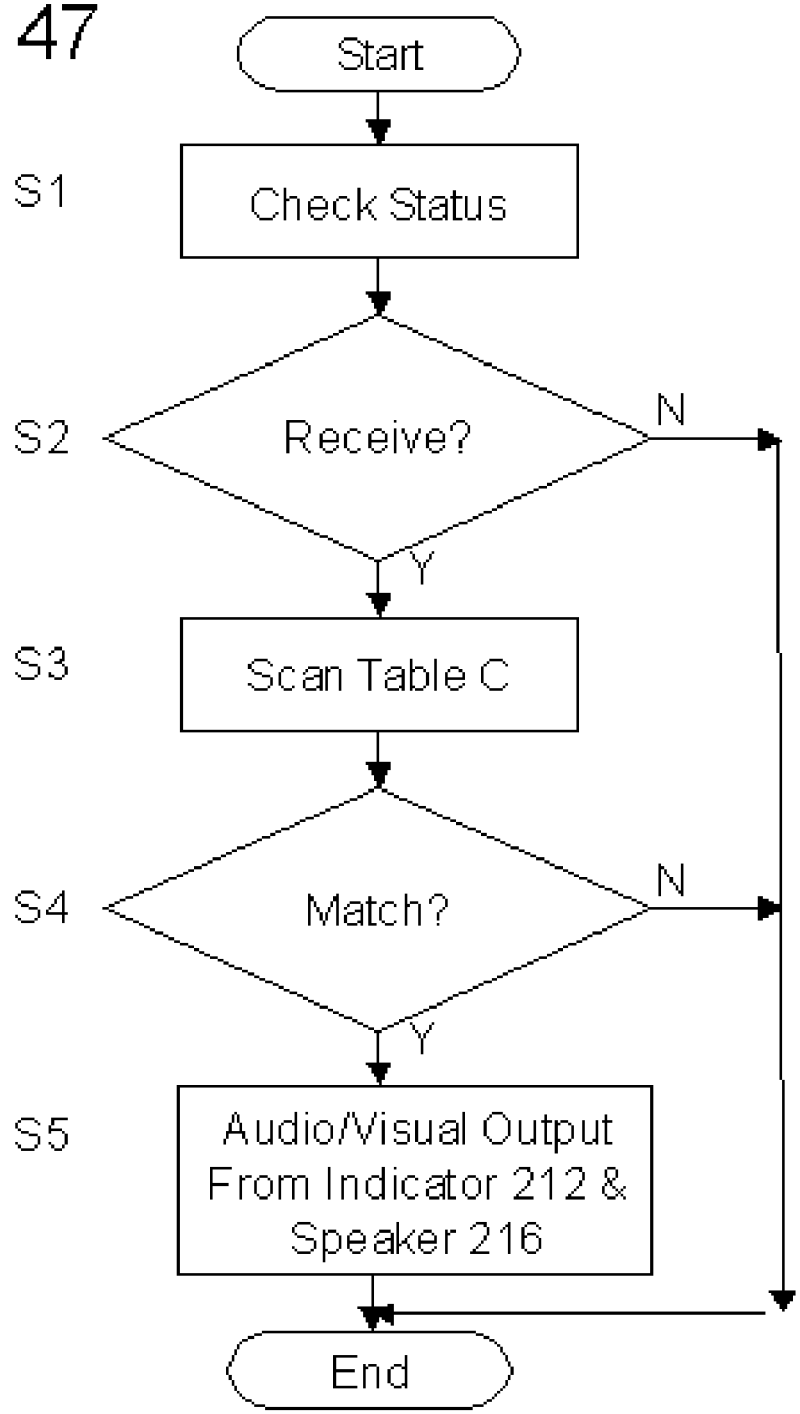
FIG. 47 is a flowchart illustrating an exemplary embodiment of the present invention.

FIGS. 45 through 47 illustrate the caller ID system of Communication Device 200 (FIG. 1).

As illustrated in FIG. 45, RAM 206 includes Table C. As shown in the drawing, each phone number corresponds to a specific color and sound. For example Phone #1 corresponds to Color A and Sound E; Phone #2 corresponds to Color B and Sound F; Phone #3 corresponds to Color C and Sound G; and Phone #4 corresponds to color D and Sound H.

As illustrated in FIG. 46, the user of Communication Device 200 selects or inputs a phone number (S1) and selects a specific color (S2) and a specific sound (S3) designated for that phone number by utilizing Input Device 210 (FIG. 1). Such sequence can be repeated until there is a specific input signal from Input Device 210 ordering to do otherwise (S4).

As illustrated in FIG. 47, CPU 211 (FIG. 1) periodically checks whether it has received a call from other communication devices (S1). If it receives a call (S2), CPU 211 scans Table C (FIG. 45) to see whether the phone number of the caller device is registered in the table (S3). If there is a match (S4), the designated color is output from Indicator 212 (FIG. 1) and the designated sound is output from Speaker 216 (FIG. 1) (S5). For example if the incoming call is from Phone #1, Color A is output from Indicator 212 and Sound E is output from Speaker 216.

<<Caller ID—Summary>>

The foregoing invention may be summarized as the following.

A communication device comprising a color emitting means which outputs more than one type of color and a speaker which outputs more than one audio information wherein said communication device stores information regarding a plurality of phone numbers, a specific color and/or a specific audio information is designated to each phone number respectively, and said specific color is output from said color emitting means and/or said specific audio information is output from said speaker according to the phone number of an incoming call thereby enabling the user of said communication device to perceive the identification of the caller of said incoming call in advance of answering thereto.

<<Stock Purchasing Function>>

FIGS. 48 through 52 illustrate the method of purchasing stocks by utilizing Communication Device 200 (FIG. 1).

Figure 48:
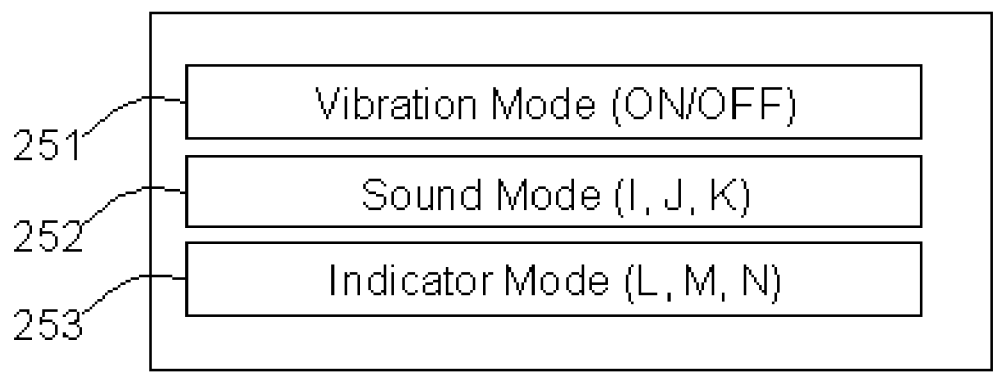
FIG. 48 is a block diagram illustrating an exemplary embodiment of the present invention.

FIG. 48 illustrates the data stored in ROM 207 (FIG. 1) necessary to set the notice mode. Area 251 stores the program regarding the vibration mode (i.e., vibration mode ON/vibration mode OFF); Area 252 stores the program regarding sound which is emitted from Speaker 216 (FIG. 1) and several types of sound data, such as Sound Data I, Sound Data J, and Sound Data K are stored therein; Area 253 stores the program regarding the color emitted from Indicator 212 (FIG. 1) and several types of color data, such as Color Data L, Color Data M, and Color Data N are stored therein.

Figure 49:
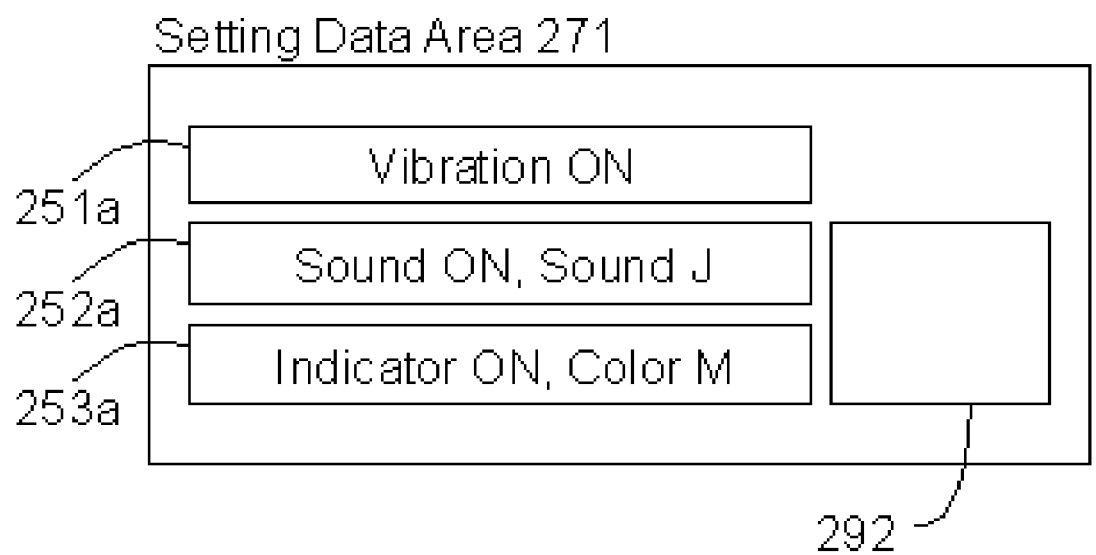
FIG. 49 is a block diagram illustrating an exemplary embodiment of the present invention.

As illustrated in FIG. 49, the notice mode is activated in the manner in compliance with the settings stored in setting data Area 271 of RAM 206 (FIG. 1). In the example illustrated in FIG. 49, when the notice mode is activated, Vibrator 217 (FIG. 1) is turned on in compliance with the data stored in Area 251a, Speaker 216 (FIG. 1) is turned on and Sound Data J is emitted therefrom in compliance with the data stored in Area 252a, and Indicator 212 (FIG. 1) is turned on and Color M is emitted therefrom in compliance with the data stored in Area 253a. Area 292 stores the stock purchase data, i.e., the name of the brand, the amount of limited price, the name of the stock market (such as NASDAQ and/or NYSE) and other relevant information regarding the stock purchase.

Figure 50:
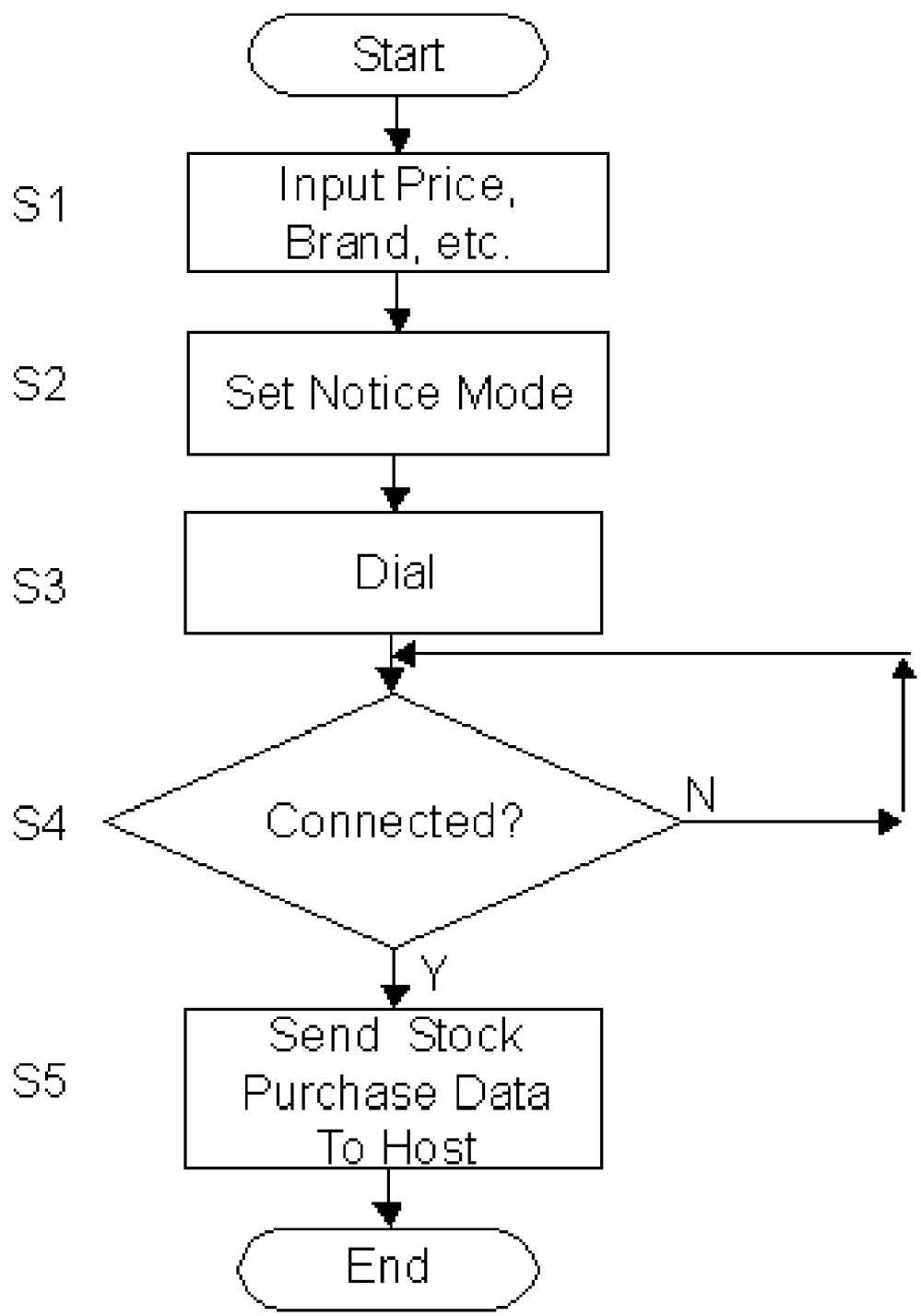
FIG. 50 is a flowchart illustrating an exemplary embodiment of the present invention.

As illustrated in FIG. 50, the user of Communication Device 200 inputs the stock purchase data from Input Device 210 (FIG. 1) or by the voice recognition system, which is stored in Area 292 of RAM 206 (FIG. 49) (S1). By way of inputting specific data from Input Device 210, the property of notice mode (i.e., vibration ON/OFF, sound ON/OFF and the type of sound, indicator ON/OFF, and the type of color) is set and the relevant data are stored in Area 271 (i.e., Areas 251a, 252a, 253a) (FIG. 49) of RAM 206 by the programs stored in Areas 251, 252, 253 of ROM 207 (FIG. 48) (S2). Communication Device 200 initiates a dialing process (S3) until it is connected to Host H (described hereinafter) (S4) and sends the stock purchase data thereto.

Figure 51:
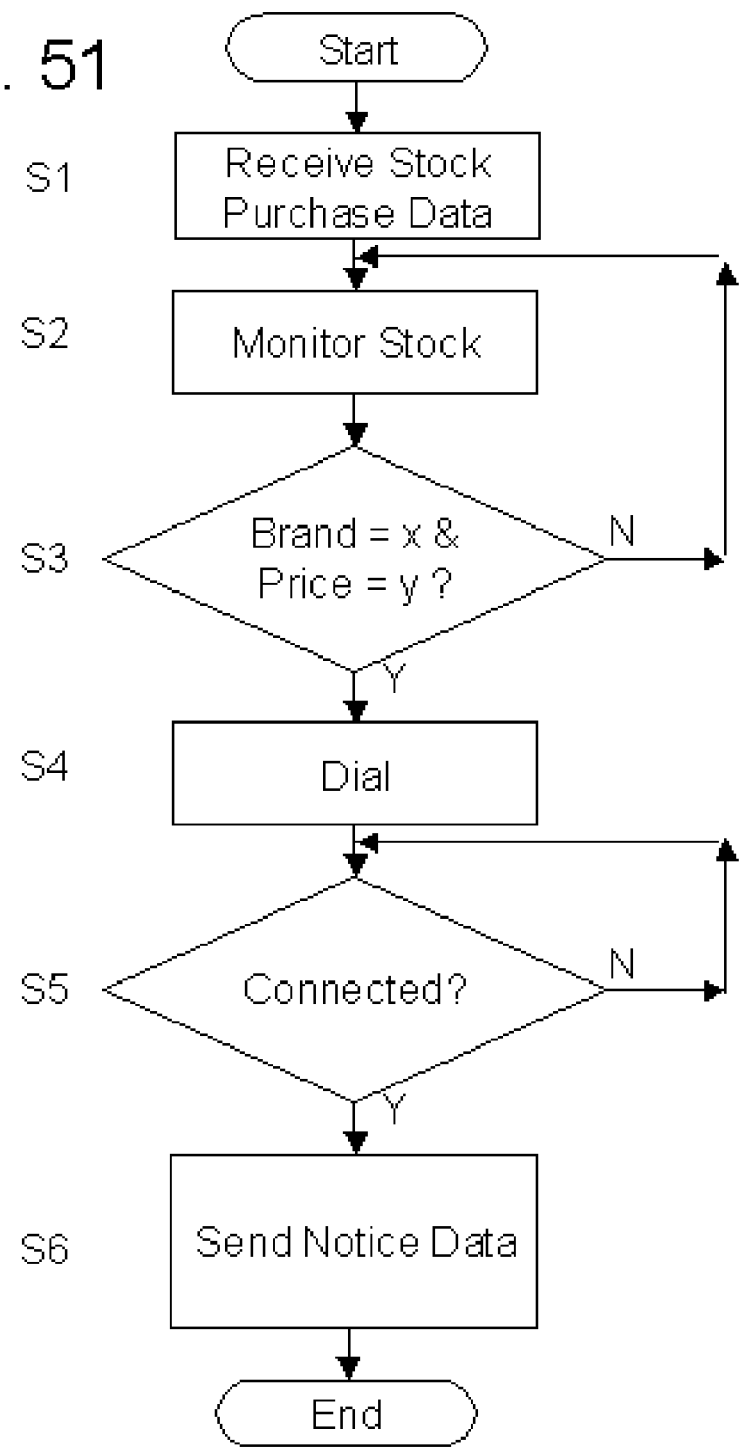
FIG. 51 is a flowchart illustrating an exemplary embodiment of the present invention.

FIG. 51 illustrates the operation of Host H (not shown). As soon as Host H receives the stock purchase data from Communication Device 200 (S1), it initiates to monitor the stock markets which is specified in the stock purchase data (S2). If Host H detects that the price of the certain brand specified in the stock purchase data meets the limited price specified in the stock purchase data, (in the present example if the price of brand x is y) (S3), it initiates a dialing process (S4) until it is connected to Communication Device 200 (S5) and sends a notice data thereto (S6).

Figure 52:
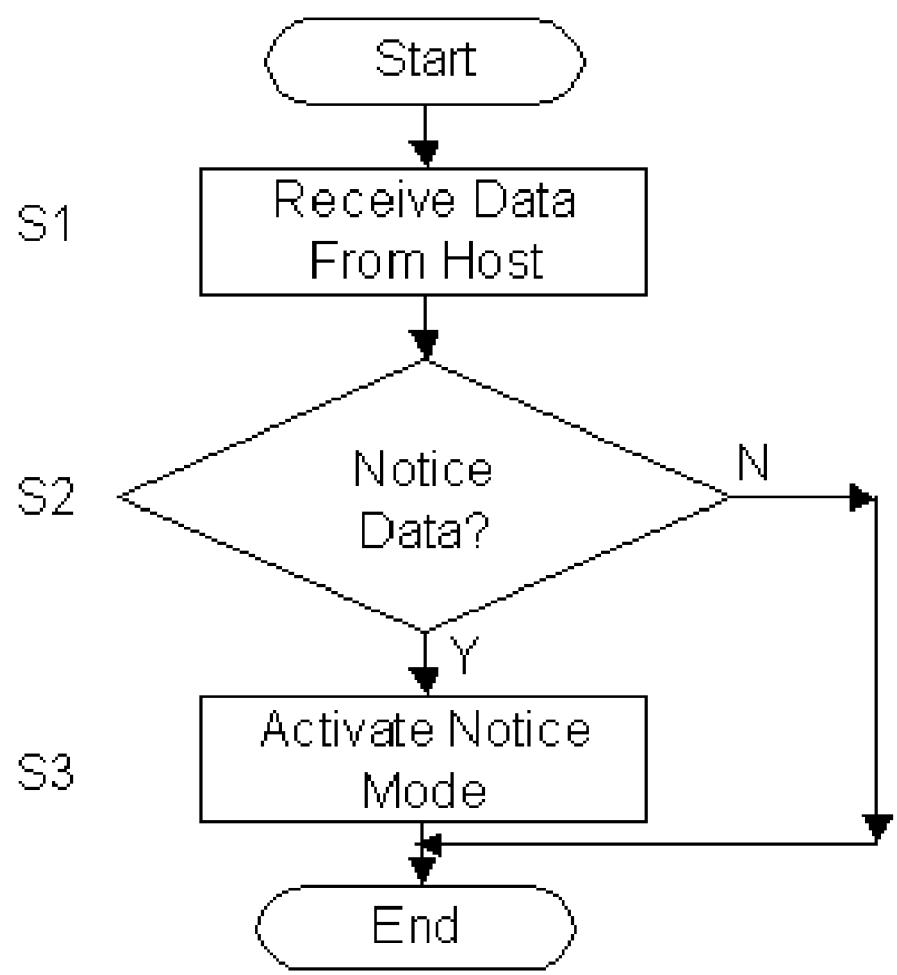
FIG. 52 is a flowchart illustrating an exemplary embodiment of the present invention.

As illustrated in FIG. 52, Communication Device 200 periodically monitors the data received from Host H (not shown) (S1). If the data received is a notice data (S2), the notice mode is activated in the manner in compliance with the settings stored in setting data Area 271 (FIG. 49) of RAM 206 (S3). In the example illustrated in FIG. 49, Vibrator 217 (FIG. 1) is turned on, Sound Data J is emitted from Speaker 216 (FIG. 1), and Indicator 212 (FIG. 1) emits Color M.

<<Stock Purchase—Summary>>

The foregoing invention may be summarized as the following.

A communication system comprising a first computer and a second computer wherein said second computer is a wireless communication device including an antenna, a stock purchase data is input to said second computer, said first computer monitors one or more stock markets specified in said stock purchase data and sends a notice to said second computer, and said second computer responds in a specified manner upon receiving said notice from said antenna in a wireless fashion thereby enabling the user of said second computer to receive said notice regarding said stock purchase data in any location wherever he/she desires.

<<Timer Email Function>>

Figure 53A:
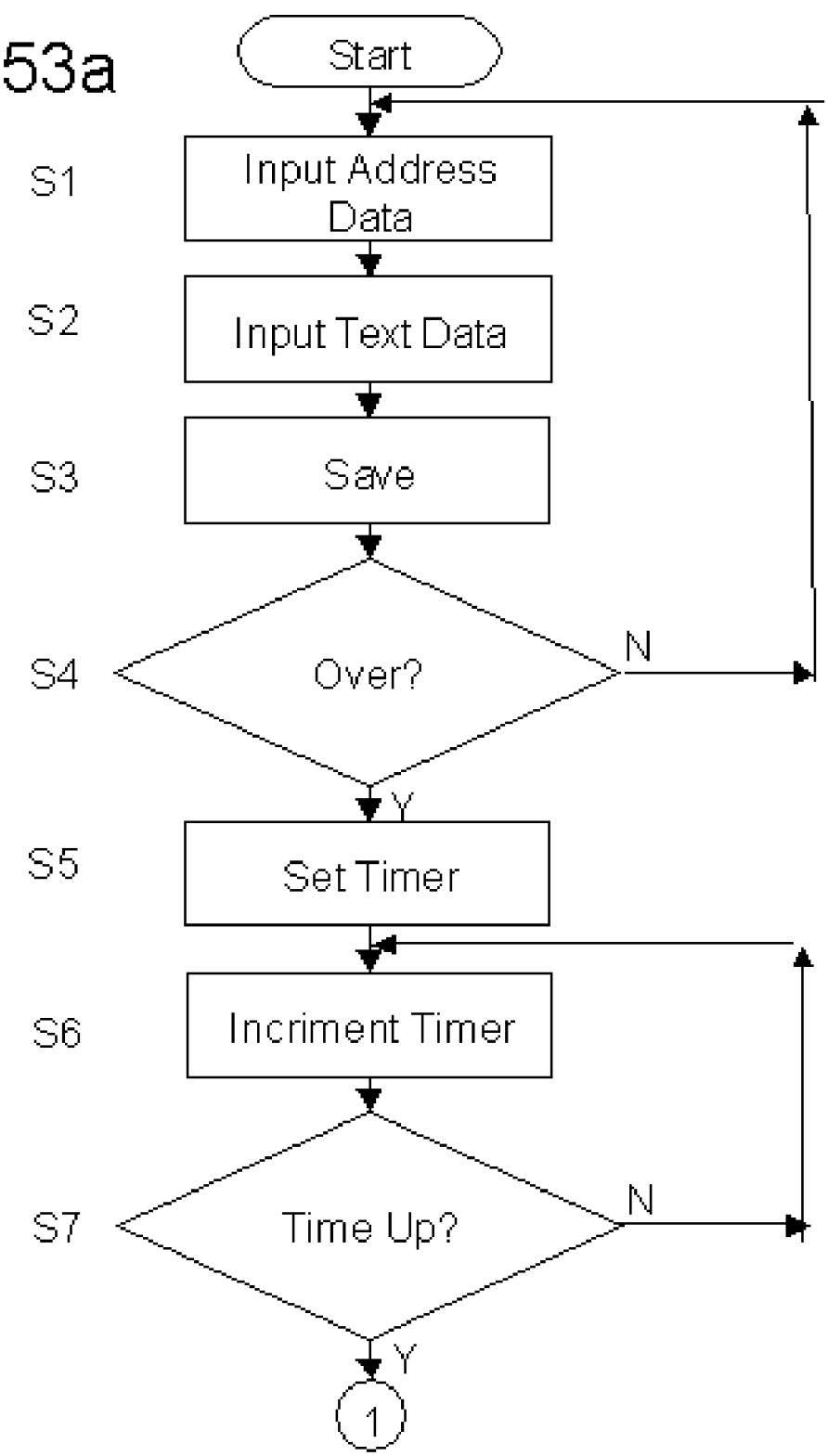
FIG. 53a is a flowchart illustrating an exemplary embodiment of the present invention.

FIGS. 53a and 53b illustrate the method of sending emails from Communication Device 200 (FIG. 1) by utilizing a timer.

Address data, i.e., email address is input by utilizing Input Device 210 (FIG. 1) or via voice recognition system explained in FIG. 3, FIG. 4, FIG. 5, FIG. 13, FIG. 14, FIG. 14a, FIG. 15, FIG. 16 and/or FIG. 17 (S1) and the text data, the text of the email message is input by the same manner (S2). The address data and the text data are automatically saved in RAM 206 (FIG. 1) (S3). The sequence of S1 through S3 is repeated (i.e., writing more than one email) until a specified input signal is input from Input Device 210 (FIG. 1) or by utilizing the voice recognition system explained above. Once inputting both the address data and the text data (which also includes numeric data, images and programs) are completed a timer (not shown) is set by Input Device 210 or by utilizing the voice recognition system (S5), and the timer is incremented periodically (S6) until the timer value equals the predetermined value specified in S5 (S7). A dialing process is continued (S8) until the line is connected (S9) and the text data are sent thereafter to email addresses specified in S1 (S10). All of the emails are sent (S11) and the line is disconnected thereafter (S12).

As another embodiment of the present invention a specific time may be input by Input Device 210 and send the text data on the specific time (i.e., a broad meaning of 'timer').

<<Timer Email—Summary>>

The foregoing invention may be summarized as the following.

A communication device comprising a text data input means which inputs one or more text data, a storage means which stores said text data, a sending means which sends said text data which is input by said input means, and a timer means which activates said sending means at a predetermined time wherein said text data input means input said text data, said storage means stores said text data input by said text data input means, said timer means activates said sending means at said predetermined time, and said sending means sends said text data at said predetermined time thereby enabling the user of said communication device to send said text data at said predetermined time at which said user is not able to send said text data.

<<Call Blocking Function>>

Figure 54:
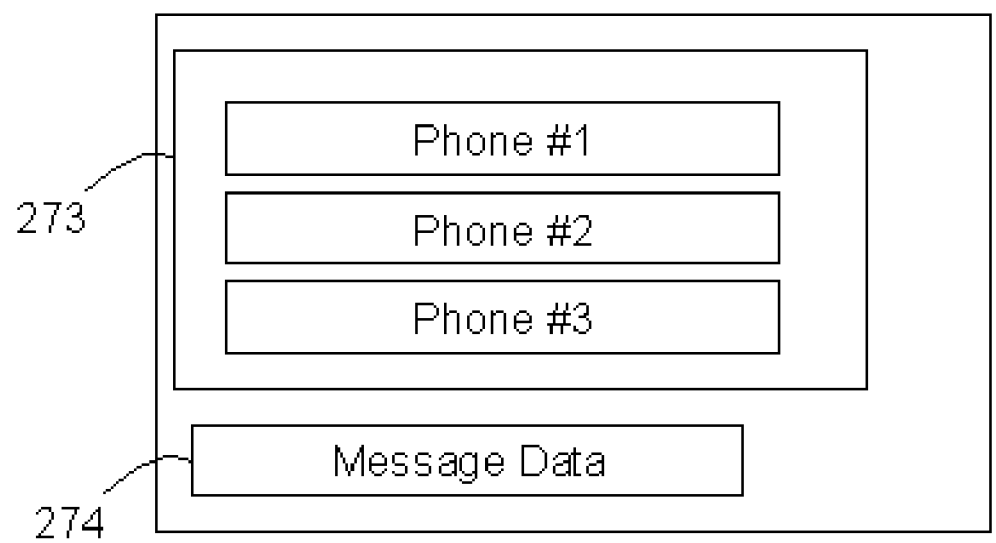
FIG. 54 is a block diagram illustrating an exemplary embodiment of the present invention.
Figure 55:
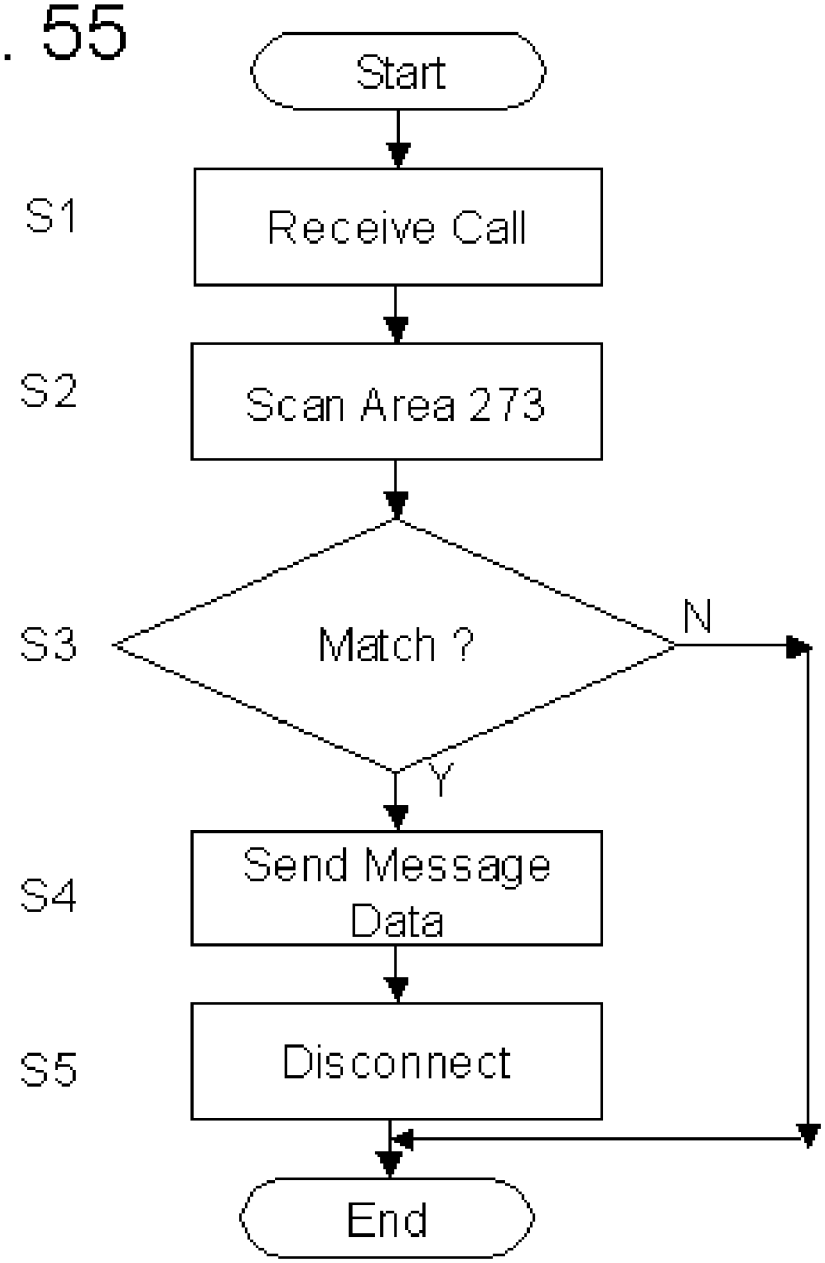
FIG. 55 is a flowchart illustrating an exemplary embodiment of the present invention.
Figure 56:
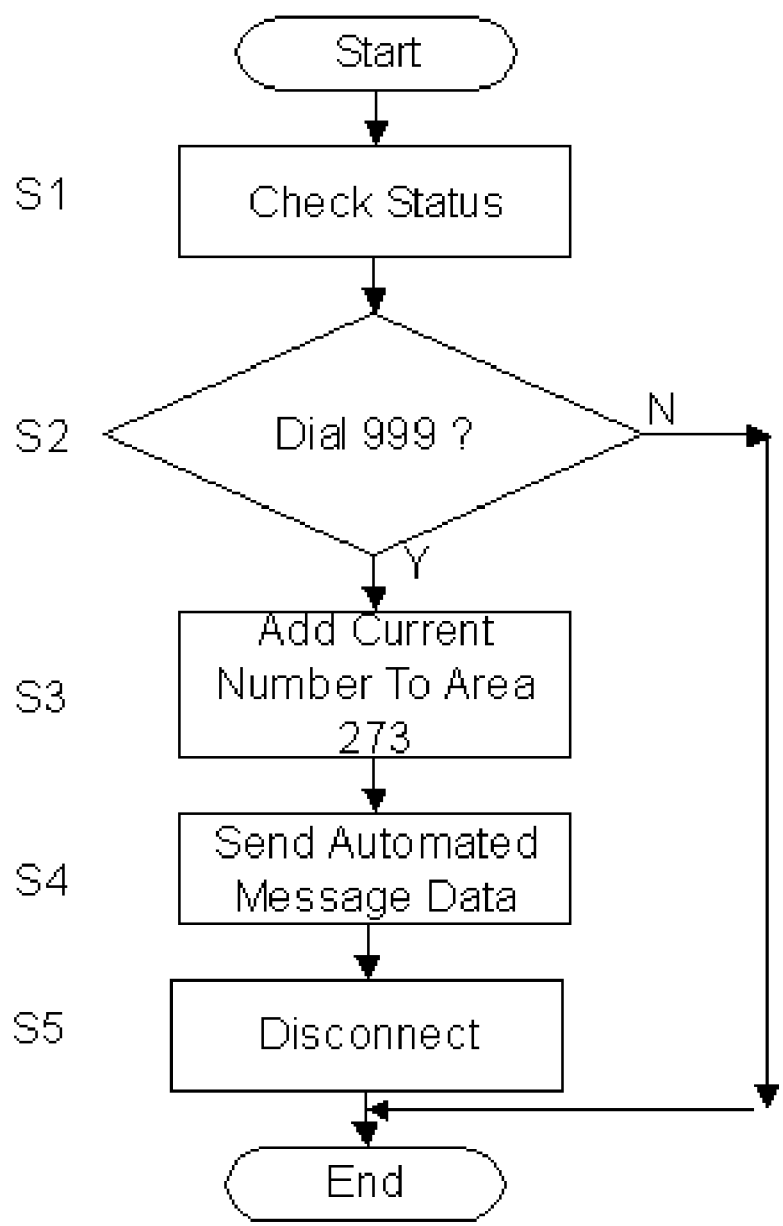
FIG. 56 is a flowchart illustrating an exemplary embodiment of the present invention.

FIGS. 54 through 56 illustrates the so-called 'call blocking' function of Communication Device 200 (FIG. 1).

As illustrated in FIG. 54, RAM 206 (FIG. 1) includes Area 273 and Area 274. Area 273 stores phone numbers that should be blocked. In the example illustrated in FIG. 54, Phone #1, Phone #2, and Phone #3 are blocked. Area 274 stores a message data, preferably a wave data, stating that the phone can not be connected.

FIG. 55 illustrates the operation of Communication Device 200. When Communication Device 200 receives a call (S1), CPU 211 (FIG. 1) scans Area 273 (FIG. 54) of RAM 206 (S2). If the phone number of the incoming call matches one of the phone numbers stored in Area 273 (S3), CPU 211 sends the message data stored in Area 274 (FIG. 54) of RAM 206 to the caller device (S4) and disconnects the line (S5).

FIG. 56 illustrates the method of updating Area 273 (FIG. 54) of RAM 206. Assuming that the phone number of the incoming call does not match any of the phone numbers stored in Area 273 of RAM 206 (see S3 of FIG. 55). In that case, Communication Device 200 is connected to the caller device. However, the user of Communication Device 200 may decide to have such number 'blocked' after all. If that is the case, the user dials '999' while the line is connected. Technically CPU 211 (FIG. 1) periodically checks the signals input from Input Device 210 (FIG. 1) (S1). If the input signal represents a numerical data '999' from Input Device 210 (S2), CPU 211 adds the phone number of the pending call to Area 273 (S3) and sends the message data stored in Area 274 (FIG. 54) of RAM 206 to the caller device (S4). The line is disconnected thereafter (S5).

Figure 57:
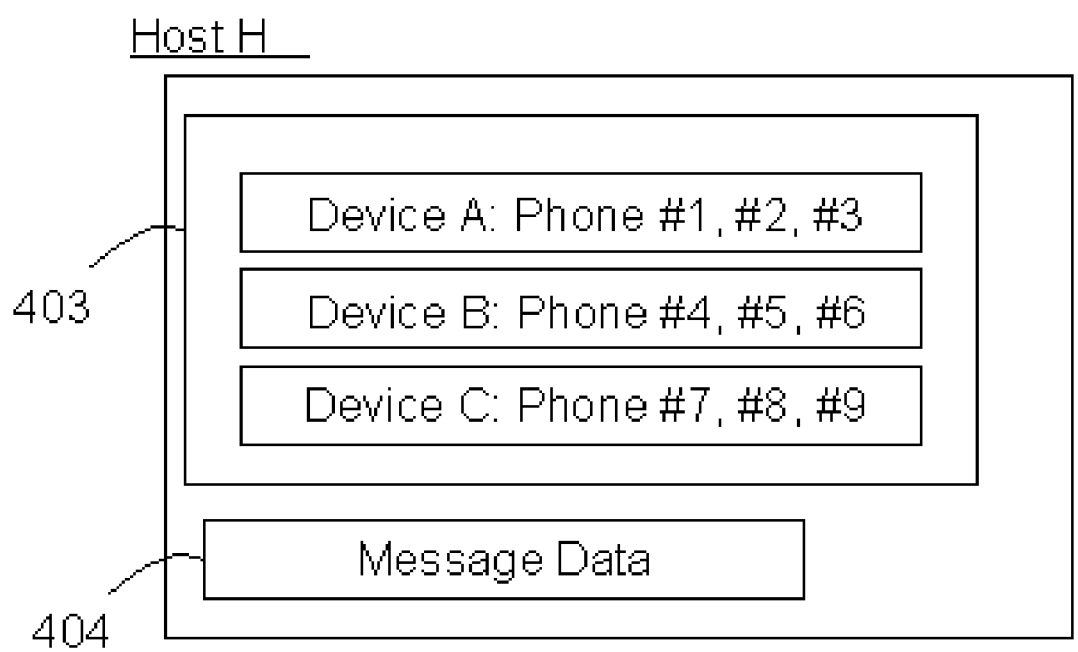
FIG. 57 is a block diagram illustrating an exemplary embodiment of the present invention.
Figure 58:
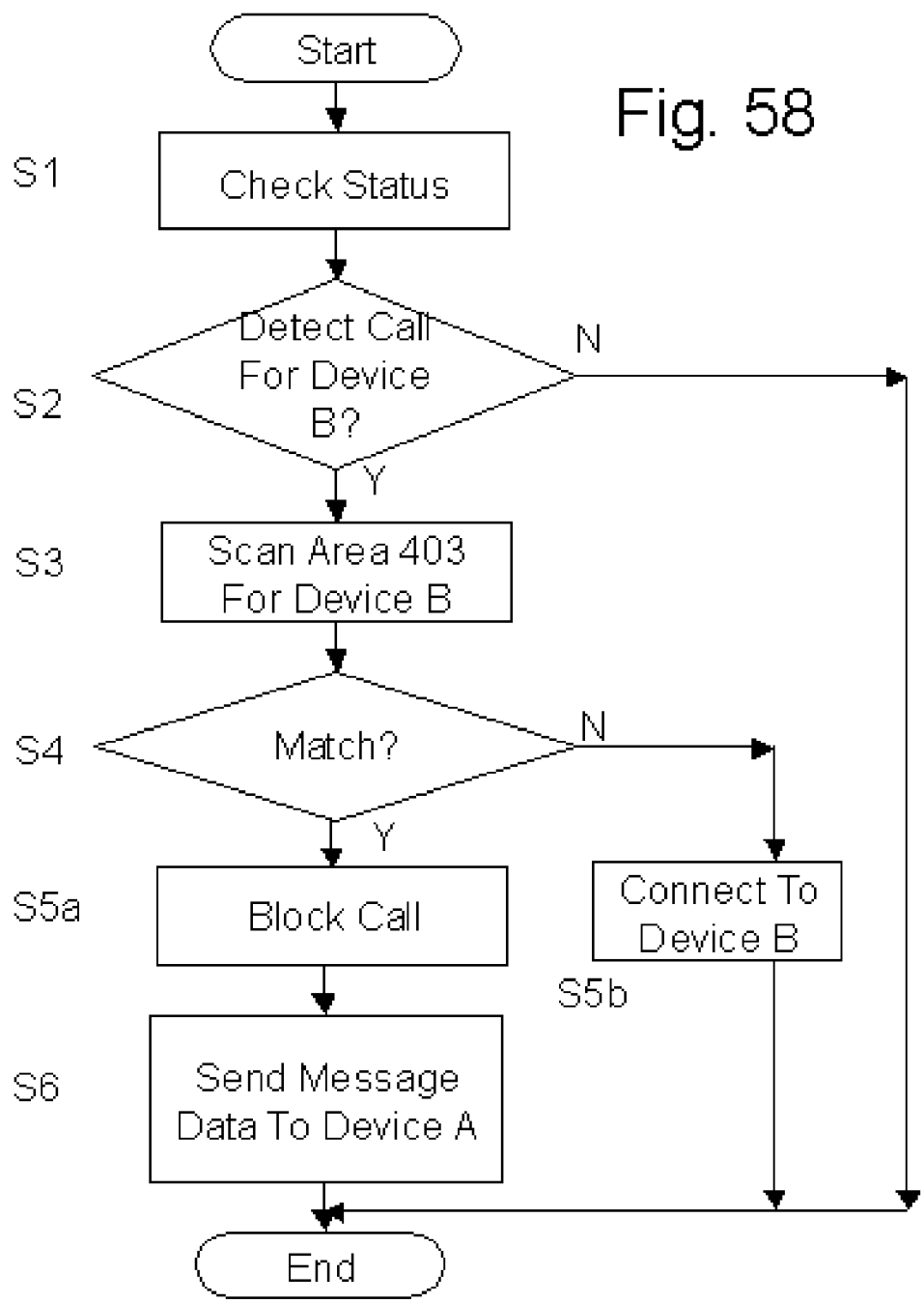
FIG. 58 is a flowchart illustrating an exemplary embodiment of the present invention.
Figure 59:
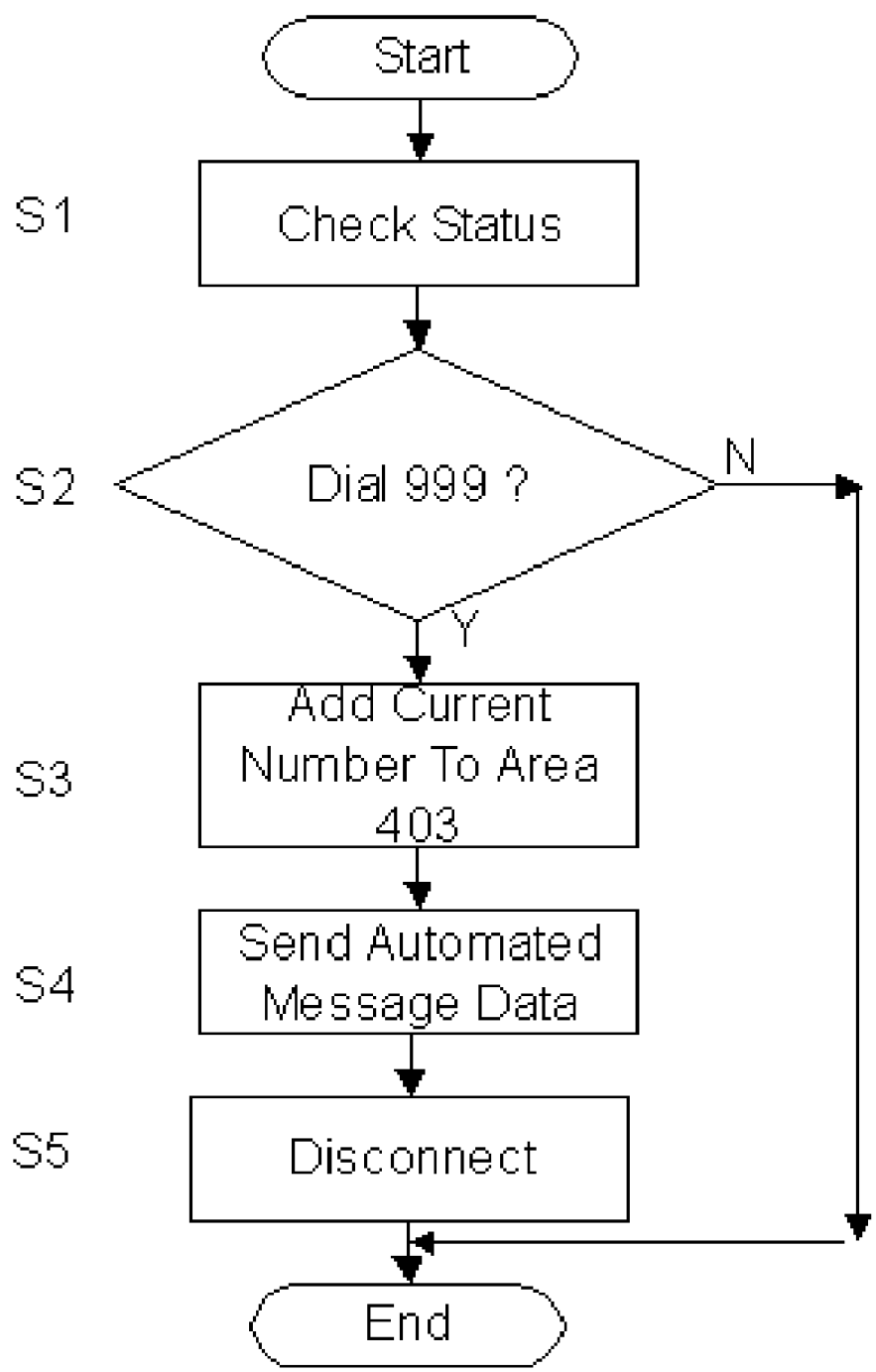
FIG. 59 is a flowchart illustrating an exemplary embodiment of the present invention.

FIGS. 57 through 59 illustrate another embodiment of the present invention.

As illustrated in FIG. 57, Host H (not shown) includes Area 403 and Area 404. Area 403 stores phone numbers that should be blocked to be connected to Communication Device 200. In the example illustrated in FIG. 57, Phone #1, Phone #2, and Phone #3 are blocked for Device A; Phone #4, Phone #5, and Phone #6 are blocked for Device B; and Phone #7, Phone #8, and Phone #9 are blocked for Device C. Area 404 stores a message data stating that the phone can not be connected.

FIG. 58 illustrates the operation of Host H (not shown). Assuming that the caller device is attempting to connect to Device B, Communication Device 200. Host H periodically checks the signals from all Communication Device 200 (S1). If Host H detects a call for Device B (S2), it scans Area 403 (FIG. 57) (S3) and checks whether the phone number of the incoming call matches one of the phone numbers stored therein for Device B (S4). If the phone number of the incoming call does not match any of the phone numbers stored in Area 403, the line is connected to Device B (S5b). On the other hand, if the phone number of the incoming call matches one of the phone numbers stored in Area 403, the line is 'blocked,' i.e., not connected to Device B (S5a) and Host H sends the massage data stored in Area 404 (FIG. 57) to the caller device (S6).

FIG. 59 illustrates the method of updating Area 403 (FIG. 57) of Host H. Assuming that the phone number of the incoming call does not match any of the phone numbers stored in Area 403 (see S4 of FIG. 58). In that case, Host H allows the connection between the caller device and Communication Device 200, however, the user of Communication Device 200 may decide to have such number 'blocked' after all. If that is the case, the user simply dials '999' while the line is connected. Technically Host H (FIG. 57) periodically checks the signals input from Input Device 210 (FIG. 1) (S1). If the input signal represents '999' from Input Device 210 (FIG. 1) (S2), Host H adds the phone number of the pending call to Area 403 (S3) and sends the message data stored in Area 404 (FIG. 57) to the caller device (S4). The line is disconnected thereafter (S5).

As another embodiment of the method illustrated in FIG. 59, Host H (FIG. 57) may delegate some of its tasks to Communication Device 200 (this embodiment is not shown in drawings). Namely, Communication Device 200 periodically checks the signals input from Input Device 210 (FIG. 1). If the input signal represents a numeric data '999' from Input Device 210, Communication Device 200 sends to Host H a block request signal as well as with the phone number of the pending call. Host H, upon receiving the block request signal from Communication Device 200, adds the phone number of the pending call to Area 403 (FIG. 57) and sends the message data stored in Area 404 (FIG. 57) to the caller device. The line is disconnected thereafter.

<<Call Blocking—Summary>>

The foregoing invention may be summarized as the following.

(1) A communication system comprising a communication device and a blocked number storage means wherein an incoming call is prevented from being connected to said communication device if the phone number of said incoming call is included in said blocked number storage means thereby preventing the user of said communication device from being disturbed from unnecessary calls.

(2) A communication system comprising a communication device and a blocked number storage means wherein a pending call is disconnected from said communication device if a predetermined signal is input to said communication device and the phone number of said pending call is included in said blocked number storage means thereby preventing the user of said communication device from being disturbed from unnecessary calls.

<<Online Payment Function>>

FIGS. 60 through 64 illustrate the method of online payment by utilizing Communication Device 200 (FIG. 1).

Figure 60:
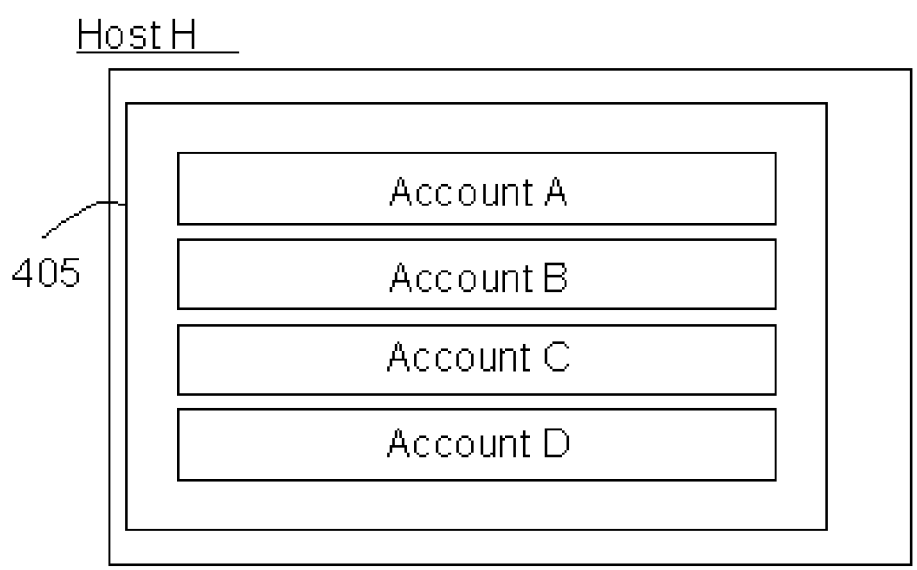
FIG. 60 is a block diagram illustrating an exemplary embodiment of the present invention.

As illustrated in FIG. 60, Host H includes account data storage Area 405. All of the account data of the users of Communication Device 200 who have signed up for the online payment service are stored in Area 405. In the example described in FIG. 60, Account A stores the relevant account data of the user using Device A; Account B stores the relevant account data of the user using Device B; Account C stores the relevant account data of the user using Device C; and Account D stores the relevant account data of the user using device D. Here, Devices A, B, C, and D are Communication Device 200.

Figure 61B:
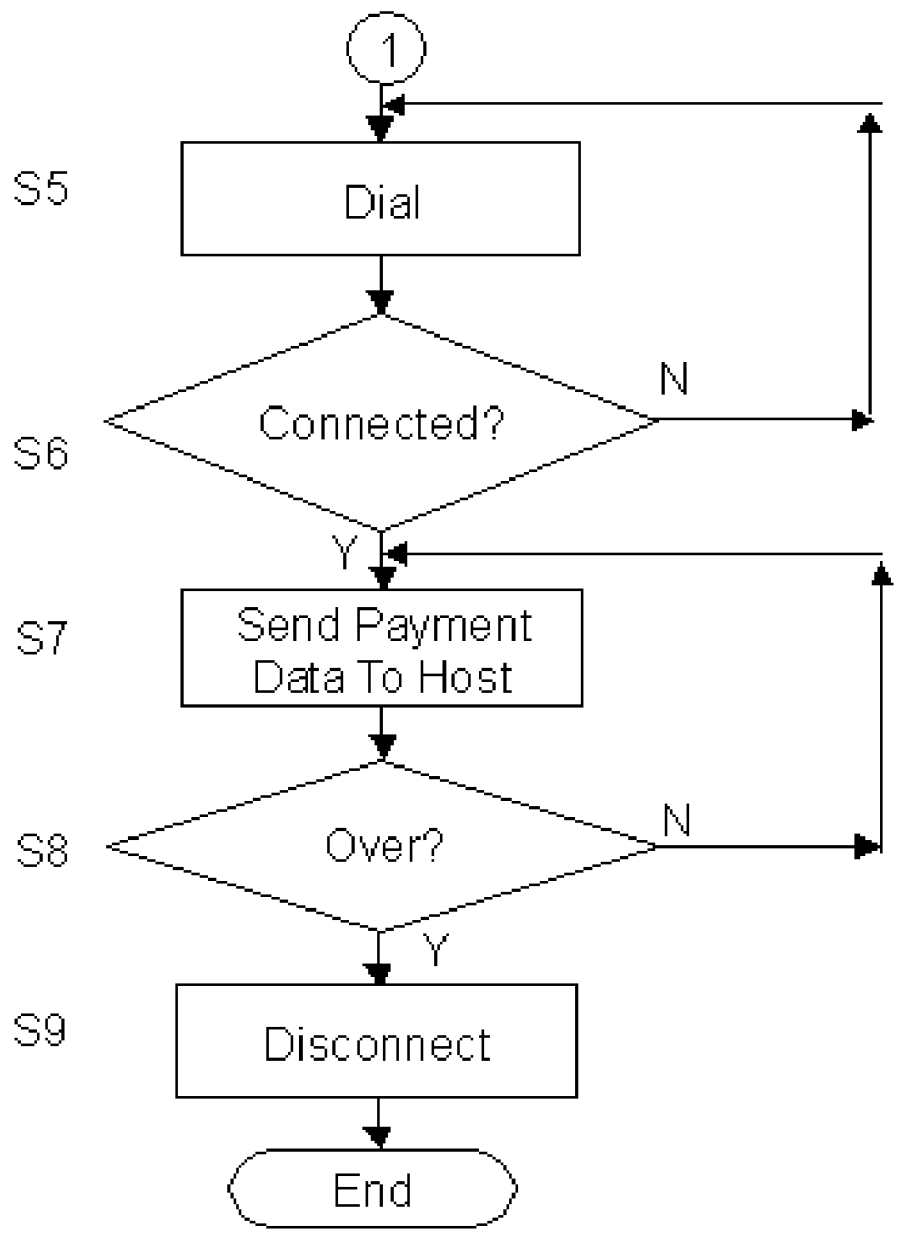
FIG. 61b is a flowchart illustrating an exemplary embodiment of the present invention.

FIGS. 61a and 61b illustrate the operation of the payer device, Communication Device 200. Assuming that Device A is the payer device and Device B is the payee device. Account A explained in FIG. 60 stores the account data of the user of Device A, and Account B explained in the same drawing stores the account data of the user of Device B. As illustrated in FIG. 61a, LCD 201 (FIG. 1) of Device A displays the balance of Account A by receiving the relevant data from Host H (FIG. 60) (S1). From the signal input from Input Device 210 (FIG. 1), the payer's account and the payee's account are selected (in the present example, Account A as the payer's account and Account B as the payee's account are selected), and the amount of payment and the device ID (in the present example, Device A as the payer's device and Device B as the payee's device) are input via Input Device 210 (S2). If the data input from Input Device 210 is correct (S3), CPU 211 (FIG. 1) of Device A prompts for other payments. If there are other payments to make, the sequence of S1 through S3 is repeated until all of the payments are made (S4). The dialing process is initiated and repeated thereafter (S5) until the line is connected to Host H (FIG. 60) (S6). Once the line is connected, Device A sends the payment data to Host H (S7). The line is disconnected when all of the payment data including the data produced in S2 are sent to Host H (S8 and S9).

Figure 62:
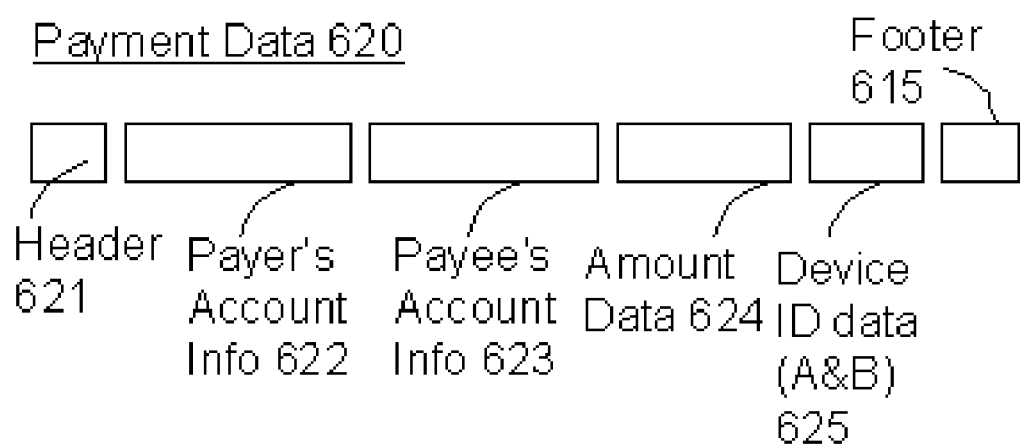
FIG. 62 is a simplified illustration illustrating an exemplary embodiment of the present invention.

FIG. 62 illustrates the payment data described in S7 of FIG. 61b. Payment data 620 is composed of Header 621, Payer's Account Information 622, Payee's Account Information 623, amount data 624, device ID data 625, and Footer 615. Payer's Account Information 622 represents the information regarding the payer's account data stored in Host H (FIG. 60) which is, in the present example, Account A. Payee's Account Information 623 represents the information regarding the payee's account data stored in Host H which is, in the present example, Account B. Amount Data 624 represents the amount of monetary value either in the U.S. dollars or in other currencies which is to be transferred from the payer's account to the payee's account. The device ID data represents the data of the payer's device and the payee's device, i.e., in the present example, Device A and Device B.

Figure 63:
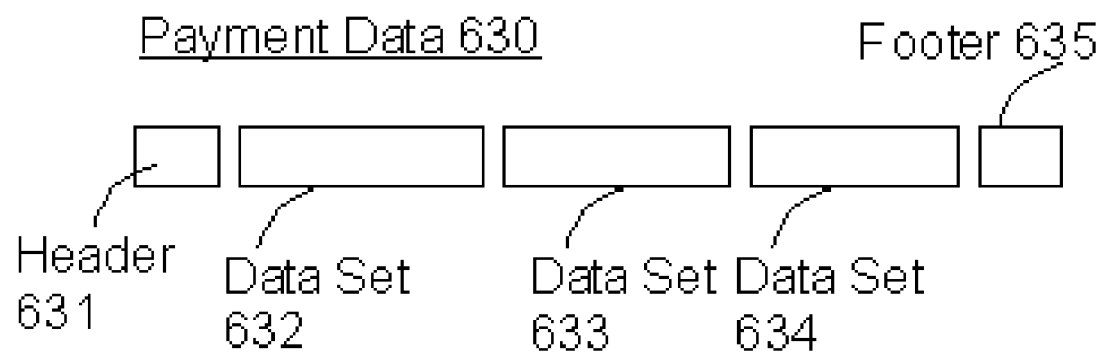
FIG. 63 is a simplified illustration illustrating an exemplary embodiment of the present invention.

FIG. 63 illustrates the basic structure of the payment data described in S7 of FIG. 61*b* when multiple payments are made, i.e., when more than one payment is made in S4 of FIG. 61*a*. Assuming that three payments are made in S4 of FIG. 61*a*. In that case, Payment Data 630 is composed of Header 631, Footer 635, and three data sets, i.e., Data Set 632, Data Set 633, Data Set 634. Each data set represents the data components described in FIG. 62 excluding Header 621 and Footer 615.

Figure 64:
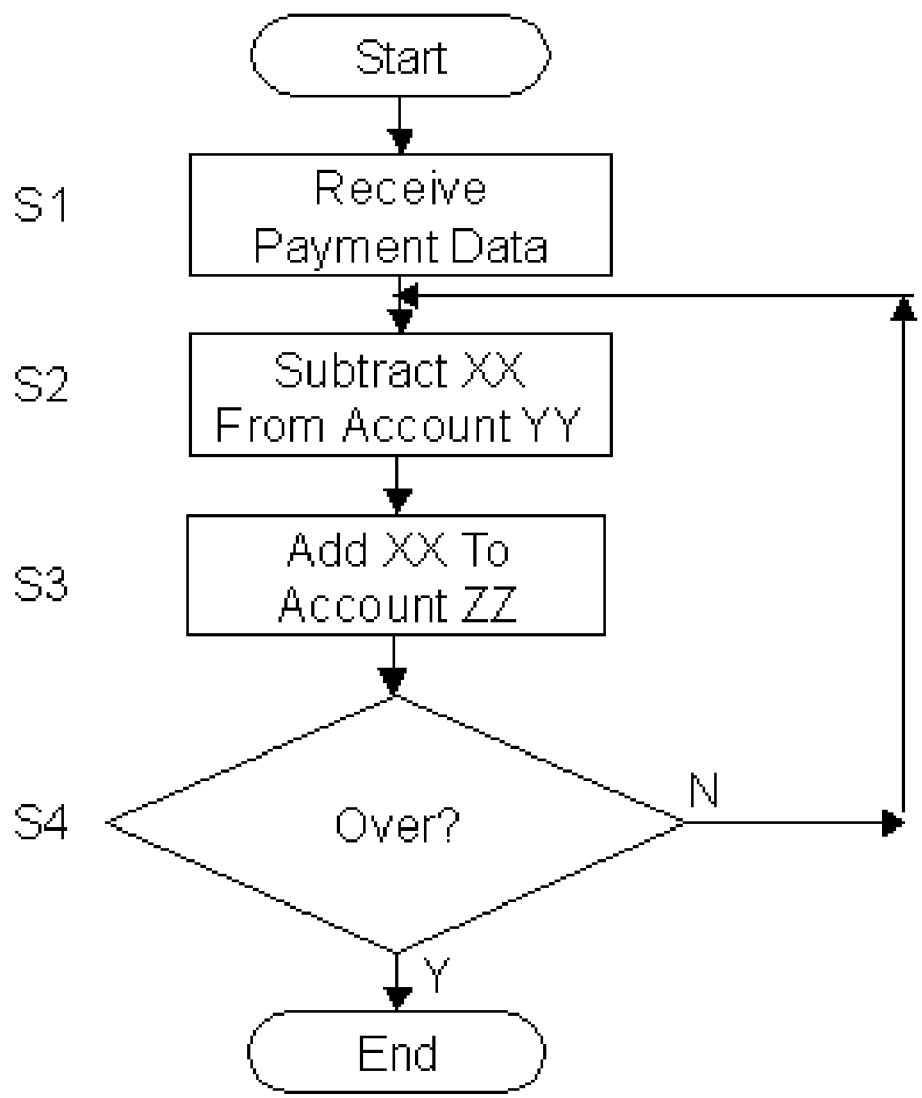
FIG. 64 is a flowchart illustrating an exemplary embodiment of the present invention.

FIG. 64 illustrates the operation of Host H (FIG. 60). After receiving payment data from Device A described in FIGS. 62 and 63, Host H retrieves therefrom the payer's account information (in the present example Account A), the payee's account information (in the present example Account B), the amount data which represents the monetary value, and the device IDs of both the payer's device and the payee's device (in the present example Device A and Device B) (S1). Host H, based on such data, subtracts the monetary value represented by the amount data from the payer's account (in the present example Account A) (S2), and adds the same amount to the payee's account (in the present example Account B) (S3). If there are other payments to make, i.e., if Host H received a payment data which has a structure of the one described in FIG. 63, the sequence of S2 and S3 is repeated as many times as the amount of the data sets are included in such payment data.

<<Online Payment—Summary>>

The foregoing invention may be summarized as the following.

An online payment system comprising a host and a first device and a second device wherein said host and said first device are connected in a wireless fashion; said host and said second device are also connected in a wireless fashion; said host stores a first account data of said first device and a second account data of said second device; a payment data which includes an amount data representing monetary value, said first account data, and said second account data is input into said first device; said payment data is sent to said host in a wireless fashion; and said host subtracts the value represented by said amount data from said first account data and adds the same value to said second account data thereby enables the users of said first device and said second device to initiate transactions and payments at any location wherever they desire.

<<Navigation System>>

FIGS. 65 through 74 illustrate the navigation system of Communication Device 200 (FIG. 1).

Figure 65:
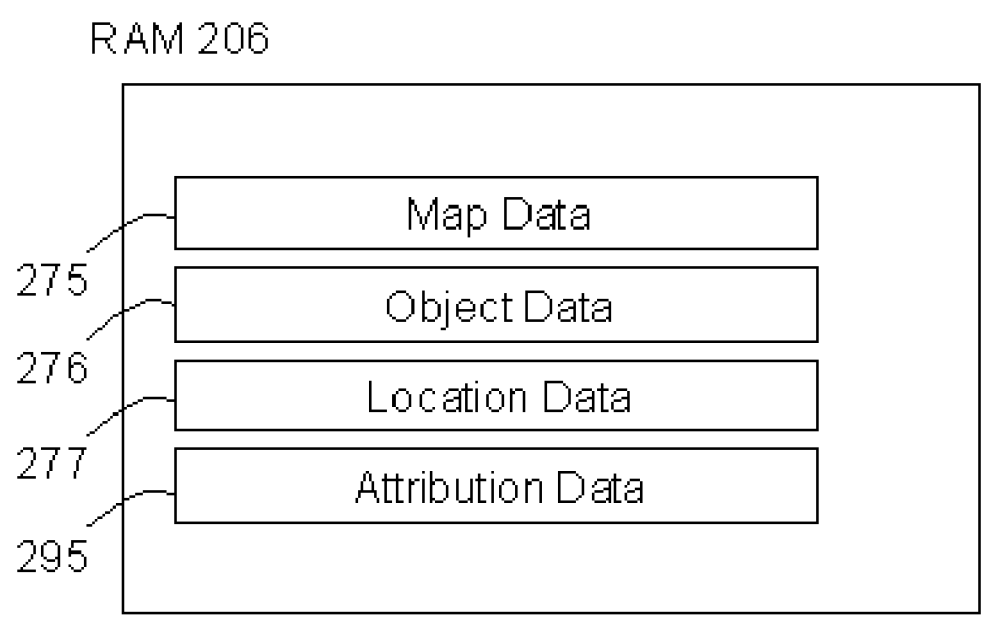
FIG. 65 is a block diagram illustrating an exemplary embodiment of the present invention.

As illustrated in FIG. 65, RAM 206 (FIG. 1) includes Area 275, Area 276, Area 277, and Area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called 'texture mapping' which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in Area 276. Area 277 also stores a plurality of data representing the street address of each object stored in Area 276. In addition, Area 277 stores the current position data of Communication Device 200 and the Destination Data which are explained in details hereafter. The map data stored in Area 275 and the location data stored in Area 277 are linked each other. Area 295 stores a plurality of attribution data attributing to the map data stored in Area 275 and location data stored in Area 277, such as road blocks, traffic accidents, and road constructions, and traffic jams. The attribution data stored in Area 295 is updated periodically by receiving an updated data from a host (not shown).

Figure 66:
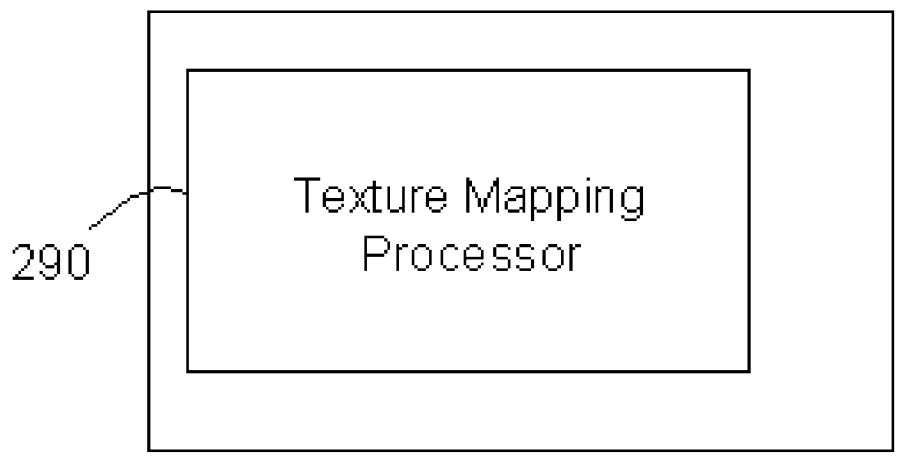
FIG. 66 is a block diagram illustrating an exemplary embodiment of the present invention.

As illustrated in FIG. 66, Video Processor 202 (FIG. 1) includes texture mapping processor 290. Texture mapping processor 290 produces polygons in a three-dimensional space and 'pastes' textures to each polygon. The concept of such method is described in the following patents and the references cited thereof: U.S. Pat. No. 5,870,101, U.S. Pat. No. 6,157,384, U.S. Pat. No. 5,774,125, U.S. Pat. No. 5,375,206, and/or U.S. Pat. No. 5,925,127.

Figure 67:
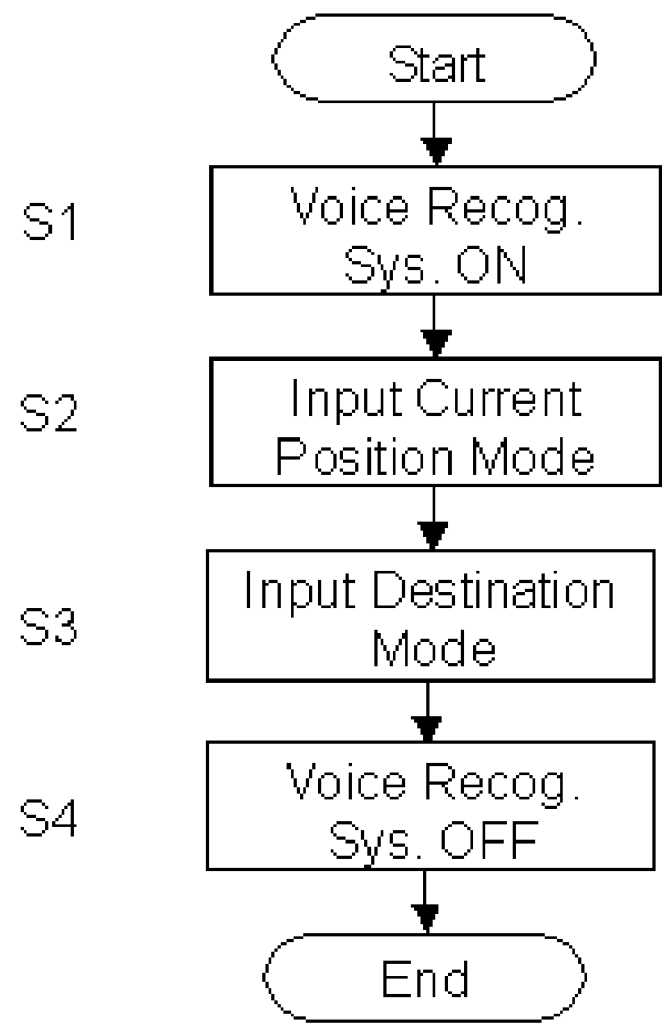
FIG. 67 is a flowchart illustrating an exemplary embodiment of the present invention.

As illustrated in FIG. 67, the voice recognition system is activated when the CPU 211 (FIG. 1) detects a specific signal input from Input Device 210 (FIG. 1) (S1). After the voice recognition system is activated, the input current position mode starts and the current position of Communication Device 200 is input by voice recognition system explained in FIG. 3, FIG. 4, FIG. 5, FIG. 13, FIG. 14, FIG. 14*a*, FIG. 15, FIG. 16 and/or FIG. 17 (S2). The current position can also be input from Input Device 210. As another embodiment of the present invention, the current position can automatically be detected by the method so-called 'global positioning system' or 'GPS' as illustrated in FIGS. 20*a* through 26 and input the current data therefrom. After the process of inputting the current data is completed, the input destination mode starts and the destination is input by the voice recognition system explained above or by the Input Device 210 (S3), and the voice recognition system is deactivated after the process of inputting the Destination Data is completed by utilizing such system (S4).

Figure 68:
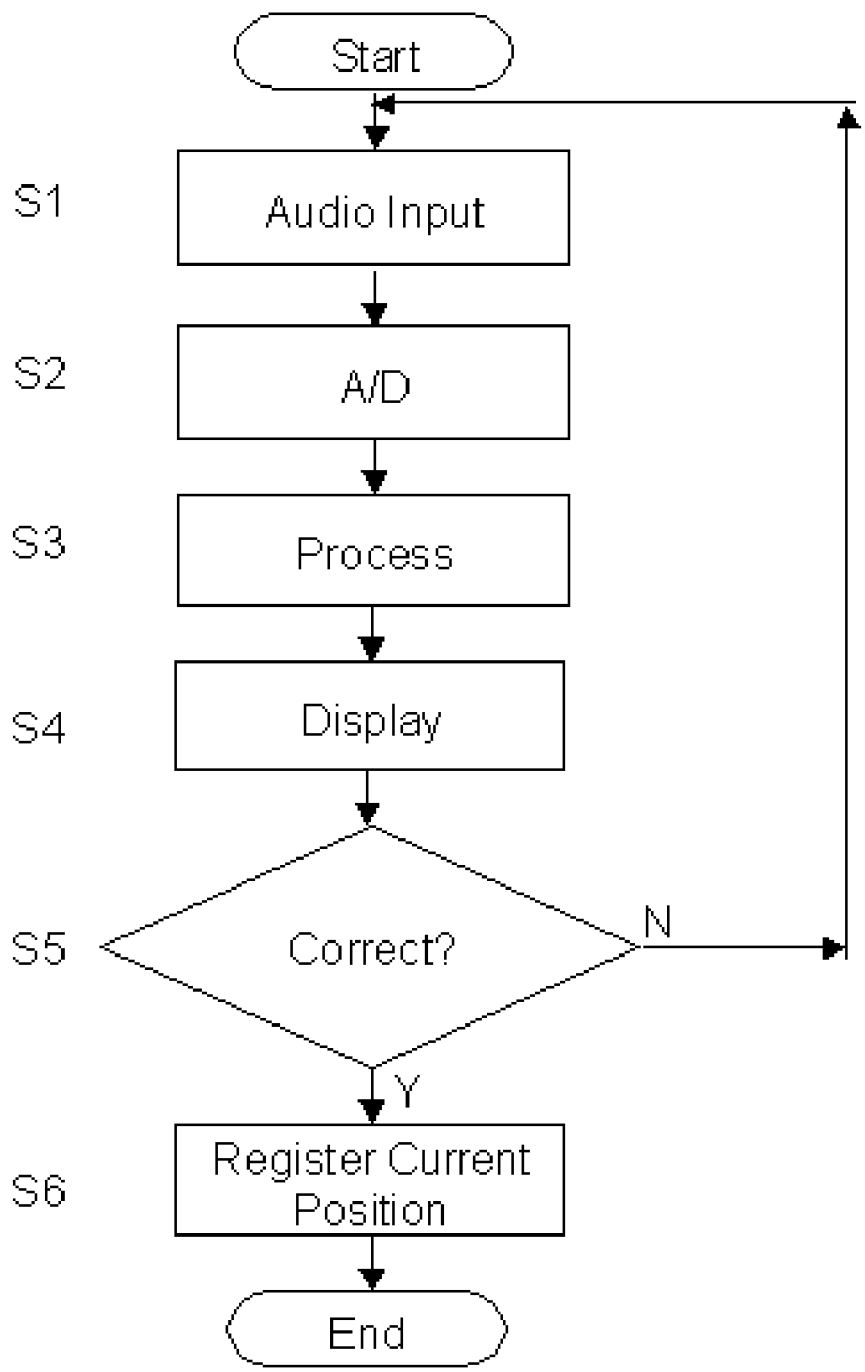
FIG. 68 is a flowchart illustrating an exemplary embodiment of the present invention.

FIG. 68 illustrates the sequence of the input current position mode described in S2 of FIG. 67. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by Input Device 210 (FIG. 1) and/or can be automatically input by utilizing the method so-called 'global positioning system' or 'GPS' as described hereinbefore.

Figure 69:
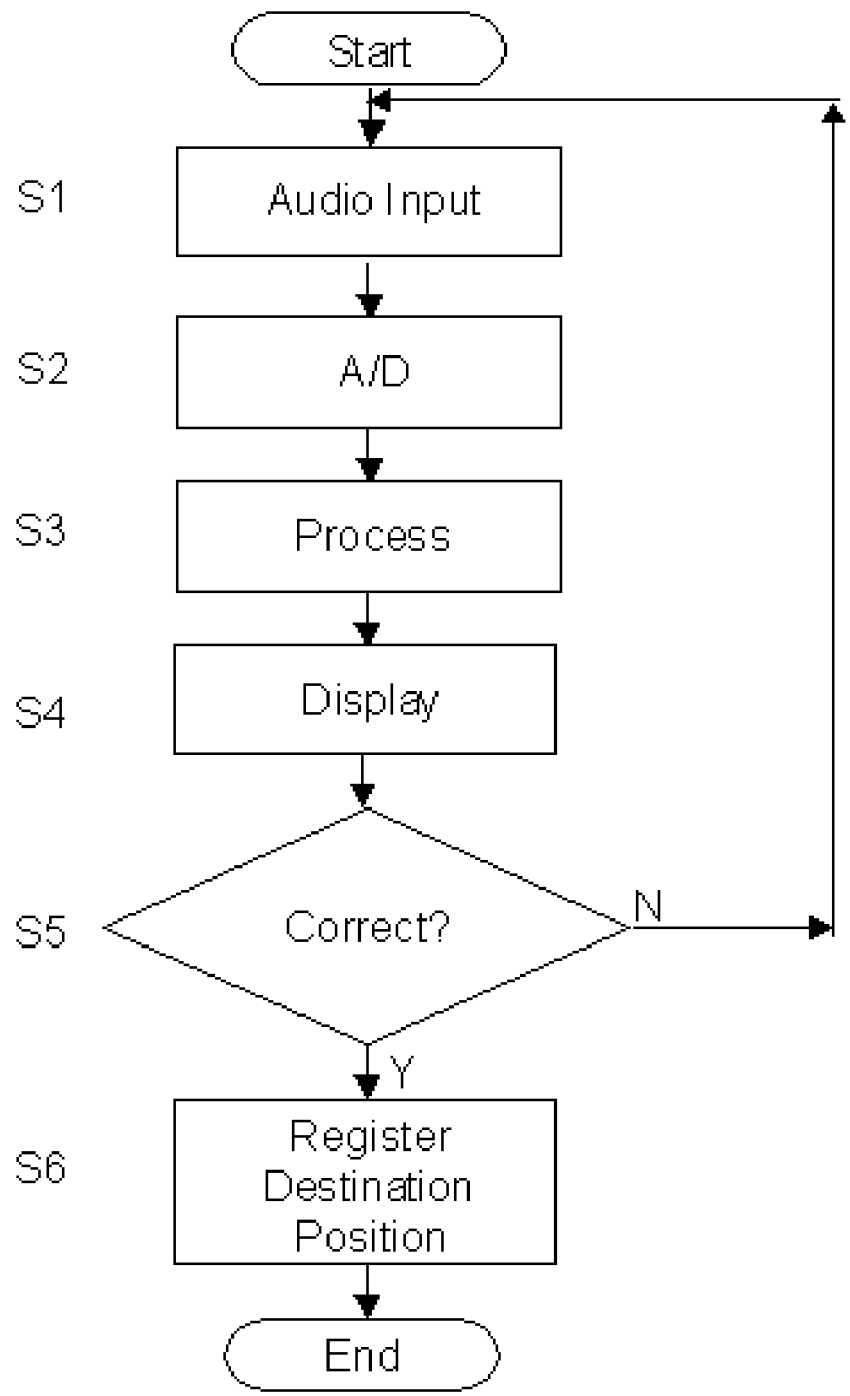
FIG. 69 is a flowchart illustrating an exemplary embodiment of the present invention.

FIG. 69 illustrates the sequence of the input destination mode described in S3 of FIG. 67. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as Destination Data (S6).

Figure 70:
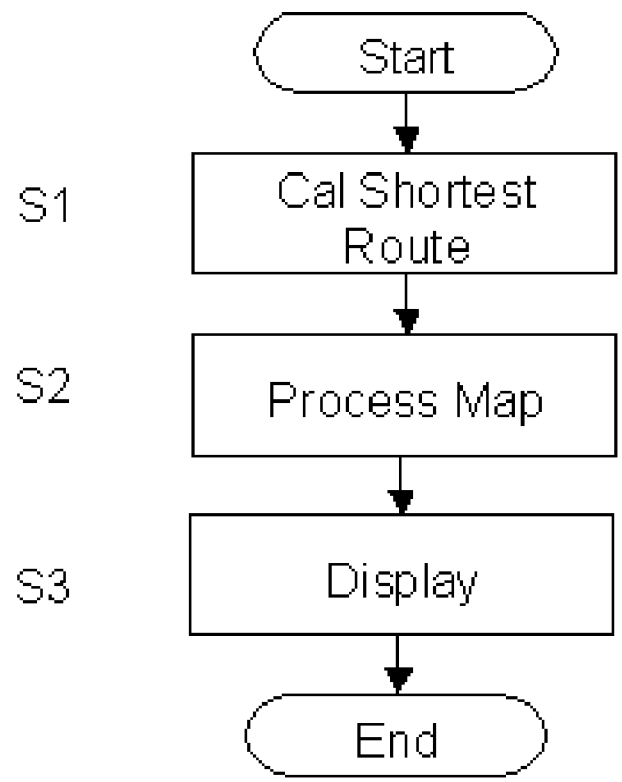
FIG. 70 is a flowchart illustrating an exemplary embodiment of the present invention.

FIG. 70 illustrates the sequence of displaying the shortest route from the current position to the destination. CPU 211 (FIG. 1) retrieves both the current position data and the Destination Data which are input by the method described in FIGS. 67 through 69 from Area 277 (FIG. 65) of RAM 206

(FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from Area 275 (FIG. 65) of RAM 206 (S2).

As another embodiment of the present invention, by way of utilizing the location data stored in Area 277, CPU 211 may produce a three-dimensional map by composing the three dimensional objects (by method so-called 'texture mapping' as described above) which are stored in Area 276 (FIG. 65) of RAM 206. The two-dimensional map and/or the three dimensional map is displayed on LCD 201 (FIG. 1) (S3).

As another embodiment of the present invention, the attribution data stored in Area 295 (FIG. 65) of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of Communication Device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from Area 277 (FIG. 65) of RAM 206. Then CPU 211 retrieves a plurality of object data which correspond to such location data from Area 276 (FIG. 65) of RAM 206 and displays a plurality of objects on LCD 201 based on such object data in a manner the user of Communication Device 200 may observe from the current location.

Figure 71:
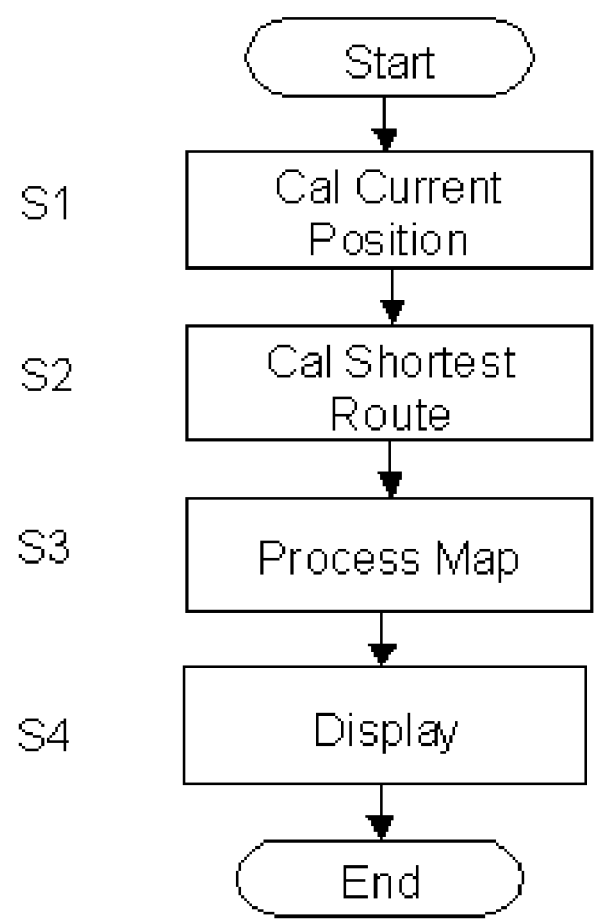
FIG. 71 is a flowchart illustrating an exemplary embodiment of the present invention.

FIG. 71 illustrates the sequence of updating the shortest route to the destination while Communication Device 200 is moving. By way of periodically and automatically inputting the current position by the method so-called 'global positioning system' or 'GPS' as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from Area 275 (FIG. 65) of RAM 206 (S3). Instead, by way of utilizing the location data stored in Area 277 (FIG. 65), CPU 211 may produce a three-dimensional map by composing the three dimensional objects by method so-called 'texture mapping' which are stored in Area 276 (FIG. 65) of RAM 206. The two-dimensional map and/or the three-dimensional map is displayed on LCD 201 (FIG. 1) (S4). The shortest route to the destination is re-highlighted by a significant color (such as red) to enable the user of Communication Device 200 to easily recognize the updated route on LCD 201.

Figure 72:
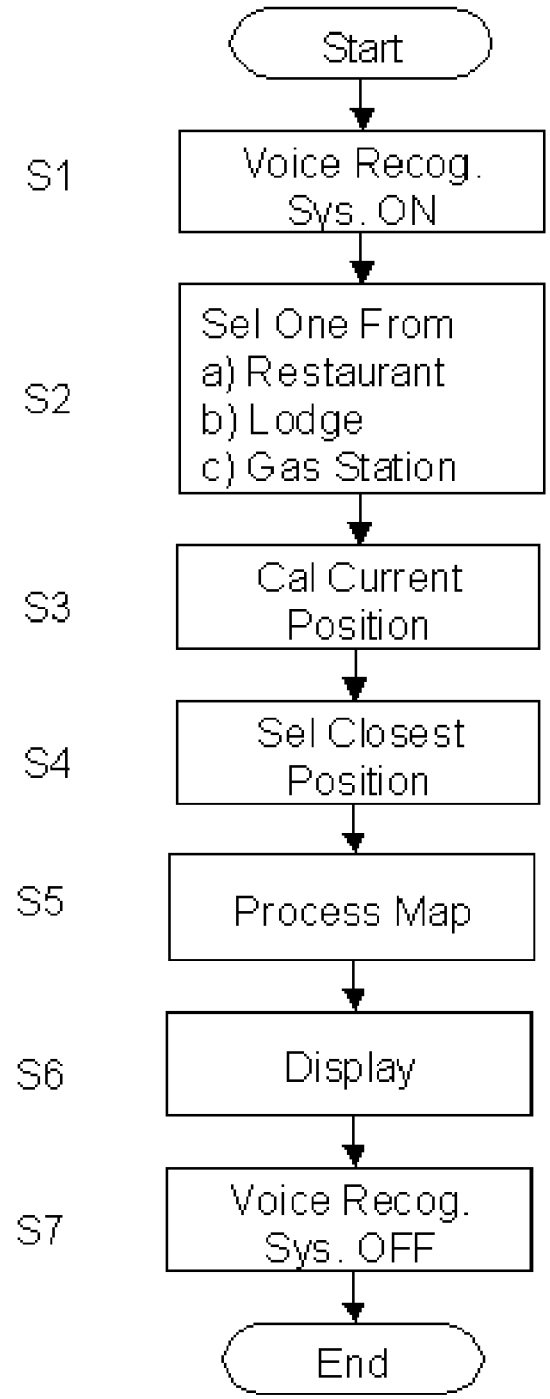
FIG. 72 is a flowchart illustrating an exemplary embodiment of the present invention.

FIG. 72 illustrates the method of finding the shortest location of the desired facility, such as restaurant, hotel, gas station, etc. The voice recognition system is activated in the manner described in FIG. 67 (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described in FIG. 68 and/or FIG. 71 (S3). From the data selected in S2, CPU 211 scans Area 277 (FIG. 65) of RAM 206 and searches the location of the facilities of the selected category (such as restaurant) which is the closest to the current position (S4). CPU 211 then retrieves the relevant two-dimensional map data which should be displayed on LCD 201 from Area 275 of RAM 206 (FIG. 65) (S5). Instead, by way of utilizing the location data stored in 277 (FIG. 65), CPU 211 may produce a three-dimensional map by composing the three dimensional objects by method so-called 'texture mapping' which are stored in Area 276 (FIG. 65) of RAM 206. The two-dimensional map and/or the three dimensional map is displayed on LCD 201 (FIG. 1) (S6). The shortest route to the destination is re-highlighted by a significant color (such as red) to enable the user of Communication Device 200 to easily recognize the updated route on LCD 201. The voice recognition system is deactivated thereafter (S7).

Figure 73:
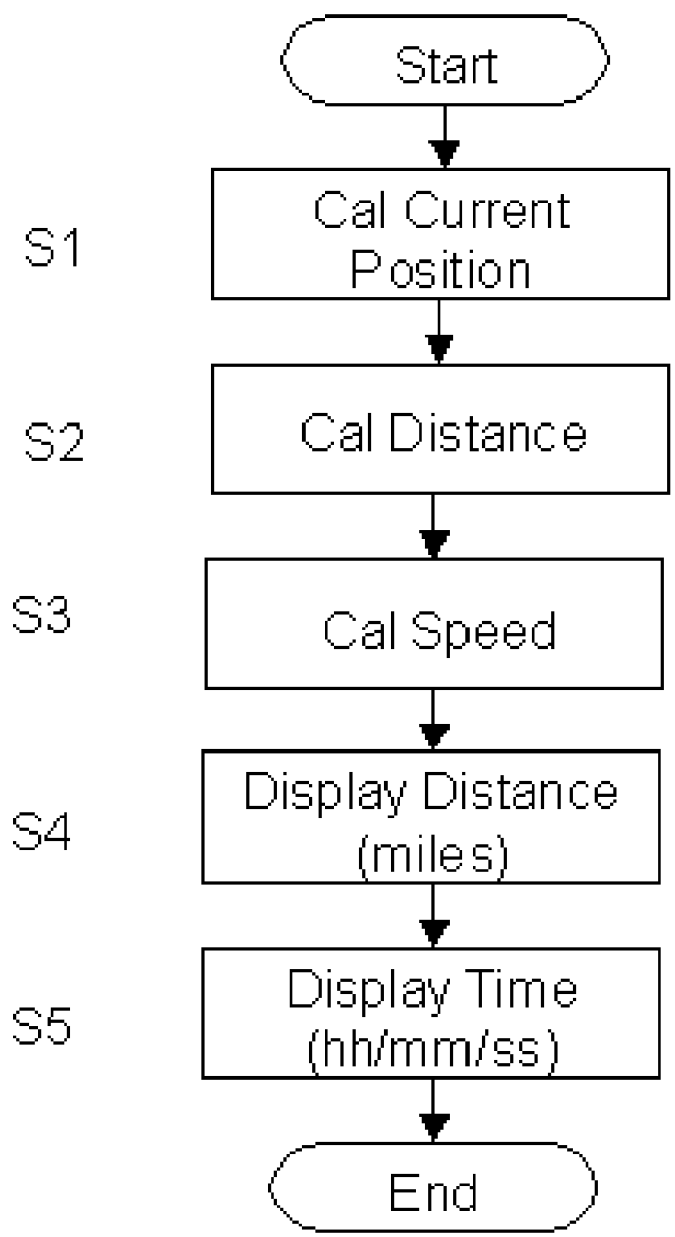
FIG. 73 is a flowchart illustrating an exemplary embodiment of the present invention.

FIG. 73 illustrates the method of displaying the time and distance to the destination. As illustrated in FIG. 73, CPU 211 (FIG. 1) calculates the current position wherein the source data can be input from the method described in FIG. 68 and/or FIG. 71 (S1). The distance is calculated from the method described in FIG. 70 (S2). The speed is calculated from the distance which Communication Device 200 has proceeded within specific period of time (S3). The distance to the destination and the time left are displayed on LCD 201 (FIG. 1) (S4 and S5).

Figure 74:
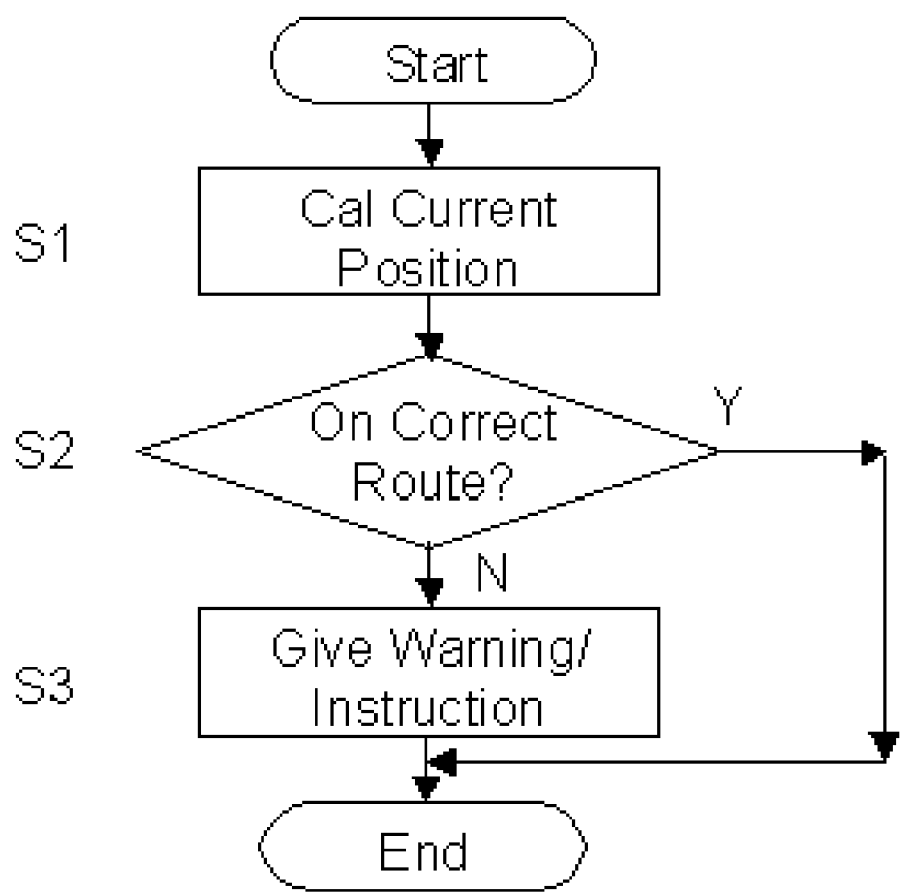
FIG. 74 is a flowchart illustrating an exemplary embodiment of the present invention.

FIG. 74 illustrates the method of warning and giving instructions when the user of Communication Device 200 deviates from the correct route. By way of periodically and automatically inputting the current position by the method so-called 'global positioning system' or 'GPS' as described hereinbefore, the current position is continuously updated (S1). If the current position deviates from the correct route (S2), a warning is given from Speaker 216 (FIG. 1) and/or on LCD 201 (FIG. 1) (S3). The method described in FIG. 74 is repeated for a certain period of time. If the deviation still exists after such period of time has passed, CPU 211 (FIG. 1) initiates the sequence described in FIG. 70 and calculates the shortest route to the destination and display it on LCD 201. The details of such sequence is as same as the one explained in FIG. 70.

Figure 74A:
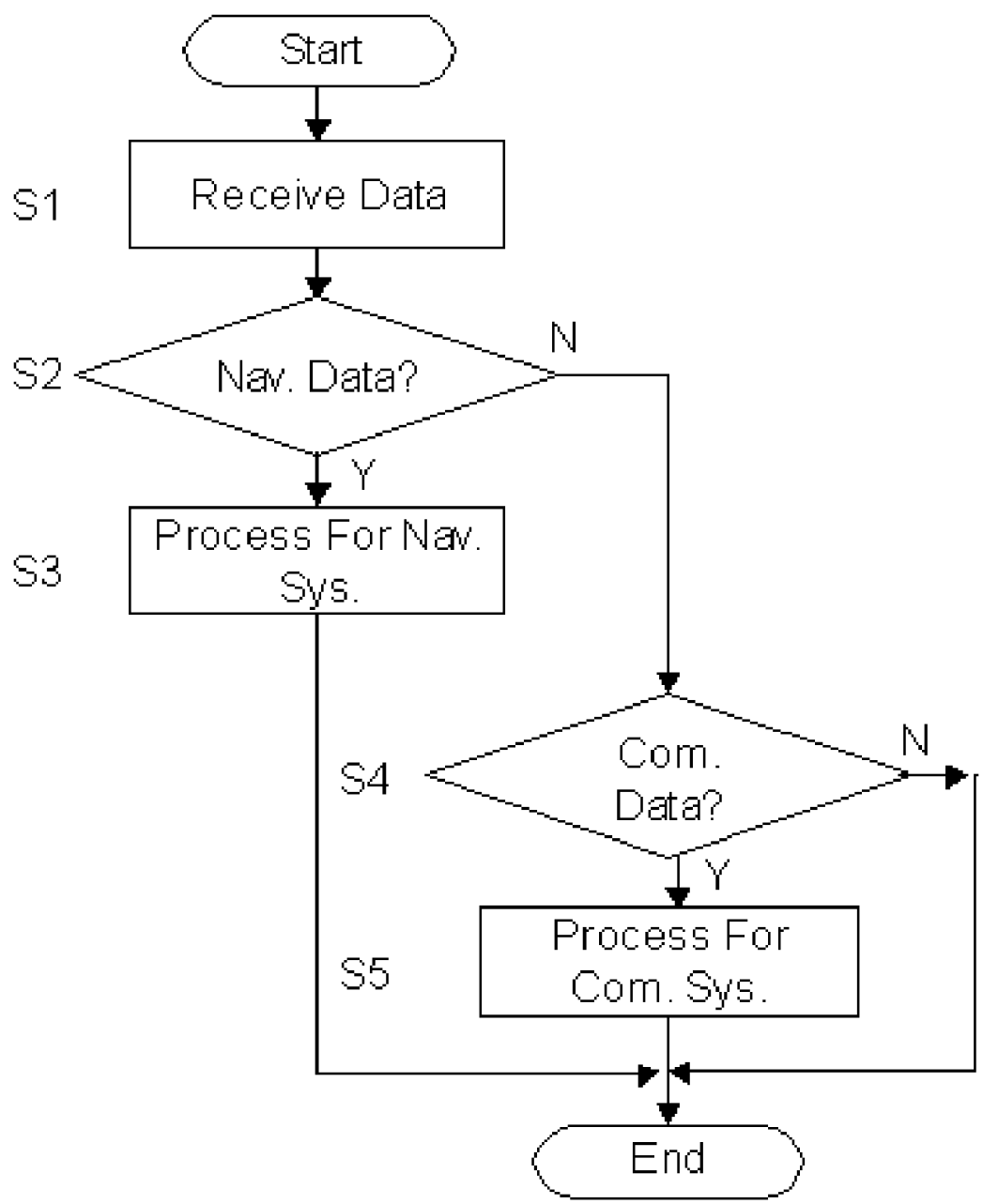
FIG. 74a is a flowchart illustrating an exemplary embodiment of the present invention.

FIG. 74a illustrates the overall operation of Communication Device 200 regarding the navigation system and the communication system. When Communication Device 200 receives data from Antenna 218 (FIG. 1) (S1), CPU 211 (FIG. 1) determines whether the data is navigation data, i.e., data necessary to operate the navigation system (S2). If the data received is a navigation data, the navigation system described in FIGS. 67 through 74 is performed (S3). On the other hand, if the data received is a communication data (S4), the communication system, i.e., the system necessary for wireless communication which is mainly described in FIG. 1 is performed (S5).

<<Navigation System—Summary>>

The foregoing inventions may be summarized as the following.

(1) A GPS navigation device comprising a display, a microphone, a GPS navigation system which identifies the present location of said GPS navigation device, and a voice recognition system which retrieves a text and numeric data from an analog audio input from said microphone wherein said analog audio is input to said microphone, said voice recognition system retrieves said text and numeric data from said analog audio, said text and numeric data is input to said GPS navigation system thereby enabling the user of said GPS navigation device to input necessary data therein without using his/her hands and/or without physically contacting said GPS navigation device and utilizing said GPS navigation system.

(2) A communication device comprising a GPS navigation system, a wireless communication system, and an antenna wherein said antenna receives navigation data which is necessary to operate said GPS navigation system, and said antenna also receives communication data which is necessary to operate said wireless communication system thereby enabling said communication device to be compact and also enabling the user of said communication device to find directions by utilizing said GPS navigation system as well as using said wireless communication system.

(3) A GPS navigation device comprising a display means, a navigation system which identifies the present location of said GPS navigation device, a storage means which stores a plurality of object data which is a three-dimensional data of object that is displayed on said display means and a plurality of location data which represents the location of said object wherein based on a specific information produced by said navigation system a specific location data is selected from said storage means, a plurality of said object data which corresponds to said location data is retrieved from said storage means, and said plurality of said object data is displayed on said display means in a manner the user of said GPS navigation device observes from the current location of said GPS navigation device thereby enables said user of said GPS navigation device to have a realistic view from said current location on said display means.

(4) A GPS navigation device comprising a display means, a navigation system which identifies the shortest route from a first location to a second location, a storage means which stores a plurality of location data which is categorized in one or more groups wherein when a certain group is selected, said navigation system retrieves a plurality of location data pertaining to said certain group, and identifies the shortest route to one of the location data pertaining to said certain group thereby enables the user of said GPS navigation device to take the shortest route from said user's present location to the location of said certain group.

(5) A GPS navigation device comprising a display means, a navigation system which identifies the shortest route from a first location to a second location, a storage means which stores a plurality of attribution data wherein said shortest route is calculated by referring to said plurality of attribution data thereby enabling the user of said GPS navigation device to reach said second location within shorter period time by way of avoiding road blocks, traffic accidents, road constructions, and traffic jams.

<<Remote Controlling System>>

FIGS. 75 through 83 illustrate the remote controlling system utilizing Communication Device 200 (FIG. 1).

As illustrated in FIG. 75, Communication Device 200 is connected to Network NT. Network NT may be the internet or have the same or similar structure described in FIG. 2a, FIG. 2b and/or FIG. 2c except 'Device B' is substituted to 'Sub-host SH' in these drawings. Network NT is connected to Sub-host SH in a wireless fashion. Sub-host SH administers various kinds of equipment installed in building 801, such as TV 802, Microwave Oven 803, VCR 804, Bathroom 805, Room Light 806, AC 807, Heater 808, Door 809, and CCD camera 810. Communication Device 200 transfers a control signal to Network NT in a wireless fashion via Antenna 218 (FIG. 1), and Network NT forwards the control signal in a wireless fashion to Sub-host SH, which controls the selected equipment based on the control signal. Communication Device 200 is also capable to connect to Sub-host SH without going through Network NT and transfer directly the control signal to Sub-host SH in a wireless fashion via Antenna 218.

Figure 76:
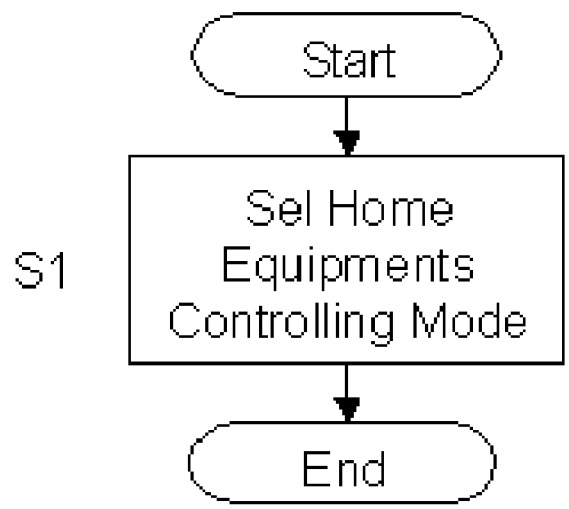
FIG. 76 is a flowchart illustrating an exemplary embodiment of the present invention.

As illustrated in FIG. 76, Communication Device 200 is enabled to perform the remote controlling system when the device is set to the home equipment controlling mode. Once Communication Device 200 is set to the home equipment controlling mode, LCD 201 (FIG. 1) displays all pieces of equipment which are remotely controllable by Communication Device 200. Each equipment can be controllable by the following method.

Figure 77:
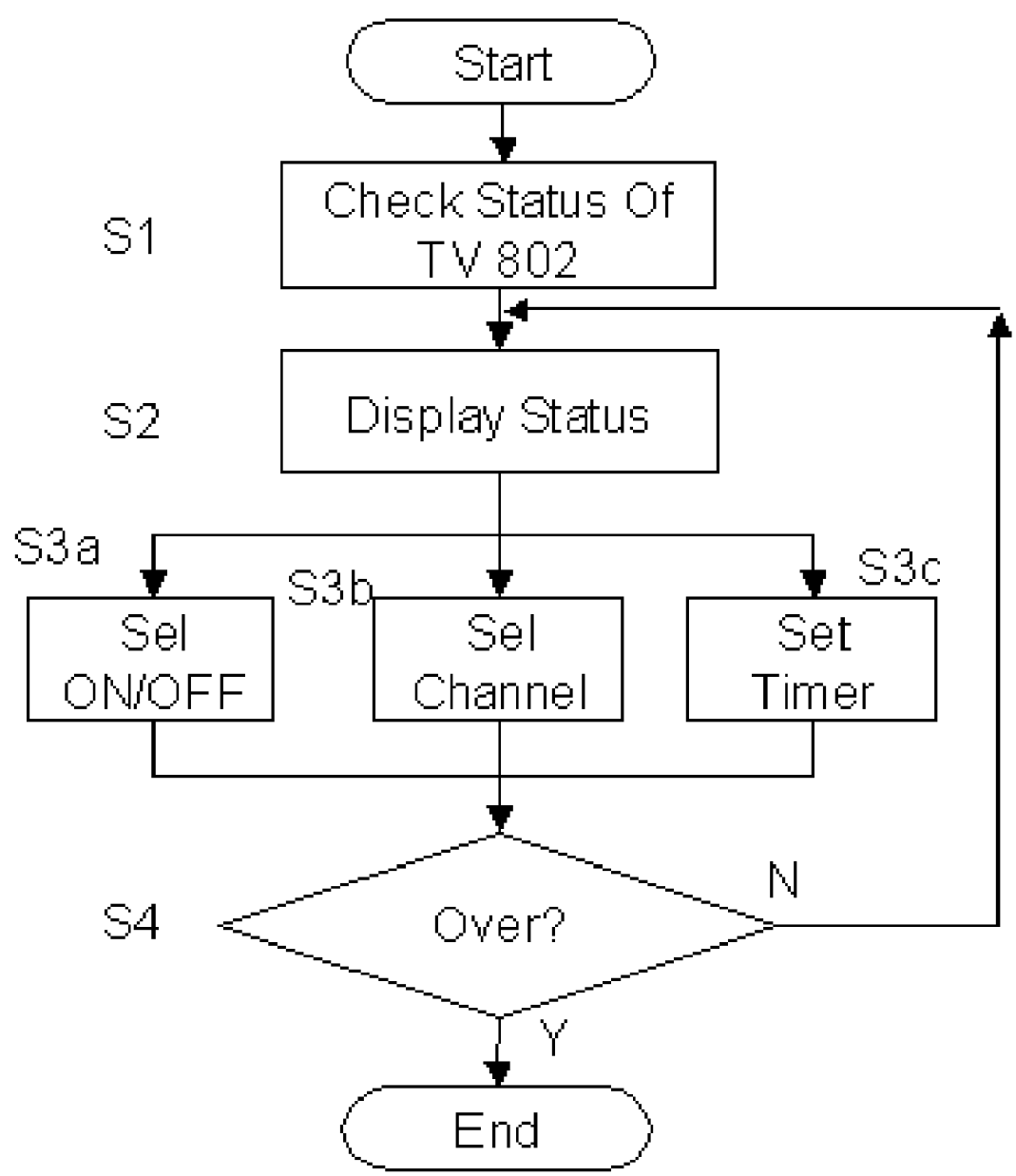
FIG. 77 is a flowchart illustrating an exemplary embodiment of the present invention.

FIG. 77 illustrates the method of remotely controlling TV 802. In order to check the status of TV 802, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of TV 802, i.e., the status of the power (ON/OFF), the channel, and the timer of TV 802 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3a), selects the channel (S3b), and/or sets the timer of TV 802 (S3c). The sequence of S2 and S3 can be repeated (S4).

Figure 78:
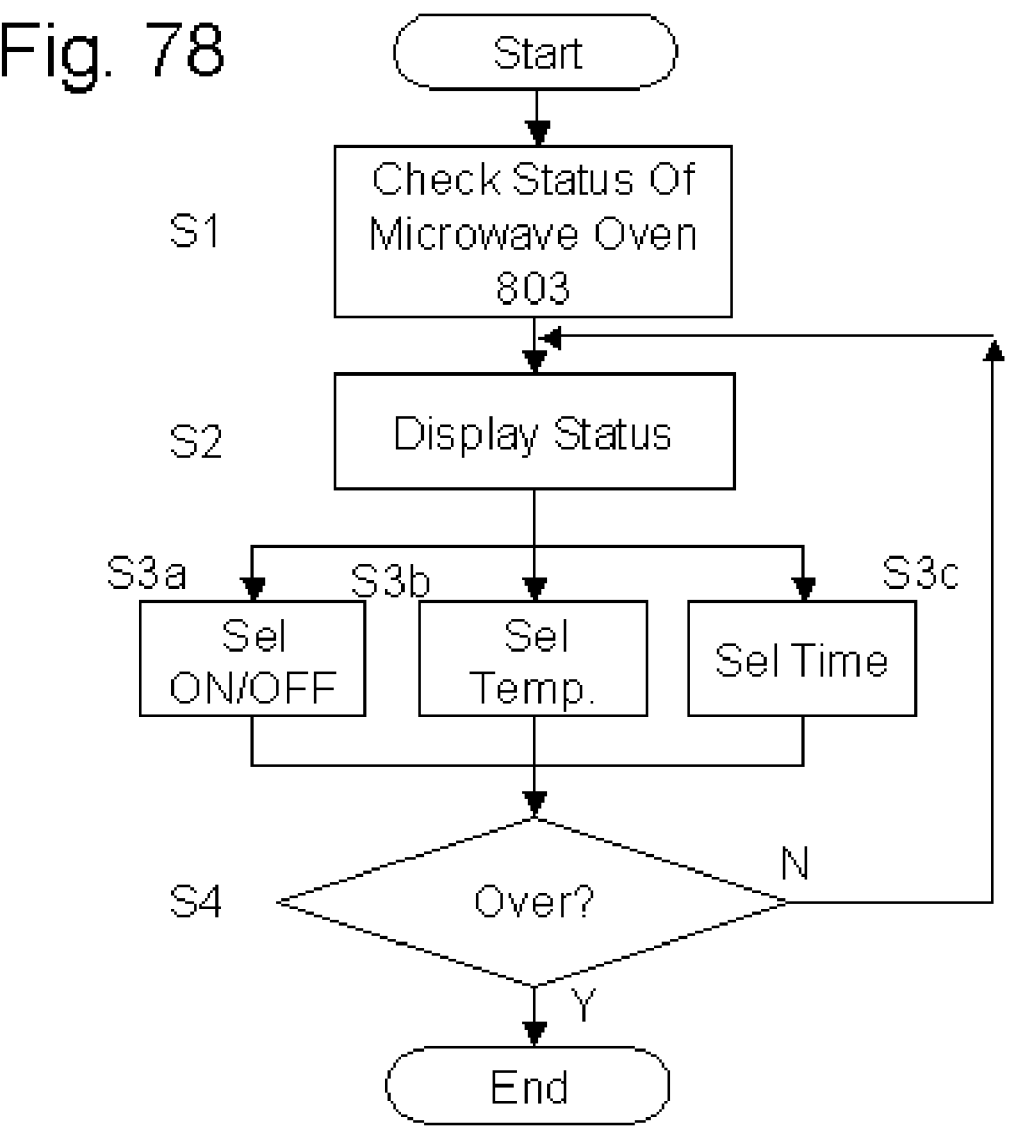
FIG. 78 is a flowchart illustrating an exemplary embodiment of the present invention.

FIG. 78 illustrates the method of remotely controlling Microwave Oven 803. In order to check the status of Microwave Oven 803, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Microwave Oven 803, i.e., the status of the power (ON/OFF), the status of temperature, and the timer of Microwave Oven 803 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3a), selects the temperature (S3b), and/or sets the timer of Microwave Oven 803 (S3c). The sequence of S2 and S3 can be repeated (S4).

Figure 79:
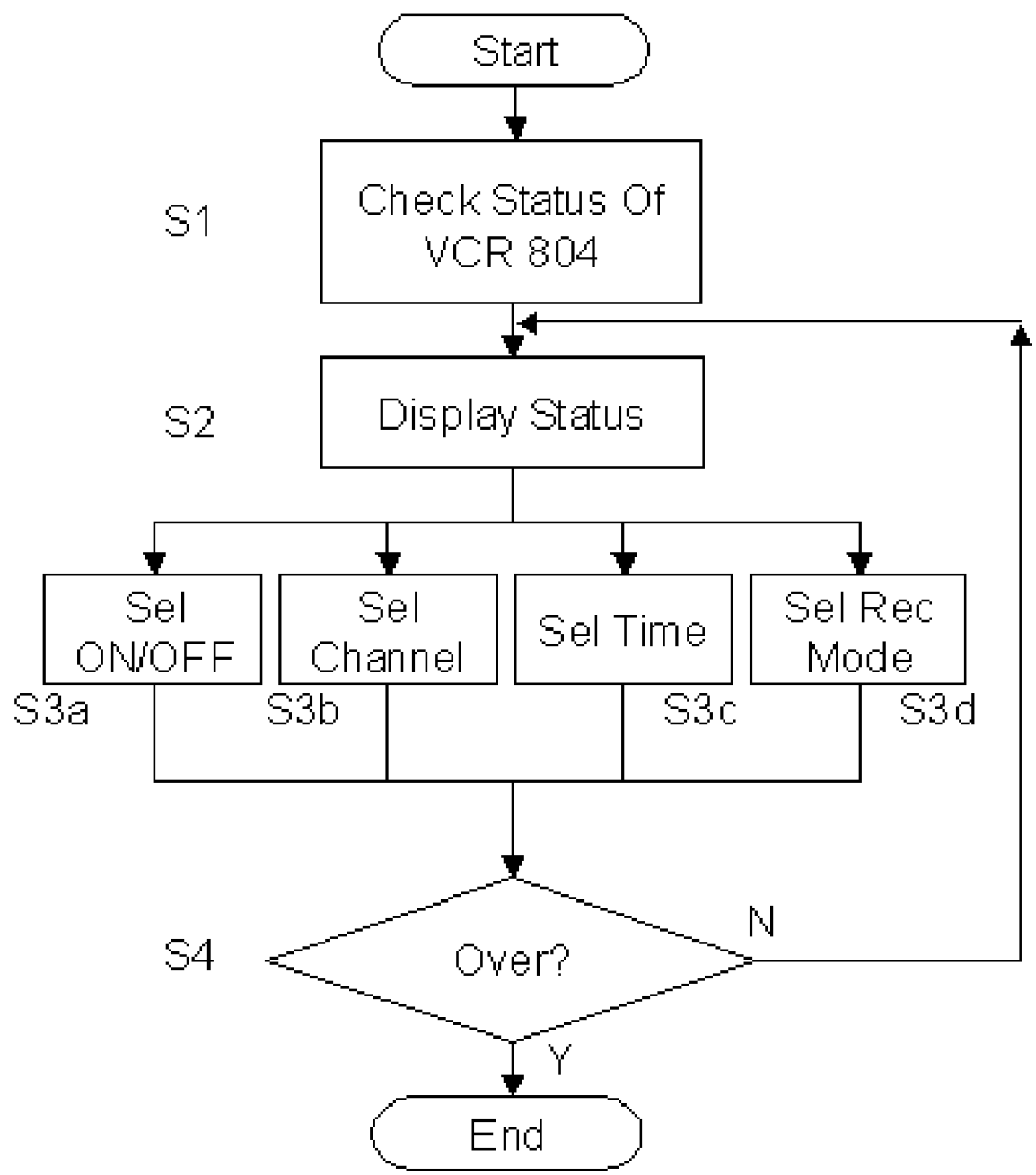
FIG. 79 is a flowchart illustrating an exemplary embodiment of the present invention.

FIG. 79 illustrates the method of remotely controlling VCR 804. In order to check the status of VCR 804, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of VCR 804, i.e., the status of the power (ON/OFF), the channel, the timer, and the status of the recording mode (e.g., one day, weekdays, or weekly) of VCR 804 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3a), selects the TV channel (S3b), sets the timer (S3c), and/or selects the recording mode of VCR 804 (S3d). The sequence of S2 and S3 can be repeated (S4).

Figure 80:
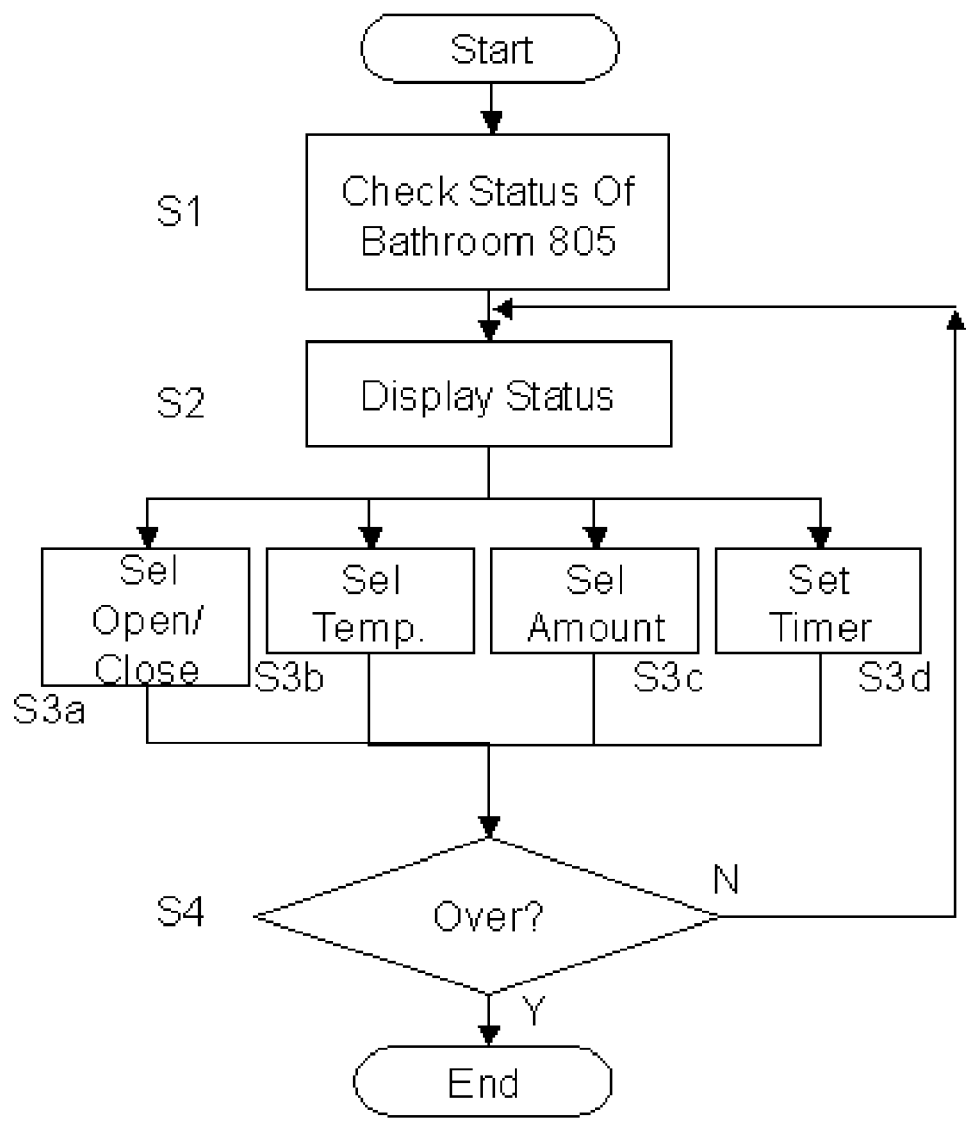
FIG. 80 is a flowchart illustrating an exemplary embodiment of the present invention.

FIG. 80 illustrates the method of remotely controlling Bathroom 805. In order to check the status of Bathroom 805, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Bathroom 805, i.e., the status of the bath plug (or the stopper for bathtub) (OPEN/CLOSE), the temperature, the amount of hot water, and the timer of Bathroom 805 (S1), and returns the results to Communication Device 200 via Network NT, which are displayed on LCD 201 (FIG. 1) (S2). Based on the control signal produced by Communication Device 200, which is transferred via Network NT, Sub-host SH opens (or closes) the bath plug (S3*a*), selects the temperature (S3*b*), selects the amount of hot water (S3*c*), and/or sets the timer of Bathroom 805 (S3*d*). The sequence of S2 and S3 can be repeated (S4).

Figure 81:
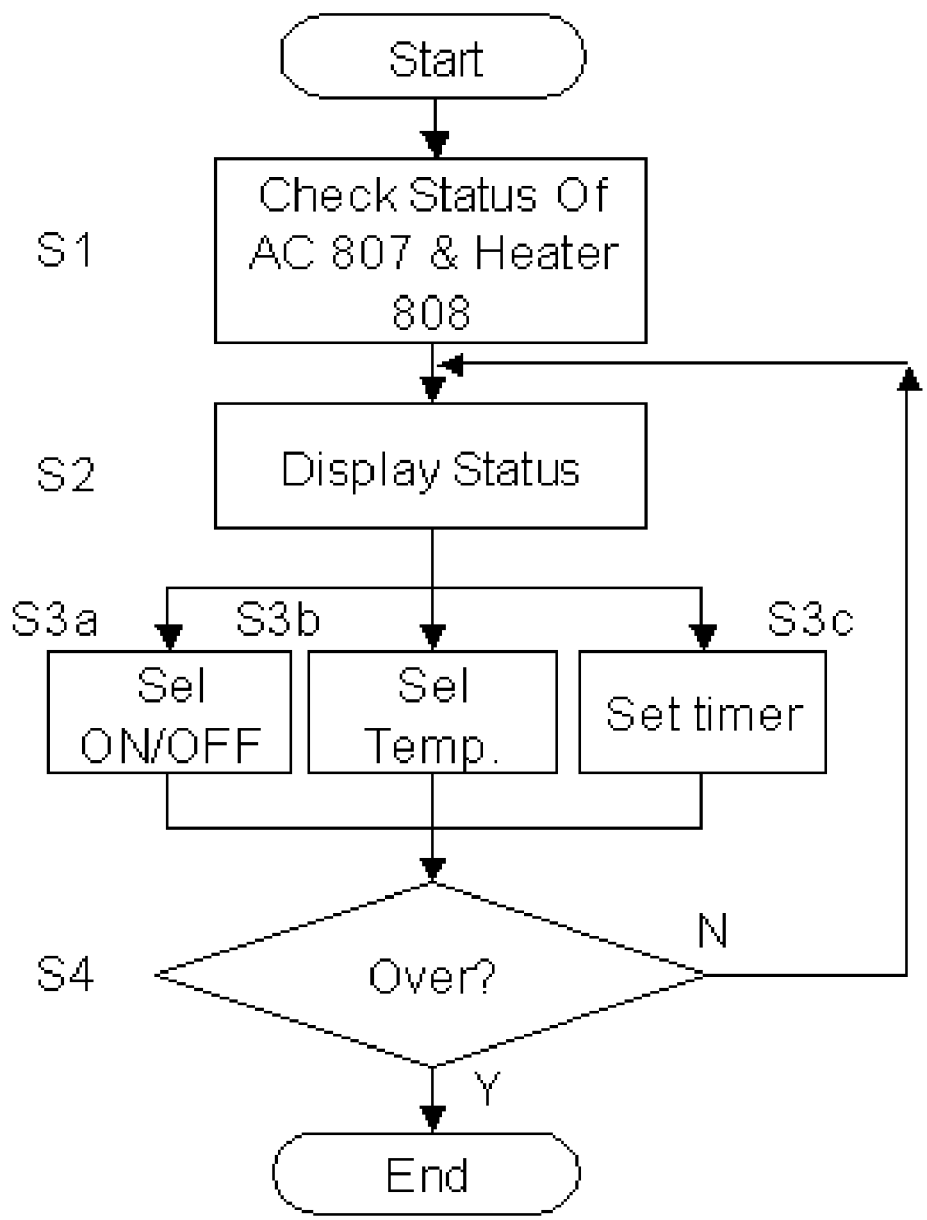
FIG. 81 is a flowchart illustrating an exemplary embodiment of the present invention.

FIG. 81 illustrates the method of remotely controlling AC 807 and Heater 808. In order to check the status of AC 807 and/or Heater 808 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of AC 807 and/or Heater 808, i.e., the status of the power (ON/OFF), the status of temperature, and the timer of AC 807 and/or Heater 808 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the temperature (S3*b*), and/or sets the timer of AC 807 and/or Heater 808 (S3*c*). The sequence of S2 and S3 can be repeated (S4).

Figure 82:
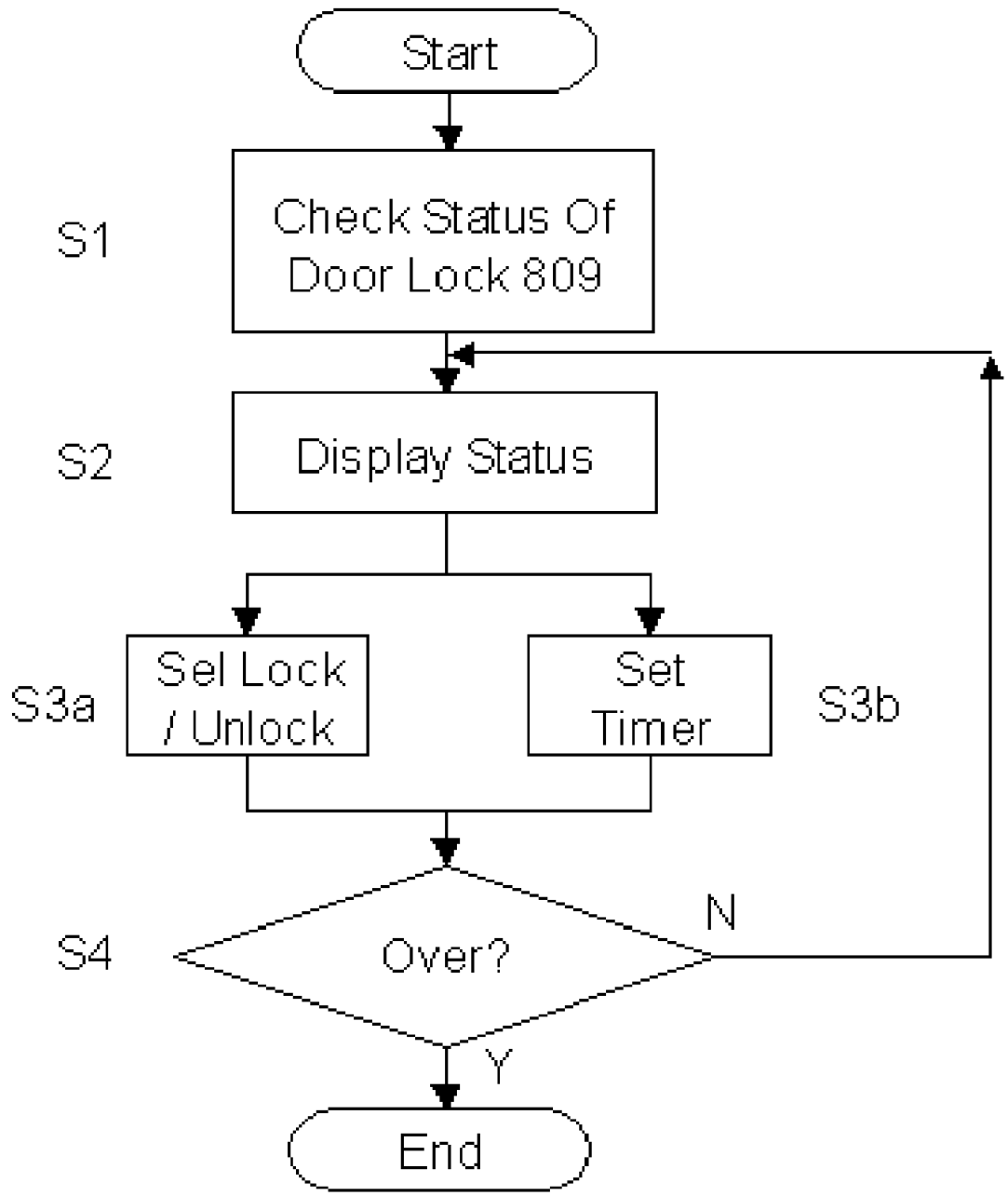
FIG. 82 is a flowchart illustrating an exemplary embodiment of the present invention.

FIG. 82 illustrates the method of remotely controlling Door 809. In order to check the status of Door 809 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Door 809, i.e., the status of the door lock (LOCKED/UNLOCKED), and the timer of door lock (S1), and returns the results to Communication Device 200 via Network NT, which are displayed on LCD 201 (FIG. 1) (S2). Based on the control signal produced by Communication Device 200, which is transferred via Network NT, Sub-host SH locks (or unlocks) the door (S3*a*), and/or sets the timer of the door lock (S3*b*). The sequence of S2 and S3 can be repeated (S4).

Figure 83:
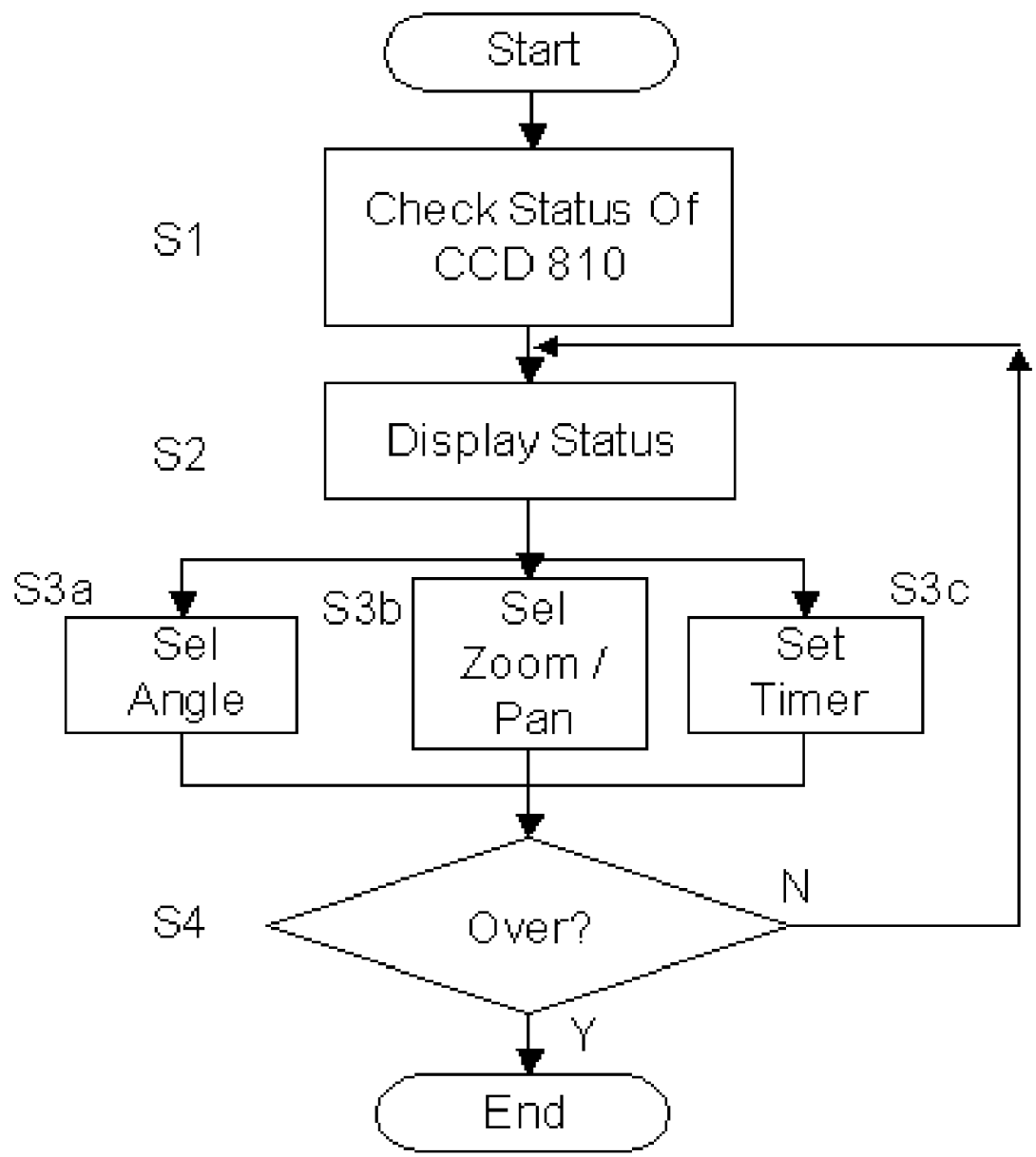
FIG. 83 is a flowchart illustrating an exemplary embodiment of the present invention.

FIG. 83 illustrates the method of CCD Camera 810. In order to check the status of CCD Camera 810 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of CCD Camera 810, i.e., the status of the camera angle, zoom and pan, and the timer of CCD Camera 810 (S1), and returns the results to Communication Device 200 via Network NT, which are displayed on LCD 201 (FIG. 1) (S2). Based on the control signal produced by Communication Device 200, which is transferred via Network NT, Sub-host SH selects the camera angle (S3*a*), selects zoom or pan (S3*b*), and/or sets the timer of CCD Camera 810 (S3*c*). The sequence of S2 and S3 can be repeated (S4).

Figure 84:
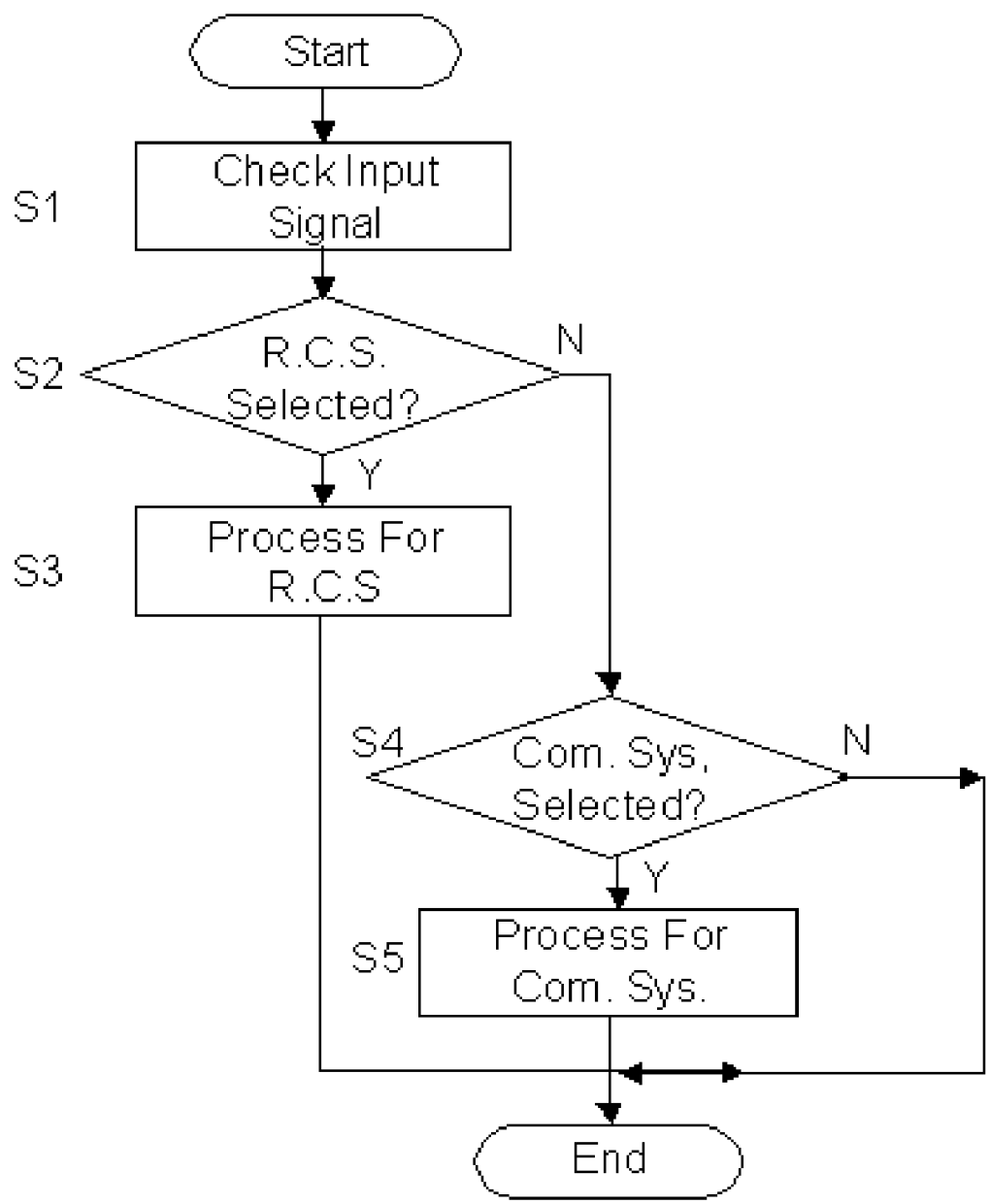
FIG. 84 is a flowchart illustrating an exemplary embodiment of the present invention.

FIG. 84 illustrates the overall operation of Communication Device 200 regarding the remote controlling system and communication system. CPU 211 (FIG. 1) periodically checks the input signal from Input Device 210 (FIG. 1) (S1). If the input signal indicates that the remote controlling system is selected (S2), CPU 211 initiates the process for the remote controlling system (S3). On the other hand, if the input signal indicates that the communication system is selected (S4), CPU 211 initiates the process for the communication system (S5).

Figure 85:
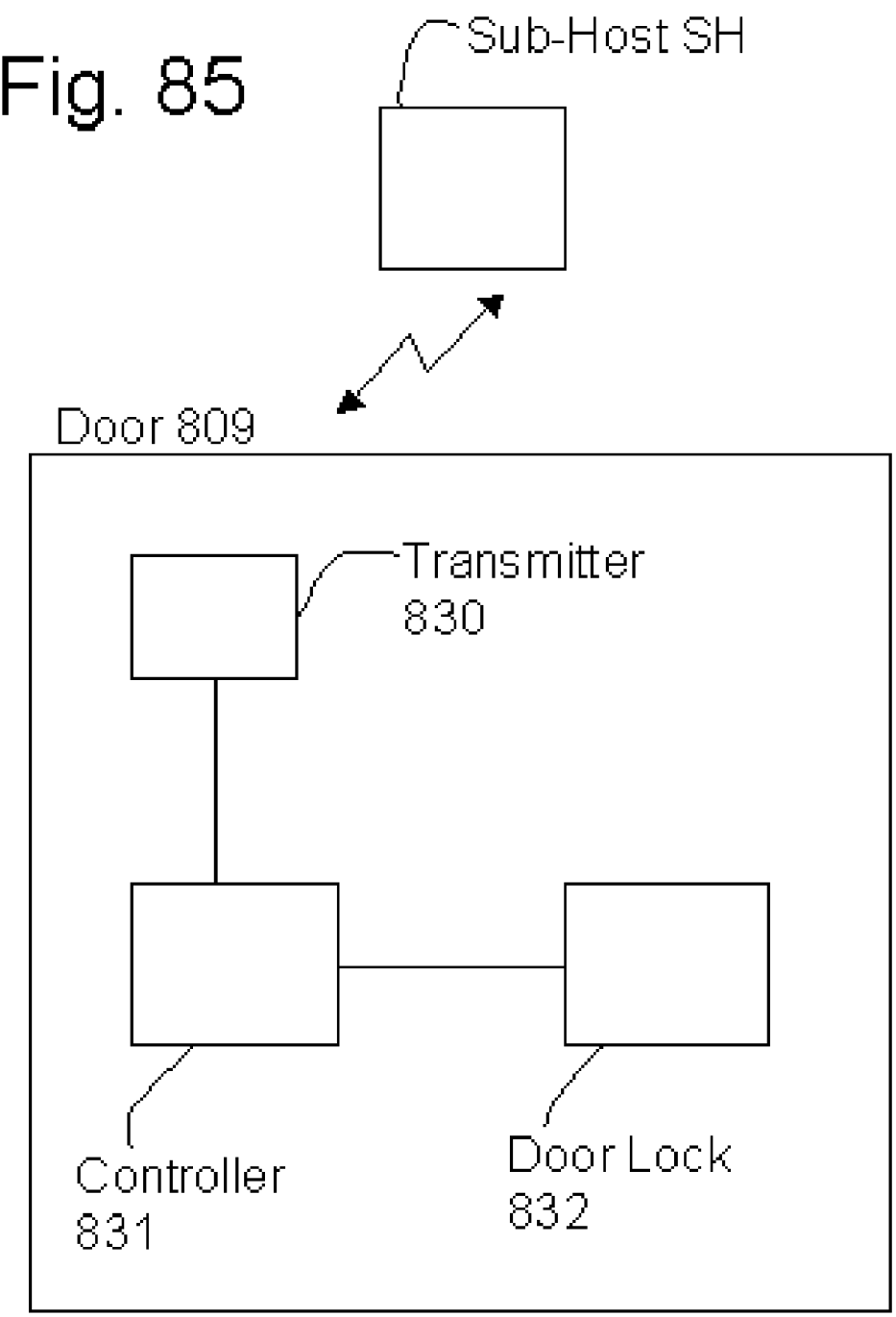
FIG. 85 is a block diagram illustrating an exemplary embodiment of the present invention.

FIG. 85 is a further description of the communication performed between Sub-host SH and Door 809 which is described in FIG. 82. When Sub-host SH receives a check request signal as described in FIG. 82, Sub-host SH sends a check status signal which is received by Controller 831 via Transmitter 830. Controller 831 checks the status of Door Lock 832 and sends back a response signal to Sub-host SH via Transmitter 830 in a wireless fashion indicating that Door Lock 832 is locked or unlocked. Upon receiving the response signal from Controller 832, Sub-host SH sends a result signal to Communication Device 200 in a wireless fashion as described in FIG. 82. When Sub-host SH receives a control signal from Communication Device 200 in a wireless fashion as described in FIG. 82, it sends a door control signal which is received by Controller 831 via Transmitter 830. Controller 831 locks or unlocks Door Lock 832 in conformity with the door control signal. As another embodiment of the present invention, Controller 831 may owe the task of both Sub-host SH and itself and communicate directly with Communication Device 200 via Network NT.

As another embodiment of the present invention each equipment, i.e., TV 802, Microwave Oven 803, VCR 804, Bathroom 805, Room Light 806, AC 807, Heater 808, Door Lock 809, and CCD Camera 810, may carry a computer which directly administers its own equipment and directly communicates with Communication Device 200 via Network NT instead of Sub-host SH administering all pieces of equipment and communicate with Communication Device 200.

The above-mentioned invention is not limited to equipment installed in building 801 (FIG. 75), i.e., it is also applicable to the ones installed in all carriers in general, such as automobiles, airplanes, space shuttles, ships, motor cycles and trains.

<<Remote Controlling System—Summary>>

The foregoing inventions may be summarized as the following.

(1) A remote controlling system comprising a wireless communication device, an administration device which is capable of communicating with said communication device in a wireless fashion, a plurality of equipment which are subject to control of said administration device wherein said communication device sends a controlling signal to said administration device, said administration device controls said plurality of equipment in conformity with said control signal thereby enabling the user of said remote controlling system to remotely control one or more of said equipment in a wireless fashion from any location he/she desires and enabling said user to remotely control one or more said equipment as well as using said remote controlling system to communicate with other devices.

(2) A communication device comprising a remote controlling system which locks or unlocks a door, a wireless communication system, and an antenna wherein said antenna sends a door control signal which is necessary to lock or unlock said door, and said antenna also sends a communication signal which is necessary to operate said wireless communication system thereby enabling said communication device to be compact and also enabling the user of said communication device to lock or unlock said door as well as using said wireless communication system.

<<Auto Emergency Calling System>>

Figure 86:
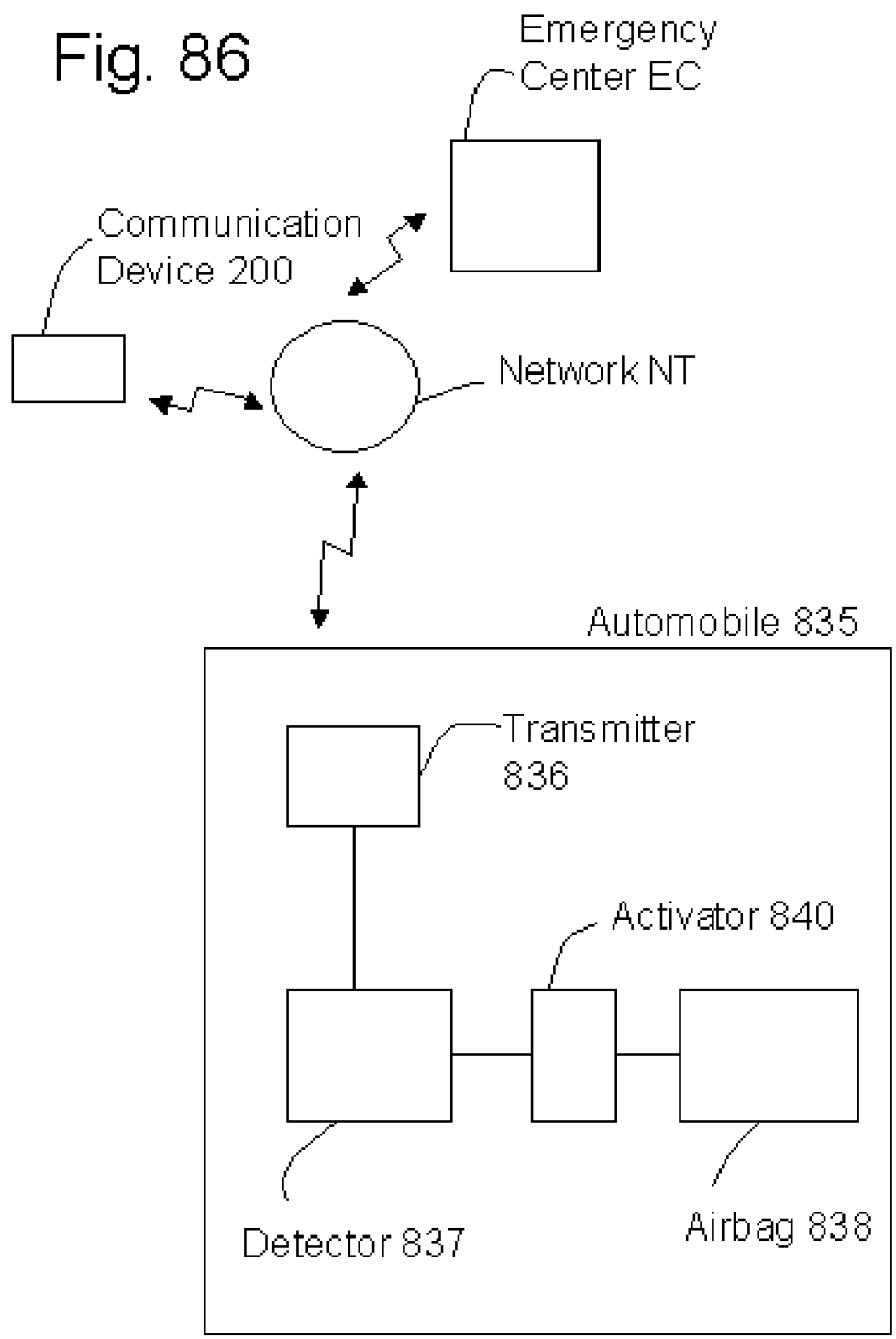
FIG. 86 is a simplified illustration illustrating an exemplary embodiment of the present invention.

FIGS. 86 and 87 illustrate the automatic emergency calling system utilizing Communication Device 200 (FIG. 1).

FIG. 86 illustrates the overall structure of the automatic emergency calling system. Communication Device 200 is connected to Network NT in a wireless fashion. Network NT may be the Internet or have the same or similar structure described in FIGS. 2*a*, and/or 2*c*. Network NT is connected to Automobile 835 thereby enabling Automobile 835 to communicate with Communication Device 200 in a wireless fashion. Emergency Center EC, a host computer, is also connected to Automobile 835 in a wireless fashion via Network NT. Airbag 838 which prevents persons in Automobile 835 from being physically injured or minimizes such injury in case traffic accidents occur is connected to Activator 840 which activates Airbag 838 when it detects an impact of more than certain level. Detector 837 sends an emergency signal via Transmitter 836 in a wireless fashion when Activator 840 is activated. The activation signal is sent to both Emergency Center EC and Communication Device 200. In lieu of Airbag 838 any equipment may be used so long as such equipment prevents from or minimizes physical injuries of the persons in Automobile 835.

FIG. 87 illustrates the overall process of the automatic emergency calling system. Detector 837 (FIG. 86) periodically checks the status of Activator 840 (FIG. 86) (S1). If the Activator 840 is activated (S2), Detector 837 transmits an emergency signal via Transmitter 836 in a wireless fashion (S3a). The emergency signal is transferred via Network NT and received by Emergency Center EC (FIG. 86) and by Communication Device 200 in a wireless fashion (S3b).

As another embodiment of the present invention, the power of Detector 837 (FIG. 86) may be usually turned off, and Activator 840 (FIG. 86) may turn on the power of Detector 837 by the activation of Activator 840 thereby enabling Detector 837 to send the emergency signal to both Emergency Center EC (FIG. 86) and to Communication Device 200 as described above.

This invention is also applicable to any carriers including airplanes, space shuttles, ships, motor cycles and trains.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A communication device comprising:
an input device to operate said communication device;
a visual image generator to generate a plurality of images;
a display to display said plurality of images;
a data storing device to store a plurality of data;
a camera to retrieve visual images;
an antenna system to send and receive wireless signals;
a target device location indicating means, wherein a target device location identifying request, which is the request to identify the current geographic location of a target device which is the mobile device different from said communication device, is transferred from said communication device to a host computing system via wireless link by which a target device location data which indicates the current geographic location of said target device is produced, and a map data with the current geographic location of said target device indicated thereon is displayed on said display;
a motion visual image producing means, wherein a motion visual image data retrieved from said camera is stored in said data storing device, and said motion visual image data is retrieved from said data storing device and displayed on said display;
a non-motion visual image producing means, wherein a non-motion visual image data retrieved from said camera is stored in said data storing device, and said non-motion visual image data is retrieved from said data storing device and displayed on said display; and
an auto backing up means, wherein a certain data stored in said data storing device is transferred to another computer, which is the computer different from said communication device, via wireless link for purposes of storing the backup data of said certain data in said another computer.

2. The communication device of claim 1, wherein said communication device further comprises a microphone and a speaker, wherein a 1st voice data input via said microphone is transmitted via said antenna system and a 2nd voice data received via said antenna system is output from said speaker to implement voice communication.

3. The communication device of claim 1, wherein said certain data transferred to said another computer includes a phone list.

4. The communication device of claim 1, wherein said certain data transferred to said another computer includes an address book.

5. The communication device of claim 1, wherein said certain data transferred to said another computer includes a software program.

6. The communication device of claim 1, wherein said certain data transferred to said another computer includes said non-motion visual image data.

7. A system for a communication device comprising
an input means for operating said communication device,
a visual image generating means for generating a plurality of images,
a displaying means for displaying said plurality of images,
a data storing means for storing a plurality of data,
a camera means for retrieving visual images, and
an antenna means for sending and receiving wireless signals,
comprising the step of:
a function implementing step;
said communication device is capable to implement
a target device location indicating function,
a motion visual image producing function,
a non-motion visual image producing function, and
an auto backing up function;
wherein when said target device location indicating function is implemented in said step, a target device location identifying request, which is the request to identify the current geographic location of a target device which is the mobile device different from said communication device, is transferred from said communication device to a host computing system via wireless link, a target device location data which indicates the current geographic location of said target device is produced, and a map data with the current geographic location of said target device indicated thereon is displayed on said displaying means;
when said motion visual image producing function is implemented in said step, a motion visual image data retrieved from said camera means is stored in said data storing means, and said motion visual image data is retrieved from said data storing means and displayed on said displaying means;
when said non-motion visual image producing function is implemented in said step, a non-motion visual image data retrieved from said camera means is stored in said data storing means, and said non-motion visual image data is retrieved from said data storing means and displayed on said displaying means; and when said auto backing up function is implemented in said step, a certain data stored in said data storing means is transferred to another computer, which is the computer different from said communication device, via wireless link for purposes of storing the backup data of said certain data in said another computer.

8. The method of claim 7, wherein said communication device further comprises a microphone and a speaker, wherein a 1st voice data input via said microphone is transmitted via said antenna means and a 2nd voice data received via said antenna means is output from said speaker to implement voice communication.

9. The method of claim 7, wherein said certain data transferred to said another computer includes a phone list.

10. The method of claim 7, wherein said certain data transferred to said another computer includes an address book.

11. The method of claim 7, wherein said certain data transferred to said another computer includes a software program.

12. The method of claim 7, wherein said certain data transferred to said another computer includes said non-motion visual image data.

13. The method of claim 7, wherein said certain data transferred to said another computer is/are selected by the user.

14. A system for a communication device comprising
an input means for operating said communication device,
a visual image generating means for generating a plurality of images,
a displaying means for displaying said plurality of images,
a data storing means for storing a plurality of data,
a camera means for retrieving visual images, and
an antenna means for sending and receiving wireless signals,
including the steps of:
a target device location indicting step, wherein a target device location identifying request, which is the request to identify the current geographic location of a target device which is the mobile device different from said communication device, is transferred from said communication device to a host computing system via wireless link, a target device location data which indicates the current geographic location of said target device is produced, and a map data with the current geographic location of said target device indicated thereon is displayed on said displaying means;
a motion visual image producing step, wherein a motion visual image data retrieved form said camera means is stored in said data storing means, and said motion visual image data is retrieved from said data storing means and displayed on said displaying means;
a non-motion visual image producing step, wherein a non-motion visual image data retrieved from said camera means is stored in said data storing means, and said non-motion visual image data is retrieved from said data storing means and displayed on said displaying means; and
an auto backing up step, wherein a certain data stored in said data storing means is transferred to another computer, which is the computer different from said communication device, via wireless link for purposes of storing the backup data of said certain data in said another computer.

15. The method of claim 14, wherein said communication device further comprises a microphone and a speaker, wherein a 1st voice data input via said microphone is transmitted via said antenna means and a 2nd voice data received via said antenna means is output from said speaker to implement voice communication.

16. The method of claim 14, wherein said certain data transferred to said another computer includes a phone list.

17. The method of claim 14, wherein said certain data transferred to said another computer includes an address book.

18. The method of claim 14, wherein said certain data transferred to said another computer includes a software program.

19. The method of claim 14, wherein said certain data transferred to said another computer includes said non-motion visual image data.

20. The method of claim 14, wherein said certain data transferred to said another computer is/are selected by the user.

* * * * *